US012536586B2

(12) United States Patent
Simpson

(10) Patent No.: US 12,536,586 B2
(45) Date of Patent: *Jan. 27, 2026

(54) SYSTEM AND METHOD FOR AN AGRICULTURE EXCHANGE FOR AGRICULTURE UNITS

(71) Applicant: CirclesX LLC, Houston, TX (US)

(72) Inventor: Erik Mowery Simpson, Houston, TX (US)

(73) Assignee: CIRCLESX LLC, Houston, TX (US)

( * ) Notice: Subject to any disclaimer, the term of this patent is extended or adjusted under 35 U.S.C. 154(b) by 598 days.

This patent is subject to a terminal disclaimer.

(21) Appl. No.: 17/493,455

(22) Filed: Oct. 4, 2021

(65) Prior Publication Data

US 2022/0027997 A1 Jan. 27, 2022

Related U.S. Application Data

(63) Continuation of application No. 16/290,278, filed on Mar. 1, 2019, now Pat. No. 11,138,661, and a
(Continued)

(51) Int. Cl.
*G06Q 40/04* (2012.01)
*G06F 16/21* (2019.01)
(Continued)

(52) U.S. Cl.
CPC ........... *G06Q 40/04* (2013.01); *G06F 16/212* (2019.01); *G06F 16/248* (2019.01); *G06Q 50/02* (2013.01)

(58) Field of Classification Search
CPC .... G06Q 10/02; G06Q 30/0641; G06Q 30/08; G06Q 50/265; G06Q 50/30; G06K 9/00087; G06K 9/00221
(Continued)

(56) References Cited

U.S. PATENT DOCUMENTS 1,008,279 A 11/1911 Leuthesser
D209,710 S 12/1967 Bruce
(Continued)

FOREIGN PATENT DOCUMENTS

CN 107341968 A 11/2017
JP 2003177034 A 12/2001
(Continued)

OTHER PUBLICATIONS

"Impact of aircraft size and seat availability on airlines demand and market share in duopoly markets" Published by Elsevier (Year: 2005).*
(Continued)

*Primary Examiner* — Zeina Elchanti
(74) *Attorney, Agent, or Firm* — Pramudji Law Group PLLC; Ari Pramudji

(57) ABSTRACT

Implementations of various methods and systems to transform agriculture units with two waypoints or a destination waypoint or a series sequence of waypoints into objects which have associated price—time priority queues for transformed agriculture units. The present disclosed invention relates to combining the concepts of objected oriented programming, market price queues, agriculture, navigation systems and social networking and transportation as a fungible asset class or agriculture linked to transportation as an open market.

20 Claims, 49 Drawing Sheets

Related U.S. Application Data continuation-in-part of application No. 16/274,490, filed on Feb. 13, 2019, now Pat. No. 11,215,466, which is a continuation-in-part of application No. 16/258,658, filed on Jan. 27, 2019, now Pat. No. 11,035,682, and a continuation-in-part of application No. 16/257,032, filed on Jan. 24, 2019, now abandoned, and a continuation-in-part of application No. 16/242,967, filed on Jan. 8, 2019, and a continuation-in-part of application No. 16/242,981, filed on Jan. 8, 2019, now abandoned, and a continuation-in-part of application No. 16/239,485, filed on Jan. 3, 2019, and a continuation-in-part of application No. 16/183,647, filed on Nov. 7, 2018, now Pat. No. 11,861,527, and a continuation-in-part of application No. 16/167,525, filed on Oct. 22, 2018, now Pat. No. 11,810,023, and a continuation-in-part of application No. 15/877,393, filed on Jan. 23, 2018, and a continuation-in-part of application No. 15/484,059, filed on Apr. 10, 2017, and a continuation-in-part of application No. 15/266,326, filed on Sep. 15, 2016, now Pat. No. 11,138,827.

(51) Int. Cl.
 *G06F 16/248* (2019.01)
 *G06Q 50/02* (2024.01)

(58) Field of Classification Search
 USPC .......................................................... 705/5
 See application file for complete search history.

(56) References Cited

U.S. PATENT DOCUMENTS

| | | | |
|---|---|---|---|
| D318,073 S | 7/1991 | Jang | |
| 5,249,259 A | 9/1993 | Harvey | |
| 5,751,245 A | 5/1998 | Janky et al. | |
| 5,948,040 A | 9/1999 | DeLorme | |
| 6,240,396 B1 | 5/2001 | Walker et al. | |
| D453,945 S | 2/2002 | Shan | |
| 6,400,996 B1 | 6/2002 | Hoffberg | |
| D460,952 S | 7/2002 | Kataoka | |
| D468,738 S | 1/2003 | Lin | |
| D469,089 S | 1/2003 | Lin | |
| 7,010,472 B1 | 3/2006 | Vasey-Glandon et al. | |
| D590,396 S | 4/2009 | Lo | |
| 7,584,123 B1 | 9/2009 | Karonis et al. | |
| D628,171 S | 11/2010 | Hakopian | |
| D638,879 S | 5/2011 | Suto | |
| 8,065,191 B2 | 11/2011 | Senior | |
| D650,385 S | 12/2011 | Chiu | |
| 9,213,957 B2 | 12/2015 | Stefik et al. | |
| 9,274,540 B2 | 3/2016 | Anglin et al. | |
| 9,292,764 B2 | 3/2016 | Yun et al. | |
| 9,436,923 B1 | 9/2016 | Sriram et al. | |
| 9,450,817 B1 | 9/2016 | Bahadur et al. | |
| D772,828 S | 11/2016 | Kusumoto | |
| 9,665,983 B2 | 5/2017 | Spivack | |
| 9,952,042 B2 | 4/2018 | Abovitz et al. | |
| D832,355 S | 10/2018 | Castro | |
| 10,216,367 B1 | 2/2019 | Patel | |
| 10,395,332 B1 | 8/2019 | Konrardy et al. | |
| 10,403,050 B1 | 9/2019 | Beall et al. | |
| 10,408,489 B1 | 9/2019 | Trishaun et al. | |
| 10,452,978 B2 | 10/2019 | Shazeer et al. | |
| 10,533,850 B2 | 1/2020 | Abovitz et al. | |
| 10,737,585 B2 | 8/2020 | Chaudhary et al. | |
| D896,315 S | 9/2020 | Castro | |
| 10,832,337 B1 | 11/2020 | Floyd et al. | |
| D903,657 S | 12/2020 | Catania | |
| D903,658 S | 12/2020 | Catania | |
| D903,659 S | 12/2020 | Catania | |
| 10,872,381 B1 | 12/2020 | Leise et al. | |
| D910,758 S | 2/2021 | Leong | |
| 11,138,827 B2 | 10/2021 | Simpson | |
| 11,183,080 B2 | 11/2021 | Wolf et al. | |
| D938,375 S | 12/2021 | Zhang | |
| 11,215,466 B2 | 1/2022 | Simpson | |
| 11,288,563 B2 | 3/2022 | Lee et al. | |
| 11,296,897 B2 | 4/2022 | Endress et al. | |
| 11,298,017 B2 | 4/2022 | Tran | |
| 11,298,591 B2 | 4/2022 | Evancha | |
| 11,537,953 B2 | 12/2022 | Beaurepaire | |
| 11,555,709 B2 | 1/2023 | Simpson | |
| 11,586,993 B2 | 2/2023 | Handler et al. | |
| D980,210 S | 3/2023 | Wu | |
| 11,651,464 B2 | 5/2023 | Park | |
| D993,316 S | 7/2023 | Lin | |
| 11,704,219 B1 | 7/2023 | Lerner et al. | |
| 11,722,500 B2 | 8/2023 | Singh | |
| 11,734,618 B2 | 8/2023 | Ogden | |
| D1,000,137 S | 10/2023 | Shuster | |
| D1,007,451 S | 12/2023 | Im et al. | |
| D1,024,065 S | 4/2024 | Kim et al. | |
| 2002/0004788 A1 | 1/2002 | Gros et al. | |
| 2002/0017997 A1 | 2/2002 | Wall | |
| 2002/0065738 A1 | 5/2002 | Riggs et al. | |
| 2002/0065766 A1* | 5/2002 | Brown | G06Q 40/04 705/37 |
| 2002/0128952 A1 | 9/2002 | Melkomaian | |
| 2003/0191725 A1* | 10/2003 | Ratliff | G06Q 30/06 705/26.1 |
| 2004/0115596 A1 | 6/2004 | Snyder et al. | |
| 2004/0249742 A1 | 12/2004 | Laurent et al. | |
| 2004/0254819 A1 | 12/2004 | Halim | |
| 2005/0132070 A1 | 6/2005 | Redlich et al. | |
| 2006/0104224 A1 | 5/2006 | Singh | |
| 2006/0184321 A1 | 8/2006 | Kawakami | |
| 2007/0005224 A1 | 1/2007 | Sutardja | |
| 2007/0260723 A1 | 11/2007 | Cohen | |
| 2008/0129490 A1 | 6/2008 | Linville et al. | |
| 2008/0140557 A1 | 6/2008 | Bowlby et al. | |
| 2008/0195428 A1 | 8/2008 | O'Sullivan | |
| 2008/0195432 A1 | 8/2008 | Fell et al. | |
| 2008/0262892 A1 | 10/2008 | Prager et al. | |
| 2009/0221338 A1 | 9/2009 | Stewart | |
| 2009/0309729 A1 | 12/2009 | Nichols | |
| 2010/0042421 A1 | 2/2010 | Bai et al. | |
| 2010/0081548 A1 | 4/2010 | Labedz | |
| 2010/0208029 A1 | 8/2010 | Marti | |
| 2010/0280748 A1 | 11/2010 | Mundinger et al. | |
| 2010/0306078 A1 | 12/2010 | Hwang | |
| 2010/0318373 A1 | 12/2010 | Harris | |
| 2011/0025267 A1 | 2/2011 | Kamen et al. | |
| 2011/0059693 A1 | 3/2011 | O'Sullivan | |
| 2011/0098056 A1 | 4/2011 | Rhoads et al. | |
| 2011/0106660 A1 | 5/2011 | Ajjarapu et al. | |
| 2011/0184784 A1 | 7/2011 | Rudow | |
| 2011/0191248 A1 | 8/2011 | Bishop | |
| 2011/0202418 A1 | 8/2011 | Kempton et al. | |
| 2012/0023032 A1 | 1/2012 | Visdomini | |
| 2012/0072925 A1 | 3/2012 | Jenkins et al. | |
| 2012/0075067 A1 | 3/2012 | Attaluri | |
| 2012/0130556 A1 | 5/2012 | Marhoefer | |
| 2012/0136527 A1 | 5/2012 | McQuade | |
| 2012/0158762 A1 | 6/2012 | IwuchukWu | |
| 2013/0035973 A1 | 2/2013 | Desai et al. | |
| 2013/0132261 A1 | 5/2013 | Ebersole | |
| 2013/0173326 A1 | 7/2013 | Anglin et al. | |
| 2013/0268325 A1 | 10/2013 | Dembo | |
| 2013/0275156 A1 | 10/2013 | Kinkaid et al. | |
| 2014/0032034 A1 | 1/2014 | Raptopoulos | |
| 2014/0038781 A1 | 2/2014 | Foley | |
| 2014/0052500 A1 | 2/2014 | Vallapuzha et al. | |
| 2014/0075528 A1 | 3/2014 | Matsuoka | |
| 2014/0129302 A1 | 5/2014 | Amin et al. | |
| 2014/0149157 A1 | 5/2014 | Shaam et al. | |
| 2014/0162598 A1 | 6/2014 | Villa-Real | |
| 2014/0180732 A1 | 6/2014 | Rotchin | |
| 2014/0229258 A1 | 8/2014 | Seriani | |
| 2014/0282586 A1 | 9/2014 | Shear et al. | |
| 2014/0310149 A1 | 10/2014 | Singh | |

(56) References Cited

U.S. PATENT DOCUMENTS

| | | |
|---|---|---|
| 2015/0006428 A1 | 1/2015 | Miller et al. |
| 2015/0058051 A1 | 2/2015 | Movshovich |
| 2015/0097864 A1 | 4/2015 | Alaniz |
| 2015/0154516 A1 | 6/2015 | Joachim |
| 2015/0161564 A1 | 6/2015 | Sweeney et al. |
| 2015/0178642 A1 | 6/2015 | Abboud |
| 2015/0198459 A1 | 7/2015 | MacNeille et al. |
| 2015/0206443 A1 | 7/2015 | Aylesworth et al. |
| 2015/0260474 A1 | 9/2015 | Rublowsky et al. |
| 2015/0348282 A1 | 12/2015 | Gibbon et al. |
| 2016/0018969 A1 | 1/2016 | Sundarraman et al. |
| 2016/0026253 A1 | 1/2016 | Bradski et al. |
| 2016/0034305 A1 | 2/2016 | Shear et al. |
| 2016/0041628 A1 | 2/2016 | Verma |
| 2016/0063436 A1 | 3/2016 | Coles |
| 2016/0117657 A1 | 4/2016 | Forbes, Jr. et al. |
| 2016/0148289 A1 | 5/2016 | Altschuler |
| 2016/0221935 A1* | 8/2016 | Jaworska-Maslanka ............ A61K 8/44 |
| 2016/0224935 A1* | 8/2016 | Burnett ............ G06Q 10/0834 |
| 2016/0253622 A1 | 9/2016 | Sriram |
| 2016/0253662 A1 | 9/2016 | Sriram |
| 2016/0298977 A1 | 10/2016 | Newlin |
| 2016/0307276 A1 | 10/2016 | Young |
| 2016/0307288 A1 | 10/2016 | Yehuda et al. |
| 2016/0364679 A1 | 12/2016 | Cao |
| 2017/0039770 A1 | 2/2017 | Lanier et al. |
| 2017/0046664 A1 | 2/2017 | Haldenby et al. |
| 2017/0046799 A1 | 2/2017 | Chan et al. |
| 2017/0046806 A1 | 2/2017 | Haldenby et al. |
| 2017/0048216 A1 | 2/2017 | Chow et al. |
| 2017/0053461 A1 | 2/2017 | Pal et al. |
| 2017/0146360 A1 | 5/2017 | Averbuch |
| 2017/0232300 A1 | 8/2017 | Tran et al. |
| 2017/0293881 A1 | 10/2017 | Narkulla |
| 2017/0293950 A1 | 10/2017 | Rathod |
| 2017/0318325 A1 | 11/2017 | Ortiz |
| 2017/0330274 A1 | 11/2017 | Conant, II et al. |
| 2017/0356749 A1 | 12/2017 | Shelby |
| 2017/0357914 A1 | 12/2017 | Tulabandhula |
| 2017/0373509 A1 | 12/2017 | Betzin |
| 2018/0012149 A1 | 1/2018 | Yust |
| 2018/0025417 A1 | 1/2018 | Brathwaite et al. |
| 2018/0046431 A1 | 2/2018 | Thagadur Shivappa et al. |
| 2018/0053226 A1 | 2/2018 | Hutton et al. |
| 2018/0068355 A1 | 3/2018 | Garry |
| 2018/0088455 A1 | 3/2018 | Cippant |
| 2018/0111494 A1 | 4/2018 | Penilla et al. |
| 2018/0117447 A1 | 5/2018 | Bao et al. |
| 2018/0121958 A1 | 5/2018 | Aist et al. |
| 2018/0129276 A1 | 5/2018 | Nguyen et al. |
| 2018/0140903 A1 | 5/2018 | Poure |
| 2018/0157999 A1* | 6/2018 | Arora ............ G06Q 10/02 |
| 2018/0165364 A1 | 6/2018 | Mehta et al. |
| 2018/0173742 A1 | 6/2018 | Liu et al. |
| 2018/0173800 A1 | 6/2018 | Chang et al. |
| 2018/0188715 A1 | 7/2018 | Cella et al. |
| 2018/0190026 A1 | 7/2018 | Barnett et al. |
| 2018/0209801 A1 | 7/2018 | Stentz et al. |
| 2018/0209803 A1 | 7/2018 | Rakah |
| 2018/0238705 A1 | 8/2018 | O'Herlihy |
| 2018/0240542 A1 | 8/2018 | Grimmer |
| 2018/0278984 A1 | 9/2018 | Aimone et al. |
| 2018/0313798 A1 | 11/2018 | Chokshi et al. |
| 2018/0342106 A1 | 11/2018 | Rosado |
| 2018/0348863 A1 | 12/2018 | Aimone et al. |
| 2018/0365904 A1 | 12/2018 | Holmes |
| 2018/0374268 A1 | 12/2018 | Niles |
| 2019/0019144 A1 | 1/2019 | Gillen |
| 2019/0020973 A1 | 1/2019 | Harish |
| 2019/0050634 A1 | 2/2019 | Nerayoff et al. |
| 2019/0066528 A1 | 2/2019 | Hwang et al. |
| 2019/0102946 A1 | 4/2019 | Spivack et al. |
| 2019/0108686 A1 | 4/2019 | Spivack et al. |
| 2019/0139448 A1 | 5/2019 | Marshall et al. |
| 2019/0180862 A1 | 6/2019 | Wisser et al. |
| 2019/0186942 A1 | 6/2019 | Rubin |
| 2019/0188450 A1 | 6/2019 | Spivack et al. |
| 2019/0202448 A1 | 7/2019 | Pal et al. |
| 2019/0204110 A1 | 7/2019 | Dubielzyk |
| 2019/0228269 A1 | 7/2019 | Brent et al. |
| 2019/0236741 A1 | 8/2019 | Bowman et al. |
| 2019/0236742 A1 | 8/2019 | Tomskii et al. |
| 2019/0251503 A1 | 8/2019 | Simpson |
| 2019/0251509 A1 | 8/2019 | Simpson |
| 2019/0259008 A1 | 8/2019 | Lindsey |
| 2019/0272589 A1 | 9/2019 | Simpson |
| 2019/0293438 A1 | 9/2019 | Simpson |
| 2019/0304000 A1 | 10/2019 | Simpson |
| 2019/0311431 A1 | 10/2019 | Simpson |
| 2019/0324989 A1 | 10/2019 | Borochoff et al. |
| 2019/0325541 A1 | 10/2019 | Simpson |
| 2019/0333166 A1 | 10/2019 | Simpson |
| 2019/0333181 A1 | 10/2019 | Simpson |
| 2019/0342106 A1 | 11/2019 | Li et al. |
| 2019/0353499 A1 | 11/2019 | Stenneth |
| 2020/0013498 A1 | 1/2020 | Gelber |
| 2020/0027096 A1 | 1/2020 | Cooner |
| 2020/0047055 A1 | 2/2020 | Ward |
| 2020/0098071 A1 | 3/2020 | Jackson |
| 2020/0125999 A1 | 4/2020 | Simpson |
| 2020/0151816 A1 | 5/2020 | Simpson |
| 2020/0156495 A1 | 5/2020 | Lindup |
| 2020/0184416 A1 | 6/2020 | Javaheri |
| 2020/0219017 A1 | 7/2020 | Simpson |
| 2020/0226853 A1 | 7/2020 | Ahmed et al. |
| 2020/0317075 A1 | 10/2020 | Yokoyama et al. |
| 2020/0389301 A1 | 12/2020 | Detres et al. |
| 2021/0004909 A1 | 1/2021 | Farmer et al. |
| 2021/0012278 A1 | 1/2021 | Alon et al. |
| 2021/0041258 A1 | 2/2021 | Simpson |
| 2021/0042835 A1 | 2/2021 | Simpson |
| 2021/0065100 A1 | 3/2021 | Hwang |
| 2021/0158447 A1 | 5/2021 | Simpson |
| 2021/0166317 A1 | 6/2021 | Simpson |
| 2021/0248633 A1 | 8/2021 | Simpson |
| 2021/0318132 A1 | 10/2021 | Simpson |
| 2021/0326872 A1 | 10/2021 | Robotham |
| 2021/0379447 A1 | 12/2021 | Lee |
| 2021/0382924 A1 | 12/2021 | Aaltonen et al. |
| 2022/0020073 A1* | 1/2022 | Farmer ............ G06Q 20/203 |
| 2022/0058578 A1 | 2/2022 | Javaheri |
| 2022/0068081 A1 | 3/2022 | Pariseau |
| 2022/0100731 A1 | 3/2022 | Tirapu Azpiroz et al. |
| 2022/0122026 A1 | 4/2022 | Okabe et al. |
| 2023/0157579 A1 | 5/2023 | Sato |
| 2023/0377409 A1 | 11/2023 | Rye |

FOREIGN PATENT DOCUMENTS

| | | |
|---|---|---|
| KR | 20170078094 A1 | 12/2015 |
| WO | 9508240 A2 | 3/1995 |
| WO | 2015059691 A1 | 4/2015 |
| WO | 2015161307 A1 | 4/2015 |
| WO | 2019/134005 A1 | 7/2019 |
| WO | 2019183468 A1 | 9/2019 |
| WO | 2021/163675 A1 | 8/2021 |

OTHER PUBLICATIONS

Papa, U., & Del Core, G., "Design of Sonar Sensor Model for Safe Landing of an UAV," IEEE Metrology for Aerospace, 2015, pp. 346-350.

Li, Jundong, et al., "Multi-network Embedding", pp. 1-9, 2018.

Speediance, All-in-One Smart Home Gym; retrieved from internet: https://www.amazon.com/Speediance-Equipment-Resistance-Training-Machine-Works/dp/B0C4KF7844/?th=1; May 8, 2023; p. 1.

Freebeat, Smart Exercise Bike; retrieved from internet: https://www.amazon.com/Resistance-Cushioned-Detection-Altoritm-Instructors/dp/B0BZKKZ6B3/?th=1; Mar. 3, 2023; p. 1.

The Wayback Machine, Interest Rate Swaps, https://web.archive.org/web/20171006212154/https://global.pimco.com/en/gbl/resources/education/understanding-interest-rate-swaps, 2016, pp. 1-7.

(56) References Cited

OTHER PUBLICATIONS

Freight Derivatives—a Vital Tool For YOur Business, https://www.reedsmith.com/-/media/files/perspectives/2007/02/freight-derivatives—a-vital-tool-for-your-business/files/freight-derivatives—a-vital-tool-for-your-business/fileattachment/etcfreightderivativesavitaltoolforyourbusiness.pdf (Year: 2007), Energy, Trade & Commodities, pp. 1-3.

Barry, Kieth, App lets drivers auction public parking spaces, Wired, Aug. 11, 2011, pp. 1-4.

Jiang, Landu, et al., Sun Chase: Energy-Efficient Route Planning for solar-powered Evs, IEEE 37th international conference on distrubuted computing systems, 2017, pp. 1-11.

Netlingo, https://web.archive.org/web/20170122184857/https://www.netlingo.com/word/electronic-exchange.php,dated Oct. 22, 2017.

Laseter, Tim, "B2B benchmark: The State of Electronic Exchanges", Tech & Innovation, dated Oct. 1, 2001.

Directed Graph, https://en.wikipedia.org/wiki/Directed_graph, pp. 1-6, 2022.

About IBM Food Trust, https://www.IBM.com/downloads/cas/E9DBNDJG, pp. 1-17, 2019.

IBM Blockchain Transparent Supply, https://www.ibm.com/downloads/cas/BKQDKOM2, pp. 1-14, Aug. 2020.

Radocchia, Samantha, 3 Innovative Ways Blockchain Will Build Trust In The Food Industry, https://www.forbes.com/sites/samantharadocchia/2018/04/26/3-innovative-ways-blockchain-will-build-trust-in-the-food-industry/?sh=65bc79f42afc, Forbes, pp. 1-5, Apr. 26, 2018.

Change the World, https://fortune.com/change-the-world/2019/IBM/, Fortune Media IP Limited, pp. 1-5, 2022.

IBM Food Trust, https://www.constellationr.com/node/17601/vote/application/view/588, Constellation Research Inc., pp. 1-4, 2010-2022.

Dey, Somdip, et al., FoodSQRBlock: Digitizing Food Production and the Supply Chain with Blockchain and QR Code in the Cloud, https://www.mdpi.com/2071-1050/13/6/3486/htm, MDPI, pp. 1-27, Mar. 22, 2021.

Ramasubramanian, Vasant, "Quadrasense: Immersive UAV-based cross-reality environmental sensor networks," phD diss., Massachusetts Institute of Technology, pp. 1-75, 2015.

Wyzant, https://web.archive.org/web/20190327185429/https://www.wyzant.com/hotitworks/students,Wyzant tutoring, pp. 1-13 , Mar. 27, 2019.

PCT International Search Report and Written Opinion; PCT/US2021/065855; Mar. 2, 20229.

PCT International Search Report and Written Opinion; PCT/US2022/012717; Mar. 3, 20220.

Zhao, et al., Incentives in Ridesharing with Deficit Control, Proceedings of the 13th International Conference on Autonomous Agents and Multiagent Systems (AAMAS 2014), May 5-9, 2014, pp. 1021-1028.

Peters, et al.; Student Support Services for Online Learning Re-Imagined and Re-Invigorated: Then, Now and What's To Come; Contact North | Contact Nord; Sep. 2017.

PCT International Search Report and Written Opinion; PCT/US2022/027077; Nov. 1, 2022.

Wei, et al. "impact of aircraft size and seat availability on airlines demand and market share in duopoly markets" Published by Elsevier, 2005, pp. 315-327.

PCT International Search Report and Written Opinion; PCT/US2022/052969; Mar. 2, 20231.

Little, T.D., et al., On the Joys of Missing Data, Journal of pediatric psychology, 2014, pp. 151-162.

Honaker, J., et al., What to do About Missing Values in Time-Series Cross-Section Data, American Journal of Political Science, Sep. 6, 2008, pp. 561-581.

Westerhoff, Market Depth and Price Dynamics: A Note, University of Osnabrueck, Department of Economics Rolandstrasse 8, D-49069 Osnabrueck, German, Mar. 30, 2004, pp. 1-8.

PCT International Search Report and Written Opinion; PCTUS2022/051998; Mar. 8, 2023.

EP23153137.7 European Search Report, May 24, 2023, pp. 1-10.

EP20787830.7 European Search Report, May 12, 2023, pp. 1-10.

Zheyong, Bian, et al., "Planning the Ridesharing Route for the First-Mile Service Linking to Railway Passenger Transportation," Joint Rail Conference, Apr. 2017, pp. 1-11.

EP23168879.7 European Search Report, Jul. 5, 2023, pp. 1-13.

Bortolini, et al.; "Fresh food sustainable distribution: cost, delivery time and carbon footprint three-objective optimization," 2016, pp. 1-12.

Yu, Haicong et al.; "A Multi-Modal Route Planning Approach with an Improved Genetic Algorithm", The International Archives of the Photogrammetry, Remote Sensing and Spaital Information Sciences, vol. 38, Part 1, 2010.

"Node Influence Metric", Wikipedia, Nov. 6, 2020, pp. 1-5.

EP21916571 European Search Report, May 29, 2024, pp. 1-9.

Aratani, Lori, "This app wants to reward you for smart commuting choices," The Washington Post, Aug. 18, 2018, pp. 1-3.

Fulldomepro, VR Aquatic Simulator with a Dome, Pub. Sep. 3, 2018, https://www.youtube.com/watch?v=k_53G5DksjQ, pp. 1-2.

Randomoneh, Dome Screens & Displays, Pub. Oct. 12, 2012, https:// hardforum.com/threads/dome-screens-displays, p. 1.

Borgobello, Bridget, TOOB Personal Dome Screen Revamped, Pub. Jan. 12, 2012, https:// newatlas.com/toob-earth-personal-dome-screen/21082, p. 1.

Asghari, et al; "Price-aware Real-time Ride-sharing at Scale-An Auction-based Approach", Oct. 31, 2016, 9 SIGSPACIAL'16: Proceedings of the 24th ACM SIGSPATIAL International Conference on Advances in Geographic Information Systems, Article No. 3, pp. 1-10.

EP22740218.7 European Search Report, Nov. 12, 2024, pp. 1-29.

Karbassi, et al.; "Vehicle Route Prediction and Time of Arrival Estimation Techniques for Improved Transportation System Management" Published by IEEE; 2003, pp. 511-516.

EP23153137.7 Exam Report (Communication pursuant to Article 94(3) EPC), Mar. 5, 2025, pp. 1-11.

Chang, et al., "Estimating Real-Time Traffic Carbon Dioxide Emissions Based on Intelligent Transportation System Technologies," IEEE Mar. 1, 2013, vol. 14, pp. 1-11.

Valdes, J. J., et al.; (Sep. 2007). Virtual reality high dimensional objective spaces for multi-objective optimization: An improved representation. In 2007 IEEE Congress on Evolutionary Computation (pp. 4191-4198). IEEE., pp. 1-11.

Valdes, J. J., et al.; (2007). Multi-objective evolutionary optimization for constructing neural networks for virtual reality visual data mining: Application to geophysical prospecting. Neural networks, 20(4), pp. 498-508.

Zhao, et al., Deshpande, P. M., Naughton, J. F., & Shukla, A (Jun. 1998). Simultaneous optimization and evaluation of multiple dimensional queries. In Proceedings of the 1998 ACM SIGMOD international conference on Management of data (pp. 271-282).

A. Lazarus et al., Multimodal Behavior Therapy. Berlin, Germany: Springer, 1976.

B. P. Yuhas, M. H. Goldstein, and T. J. Sejnowski, "Integration of acoustic and visual speech signals using neural networks," IEEE Commun. Mag., vol. 27, No. 11, pp. 65-71, Nov. 1989.

W. Guo, J. Wang, and S. Wang, "Deep multimodal representation learning: A survey," IEEE Access, vol. 7, pp. 63373-63394, 2019.

L. Wu, S. L. Oviatt, and P. R. Cohen, "Multimodal integration-a statistical view," IEEE Trans. Multimedia, vol. 1, No. 4, pp. 334-341, Dec. 1999.

J. Shang, T. Ma, C. Xiao, and J. Sun, "Pre-training of graph augmented transformers for medication recommendation," 2019, arXiv: 1906.00346.

K. Gavrilyuk, R. Sanford, M. Javan, and C. G. Snoek, "Actor transformers for group activity recognition," inProc. IEEE Conf. Comput. Vis. Pattern Recognit., 2020, pp. 836-845.

Beltagy, M. E. Peters, and A. Cohan, "Longformer: The long-document transformer," 2020, arXiv:2004.05150.

D. Shin, Z. Ren, E. B. Sudderth, and C. C. Fowlkes, "3D scene reconstruction with multi-layer depth and epipolar transformers," in Proc. IEEE Int. Conf. Comput. Vis., 2019, pp. 2172-2182.

(56) References Cited

OTHER PUBLICATIONS

P. Xu et al., "SketchMate: Deep hashing for million-scale human sketch retrieval," in Proc. IEEE Conf. Comput. Vis. Pattern Recognit., 2018, pp. 8090-8098.
K. Gupta, J. Lazarow, A. Achille, L. Davis, V. Mahadevan, and A. Shrivastava, "LayoutTransformer: Layout generation and completion with self-attention," 2020, arXiv:2006.14615.
T. Hastie, R. Tibshirani, J. H. Friedman, and J. H. Friedman, The Elements of Statistical Learning: Data Mining, Inference, and Prediction, vol. 2. Berlin, Germany: Springer, 2009.
C. Zhang, Z. Yang, X. He, and L. Deng, "Multimodal intelligence: Representation learning, information fusion, and applications," IEEE J. Sel. Topics Signal Process., vol. 14, No. 3, pp. 478-493, Mar. 2020.
C. Sun, A. Myers, C. Vondrick, K. Murphy, and C. Schmid, "VideoBERT: A joint model for video and language representation learning," in Proc. IEEE Int. Conf. Comput. Vis., 2019, pp. 7463-7472.
N. Carion, F. Massa, G. Synnaeve, N. Usunier, A. Kirillov, and S. Zagoruyko, "End-to-end object detection with transformers," in Proc. Eur. Conf. Comput. Vis., 2020, pp. 213-229.
J. Devlin, M.-W. Chang, K. Lee, and K. Toutanova, "BERT: Pretraining of deep bidirectional transformers for language understanding," 2018, arXiv: 1810.04805.
Vaswani et al., "Attention is all you need," in Proc. Int. Conf. Neural Inf. Process. Syst., 2017, pp. 5998-6008.
T. Baltruaitis, C. Ahuja, and L.-P. Morency, "Multimodal machine learning: A survey and taxonomy." IEEE Trans. Pattern Anal. Mach. Intell., vol. 41, No. 2, pp. 423-443, Feb. 2019.
Cai, et al.; Incorporating Visual Information in Audio Based Self-Supervised Speaker Recognition; IEEE/ACM Transactions on Audio, Speech and Language Processing; vol. 30; pp. 1422-1435; Mar. 24, 2022.
Saulle, Rosella, et al., "Cost and Cost-Effectiveness of the Mediterranean Diet: Results of a Systematic Review," www.mdpi.com/journal/nutrients, Nutrients 2013, 5, pp. 4566-4586.
Garamvolgyi et al.; Towards_Model-Driven_Engineering_of_Smart_Contracts; IEEE/IFIP; pp. 134-139; 2018.
Khan et al; "A Distributed-Ledger Consortium Model for Collaborative_Innovation" ; IEEE pp. 29-37; 2017.
Meiklejohn S.; Top Ten Obstacles along Distributed Ledgers Path to Adoption; UCL; pp. 13-19; 2017.
Muttavarapu et al.; Distributed_Ledger_for_Spammers_Resume; IEEE; 9 pages, 2018.
Nikonowicz, et al., "Virtual Power Plants", Published by Open Acess Journal, 2012, pp. 135-149.
S. Pramanik, P. Agrawal, and A. Hussain, "OmniNet: A unified architecture for multi-modal multi-task learning," Jul. 3, 2020 v2, arXiv:1907.07804.
R. Akula, S. Gella, Y. Al-Onaizan, S.-C. Zhu, and S. Reddy, "Words aren't enough, their order matters: On the robustness of grounding visual referring expressions," 2020, arXiv:2005.01655.
R. Child, S. Gray, A. Radford, and I. Sutskever, "Generating long sequences with sparse transformers," 2019, arXiv:1904.10509.
Y. Xian, C. H. Lampert, B. Schiele, and Z. Akata, "Zero-shot learning—A comprehensive evaluation of the good, the bad and the ugly," IEEE Trans. Pattern Anal. Mach. Intell., vol. 41, No. 9, pp. 2251-2265, Sep. 2019.
Owens and A. A. Efros, "Audio-visual scene analysis with selfsupervised multisensory features," inProc. Eur. Conf. Comput. Vis., 2018, pp. 639-658.
T. Chen and R. R. Rao, "Audio-visual integration in multimodal communication," Proc. IEEE, vol. 86, No. 5, pp. 837-852, May 1998.
N. Li, S. Liu, Y. Liu, S. Zhao, and M. Liu, "Neural speech synthesis with transformer network," in Proc. AAAI Conf. Artif. Intell., 2019, pp. 6706-6713.
M. Chen, Y. Li, Z. Zhang, and S. Huang, "TVT: Two-view transformer network for video captioning," in Proc. 10th Asian Conf. Mach. Learn., 2018, pp. 847-862.

X. Lin, C. Ding, J. Zeng, and D. Tao, "GPS-Net: Graph property sensing network for scene graph generation," in Proc. IEEE Conf. Comput. Vis. Pattern Recognit., 2020, pp. 3743-3752.
W. Hao, C. Li, X. Li, L. Carin, and J. Gao, "Towards learning a generic agent for vision-and-language navigation via pre-training," in Proc. IEEE Conf. Comput. Vis. Pattern Recognit., 2020, p. 13134-13143.
S. Ren, K. He, R. Girshick, and J. Sun, "Faster R-CNN: Towards realtime object detection with region proposal networks," in Proc. Int. Conf. Neural Inf. Process. Syst., 2015, pp. 91-99.
Y.-H. H. Tsai, S. Bai, P. P. Liang, J. Z. Kolter, L.-P. Morency, and R. Salakhutdinov, "Multimodal transformer for unaligned multimodal language sequences," in Proc. Conf. Assoc. Comput. Linguistics, 2019, pp. 6558-6569.
J. Lin, A. Yang, Y. Zhang, J. Liu, J. Zhou, and H. Yang, "InterBERT: Vision-and-language interaction for multi-modal pretraining," 2020, arXiv:2003.13198.
D. Tran, H.Wang, L. Torresani, J. Ray, Y. LeCun, and M. Paluri, "A closer look at spatiotemporal convolutions for action recognition," inProc. IEEE Conf. Comput. Vis. Pattern Recognit., 2018, pp. 6450-6459.
S. Xie, C. Sun, J. Huang, Z. Tu, and K. Murphy, "Rethinking spatiotemporal feature learning for video understanding," 2017, arXiv:1712.04851.
L. Zhou, Y. Zhou, J. J. Corso, R. Socher, and C. Xiong, "End-to-end dense video captioning with masked transformer," in Proc. IEEE Conf. Comput. Vis. Pattern Recognit., 2018, pp. 8739-8748.
X. Wang, R. Girshick, A. Gupta, and K. He, "Non-local neural networks," in Proc. IEEE Conf. Comput. Vis. Pattern Recognit., 2018, pp. 7794-7803.
J. L. Ba, J. R. Kiros, and G. E. Hinton, "Layer normalization," 2016, arXiv: 1607.06450.
S. Ioffe and C. Szegedy, "Batch normalization: Accelerating deep network training by reducing internal covariate shift," in Proc. Int. Conf. Mach. Learn., 2015, pp. 448-456.
K. He, X. Zhang, S. Ren, and J. Sun, "Deep residual learning for image recognition," in Proc. IEEE Conf. Comput. Vis. Pattern Recognit., 2016, pp. 770-778.
J. Malmaud, J. Huang, V. Rathod, N. Johnston, A. Rabinovich, and K. Murphy, "What's Cookin'? Interpreting cooking videos using text, speech and vision," 2015, arXiv: 1503.01558.
L. Zhou, C. Xu, and J. J. Corso, "Towards automatic learning of procedures from web instructional videos," in Proc. AAAI Conf. Artif. Intell., 2018, pp. 7590-7598.
D. Kiela et al., The hateful memes challenge: Detecting hate speech in multimodal memes, 2020, arXiv:2005.04790.
Miech, D. Zhukov, J.-B. Alayrac, M. Tapaswi, I. Laptev, and J. Sivic, "HowTo100M: Learning a text-video embedding by watching hundred million narrated video clips," in Proc. IEEE Int. Conf. Comput. Vis., 2019, pp. 2630-2640.
Das et al., "Visual dialog," in Proc. IEEE Conf. Comput. Vis. Pattern Recognit., 2017, pp. 1080-1089.
R. Krishna, K. Hata, F. Ren, L. Fei-Fei, and J. C. Niebles, "Densecaptioning events in videos," in Proc. IEEE Int. Conf. Comput. Vis., 2017, pp. 706-715.
V. Ordonez, G. Kulkarni, and T. Berg, "Im2Text: Describing images using 1 million captioned photographs," in Proc. Int. Conf. Neural Inf. Process. Syst., 2011, pp. 1143-1151.
R. Krishna et al., "Visual genome: Connecting language and vision using crowdsourced dense image annotations," Int. J. Comput. Vis., vol. 123, pp. 32-73, 2017.
S. Antol et al., "VQA: Visual question answering," in Proc. IEEE Int. Conf. Comput. Vis., 2015, pp. 2425-2433.
T.-Y. Lin et al., "Microsoft COCO: Common objects in context," in Proc. Eur. Conf. Comput. Vis., 2014, pp. 740-755.
P. Sharma, N. Ding, S. Goodman, and R. Soricut, "Conceptual captions: A cleaned, hypernymed, image alt-text dataset for automatic image captioning," in Proc. Conf. Assoc. Comput. Linguistics, 2018, pp. 2556-2565.
H. Luo et al., "UniVL: A unified video and language pre-training model for multimodal understanding and generation," 2020, arXiv:2002.06353.

(56) References Cited

OTHER PUBLICATIONS

D. Qi, L. Su, J. Song, E. Cui, T. Bharti, and A. Sacheti, "ImageBERT: Cross-modal pre-training with large-scale weak-supervised image-text data," 2020, arXiv:2001.07966.
Z. Huang, Z. Zeng, B. Liu, D. Fu, and J. Fu, "Pixel-BERT: Aligning image pixels with text by deep multi-modal transformers," 2020, arXiv:2004.00849.
X. Li et al., "Oscar: Object-semantics aligned pre-training for vision-language tasks," in Proc. Eur. Conf. Comput. Vis., 2020, pp. 121-137.
J. Lu, V. Goswami, M. Rohrbach, D. Parikh, and S. Lee, "12-in-1: Multitask vision and language representation learning," in Proc. IEEE Conf. Comput. Vis. Pattern Recognit., 2020, pp. 10434-10443.
L. Zhou, H. Palangi, L. Zhang, H. Hu, J. Corso, and J. Gao, "Unified vision-language pre-training for image captioning and VQA," in Proc. AAAI Conf. Artif. Intell., 2020, pp. 13041-13049.
C. Alberti, J. Ling, M. Collins, and D. Reitter, "Fusion of detected objects in text for visual question answering," 2019, arXiv:1908.05054.
G. Li, N. Duan, Y. Fang, M. Gong, and D. Jiang, "Unicoder-VL: A universal encoder for vision and language by cross-modal pre-training," in Proc. AAAI Conf. Artif. Intell., 2020, pp. 11336-11344.
C. Sun, F. Baradel, K. Murphy, and C. Schmid, "Learning video representations using contrastive bidirectional transformer," 2019, arXiv:1906.05743.
Y.-C. Chen et al., "UNITER: Universal image-text representation learning," in Proc. Eur. Conf. Comput. Vis., 2020, pp. 104-120.
W. Su et al., "VL-BERT: Pre-training of generic visual-linguistic representations," 2019, arXiv:1908.08530.
L. H. Li, M. Yatskar, D. Yin, C.-J. Hsieh, and K.-W. Chang, "VisualBERT: A simple and performant baseline for vision and language," 2019, arXiv:1908.03557.
H. Tan and M. Bansal, "LXMERT: Learning cross-modality encoder representations from transformers," 2019, arXiv:1908.07490.
J. Lu, D. Batra, D. Parikh, and S. Lee, "VILBERT: Pretraining taskagnostic visiolinguistic representations for vision-and-language tasks," 2019, arXiv:1908.02265.
Z. Yang, Z. Dai, Y. Yang, J. Carbonell, R. R. Salakhutdinov, and Q. V. Le, "XLNet: Generalized autoregressive pretraining for language understanding," in Proc. Int. Conf. Neural Inf. Process. Syst., 2019, Art. No. 517.
Z. Dai, Z. Yang, Y. Yang, J. Carbonell, Q. V. Le, and R. Salakhutdinov, "Transformer-XL: Attentive language models beyond a fixed-length context," 2019, arXiv:1901.02860.
Radford, K. Narasimhan, T. Salimans, and I. Sutskever, "Improving language understanding by generative pre-training," 2018. [Online]. Available: https://s3-US-west-2.amazonaws.com/openai-assets/research-covers/language-unsupervised/language_understanding_paper.pdf.
M. Lewis et al., "BART: Denoising sequence-to-sequence pre-training for natural language generation, translation, and comprehension," 2019, arXiv: 1910.13461.
Y. Li et al., "BEHRT: Transformer for electronic health records," Sci. Rep., vol. 10, 2020, Art. No. 7155.

\* cited by examiner

1600

1610
At a mobile or fixed compputing device with a touchscreen or a computing device without a touchscreen or augmented mixed reality non-screen display or audio interface, detect user network login with facial recognition, fingerprint recognition for photo scan security

1620
GUI detects and receives origin from user inpout or current GPS coordinate and detects destination from user input and transmission

1630
Generate and apply one or more optimization techniques to form a virtual hub or virtual hub sequence with other user that have similar transportation requests within a geopraphic boundary

1640
Generate instructions for a plurality of computing devices, network, virtual hub database server, gaming server, map, server, network member database server and transportation forward market database server to form a combination of virtual hubs and contract specifications for delivery of transportation services or capacity between the virtual hubs in a format presented by a graphical user interface which allows users to enter forward physical prices to sell (offer) or bid (buy) transportation of freight capacity units between virtual hub combinations

1650
Generate instructions to interface a plurality of networks, global positioning systems networks, navigation servers, game server, forward commodity markets, grouping software for virtual hubs, transparent open access pricing systems, blockchain audit and safety systems, virtual hub servers and systems, no arbitrage constraint condition systems which form one system to implement a forward commmmodity transportation or freight capacity unit market system and method.

MODEL MAKE —4015

ACURA ✓—4020
BMW
DAIMLER
FORD
GM, HONDA, ETC.

MODEL TYPE—4025

MDX ✓—4030
BDX
NSX
TLX
ILX

MODEL YEAR—4035

2019 ✓—4040
2020

MODEL FUEL TYPE—4045

ELECTRIC
GASOLINE ✓—4050
DIESEL
SOLAR

FIG. 40

SYSTEM AND METHOD FOR AN AGRICULTURE EXCHANGE FOR AGRICULTURE UNITS

RELATED APPLICATIONS

This application is a continuation of patent application U.S. Ser. No. 16/290,278, filed 2019 Mar. 1; this application is also a continuation-in-part (CIP) of patent application U.S. Ser. No. 16/274,490, filed 2019 Feb. 13; which is a CIP of patent application U.S. Ser. No. 16/258,658, filed 2019 Jan. 27 and issued as U.S. Ser. No. 11/035,682 on 2021 Jun. 15; this application is also a CIP of patent application U.S. Ser. No. 16/257,032 filed 2019 Jan. 24; a CIP of patent application U.S. Ser. No. 16/242,981, filed 2019 Jan. 8; a CIP of patent application U.S. Ser. No. 16/242,967, filed 2019 Jan. 8; a CIP of patent application U.S. Ser. No. 16/239,485, filed 2019 Jan. 3; a CIP of patent application U.S. Ser. No. 16/183,647, filed 2018 Nov. 7; a CIP of patent application U.S. Ser. No. 16/167,525, filed 2018 Oct. 22; a CIP of patent application U.S. Ser. No. 15/877,393, filed 2018 Jan. 23; a CIP of patent application U.S. Ser. No. 15/484,059, filed 2017 Apr. 10; and a CIP of patent application U.S. Ser. No. 15/266,326, filed 2016 Sep. 15. All of these applications are incorporated by reference herein in their entireties.

BACKGROUND OF THE INVENTION

Field of the Invention

Implementations of various methods and systems to transform agriculture units into objects with geolocation attributes to which a user may subscribe, and which have associated price-time priority queues for transformed agriculture units, are disclosed herein. The present disclosed invention relates to combining the concepts of objected oriented programming, market price-time priority queues, agricultural produce and livestock, navigation systems, social networking, and localized agriculture units as a fungible asset class, or localized agriculture units as an open market.

Agribusiness has had many intended and unintended consequences on human health and has largely destroyed high quality farming. After the large scale agribusiness revolution from 1900 to current days, a localized organic farming movement started in 1970 with the establishment of the first certified-organic produce markets in California under a standardized program. Organic agriculture has made a modest market, accounting for only 1% of food supply in 1970 to as much as 10% of food supply today. Despite the growth of organic farmers markets in many regions, the business remains very fragmented, and it is plagued with very high transaction costs. In many cases, organic produce and farmers markets may charge 50% to 600% more for substitute agriculture products made under the large scale agribusiness model.

Large scale agribusiness also has evolved into market structures which have debased the local farmer due to high transaction costs. The disclosed novel invention triangulates agriculture unit data transformations that combine the concepts of object oriented programming, market price-time priority queues, agricultural produce and livestock, navigation systems, social networking, and localized agriculture units as fungible asset classes, which reduce transaction costs of the product and transportation costs in such a way that farming and agricultural production may shift away from low quality, high quantity production in favor of high quality agriculture with lower transaction costs. The route or road between two waypoints may be our commute to work, it may be an errand, it may be a route to school, it may be a route to the gym, it may be a route to a friend's house, it could even be a single destination waypoint or a plurality of other connected waypoint origin and waypoint destination points. The present disclosed invention transforms these routes with one destination waypoint, or two or more waypoints, into objects that may then be further transformed into communities based on agricultural units. Prior to the disclosed invention, localized farmers markets have remained extraordinarily expensive due to the very high transaction costs of farmers driving hundreds of miles to a small gathering place or market that is, in most cases, very unorganized and inefficient. Even worse, high transaction costs have allowed oligopolies to form in such agriculture areas as poultry production, which has turned poultry farming into nothing much more than modern day slavery of farmers. Farmer market communities tend to be defined by static places.

In disparate fields of study, more recently, the concept of virtual communities has developed with examples that may range from a social network topic hashtag that would form a virtual subject community around a topic such as #SuperBowl, #MartinLutherKing, #baby, or many other topics. Theglobe.com, MySpace, Facebook, or many others have also developed virtual communities around many topics but remain ineffective towards areas that require more organized markets and technologies to lower transaction costs. Waze has contributed to making a virtual community of drivers that help identify road hazards, traffic accidents, gas prices, map chat, map issues, lane closures, or many other features to outsmart traffic together as a community. Waze has even attempted to combine carpooling features in their carpooling application and associated intellectual property. Methods and systems of ride matching systems do little more than match rides and are deficient in the areas of transforming transportation objects or units into fungible commodities, transform routes into communities, or provide data transformations to form price-time priority queues around transformed transportation units. No companies or prior art have attempted to make transactional social networks for agricultural-based units, such as cattle, chicken, pork, or any other produce product (e.g., broccoli, blueberries, strawberries, lettuce, or a plurality of other produce items). No prior art or technology has been able to combine the concepts of transportation communities with agriculture communities in a way that lowers transaction costs.

Yet with all these innovations in other fields of study, and because of many method and system deficiencies in agriculture, human health issues remain at all-time highs and medical costs are skyrocketing because of poor diet and low food quality. One of many reasons human health care costs continue to skyrocket from such diseases, such as type II diabetes and heart disease, is because food supply is low quality and the former methods are inadequate, incomplete, or completely deficient. While former systems may have been incrementally useful, they do not place a cost or an economic value to the agriculture production methods that result in poor human health, which causes very inefficient behavior and large transaction costs to society.

Further, no invention has previously existed that transforms an agricultural unit with geolocation attributes into a community object that may form the basis of a social network which includes a marketplace with a time-price priority queue for the transformed agricultural units. We reason that the invention of a transformed agricultural unit community platform between waypoints or a single waypoint destination has never existed because people reason they are isolated in farms or vehicles and there is no mechanism that pools all the local farmers with riders and drivers on a given route between two waypoints or a relevant single waypoint destination where a consumer may have a buying interest. In our research, we have seen elementary forms of electronic bulletin boards for agriculture products on Craigslist or Facebook, but these systems are disorganized, they do not provide firm service, and they do not have quality standards or market structure. Further, GPS systems and networks are weak or non-existent on platforms such as Facebook or Craigslist.

Farmers remain captive to very inefficient high cost farmers markets which serve a very limited purpose, and sometimes these markets only gather once per week, which is deficient for normal food consumption patterns. After considering the effects of non-substitutability of traditional agriculture markets and transport mechanisms, the high quality agriculture activity is actually not economic for most people because of the time problems due to high transaction costs and lack of platform systems that would lower transaction costs. While U.S. patent application Ser. No. 15/877,393, "Electronic Forward Market Exchange for Transportation Seats and Capacity in Transportation Spaces and Vehicles," filed Jan. 23, 2018, solves the problem of transport and freight substitutability by completing substantial data transformations for transportation units and by creating a method for a new data transformation and entirely new asset of a transformed transportation units that makes transportation units fully fungible or exchangeable, further deficiencies exist because the transportation units are not linked to agriculture units and the lack of linkage makes transaction costs uneconomic for most urban residents to have access to high-quality, organic farm produce outside of inefficient farmers markets. Further, the purpose of such an agricultural community may also be lacking, because there is potentially no economic benefit, the pools are so small, or the pools do not match farmers with urban customers coupled with rider or driver routes. Agriculture markets have also lacked network technology development to lower transaction costs.

Further, transportation systems have generally assumed transportation is a personalized good (e.g., carpooling and branded transportation network companies) rather than a commodity that is substitutable or linkable to agriculture units. In the United States, 85% of all vehicles ride with a single passenger in the vehicle, which is a tremendously inefficient use of energy and causes high levels of traffic congestion. Trunk space in vehicles is largely empty or idle because of high transaction costs. The freight system in the U.S., which comprises 20% of road traffic, is also laden with dead-head (i.e., no haul) routes due to no developed platforms that connect agricultural communities with urban communities. As 90% of vehicle space remains idle or unutilized due to high transaction costs, trunk space could be filled with agriculture platforms that allow for transportation units and agriculture units to be seamlessly combined over a platform social network with a transaction gateway. Mobile networks have allowed for the rise of transportation network companies that promote hired drivers, but the cost of these systems has continued to be expensive for the majority of the public, which has held back wide scale adoption. It has also been proven that transportation network companies have increased traffic and pollution (Fitzsimmons, E., "Uber Hit With Cap as New York City Takes Lead in Crackdown Further, transportation companies.", Aug. 8, 2018, https://www.nytimes.com/2018/08/08/nyregion/uber-vote-city-council-cap.html), rather than reduced traffic and pollution, due to incorrect and inefficient methods and systems. Transportation network companies have created systems that allow a given company to set the prices of transportation capacity rather than an open, transparent marketplace.

Unconscionable practices occur within poultry markets, where very large agribusinesses set up tournament systems for farmers and where the sole judge of agriculture quality is the large agribusiness under an exclusive sales contract. Under such systems as poultry tournament systems, farmers are captive to slave-type practices that allow the agribusiness to penalize farmers for subjective quality measures without third party verification, which is nearly unimaginable in any developed market. Separately, agriculture systems and transportation systems are completely unlinked, which creates non-transparent terms for buyers and sellers of agriculture units. Separately, but related to transportation of freight, transportation network companies even provide similar customers with pricing that may vary by 30% from the same pick-up and delivery points at the same time of ride request, which is necessarily price discrimination and is illegal. There is no way for customers of these transportation network companies to see if they are being offered the same price as a mobile smart phone unit across the street. Transportation companies know these deficiencies and openly exploit people, because there is no mechanism to ensure that the price one rider pays for one good is the same as another person on the exact same waypoint combination at the exact same time. The current algorithms of transportation network companies are not based on fair and open pricing mechanisms, and there is no community to enforce accountability around the pricing structures. We could not imagine going to a grocery store and seeing two customers with the same cup of coffee be charged two different prices for the same cup of coffee because of the way they look, the fact that their smartphone has a different origin location, or a plurality of other factors. These deficiencies in the market are not only illegal from a Federal Trade Commission perspective, but the government does not have the resources to police such illegal activity. The disclosed invention eliminates price discrimination, among many other deficiencies, because the agriculture unit virtual hub community data transformation, as well as combined agriculture and transportation unit market structure data transformations, allow complete transparency for similar commodity services (Federal Trade Commission, "Price Discrimination: Robinson-Patman Violations.", https://www.ftc.gov/tips-advice/competition-guidance/guide-antitrust-laws/price-discrimination-robinson-patman).

In the development of the method and system of transforming a series of agricultural units near transportation waypoint(s) into virtual communities, high quality daily farmers markets may then become virtual communities where accountability, transparency, and economic markets may form in local communities. Current methods and systems leave most farmers isolated from their consumer community, because there is no method or mechanism to efficiently tap into a transportation network and certainly no linkage to agriculture markets. Prior art does not transform agriculture unit data structures or sequences of waypoint combinations into virtual communities. Accordingly, in a very real way, farmers make a community, all the people on a given commute route are a community, but there is no agricultural linkage, structure, method, or system to allow the communities to benefit from each other. The implementation of the disclosed method and system creates an agricultural unit community on a given destination waypoint or series of waypoints, which is further transformed into an object to which people may subscribe, friend, follow, comment, and post. Further, using U.S. patent application Ser. No. 15/877,393, "Electronic Forward Market Exchange for Transportation Seats and Capacity in Transportation Spaces and Vehicles," filed Jan. 23, 2018, they may transact on an open and transparent transportation security market, which forces the lowest cost, transparent, and non-price discriminatory solution to dominate the market since all participants have equal access to the market method and system for agricultural and transportation capacity units or securities. It is a well-known fact that transparent, open-access markets create the lowest price for a good or service with fungible characteristics, such as in the airline, telecommunications, and electricity markets (Pentland, W., "After decades of doubt, deregulation delivers lower electricity prices," Oct. 13, 2013, https://www.forbes.com/sites/william pentland/2013/10/13/after-decades-of-doubt-deregulation-delivers-lower-electricity-prices/#710fb94b1d13). The lowest cost and most efficient solution will greatly improve food quality, improve farmer well-being, improve farmer connectivity with their community who enjoys their produce, reduce pollution, increase transportation capacity utilization rates, reduce traffic congestion, increase service frequency, and save consumers of transportation services trillions in cost by increasing utilization rates. A method to create an agriculture community route or waypoint sequence based object to provide a gateway to open access transparent systems for trading agriculture units linked to transportation units will also ensure that new technologies, such as autonomous cars, do not become elitist, only reserved for the wealthy, and do not actually add to pollution and congestion problems, as New York City has seen with transportation network companies. Transportation and agriculture are currently some of the most inefficient markets in the world, making up 35% of greenhouse gases. An agriculture unit community route or waypoint sequence structure to provide a gateway for open forward market for agriculture linked transportation capacity units will bring market discipline and low-cost commodity pricing to all classes and forms of agricultural linked transportation capacity, freight movement, and services.

If people on a given waypoint destination or series of waypoints on an agriculture route have a method and system to make a community and a gateway to provide each other economic benefits in that agriculture community data structure waypoint sequence, then substantial congestion, pollution, and maintenance issues will be reduced.

Further, common transportation modes and methods have lacked basic security. Drivers may be felons without anyone able to monitor safety dealing in agricultural units. Anyone skilled the art of agriculture or transportation would quickly recognize that there is fairly robust security to travel by air, but nearly no security while traveling by truck, bus, car, autonomous car, motorcycle, ship, train, subway, light rail, or many other methods. While all these common methods of transportation lack security checks, the number one reason people use to not combine transportation units is personal security. The disclosed novel invention integrates a high level of security technology within the context of an agriculture unit community data transformation for routes to provide a gateway for an open market method of a multi-modal open forward market for agriculture and associated freight capacity. The security technology greatly reduces former barriers to community and agriculture or transportation unit safety.

Lastly, roadways are generally the highest cause of death with well more dying in vehicle accidents than in all wars combined. Methods and systems, such as the disclosed system, which build agriculture community around a series or sequence of waypoints to provide gateways to economic agriculture linked transportation platforms to help riders and drivers combine vehicles, not only have tremendous benefits of saving money, reducing pollution, and decreasing congestion, but it also saves lives because all people drive more cautiously when they have more than one person in the vehicle or they are providing a commercial service or activity.

Description of the Related Art

The following descriptions and examples are not admitted to be prior art by virtue of their inclusion within this section.

The current implementations of methods to build agriculture unit communities linked to transportation networks suffer from lack of structure, firm service, safety, accountability, scheduling issues, substitutability issues and general lack of technology development. No vibrant agricultural unit virtual community platforms aggregate or transform agriculture units into virtual communities along specific routes with efficient methods or ancillary benefits. Further, most implementations of methods do not allow price discovery between various sellers and buyers of agriculture because the systems are disparate and are not open access or transparent. Anyone skilled in the art of agriculture poultry markets would know there is no such thing as a market price for poultry that is available in wholesale markets, let alone price transparency or linkage to transportation markets. Similarly, users of transportation network company services today in New York City may request a ride at the same moment in time from the exact same pick up location and drop off location, and they may experience pricing that is 30% different. The majority of mobile method and system transportation services are utilizing mobile technology, GPS, and system algorithms to manage transportation as a service, which is fundamentally different than viewing transportation or agriculture units as a securitized commodity and as a commodity market and forming agricultural unit virtual route waypoint sequence communities which the disclosed system and method accomplish. Competing methods do not form waypoint sequence based communities and do not provide gateways to price agriculture or transportation as a linked service, with the consumer buying multiple units with no transparent marketplace governing price competition for a single agriculture, freight, or transportation unit along a hub to hub route. Furthermore, these services and methods do not foster accountability in service. Typical agriculture or transportation systems do not enforce delivery penalties for non-performance as the method is not firm and it does not transform the transportation unit into a standardized security asset with the properties of cost of cover, liquidated damages, and force majeure, among many attributes of the contract specification. Additional competing implementations of methods do not allow for forward selling or forward purchasing of agricultural units linked to transportation, freight, or capacity beyond a single transaction, which a commodity forward market for transportation unit securities allows through the disclosed systems and methods and which are a bridged gateway from the data transformation of a social network into agriculture unit route based virtual communities of the disclosed invention. The disclosed creation of agricultural unit route based virtual community objects to provide a gateway to a forward market of agriculture unit security between virtual hubs along map routes has also never held the attributes of a forward contract security, which allows for one agricultural unit security to be substitutable for another agriculture unit security. In other words, if user A bought an agriculture unit security from user B, but then user A was not able to perform the obligation to purchase the agriculture unit security from user B, then user A could resell the agriculture unit security contract to a third party user C on the forward agriculture unit auction market to retrieve the financial payment made for their original purchase from user B. Then user C would replace user A and be matched with user B while incorporating the data transformation of the overall method and system and while considering additional subordinate concepts such as cost of cover, liquidated damages, and force majeure. No prior art transforms a series of waypoints or waypoint sequences into an agriculture unit community object that has features that allow users to subscribe, friend, follow, or member, or which allow users to gain benefits of a gateway to an economic mechanism to trade agriculture as a transformed agriculture unit(s). No prior art discloses the disclosed agriculture unit communities which provide gateways to transportation unit securities to incorporate the concepts of cost of cover, liquidated damages, force majeure, contract specifications, or firm service to ensure reliability and asset performance. No other system or method performs the aforementioned data transformation combination, nor do the prior art methods and systems capture the technical elements that make the data transformations possible.

Not only does the formation of agriculture unit route based or waypoint sequence based community objects increase accountability mechanisms along a give route, but it also provides an efficient gateway and market data transformation structure for an open and transparent market for agriculture unit securities and allows for large increases in price discovery and by economic theory results in the lowest possible price for consumers. City planners from New York to Austin to San Francisco to Paris to Mumbai to Tokyo to Beijing to Sao Paulo or Johannesburg all struggle to see how the future options of agriculture and transportation will shape city planning. Government experts remained concerned over deteriorating food nutrient quality under the agribusiness structure, which has had an enormous toll on human health. City planners have large concerns that, when markets move to autonomous cars, cities will still have massive congestion problems if people continue to ride as a single passenger in one car.

Implementations of methods have been made in systems that provide virtual communities for ride sharing, but none frame the problem as agriculture unit routes being a community object data structure, as a gateway to a forward commodity market, or a unitized agriculture security capacity market, with simple elegant systems and methods that allow the natural forces of supply and demand to set the price through a universally transparent medium, such as an open transportation and freight capacity forward market with securitized contract specifications. Additionally, no prior art system or method proposes a technically capable solution of integrating the technical software and hardware requirements and data transformations for integrating the tasks of a community forming system for specific routes or agriculture unit virtual hub sequences of waypoints, which are an object to which one may subscribe, friend, follow, or become a member alongside a network, GPS system, mobile computing devices, servers, forward commodity markets, grouping software for hubs, community route processors, my route processors, sequence route processors, transparent open access pricing systems, blockchain audit, safety methods and systems, virtual hub systems, map routing systems, or algorithms for no arbitrage conditions in a simple, easy-to-use graphical user interface format for mobile or virtual computing over various mediums which are connected via a network.

1) U.S. Pat. No. 6,356,838, issued on Mar. 12, 2002 to Sunil Paul, discloses a method, system, and program for determining an efficient transportation route. The prior art relates to a computer-implemented method is described for determining an efficient transportation route comprising: compiling travel data over one or more travel segments, the travel data transmitted from one or more transportation vehicles traveling over the travel segments; receiving positional data associated with a transportation request, the positional data including an origin and a destination; and providing a driver of a vehicle with a first efficient route from the origin to the destination using the travel data, the first efficient route including one or more of the travel segments. Also described is a computer-implemented method for providing transportation services comprising: receiving a transportation request from a passenger; tracking the passenger's position following the request using positional detection logic; and transmitting positional data identifying the passenger's position to a pickup vehicle. The prior art patent is widely cited as the business model taken by most mobile application based transportation services companies. While the prior art does describe the service model of the current construct of the market for transportation with a custom on demand service and then a corresponding company delivering that service through both the technology and the actual physical transportation, it defines a completely different market scenario than a virtual hub to virtual hub transportation sequence which has been predefined as a community as a gateway for an open transparent market forward market for an individual transportation or freight capacity unit. As previously discussed, a commodity based transportation capacity unit market has a completely different market construct than is defined by all operators and patents in the space. The prior art is simply matching transportation requests through a series of servers, GPS systems, and mobile devices. The prior art clearly was a novel invention, but as evidenced by the market, the method has been utilized to replace the inefficient taxi model rather than create a community route sequence marketplace for transportation units that can be priced as a commodity with specific commodity contract specifications and the discipline a market brings to a business problem to fill up unutilized transportation capacity through the efficient mechanism of price. It is clear the result of the methods and systems of the prior art has contributed to increased congestion and traffic unlike the disclosed methods and systems. In an agriculture unit virtual route based community gateway to a commodity-based agriculture capacity system with open access transparent systems and methods, the price will continue to go lower until all space has been utilized or supply for the agriculture linked transportation units is equal to the demand for agriculture linked transportation units. As any observer with ordinary skill would see, most transportation or freight unit seats or capacity goes unutilized and this is a proof and counterexample that no such system is in existence and that the patents and prior art in this field do not address the present novel invention of bringing an agriculture commodity market to bear on the prices of individual units of transportation or freight capacity between virtual hub to virtual hub routes or they have been ineffective of removing transaction costs. If prior art addressed the novel invention, then a marketplace would exist for agriculture units of capacity which is open access and transparent and prices would drop until a level was reached where all agriculture linked transportation was fully utilized, just as has occurred in oil and gas or other commodity markets. The prior art simply makes the method of taxicab and private service cars more efficient and in fact adds to congestion as has been empirically documented by all cities across the world. By contrast the novel invention may use the method and system integrating the technical software and hardware requirements for integrating the tasks of a network, GPS system, mobile computing devices, servers, forward commodity markets, grouping software for hubs, route sequence processors, community route processors, transparent open access pricing systems, blockchain audit and safety methods and systems, virtual hub topology systems, securitization, algorithms for no arbitrage conditions in a simple easy to use graphical user interface format for mobile or virtual computing over various mediums which are connected via a network which dramatically lower transaction costs.

2) U.S. Pat. No. 6,421,606, issued on Jul. 16, 2002 to Asai et al., discloses a method and system for a route guiding apparatus and medium. The prior art specifically addresses a route guiding apparatus providing information for a route using public transportation as an alternative to a vehicular route. In addition to searching for a vehicular route from a current location to a destination, it is determined whether the current location and the destination are within a zone in which public transportation can be used. When the current location and the destination are determined to be within a public transportation zone, a route using public transportation is searched for. Subsequently, the cost of the route using public transportation and the cost of the vehicular route are compared. When the cost of the public transportation route falls within a predetermined limit, the apparatus indicates the public transportation route. The route costs are calculated considering factors such as required travel time and ticket fees. The apparatus may also recommend public transportation when no parking is available near the destination or based on traffic information concerning the vehicular route. The prior art clearly addresses a comparing function to determine the lowest cost route to move from one point to another point however the prior art is completely void of providing agriculture unit virtual hub waypoint sequence communities as a gateway to an open access transparent forward commodity market for individual agriculture capacity units to place the method of a market over the system which would then allow for dramatically lower and more efficient prices and utilization would increase dramatically as supply and demand forces would force the market to balance through price. Accordingly, the prior art is not comparable from a market method and system basis or from an efficiency basis. The novel invention by contrast integrates the technical software and hardware requirements for integrating the tasks of a network, GPS system, mobile computing devices, servers, securitization, forward commodity markets, grouping software for hubs, transparent open access pricing systems, blockchain audit and safety methods and systems, virtual communities, virtual hub topology systems, algorithms for no arbitrage conditions in a simple easy to use graphical user interface format for mobile or virtual computing over various mediums which are connected via a network.

3) U.S. Pat. No. 7,373,320, issued on May 13, 2008 to Timothy Francis McDonough, discloses a method and system for an invention relating to a futures exchange for services contracts. The SerFEx is an electronic market system that enables the exchange of cash (spot and futures) contracts and futures contracts for the delivery of services. Services are traded on the exchange similar to commodities on a prior art commodities exchange. The exchange allows the futures market to determine the right price for services for the producers and consumers of those services. Participants may buy, sell, or leverage services contracts through a variety of order types. The exchange is composed of an electronic infrastructure that has four major components: a front-end facility comprised of licensed authorized intermediaries, an automated bid/ask matching system, a clearinghouse system, and a title management system. The exchange operates twenty-four hours per day and seven days per week with all accounts settled at least once in every twenty-four hours. Participants in the exchange may be producers of services, intermediaries, speculators, and consumers of the services. The prior art very clearly calls the title and claims of the patent a contract futures exchange. A person with ordinary skill in the art would know there is a dramatic difference between a futures contract which are on regulated exchanges and forward contracts which trade over the counter. Futures contracts are highly regulated by definition. There are specific legal differences between futures and forward contracts and they cannot be confused or used interchangeably. As one of many examples, speculators are not permitted to trade forward contracts as all contracts must be transacted with a physical underlying ownership and must be physically delivered unlike regulated futures exchanges which permit speculators. For the sake of clarity, the agriculture linked transportation capacity market is exclusively limited to forward physical contracts which means that the contracts are limited to be traded by only those who are actually providing the underlying service or method. The prior art specifically mentions a data system method for implementing a service contract exchange for construction, transportation, warehousing, postal services, information, real estate, rental, leasing, financial, insurance, professional, scientific, technical services, management, administrative services, educational services, health care, social assistance arts, entertainment, and recreation, among others. Again, someone with ordinary skill would note the specific technical difference between a forward contract which is disclosed and the prior art futures contract. As an important further technical difference to anyone with ordinary skill in the art, the prior art does not show mobile computers or GPS systems as part of the disclosed futures exchange in any of the claims or as any part of any diagram and it would be clear this would be a necessary requirement to functionally allow for the delivery of futures or forward contracts for agriculture units linked with transportation or freight. Furthermore, the prior art does not address forming agriculture unit virtual hub sequence based communities as objects to which people may subscribe, follow, friend, or become a member. Therefore, the prior art method and system would be incapable of completing the novel invention disclosed in this patent method and systems. FIGS. 9A and 9B of the prior art show that the primary art of the patent in question was a futures contract to sell a royalty escrow service contract which does not require GPS or mobile based technology to complete a transaction. Accordingly, the prior art would be disqualified from comparison very clearly to someone with ordinary skill based on the futures to forwards legal differences and the technical inability to complete an agriculture linked transportation capacity contract without mobile or GPS based technology outlined in any claim or figure of the patents. The prior art is limited to a regulated futures exchange which has a clearing house that guarantees the transactions through a highly regulated process. By contrast, forward contracts carry default risks. The prior art refers to mark to market contracts which are a hall mark of futures contracts whereas the novel invention of agriculture linked communities as a gateway to forward agriculture unit contracts are settled on one date at the end of the contract. The prior art is clearly limited to regulated futures which are heavily participated in by speculators who are betting on price directions and usually close out positions prior to maturity as evidenced by any regulated commodity futures trading commission data. The novel invention, by contrast, is a forward agriculture linked transportation or freight capacity unit security contract which is mainly used by hedgers and physical participants in the market to eliminate the volatility of an asset price and physical delivery usually takes place as would be the case for someone actually using or providing the agriculture linked transportation or freight capacity unit. The prior art futures contracts are generally subject to one single regulatory regime as by definition they must be regulated by a single entity in one jurisdiction. The prior art is limited in the claims to futures which in the case of physical delivery, counterparties are chosen randomly by the exchange. By contrast, the novel invention of an agricultural forward transportation capacity or freight security unit specifies to whom the delivery should be made. The prior art claims are limited to futures where there are margin requirements and periodic margin calls by which cash may change hands daily. By contrast, the novel invention of a computer implemented forward commodity agriculture linked transportation capacity unit security market, no cash flows until physical delivery takes place. By comparison, the novel invention may be transacted across jurisdictional boundaries and are primarily governed by the transactional relations between the parties. The prior art is a futures exchange for service contracts for royalties of many service products highlighting the service of agriculture linked transportation or agriculture linked transportation as a service which is not an actual physical fungible good such as a commodity like copper or coffee or oil which can have an associated futures contract. By contrast, the novel invention is a fungible agriculture linked transportation commodity forward contract of an actual seat or ride capacity or space freight capacity on a transportation capacity bearing unit security. A service of the prior art would not be able to group users using a virtual hub pooling server which would then combine with another virtual hub or combination of hubs to make a tradable commodity unit, again therefore rendering the prior art as incapable of delivering or even rendering the service. The novel invention, by contrast, integrates the technical software and hardware requirements for integrating the tasks of a network, GPS system, mobile computing devices, servers, forward commodity markets, community grouping software, grouping topology software for hubs, transparent open access pricing systems, blockchain audit and safety methods and systems, virtual hub topology systems, algorithms for no arbitrage conditions in a simple easy to use graphical user interface format for mobile or virtual computing over various mediums which are connected via a network. The prior art is technically incapable of providing the software or hardware that would allow for the completion of a transaction between two users in any of the claims. Lastly, the prior art of McDonough largely resembles the recent U.S. Supreme court decision in Alice Corp. v. CLS Bank International. The issue in the Alice case was whether certain claims about a computer-implemented, electronic escrow service for facilitating financial transactions covered abstract ideas ineligible for patent protection. The patents were held to be invalid because the claims were drawn to an abstract idea and implementing those claims on a computer was not enough to transform that idea into patentable subject matter. It is clear that the prior art of McDonough is dangerously close in spirit if not fully resembling the Alice decision as the patent is simply pushing forth the concept of using a financial exchange to cover a general abstract idea with very little evidence to support a novel invention, data transformations of the actual structure of the market or a novel approach to how to make the physical market perform with either an escrow service contract futures exchange or a transportation service contract futures exchange. In this specific case, the Supreme court gave a two-step test which McDonough would follow the precedent of Alice in that they are simply borrowing the concept of a futures exchange without a novel technical method or system as to facilitating a transaction and as we clearly present in our arguments, the prior art could not facilitate a transportation futures contract implementation because there is no mobile technology to route agricultural units which renders the implementation non-feasible. Further, there is no specific computer system or unique program which is novel in the implementation other than regurgitating back the business method of a prior art exchange and then applying it to the abstract concept of applying the existing prior art to service contracts. The novel system and methods of this patent specifically outline the implementation of integrating a novel interfacing of networks, GPS systems, community networks, mobile computing devices, services, forward commodity markets, securitization, grouping software for hubs, transparent open access pricing systems, virtual hub topology, no arbitrage conditions alongside a novel graphical user interface that combines all these systems and methods for forward agricultural unit contracts based on agricultural community objects. Clearly, the current disclosed patent (unlike McDonough), adds "something extra" that embodies and "innovative concept" and is not generic, conventional, or obvious, as no other patent or business offers these novel concepts.

4) U.S. Pat. No. 7,756,633, issued on Jul. 13, 2010 to Huang et al., discloses a method and system for a comprehensive security-enhanced rideshare system is provided. The rideshare program includes localization, mapping, and ride matching for participants. Participation incentives and revenue methods provide for the financial viability of the rideshare system. Participant security is monitored in near real-time using location-determining communication devices used by the participants in the system. The rideshare system monitors a number of security-indicating criteria and acts when an anomalous condition is recognized. The method claim of the prior art specifically refers to providing security in a rideshare environment, monitoring that participant to look for anomalies during the travel route or travel times by a pre-defined threshold and sending security alerts to be confirmed by the rideshare participant that indeed they are safe. Unlike Huang et al., the disclosed novel invention claims defining route or virtual hub sequences as community objects to which members may subscribe, friend, follow, or become a member as a gateway to the forward agricultural unit market. The novel invention is fundamentally different than the prior art, as the blockchain technology for security within the forward agriculture capacity market relies upon algorithms that include independent comprehensive background checks of participants and combined algorithms which alert towards the actual commodity unit of the agricultural capacity unit security not being delivered as per the forward contract specifications in the agreement. Further, facial recognition, fingerprint, video 911, and photo recognition dependent sub-methods are not utilized to ensure the identity of users, which are part of the novel invention and patent.

5) U.S. Pat. No. 7,680,770, issued on Mar. 16, 2010 to Buyukkokten et al., discloses systems and methods for automatic generation and recommendation of communities in a social network or set forth. The prior art claims specifically deal with collecting user profiles or user profile attributes to create a new defined community based on matched profiles. By contrast, the disclosed novel invention is defining communities based on static agricultural virtual hub sequences, not on user profiles. The static virtual hub(s) or hub sequence(s) are independent of people or members and further require additional data transformations that would not be possible from determining user profiles. Just as bus stops are not determined by user profiles, nor are virtual hubs or sequences. People may join, friend, follow, or become a member of an agricultural unit virtual hub routes sequence as a community object, but the object is independent of the people. The disclosed novel invention also requires use of GPS networks and servers which are not to be found in the diagrams or claims of the prior art. The disclosed novel invention also requires use of data transformations to form agricultural unit virtual hub sequences as community objects as a gateway for additional data transformations of turning agricultural units into securities or commodities which are substitutable. The prior art method is specifically creating incremental communities based on a plurality of user features whereas the agricultural unit community sequences with price-time priority queues operate and are transformed independent of user features.

6) U.S. Pat. No. 8,121,780, issued on Feb. 21, 2012 to Gerdes et al., discloses a method for offering a user reward based on a chosen navigation route includes calculating alternative routes from a starting location to a destination location by taking into consideration route segments including public transportation route segments and road network route segments. The alternative routes are presented to a user. A reward is offered for choosing a respective one of the routes. A navigation system that performs the route calculation preferably queries a network database for public transportation information. The prior art in concept is similar to the Paul et al., U.S. patent application No. 2015/0248689, wherein the user of the system and method are given a reward or incentive for choosing a route, which in theory promotes the concept of transportation pooling or the use of public transportation. The clear differences again are that the prior art is not an agricultural unit route based virtual hub waypoint sequence as a community to provide a gateway to a forward based agricultural unit capacity market which may drive the agricultural capacity price to the lowest possible economic level. Accordingly, the prior art does not necessarily lead to the most efficient outcome and is a distinctly different method from an agricultural unit community object based on a route sequence and associated price-time priority queue for transactions. The forward commodity individual unit security transparent open access forward market is required to arrive at the most efficient lowest price outcome in the limit and therefore the disclosed invention uses methods and systems to come to a superior solution and is therefore fundamentally different and unique. The novel invention by contrast integrates the technical software and hardware requirements for integrating the tasks of an object oriented programming data transformations, network, GPS system, mobile computing devices, community route processors, sequence route processors, servers, forward commodity markets, grouping software for hubs, securitization, transparent open access pricing systems, blockchain audit and safety methods and systems, virtual hub topology systems, or algorithms for no arbitrage conditions in a simple easy to use graphical user interface format for mobile or virtual computing over various mediums which are connected via a network.

7) U.S. Pat. No. 8,762,035, issued on Jun. 24, 2014 to Uri Levine et al., discloses a method and system for real-time community information exchange for a traffic mapping service for allowing plurality of users having each a navigation device to transmit their locations to a server and optionally to signal to the server their requested destination. The system and method are further capable of calculating traffic parameters such as current traffic speed at a given road based on the momentary locations of the users. The system and method of the invention may also calculate and advise the users of preferred roads to take in order to arrive at the requested location with minimum delay. The prior art utilizes GPS systems and mobile devices to route people most efficiently from a starting point to an ending point utilizing a community of users. The prior art makes no mention of using agricultural unit route based virtual hub sequences as community objects to which people may subscribe, friend, or follow to provide a gateway to a forward agriculture unit market. The prior art utilizes a community but has nothing to mention of an open access transparent agriculture, transportation or freight trading market for forward agriculture or freight capacity. Further, the prior art is focused on the shortest mapping route for a transportation segment, not using a market to price the value of the individual agriculture or transportation capacity units along a given agricultural unit virtual hub to virtual hub topology route or a series of single or multi-modal, multi-hub topology subject to constraints to price the transportation or freight capacity. The novel invention, by contrast, integrates the technical software and hardware requirements for integrating the tasks of an object oriented programming data transformation, network, GPS system, mobile computing devices, servers, securitization, community route processors, my route processors, sequence route processors, forward commodity markets, grouping software for hubs, transparent open access pricing systems, blockchain audit and safety methods and systems, virtual hub topology systems, or algorithms for no arbitrage conditions in a simple easy to use graphical user interface format for mobile or virtual computing over various mediums which are connected via a network.

8) U.S. Pat. No. 8,798,593, issued on Aug. 5, 2014 to Haney, discloses location sharing and tracking using mobile phones or other wireless devices. The prior art systems and methods provide a system for exchanging GPS or other position data between wireless devices for purposes of group activities, child location monitoring, work group coordination, dispatching of employees, etc. Cell phones and other wireless devices with GPS receivers have loaded therein a Buddy Watch application and a TalkControl application. The Buddy Watch application communicates with the GPS receiver and other wireless devices operated by buddies registered in the user's phone as part of buddy groups or individually. GPS position data and historical GPS position data can be exchanged between cell phones of buddies and instant buddies such as tow truck drivers via a buddy watch server. Referencing the Alice Corp. v. CLS Bank International decision, the prior art generally falls under the category of an abstract concept of grouping people using GPS which is not a novel concept or method beyond a general business method from prior art without specific application. Further, the prior art would struggle to stand the light of Alice additionally considering Bilski v. Kappos that the idea of grouping people with GPS is an abstract idea and does not apply to a specific novel example of agriculture or transportation, building a virtual community based on a route sequence data transformation, transportation as a commodity, unique agriculture unit contract specifications, uniquely defining agriculture unit linked transportation capacity securities as seats or cargo space, agriculture unit linked transportation to define a virtual or actual hub or hub series topology in the context of a forward contract market for agriculture securities.

9) U.S. Patent Application No. US 2015/0248689, with a publication date of Sep. 3, 2015 to Sunil Paul et al., discloses a method and system for providing transportation discounts. The prior art systems and methods for providing transportation discounts are disclosed as a server receives, from a client device of a user, a request for a transportation service. In response, the server identifies that the request relates to a particular characteristic associated with modified pricing. The server then calculates an adjusted price for the transportation service based on the modified pricing associated with the particular characteristic. As we have reviewed in the background section of this patent application the disclosed system and method uses proprietary information for a company to price a transportation discount which is non-transparent, and the company assigned the patent uses its technology to price the discount rather than an open transparent market such as a commodity market for agriculture unit linked transportation or freight capacity. The Paul et al. patent application refers to a ride request in FIG. 7, which prices a discount for a ride option based on longer wait time and fewer pick-ups as a disclosed example. In this example, the ride request and the market are not for an individual security unit of agriculture linked transportation or freight capacity, and the example is not an open access market forward market for the individual units of agriculture linked transportation securities. Custom discounts or the concept of generally used discounts are not used and individual custom rides are not commodities, which has been why the transportation market has not been able to get to the result of the disclosed invention. In a hub to hub based system (or multi-hub topology), there would be enough liquidity and participants to create a viable marketplace of substitutable agriculture linked transportation or freight capacity securities. A hub to hub agriculture linked transportation model may generally leave the last mile of transportation to another system or method, such as the method of a custom agriculture linked transportation request. A commodity market for agriculture linked transportation or freight capacity is only viable where there is ample liquidity for substitution as a security. The disclosed method and system of Paul et al. is fundamentally different and more akin to the current methods and systems currently available through companies such as Uber, Lyft, Grab, or Via. Paul et al. in FIG. 8 proposes an electronic bulletin board for matching custom requests, but clearly dos not function as commodity forward market securities with defined commodity delivery points (virtual hubs or multi-layered virtual hubs), product specifications, penalties for non-performance, etc., as are standard in commodity contracts for well-known alternative products such as wheat, corn, natural gas, power, oil, etc. Further, FIG. 9 disclosed by Paul et al. shows a cross promotional package approach to transportation and theater or dinner shows, which defeats the purpose of defining transportation units as a commodity unit security that will bear the lowest cost and provide the highest economic incentive for usage. FIG. 12 from Paul et al. describes a method and system for using user profile history data to generate discounts which by definition are set by the system. This is fundamentally different from setting a price by an open access market where any participant can offer any price at any time for a given hub to hub route with uniformity of contract as a security. No system or company controls the pricing and the market is left free to float, which is different from the system and method Paul et al. propose, which has a transportation server price the transportation request for some hot spot location. Paul makes no mention of agriculture unit linked virtual hub sequenced based community object which allows members to subscribe, follow, friend, or join to provide a gateway to a forward agriculture linked transportation unit market. Further, Paul et al. suggests some embodiments are defined from a sponsor giving a transportation discount to a particular location as a promotion. An agriculture linked transportation unit commodity security market eliminates custom behavior and treats an agriculture linked transportation unit security for a specific product as uniform without special characteristics such as are disclosed by Paul et al. The novel invention, by contrast, integrates the technical software and hardware requirements for integrating the tasks of an object oriented programming data transformations, network, GPS system, data transformations, mobile computing devices, securitization, servers, forward commodity markets, grouping software for virtual hubs, transparent open access pricing systems, blockchain audit and safety methods and systems, virtual hub topology systems, or algorithms for no arbitrage conditions in a simple, easy to use graphical user interface format for mobile or virtual computing over various mediums which are connected via a network.

10) U.S. Patent Application No. US 2009/0287401 A1, with a publication date of Nov. 19, 2009 to Uri Levine et al., discloses a system and method for traffic mapping service are disclosed for allowing plurality of users having each a navigation device to transmit their locations to a server and optionally to signal to the server their requested destination. The system and method are further capable of calculating traffic parameters such as current traffic speed at a given road based on the momentary locations of the users. The prior art fails to mention an agriculture unit transport virtual hub sequence as a community object to which a member may subscribe, join, friend, or follow as a gateway to a forward agriculture linked transportation unit market. The system is designed to advise the users of preferred roads to take in order to arrive at the requested location with minimum delay. The prior art systems and methods clearly route based on time based routing which is fundamentally different from market price based routing or price based navigation. No prior art directly deals with agricultural unit communities linked to price based navigation because no market has existed for agriculture linked transportation unit securities such as disclosed in the novel and unique invention.

11) U.S. Pat. No. 9,389,094 B2, issued on Jul. 12, 2016 to Jennifer T Brenner et al., discloses systems and methods presented for sequencing locations and events and determining routing and itineraries for the sequence. The prior art makes no mention of forming an agriculture unit virtual hub sequence as a community object to which members may subscribe, follow, join, or friend as a gateway to a forward agriculture linked transportation unit market. The prior art method and system is very clearly route based on event sequencing rather than price based routing based on a market for underlying agriculture linked transportation unit securities. Event sequencing as disclosed in the prior art is based on event addresses which would be fundamentally different from a route based on an underlying forward market for agriculture linked transportation units. Further, the prior art sequences are dynamic as compared to agriculture community units which are route based sequences which are static once formed as transformed data objects. The prior art makes no remote referencing to forward markets for agriculture linked transportation, transportation pricing on a route, forming virtual communities around static routes of waypoints or waypoint sequences which are fixed, price sequencing, or other related routing techniques. The prior art method and system would also be incapable of routing or navigation based on price or agriculture community objects or forward market agriculture linked transportation unit securities.

SUMMARY

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

The aforementioned deficiencies and other problems associated with the general agricultural markets, social network communities that lack technical capabilities, navigation systems, transportation and freight markets, securitization of agriculture linked transportation units, other novel systems and interfaces and how agriculture linked transportation functions with large inefficiencies which use electronic devices to hail transportation services are reduced or eliminated by the disclosed method and system of integrating and interfacing a plurality of systems into one system which allows the necessary data transformations for the agriculture community linked transportation unit security combined with the efficiency of a forward market to price and ration unused spaced as to eliminate wasted agriculture community linked transportation units or freight capacity as securities. In some embodiments, the methods and systems are on portable devices. In some embodiments, the disclosed method and system is a layer on mapping and map routing software on a plurality of computing devices. In some embodiments, the disclosed method and systems are agriculture community networks with technical logistic data transformations, In some embodiments, the methods and systems use subordinate legal contracts to transform the data. In some embodiments, the methods and systems are on stationary devices. In yet other embodiments, the methods and system disclosed may use mixed reality, augmented reality, virtual reality, or other audio or visualization methods to allow a user to transact and trade freight and agriculture community linked transportation capacity as a forward commodity security with associated price-time priority queues. In some embodiments, the graphical user interface ("GUI") on any mobile or stationary computer device interfaces with one or more processors, memory and one or more modules, programs or sets of instructions stored in the memory for performing multiple functions. In some embodiments, the user interacts with the GUI primarily through finger contacts or voice commands or other sensory methods to interface with the GUI. In some embodiments, the functions may include the user directing the GUI to place a user profile in an agriculture community linked virtual hub so that they may participate, transact, or trade a combination of agriculture community linked virtual hub transportation routes as a forward commodity for agriculture community linked transportation or freight capacity. In some embodiments, the functions may include the user instructing the GUI to participate, transact, or trade various modes of agriculture community linked transportation capacity, such as automobile, air, autonomous vehicle, bike, boat, bus, drone, limo, motorcycle, moped, shuttle, spaceship, subway, taxi, train, other transportation methods, cargo freight, package freight, virtual, or various combinations of the aforementioned modes. In some embodiments, the functions may include the user instructing the GUI to form a new or existing agriculture community linked virtual hub or virtual hub combination which then has a specification function which forms a basis for the GUI to present the plurality of buyers and sellers of agriculture community linked transportation and freight capacity securities between two or more virtual hubs.

In an aspect of the invention, a computer-implemented method for use in conjunction with a computing device with various display formats comprises: a user at a mobile or fixed computing device with a touchscreen or a computing device without a touchscreen or augmented reality non-screen display or audio non-screen interface detecting a user network login, detecting a secure login based on facial recognition, fingerprint recognition or photo scan or biometric interface recognition of the user, performing multiple local and external security and crime checks on the user, detecting and receiving from the user an origin location through the GUI user input or GPS coordinate input from the computing device and detecting from the user input a destination coordinate and transmission of said coordinates, generating and applying specific data legal contract transformations to incorporate general specifications as well as the concepts of cost of cover, liquidated damages, and force majeure, generating and applying one or more optimization techniques to form a virtual hub with other users that have similar agriculture community linked transportation requests within a geographic boundary, determining if two or more agriculture community linked virtual hubs are required for the path of the auction between a said starting point and ending point, generating instructions to index and rank pricing for a plurality of routes in context of agriculture community linked virtual hubs or navigation routing, generating instructions to index navigation routes based on pricing for agriculture community linked transportation units along the routes, generating instructions for a plurality of computing devices, networks, virtual hub database servers, network member database servers, transportation platform market database servers to form a combination of virtual hubs and contract specifications for delivery of transportation services or freight capacity between the virtual hubs in a format presented by a GUI which allows the user to submit prices to sell (offer) or bid (buy) in a price-time priority queue agriculture community linked transportation or freight capacity between agriculture community linked virtual hub combinations, generating instructions to interface a plurality networks, navigation routing based on price of agriculture community linked transportation unit securities, global positioning systems networks, servers, securitization, forward commodity markets, grouping software for virtual hubs, map routing systems and methods, transparent open access pricing systems which form a price auction with price-time priority queues of a given quality, blockchain audit and safety systems, agriculture community linked virtual hub topology servers and systems, no arbitrage constraint condition systems which form one system to implement a forward commodity agriculture community linked transportation and freight capacity unit market system and method. The programs and instructions are stored in memory and configured to be executed by one or more processes by a plurality of users. The programs may include a plurality of configurations and specification instructions for various modes of agriculture community linked transportation capacity. The programs also may include as specification options to select a plurality of timings, quality levels of capacity and service, cost of cover, liquidated damages, force majeure, term of timings such as by the second, minute, hour, day, weekday, weekend, month, annual or day of the week, various order types such as day, good till cancelled, immediate or cancel, good till date, day till cancelled, limit, market, market if touched, snap market, snap mid, snap to primary, peg to benchmark, adaptive custom orders. The programs may also include a plurality of instruction modes such as automobile, air, autonomous vehicle, bike, boat, bus, drone, limo, motorcycle, moped, shuttle, spaceship, subway, taxi, train, packages, multimodal and cargo for agriculture community linked transportation or freight capacity. The programs also may include instructions for virtual hub pick up and drop off points as well as instructions to set various constraints such as cheapest route, single mode, multi-mode, fastest route, most scenic route, highest rating, routing alternatives based on the prices of the agriculture community linked transportation unit securities between two hubs, most available or liquid, highest volume, most frequent, service level, security and safety and group restricted modes. The programs may include a plurality of interfaces with map routing software such as Google Maps, Apple Maps, TomTom Maps, Open Street Maps, Bing Maps, Nokia Maps, or a plurality of other map routing technologies to place the agriculture community linked forward transportation unit security pricing on the map navigation routes as an integration layer. The programs and instructions from the GUI provide master instructions for the plurality of computing devices and servers which interface to allow the user to participate, transact, and trade a plurality of agriculture community linked transportation and freight capacity modes between a plurality of virtual hubs.

In another aspect of the invention, a computing system comprises: a plurality of networks, global positioning systems networks, servers, forward commodity market servers and instructions, securitization legal data transformations, grouping program instructions for virtual hubs and associated servers, transparent open access pricing servers and instructions, GPS map routing servers, indexing databases and programs to rank alternative navigation routes based on agriculture community linked transportation unit security pricing, blockchain audit and safety servers and instructions, user identification history and instructions against crime databases and identity databases to confirm security of the system and users, virtual hub servers and instructions, no arbitrage constraint condition servers and instructions which form one system to implement a forward commodity agriculture community linked transportation and freight capacity unit security market system and method.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 16 is a flow diagram illustrating methods exemplary users move through while participating, transacting, and trading agriculture community linked transportation or freight capacity in accordance with some embodiments.

FIG. 40 illustrates an exemplary user interface and database configuration which allow the user to select model, make, type, year, fuel type in configuration for agriculture community linked price based navigation.

DETAILED DESCRIPTION

Figure 1:
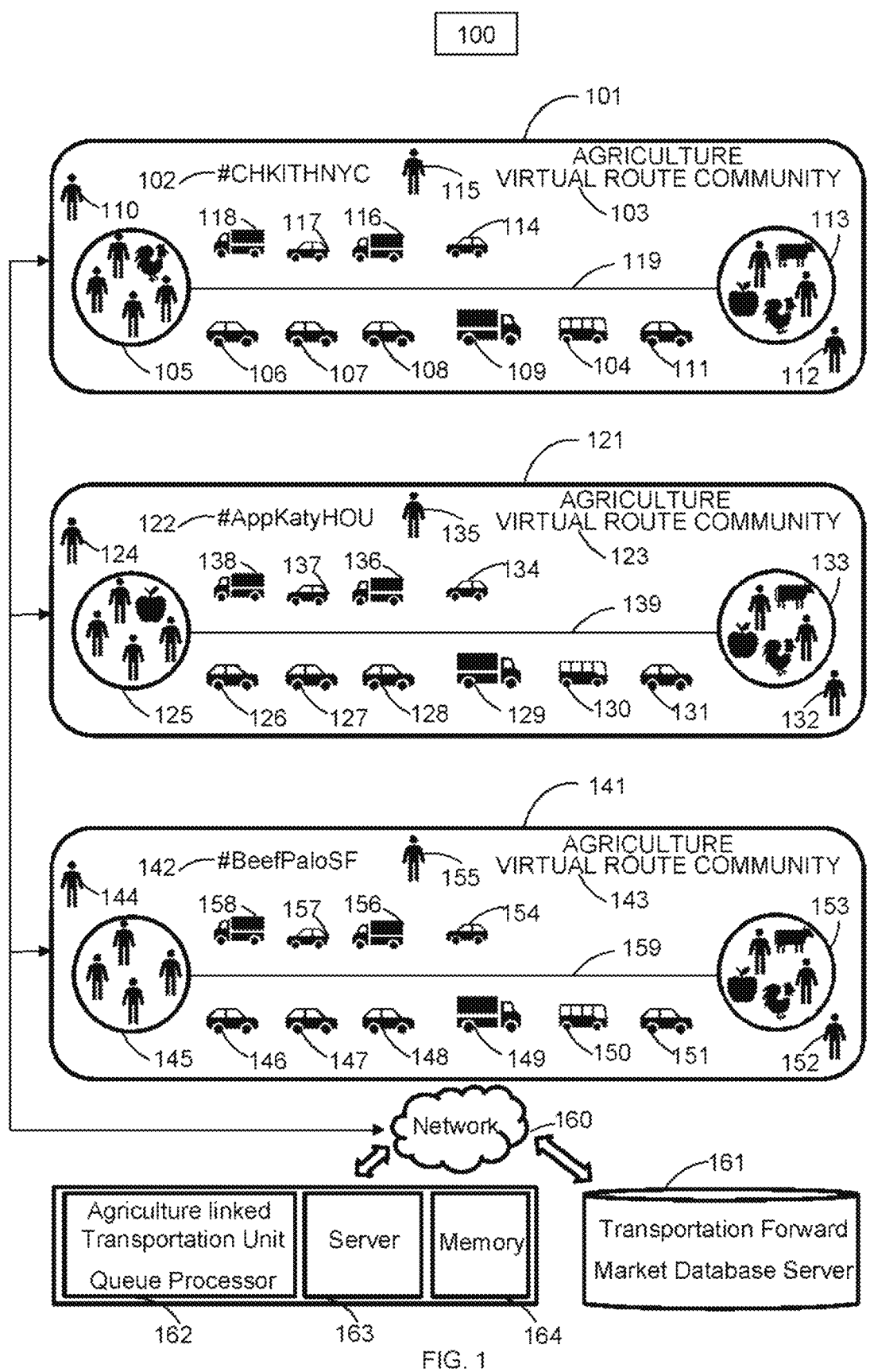
FIG. 1 illustrates a schematic diagram of a plurality of agriculture community linked virtual hub sequences data transformations into waypoint combinations as community objects to which users may subscribe and associate price-time priority queues.

The discussion below is directed to certain specific implementations. It is to be understood that the discussion below is only for the purpose of enabling a person with ordinary skill in the art to make and use any subject matter defined now or later by the patent "claims" found in any issued patent herein. In other instances, well-known methods, procedures, components, circuits, and networks have not been described in detail so as not to unnecessarily obscure aspects of the embodiments.

It will also be understood that, although certain elements of the invention and subject matter will be described in a certain order, the order is not intended to be limiting to the invention as many steps may be performed in a plurality of configurations to accomplish the invention of using various technologies to participate, trade and transact agriculture community linked transportation and freight units as a physical forward commodity. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof.

The terminology used in the description of the invention herein is for the purpose of describing particular embodiments only and is not intended to be limiting of the invention. As used in the description of the invention, the singular forms "a", "an" and "the" are intended to also include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a mobile computing device may be substituted for a fixed stationary computing device, a virtual reality headset, a mixed reality headset, an augmented reality headset, or an audio interfaced computer device. Embodiments may also occur on a projection computing device or in any other method or system which communicates and integrates the use of a network, community route processor, my route processor, sequence route processor, global positioning system network, mobile computing devices, servers, forward commodity forward market auction database, price-time priority queues, grouping software instructions for hubs, securitization transformations and specifications, game servers, agriculture community linked objects, indexing algorithms for agriculture community linked transportation unit securities on various navigation routes, navigation servers, virtual hub topology methods and systems, transparent open access user interface pricing systems, blockchain audit and safety methods, facial recognition, fingerprint recognition or photo recognition of users for security and identity check, or algorithms for no arbitrage conditions and constraints with a user interface or graphical user interface formatted on mobile or stationary computing devices over various mediums. The devices are connected through a network for the purpose of grouping users into virtual hub sequences of community objects as a gateway to participating, transacting or trading agriculture community linked transportation or freight capacity units between combinations of virtual hubs as a forward commodity in an auction with price-time priority queues.

The following paragraphs provide various techniques of various embodiments described herein such as illustrated as in FIG. 1. In one implementation as illustrated in FIG. 1, a user 110 may be assigned or may join an agriculture community linked virtual route community 101, 103, which is a sequence of virtual hub(s). In some embodiments, the agriculture community linked virtual hub sequence may be assigned a metadata tag such as #CHKITHNYC 102, which is short for a longer full name sequence such as Chicken as an agriculture product originating in Ithaca, NY with a destination waypoint of New York City, NY. In some embodiments, the origin agriculture community linked virtual hub 105 may be a specific address and geolocation data in the city of Ithaca, NY. In some embodiments, the route 119 between the Ithaca, NY agriculture community linked virtual hub 105 and the New York City, NY agriculture community linked virtual hub 113 may be a sequence of two agriculture community linked virtual hubs. In some embodiments, there may be one or more trucks 118, cars 117, additional trucks 116, or additional cars 114 which are headed in a certain direction along the route 119. In some embodiments, additional vehicles 106, 107, 108, 109, 104, 111 may be headed the other direction along the virtual hub sequence 119 between two agriculture community linked virtual hub points 105, 113. In some embodiments, additional user(s) 112 may join the virtual hub route sequence community 103. In yet another exemplary implementation, a user 110 may be assigned or may join an agriculture community linked virtual route community 121, 123 which is a sequence of virtual hub(s). In some embodiments, the virtual hub sequence may be assigned a metadata tag such as #AppKatyHOU 122 which is short for a longer full name agriculture community linked sequence, such as apples as an agriculture product originating in Katy, Texas with a destination waypoint of Houston, NY. In some embodiments, the origin agriculture community linked virtual hub 125 may be a specific address and geolocation data in the city of Katy, Texas. In some embodiments, the agriculture community linked route 139 between the Katy, Texas virtual hub 125 and the Houston, Texas virtual hub 133 may be a sequence of two virtual hubs. In some embodiments, there may be one or more trucks 138, cars 137, additional trucks 136, or additional cars 134 that are headed in a certain direction along the route 139. In some embodiments, additional vehicles 126, 127, 128, 129, 130, 131 may be headed the other direction along the virtual hub sequence 139 between two agriculture community linked virtual hub points 125, 133. In some embodiments, additional user(s) 132 may join the agriculture community linked virtual hub route sequence community 123. In yet another exemplary implementation, a user 144 may be assigned or may join an agriculture community linked virtual route community 141, 143, which is a sequence of virtual hub(s). In some embodiments, the agriculture community linked virtual hub sequence may be assigned a metadata tag such as #BeefPaloSF 142, which is short for a longer full name sequence, such as an agriculture community linked sequence corresponding to beef as an agriculture product originating in Palo Alto, California with a waypoint destination of San Francisco, California. In some embodiments, the origin virtual hub 145 may be a specific address and geolocation data in the city of Palo Alto, California. In some embodiments, the agriculture community linked route 159 between the Palo Alto, California agriculture community linked virtual hub 145 and the San Francisco agriculture community linked virtual hub 153 may be a sequence of two virtual hubs. In some embodiments, there may be one or more trucks 158, cars 157, additional trucks 156, or additional cars 154 that are headed in a certain direction along the route 159. In some embodiments, additional vehicles 146, 147, 148, 149, 150, 151 may be headed the other direction along the virtual hub sequence 159 between two virtual hub points 145, 153. In some embodiments, additional user(s) 152 may join the agriculture community linked virtual hub route sequence community 143.

In some embodiments, agriculture community linked virtual hub sequences, such as Ithaca, NY agriculture community linked virtual hub 105 to New York City, NY agriculture community linked virtual hub 113, are transformed into community objects, which may then be assigned a plurality of attributes in the same sense that a class in the Java programming language has methods as a part of the class object in object oriented programming. In some embodiments, the data transformation of an agriculture community linked virtual hub sequence into a community object allows the similar benefits of the data transformations involved in computing languages with methods, where the methods help the instructions of the computer program communicate in an organized manner using modular logic. In some embodiments, agriculture community linked virtual hub sequences, such as 105 to 113 #CHKITHNYC 102, may be combined with other agriculture community linked virtual hub sequences to extend the series sequence. As we have discussed at length in the previous sections of the disclosed invention, while there may be hundreds, thousands, or millions of people along various agriculture community linked transportation virtual hub sequences, there currently exists no method or system of organizing an agriculture community linked route or agriculture community linked virtual hub sequence into a transformed data community object. The attributes of communities allow for superior communication, accountability and even transactions to occur within a community object 101. In some embodiments, the data transformation of an agriculture community linked virtual hub sequence community object 101 allows a plurality of network members 110, 112 to be assigned agriculture community linked virtual route communities 103 based on a plurality of attributes, prior GPS location histories, navigation search queries, or other attributes. In some embodiments, agriculture community linked virtual hub sequences that have been transformed into community objects 101 can provide greater communication and organizational ability for a market to transact agriculture community linked transportation unit(s) and provide a gateway for those transportation unit transactions, as described in U.S. patent application publication, Ser. No. 15/877,393, "Electronic Forward Market Exchange for Transportation Seats and Capacity in Transportation Spaces and Vehicles," filed Jan. 23, 2018, the entirety of which is incorporated by reference herein.

In some embodiments, agriculture community linked virtual hub sequences, which have been transformed into community objects 141, 121, 101, communicate through a network 160 to associate a price-time priority queue for a transformed agriculture community linked transportation community object using an agriculture community linked transportation unit queue processor 162, a server 163, memory 164 and an agriculture community linked transportation forward market database server 161. In some embodiments, the virtual hub sequences or community objects 141, 121, 101 may be independent or sequenced to construct a waypoint sequence of multiple linked agriculture community linked virtual hub route community objects 101, 121, 141. In some embodiments, the associated price-time priority queue system for agriculture community linked transportation units may have generated processing and user interface display instructions from the agriculture community linked transportation unit queue processor 162, the server 163, the memory 164 and an agriculture community linked transportation forward market database server 161 through a network 160. In some embodiments, the price-time priority queue system for transformed agriculture community linked transportation units may process and display a plurality of time and date sequences for a plurality of forward delivery periods for agriculture community linked transformed transportation unit(s).

Figure 2:
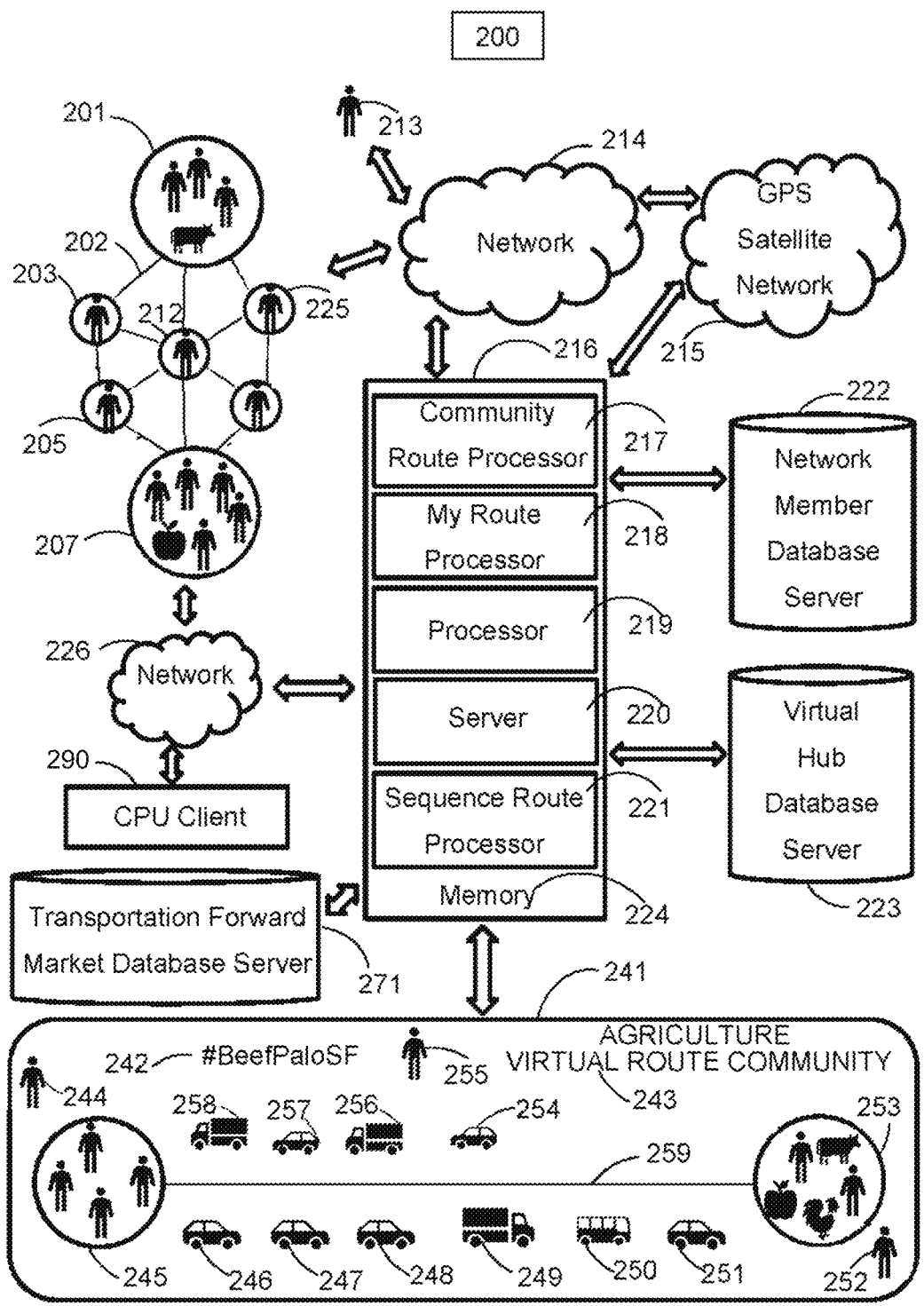
FIG. 2 illustrates a schematic diagram of an exemplary network configuration and of an agriculture community linked virtual hub sequences data transformation into a waypoint combination as community object to which users may subscribe and associate price-time priority queues.

FIG. 2 illustrates in some embodiments, an exemplary network configuration 200. In some embodiments a network of agriculture community linked virtual transportation hubs 201, 203, 205, 207, 212, 225 may represent an agriculture community linked virtual transportation network of a neighborhood, village, city, county, state, country, continent, or even inter-virtual hub networks across geographies. Prior art as well as current inventions carry no methods or data transformations to transform agriculture community linked navigation routes 202 which are a virtual hub sequence between a series of virtual transportation hubs 201 and 203, 203 and 212, or multi-leg agriculture community linked combinations, such as 201 to 203 and 203 to 212 as a sequence. In some embodiments, user(s) 213 or the network 214 have input hundreds, thousands, millions, or more of agriculture community linked virtual hubs 201 to form a network topology for agriculture community linked transportation virtual hub sequences 241. In some embodiments, the agriculture community linked transportation data transformation to a series of virtual transportation hubs 245, 253 allows for network structure 201, 203, 212, 205, 207, 225, 212 and organization, such as a hub and spoke model which is heavily utilized within the airline transportation industry or a plurality of other competing network topologies which are not dependent on road pathways. While hub and spoke transportation systems are common for airplane transportation or bus and train networks, they do not exist for private vehicle networks in an organized manner other than roadways. In some embodiments, agriculture community linked virtual transportation hub topologies 241 over road structures 259 allow for the benefits of public transportation networks to be combined with private vehicle networks. In some embodiments, the agriculture community linked virtual transportation hub networks 201, 203, 212, 205, 207, 225, 212 have been input into the network 214. In some embodiments, the topologies of the virtual hub network 201, 203, 212, 205, 207, 225, 212 then move for further data transformation in the community route processor 217, which transforms subsections of the agriculture community linked transportation network topologies 201, 203, 212, 205, 207, 225, 212 into an agriculture community linked virtual hub sequence 241. As shown, the virtual hub sequence 241 represents two addresses 245, 253 along an agriculture community linked virtual hub sequence 259, such as Palo Alto, California 245 to San Francisco, California 253, where each agriculture community linked virtual hub address 245, 252 corresponds with a physical address. Agriculture community linked virtual route communities 243 may be one to one, one to two, one to many, and any superset or subset combination thereof. The My Route Processor 218 further processes agriculture community linked virtual hub combination and agriculture community linked virtual transportation hub sequences into a specific network members account on the network member database server 222. In some embodiments, the agriculture community linked sequence route processor 221 may connect a plurality of virtual hub sequences 201, 203 205, 207 in a logical order to complete a path combination 201 to 207 for agriculture community linked navigation or community object construction. In some embodiments, community objects may be made from simple direct path routes 202 between two virtual hubs 201 and 203 or multi-virtual hub constructions between two agriculture community linked virtual hub sequences 201 to 207 by waypoints of 201 to 203 to 212 to 207 or any combination, superset, or subset thereof. In some embodiments, the agriculture community linked virtual route community objects 243 allow attributes to be assigned to the community objects. In some embodiments, users may be assigned to a plurality of community virtual hub sequence objects 241. In some embodiments, network members 213 may be assigned to an agriculture community linked virtual route community 241 because the user(s) route history on the GPS satellite network 215 suggests the route has overlap with agriculture community linked virtual hub route sequences the user has used or queried on various search methods on the system for the agricultural product. In some embodiments, the user 213 may use a CPU client 290, which is a visual, audio, or other type of computing interface, with the network 226 of agriculture community linked navigation route communities 243. In some embodiments, the agriculture community linked transportation forward market database server 271 may interface with a processor 219, sequence route processor 221, my route processor 218, or agriculture community linked community route object processor 217 to process a plurality of price-time priority queues for transformed transportation unit(s). In some embodiments, a plurality of vehicles 258, 257, 256, 254, 246, 247, 248, 249, 250, 251 may be in route between a first virtual hub 245 and a second said virtual hub 253. In some embodiments, vehicles 257, 247 may be moving in opposite directions along a route 259. In some embodiments, a truck 258 may contain a transformed transportation unit(s), a car 251 may contain a transformed transportation unit(s), a bus 250 may contain a transformed transportation unit(s), or a plurality of other vehicle types may contain a transformed agriculture community linked transportation unit(s) under a specification that is substitutable. In some embodiments, the agriculture community linked virtual hub or community object sequence of waypoints may be reversed from waypoint 245 to waypoint 253 to waypoint 253 to waypoint 245. In some embodiments, the agriculture community linked route object 241 or agriculture linked community route object sequences 101, 121, 141 may have an infinite series of associated price-time queues, whereby any subset or superset comprise a forward market for transformed agriculture community linked transportation unit(s), transformed agriculture community linked route object(s) and the associated transformed agriculture community linked transportation unit(s). In some embodiments agriculture community linked virtual route communities 241, 101, 121, 141 are transformed data structures that form objects which community users 213 may subscribe, friend, join, or follow to more efficiently have news and understanding for the agriculture community linked transportation unit transactions, as described in U.S. patent application Publication, Ser. No. 15/877,393, "Electronic Forward Market Exchange for Transportation Seats and Capacity in Transportation Spaces and Vehicles," filed Jan. 23, 2018, the entirety of which is incorporated by reference herein.

Figure 3:
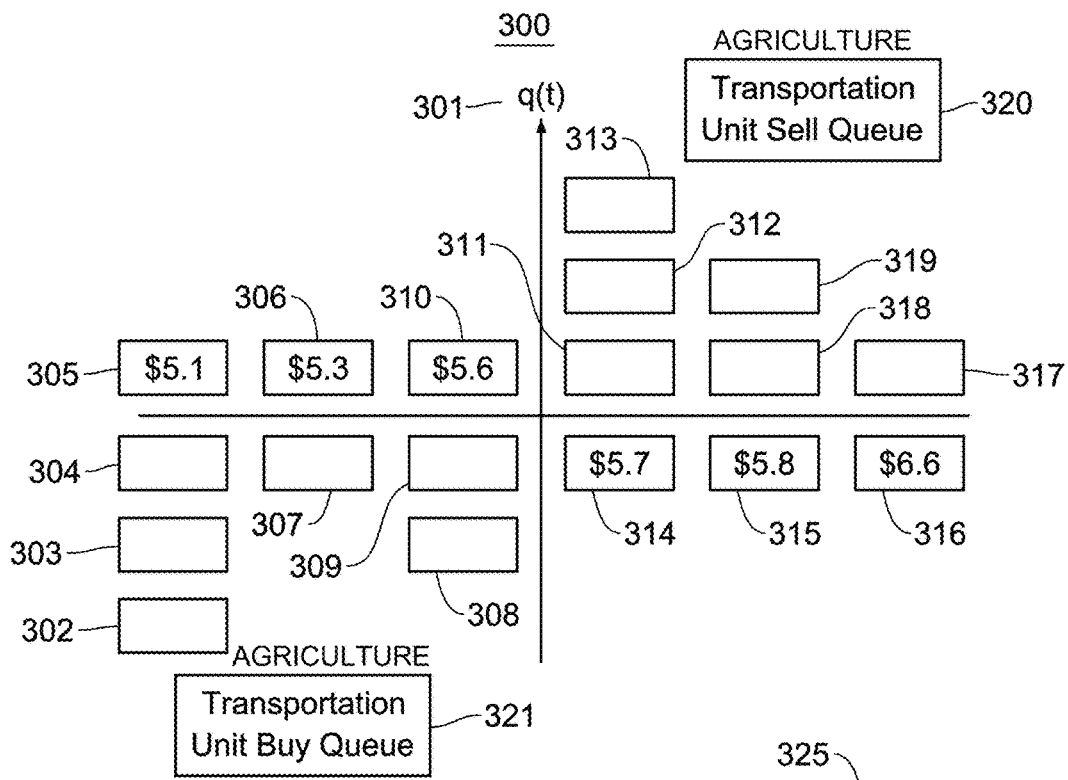
FIG. 3 illustrates an exemplary price-time priority queue for agriculture community linked route objects or waypoint combinations and community route object sequences for transformed agriculture community linked transportation and freight units.

FIG. 3 illustrates exemplary user price-time priority queue 300 for transacting or matching transformed agriculture community linked transportation unit data, participating, transacting, and/or trading agriculture community linked transportation, and representing the transformed agriculture community linked transportation unit value as a homogeneous asset specification or freight as a physical forward commodity security between combinations of virtual hubs over various transportation modes. In some embodiments, user transformed agriculture community linked transportation unit(s) or transformed agriculture community linked transportation unit(s) associated with agriculture community linked route community objects interface 300 includes the following instructions, transformations and elements, or a subset or superset thereof:

exemplary transformed agriculture community linked transportation unit price-time priority sell queue 320;

exemplary transformed agriculture community linked transportation unit price-time priority buy queue 321;

exemplary transformed agriculture community linked transportation unit price priority bucket 305 in the transportation unit buy queue of $5.10;

exemplary transformed agriculture community linked transportation unit price priority bucket 306 in the transportation unit buy queue of $5.30;

exemplary transformed agriculture community linked transportation unit price priority bucket 310 in the transportation unit buy queue of $5.60;

exemplary transformed agriculture community linked transportation unit price priority bucket 314 in the transportation unit sell queue of $5.70;

exemplary transformed agriculture community linked transportation unit price priority bucket 315 in the transportation unit sell queue of $5.80;

exemplary transformed agriculture community linked transportation unit price priority bucket 316 in the transportation unit sell queue of $6.60;

exemplary transformed agriculture community linked transportation unit price-time priority buy price 304 in the first time position of the price priority bucket 305 of $5.10;

exemplary transformed agriculture community linked transportation unit price-time priority buy price 303 in the second time position of the price priority bucket 305 of $5.10;

exemplary transformed agriculture community linked transportation unit price-time priority buy price 302 in the third time position of the price priority bucket 305 of $5.10;

exemplary transformed agriculture community linked transportation unit price-time priority buy price 307 in the first time position of the price priority bucket 306 of $5.30;

exemplary transformed agriculture community linked transportation unit price-time priority buy price 309 in the first time position of the price priority bucket 310 of $5.60;

exemplary transformed agriculture community linked transportation unit price-time priority buy price 308 in the second time position of the price priority bucket 310 of $5.60;

exemplary transformed agriculture community linked transportation unit price-time priority sell price 311 in the first time position of the price priority bucket 314 of $5.70;

exemplary transformed agriculture community linked transportation unit price-time priority sell price 312 in the second time position of the price priority bucket 314 of $5.70;

exemplary transformed agriculture community linked transportation unit price-time priority sell price 313 in the third time position of the price priority bucket 314 of $5.70;

exemplary transformed agriculture community linked transportation unit price-time priority sell price 318 in the first time position of the price priority bucket 315 of $5.80;

exemplary transformed agriculture community linked transportation unit price-time priority sell price 319 in the second time position of the price priority bucket 315 of $5.80;

exemplary transformed agriculture community linked transportation unit price-time priority sell price 317 in the first time position of the price priority bucket 316 of $6.60;

exemplary transformed agriculture community linked transportation unit price time priority limit order book ("LOB") 325 is represented by the vector q(t) 301, such that the i-th coordinate for i>0, $q_i(t)$, is the number of sell limit orders of transformed transportation units that are waiting in the LOB at time t a price iδ (δ is the price unit tick size of the transformed agriculture community linked transportation unit), where the number of buy limit orders for transformed agriculture community linked transportation units at iδ are represented with a negative sign $q_i(t)$;

exemplary benchmark price 326 of all sell limit orders at time t are computed as s(t)=s(q(t))=min (min {0<iδ: $q_i$(t)>0}), if $q_i$(t) is less than or equal to 0 for all i>0, then s (q (t))=infinity;

exemplary benchmark price 327 of all buy limit orders at time t are computed as b(t)=b (q (t))=max (max {iδ>0: $q_i$(t)<0}), if $q_i$(t) is greater than or equal to 0 for all i>0, then b(q (t))=negative infinity;

exemplary order match 328 in the transformed agriculture community linked transportation unit limit order book where s(t)=b(t), which then moves the method and system to the matched transformed agriculture community linked transportation unit limit order confirmation and delivery process;

exemplary limit order book status of no order match 329, where s (t)>b (t);

exemplary limit order book i-th $q_i$ (t) element 330 of LOB is cancelled, remove from queue;

exemplary i-th qi (t) element is a new transformed agriculture community linked transportation unit order 331 in LOB, insert into respective limit order buy queue 321 or limit order sell queue 320 with priority of price, then time into the price time priority queues 300.

In some embodiments, the price—time priority queue 300 for transformed agriculture community linked transportation units may be assigned to an agriculture community linked commute community object 241, which is a waypoint sequence of transformed agriculture community linked transportation units. In some embodiments, the price—time priority queue 300 may be assigned to two waypoints as an agriculture community linked commute community object 241, or the price—time prior queue 300 may be assigned to an agriculture community linked commute community waypoint object sequence of many waypoints 203 to 205 to 207 to 212, which have been added together to form one continuous agriculture community linked commute community object 241 and respective price—time priority queue for transformed agriculture community linked transportation units through processing instructions from the agriculture community linked Community Route Processor 217 and agriculture community linked Sequence Route Processor 221 via the network(s) 226, 214, and 215. In some embodiments, the limit order book 301 vector may be assigned to a specific date and time for the agriculture community linked commute community waypoint object, which is a forward market price for transformed agriculture community linked transportation unit(s) 271 and agriculture community linked commute community waypoint object(s) 241. In some embodiments, a specific transformed agriculture community linked transportation unit price—time priority queue limit buy order 304 with a specific price stamp bucket 305 of $5.10 may be cancelled. If the order 304 is cancelled, then the price—time priority limit order book buy queue price 303 moves to the higher price—time priority queue position of 304 and price—time priority price of 302 moves to position 303. In some embodiments, the price—time priority limit order sell price 319 of price—time priority bucket price 315 of $5.80 may be cancelled. If the price—time priority of the transformed agriculture community linked transportation unit 319 is cancelled, then order 317 moves to a higher position in the overall transformed agriculture community linked transportation queue 320 even though the limit order book price 317 remains in the price bucket of 316 which is $6.60. In some embodiments, price—time priority insertion may occur where a new order is inserted into either the transformed agriculture community linked transportation unit buy queue 320 or transformed agriculture community linked transportation unit sell queue 321. In some embodiments, and by example, but not limited by the example, a new price—time limit order for a transformed agriculture community linked transportation unit may be inserted as a sell order at a price of $5.70 at position 313, which would then assume order 312 was also at a price of $5.70 and that order 312 was placed with a time that was before order 313 was placed. In the aforementioned example of the price—time order insertion of 313, price—time orders of 319, 318, and 317 have moved lower in their relative position even though they remain in distinctly different price buckets of 315 and 316, respectively. For the price—time priority queue 300, price is first priority, then time stamp in the price—time priority queue 300 for transformed agriculture community linked transportation units.

In some embodiments, the lowest selling price s(t) 326 may equal the highest buying price b(t) 327, in which case the highest transformed agriculture community linked transportation unit buy queue price bucket 310 is equal to the lowest transformed agriculture community linked transportation unit sell queue 320 selling bucket price 314. In the example 300 of the limit order book 301, but not limiting by example, the highest transformed agriculture community linked transportation unit buy price 310 of $5.60 is lower than the lowest agriculture community linked transportation unit sell queue 320 lowest selling bucket 314 of $5.70, so no match occurs because s (t)>b (t) 329. In some embodiments, many order insertions 331 or order cancellations 330 may occur for transformed agriculture community linked transportation units from the agriculture community linked transportation forward market database server 271 associated with agriculture community linked community objects which are series of waypoints 241.

In some embodiments, the LOB 325 for transformed agriculture community linked transportation units may contain many different types of instruction structures and specifications, such as limit orders, market orders, market if touched orders, snap market orders, snap mid orders, snap to primary orders, peg to benchmark orders, or adaptive custom orders (which are custom customer designed instructions), which are all standard order types for anyone skilled in the art of markets. In some embodiments, the LOB 325 for transformed transportation units may also contain instructions for order times, such as good for the day, good till cancelled, immediate or cancel, good till date, day till cancelled, or a plurality of additional custom instructions for the timing of the order of the transformed transportation unit in the LOB 325 that is associated with an agriculture community linked commute community object 241. In some embodiments, a plurality of additional instructions and specifications may also be unique to each transformed agriculture community linked transportation unit LOB 325, such as the modes shown in FIG. 8 and discussed later, including automobile mode 811, air mode 812, autonomous vehicle mode 813, bike mode 814, boat mode 815, bus mode 816, drone mode 817, limo mode 818, motorcycle mode 819, moped mode 820, shuttle mode 821, spaceship mode 822, subway mode 823, taxi mode 824, train mode 825, or fastest optimized mode 826 (which may combine many modes or a single mode) for a waypoint commute community object 241 or waypoint agriculture community linked sequence 201 to 203 to 205 to 212 to 207 of many agriculture community linked commute communities 241.

In some embodiments, the LOB 325 may be assigned to transformed agriculture community linked transportation unit packages that have associated agriculture community linked commute community objects 241. In some embodiments, the LOB 325 for transformed transportation units may be assigned to cargo, such as a trailer of a rig, a container of a boat, a container on a truck, or any type of cargo that takes up the space of a transformed agriculture community linked transportation unit. In some embodiments, the LOB 325 may even be assigned to the virtual transformed agriculture community linked transportation unit which would be space along a packet moving medium, such as a telecommunications pipeline, satellite telecommunications, or wireless telecommunications that move packets of data that are transformed transportation units.

Figure 4:
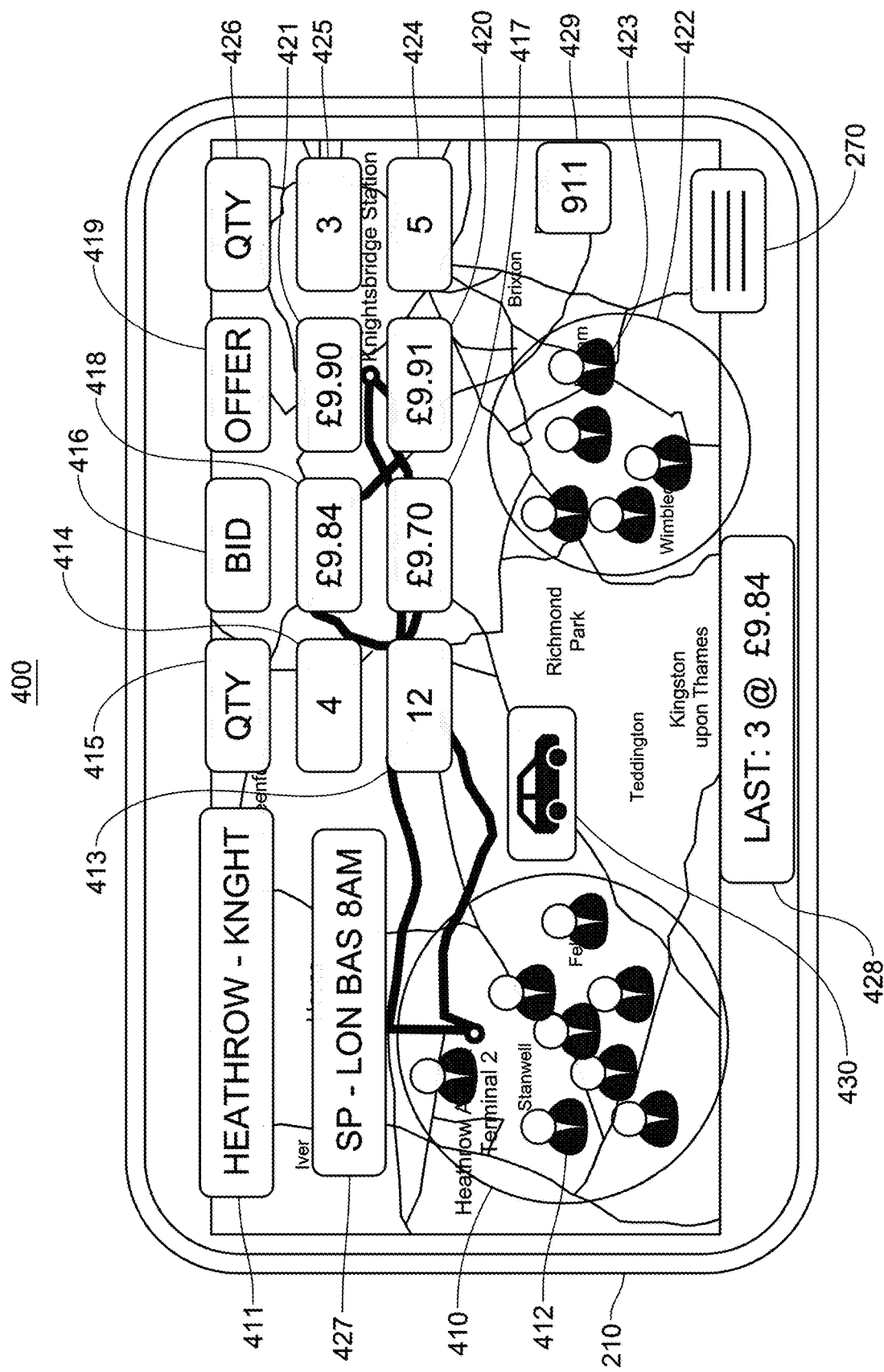
FIG. 4 illustrates an exemplary user interface with various international configurations of trading agriculture community linked automobile or freight capacity in accordance with some embodiments.

FIG. 4 illustrates exemplary user interfaces 210 of a mobile computing device for participating, transacting, and/or trading agriculture community linked transportation as a physical forward data transformed agriculture community linked transportation unit commodity or security between combinations of virtual hubs which may be community objects 241 over various transportation modes. In some embodiments, user interface 210 includes the following elements, or a subset or superset thereof:

Exemplary agriculture community linked virtual hub combination 411;

Exemplary agriculture community linked virtual hub origin/from location 410 with users 412 within the agriculture community linked virtual hub location 410;

Exemplary specification summary of the market, level of service and time of delivery commencement 427, in this particular embodiment the GUI 210 has moved to an international agriculture community linked virtual market hub combination market such as within London;

Exemplary mode of agriculture community linked transportation capacity type 430;

Exemplary agriculture community linked transaction summary of the last trade price-time priority queue auction quantity and price 428 in the local currency or another currency set by the user 110;

Exemplary agriculture community linked virtual hub destination/to location 422 and user who is being delivered on the agriculture community linked transportation or freight capacity unit 423;

Exemplary bid/buy quantity title header 415 for an exemplary agriculture community linked virtual transportation hub market;

Exemplary bid/buy price title header 416 for an exemplary agriculture community linked virtual transportation hub market;

Exemplary offer/sell price title header 419 for an exemplary agriculture community linked virtual transportation hub market;

Exemplary offer/sell quantity title header 426 for an exemplary agriculture community linked virtual transportation hub market;

Exemplary bid/buy quantity 414 for the best bid quantity for the associated LOB 325 from a plurality of users 110 for an exemplary respective transportation capacity agriculture community linked virtual hub combination that has undergone a plurality of data transformations in the method;

Exemplary bid/buy quantity 413 for the second-best bid quantity for the associated LOB 325 from a plurality of users 110 for an exemplary respective agriculture community linked transportation or freight capacity virtual hub combination that has undergone a plurality of data transformations in the method;

Exemplary bid/buy price 418 for the best bid price for the associated LOB 325 from a plurality of users 110 for an exemplary respective agriculture community linked transportation capacity virtual hub combination that has undergone a plurality of data transformations in the method;

Exemplary bid/buy price 417 for the second-best bid price for the associated LOB 325 from a plurality of users 110 for an exemplary respective agriculture community linked transportation or freight capacity virtual hub combination that has undergone a plurality of data transformations in the method;

Exemplary offer/sell price 421 for the best offer price for the associated LOB 325 from a plurality of users 110 for an exemplary respective agriculture community linked transportation or freight capacity virtual hub combination that has undergone a plurality of data transformations in the method;

Exemplary offer/sell price 420 for the second-best offer price for the associated LOB 325 from a plurality of users 110 for an exemplary respective agriculture community linked transportation or freight capacity virtual hub combination that has undergone a plurality of data transformations in the method;

Exemplary offer/sell quantity 425 for the best offer quantity for the associated LOB 325 from a plurality of users 110 for an exemplary respective agriculture community linked transportation or freight capacity virtual hub combination that has undergone a plurality of data transformations in the method;

Exemplary offer/sell quantity 424 for the second-best offer quantity for the associated LOB 325 from a plurality of users 110 for an exemplary respective agriculture community linked transportation or freight capacity virtual hub combination that has undergone a plurality of data transformations in the method;

Exemplary safety dispatch "911" button 429 to enact video and audio recording of the user 110 environment and dispatch of that information to authorities.

Exemplary hamburger menu button 270 to move back to menu options and settings away from the participation, transaction, trading GUI 210 embodiment.

In some embodiments the user 110 may enter an agriculture community linked transaction quantity and price for transformed agriculture community linked transportation or freight capacity unit securities to participate, transact and/or trade by the GUI 210 detecting user 110 contact with a bid/buy price 418 or offer/sell price 421. The GUI 210 detects user 110 contact with any of the GUI 210 buttons which have been aforementioned. The GUI 210 may detect user contact 110 with any of the GUI 210 buttons 418, 417, 420, 421 or user 110 voice interface with the application 210 method. Upon user 110 contact with buttons on the GUI 210, instructions are instantiated which allows the user 110 to change the specifications of the respective agriculture community linked virtual hub combination 411. A plurality of prices and markets may be presented based on a plurality of contract specifications. In some embodiments, the best bid/buy price 418 may be moving up in price or down in price depending on the market conditions at any given time. In some embodiments the last auction trade or last transacted price for a given specification is listed to help the user 110 understand how the market is moving so that the user 110 may submit a competitive offer/selling price 421 or bid/buying price 414. In some embodiments, users 110 may adjust settings of the GUI 210 to show more bid/buying prices 417 or more offer/selling prices 420. In some embodiments the matrix of agriculture community linked market quantities and prices 413, 414, 415, 416, 417, 418, 419, 420, 421, 424, 425, 426 may be referred to as market depth in the GUI 210 embodiment. In some embodiments, the number of users 110 may be displayed as user icons 412 or 423 for the amount of people logged in which desire to transact, trade or participate in a given agriculture community linked virtual hub 410 to agriculture community linked virtual hub 422 combination auction with price-time priority queues. In some embodiments, users 110 may select the agriculture community linked transportation mode 430 such that the user allows a market for only one form of transformed agriculture community linked transportation capacity as a commodity or security or the user 110 may allow the system to show multiple forms of transformed agriculture community linked transportation capacity between two virtual agriculture community linked transportation capacity hubs 410, 411, 422. In some embodiments, the GUI 210 may detect a user 110 selecting the 911 button 429, which may activate voice and video recording functions on the mobile or stationary device and transmit the data with a confirmation from the user 110 to the authorities to provide enhanced security while participating, transacting, or trading forward transformed agriculture community linked transportation or freight as a commodity or security. In some embodiments, the user may toggle between the GUI 210 market view screen in FIG. 4 and other menu 270 options and settings by the user 110 selecting the hamburger button 270 and the GUI 210 detecting the user 110 input or contact. In some embodiments, the GUI 210 may instantiate instructions in the memory of the mobile computing device, which then transmits agriculture community linked transportation or freight capacity data through the network 226, 214 or wireless GPS network 215 to call upon instruction routines and instruction sub-routines on the agriculture community linked transportation forward market database server 271, virtual hub database server 223, network member database server 222, no arbitrage condition database server and/or instructions in the memory of the cloud and local CPUs 290, which all interface together to make one system which may deliver agriculture community linked transportation or freight capacity units to users 110 from and to a plurality of virtual hubs 410, 422 with a plurality of specifications 427 at specific market prices.

Figure 5:
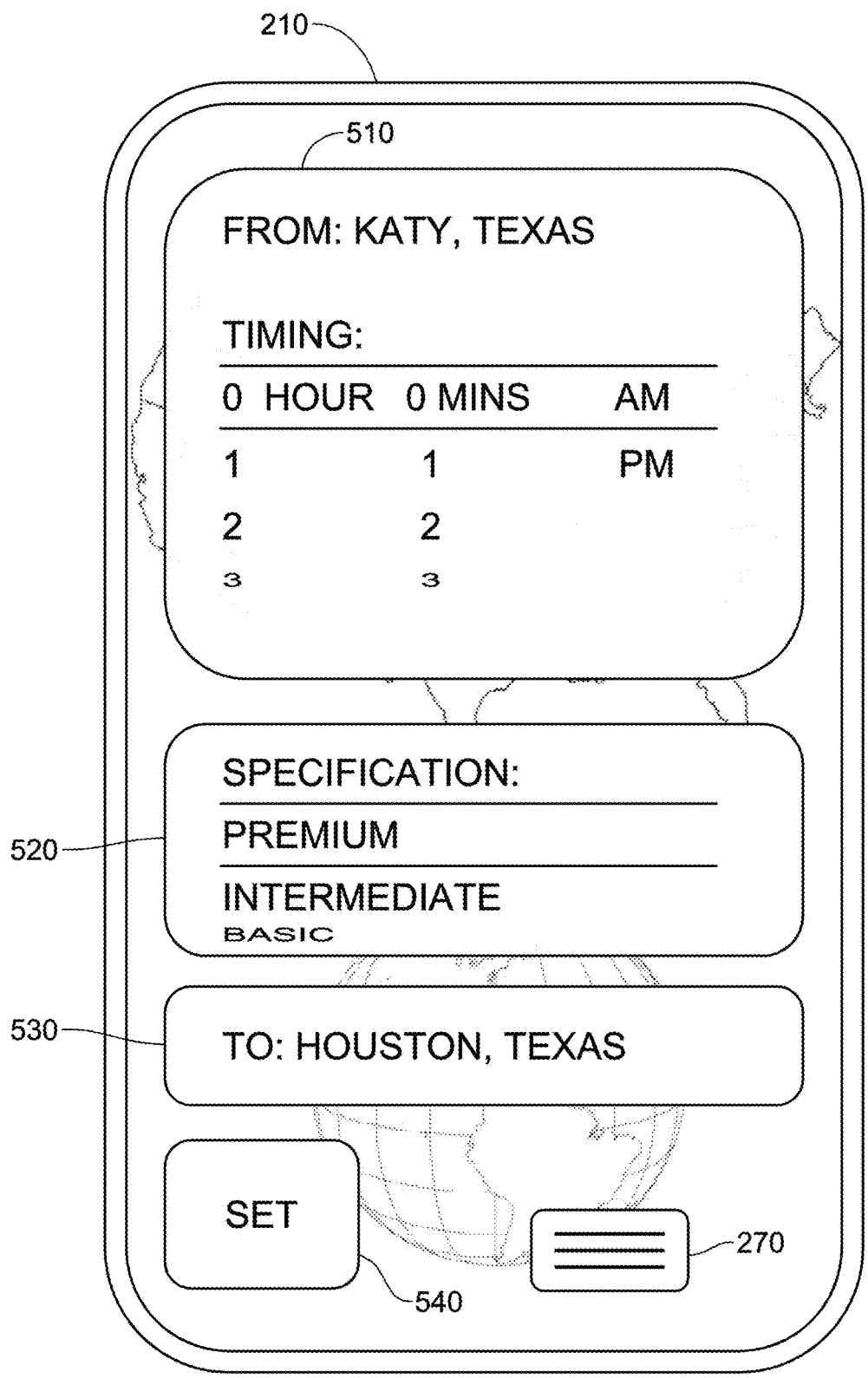
FIG. 5 illustrates an exemplary user interface to select a specification grade of agriculture community linked transportation or freight capacity with various timing specifications in accordance with some embodiments.

FIG. 5 illustrates an exemplary user interface 210 for listing timing specifications 510 on a portable multifunction device (e.g., a mobile computing device) in accordance with some embodiments. In some embodiments, user interface 210 includes the following elements, or a subset or superset thereof:

Origin/From virtual hub timing (a data transformation) 510;

Specification of quality of agriculture community linked transportation capacity (a data transformation) 520;

Destination/To virtual hub (a data transformation) 530;

Setting button 540 to transmit the timings 510 and quality specification grade 520 (a data transformation);

Hamburger button 270 to instruct the GUI 210 to take the user 110 to the menu screen.

In some embodiments, the user 110 may select a plurality of timing options in the timing selection specification 510. The timing specification constraint may be the time at which the transformed agriculture community linked transportation or freight capacity unit security departs from the origin/from agriculture community linked virtual hub 410. As in any commodity market, if a user 110 is late and they have purchased the agriculture community linked transportation capacity unit, the user must still pay for the agriculture community linked transportation or freight capacity unit regardless if the user 110 is present at the time of departure or not. The user has the option if they know they will be late to sell back the agriculture community linked transportation or freight capacity unit to the market at the then current price. Accordingly, for the purpose of example, but not limiting by example, if a user 110 bought a transformed agriculture community linked transportation capacity unit security for £9.90 421 and the user 110 realized they would be late for the 8 am departure specification 427, then the user 110 may either pay for the agriculture community linked transportation unit even though the user 110 was present and did not take delivery of the agriculture community linked transportation unit security, or the user 110 may preemptively sell back the agriculture community linked transportation capacity unit security to the market at the then current bid price 418. The user 110 would then have offset their obligation in a timely manner and another user 110 on the network 214, 226 may then purchase the available agriculture community linked transportation or freight capacity unit security. By eliminating the initial obligation by an creating an offset obligation, the additional data agriculture community linked transformation concepts such as cost of cover, liquidated damages or force majeure are not employed by the method. In some embodiments, virtual agriculture community linked transportation or freight hub combination units may or may not have the available liquidity if the user 110 were to wait too long before delivery of the agriculture community linked transportation capacity unit to make an adjustment and therefore may need to take delivery even if they are not present. In some embodiments, the user 110 may select a grade specification 520. For the purpose of example, but not limiting by example, a plurality of specification grades may exist, such as "premium" which may be defined by certain classes of agriculture community linked transportation capacity units and/or certain quality levels. Similarly, for the purpose of example, but not limiting by example, a plurality of specification grades may exist such as "intermediate" or "basic" which may be defined by certain classes of agriculture community linked transportation or freight capacity unit securities and/or certain quality levels. In some embodiments, the user 110 may select the destination/to agriculture community linked virtual hub 530 to change the agriculture community linked virtual hub combination. In some embodiments, the user 110, may contact the "set" button 540 to transmit the transformed agriculture community linked transportation capacity unit security specification data by using the GUI 210 which may instantiate instructions in the memory of the mobile computing device, which then transmits agriculture community linked transportation capacity data through the network 214, 226 or wireless GPS network 215 to call upon instruction routines and instruction sub-routines on the agriculture community linked transportation forward market database server 271, virtual hub database server 223, network member database server 222, map routing servers, no arbitrage condition database server and/or instructions in the memory of the cloud and local CPUs 290, which all interface together to make one system which may deliver transformed agriculture community linked transportation capacity unit securities to users 110 from and to a plurality of agriculture community linked virtual hubs 410, 422 with a plurality of specifications at specific market prices.

Figure 6:
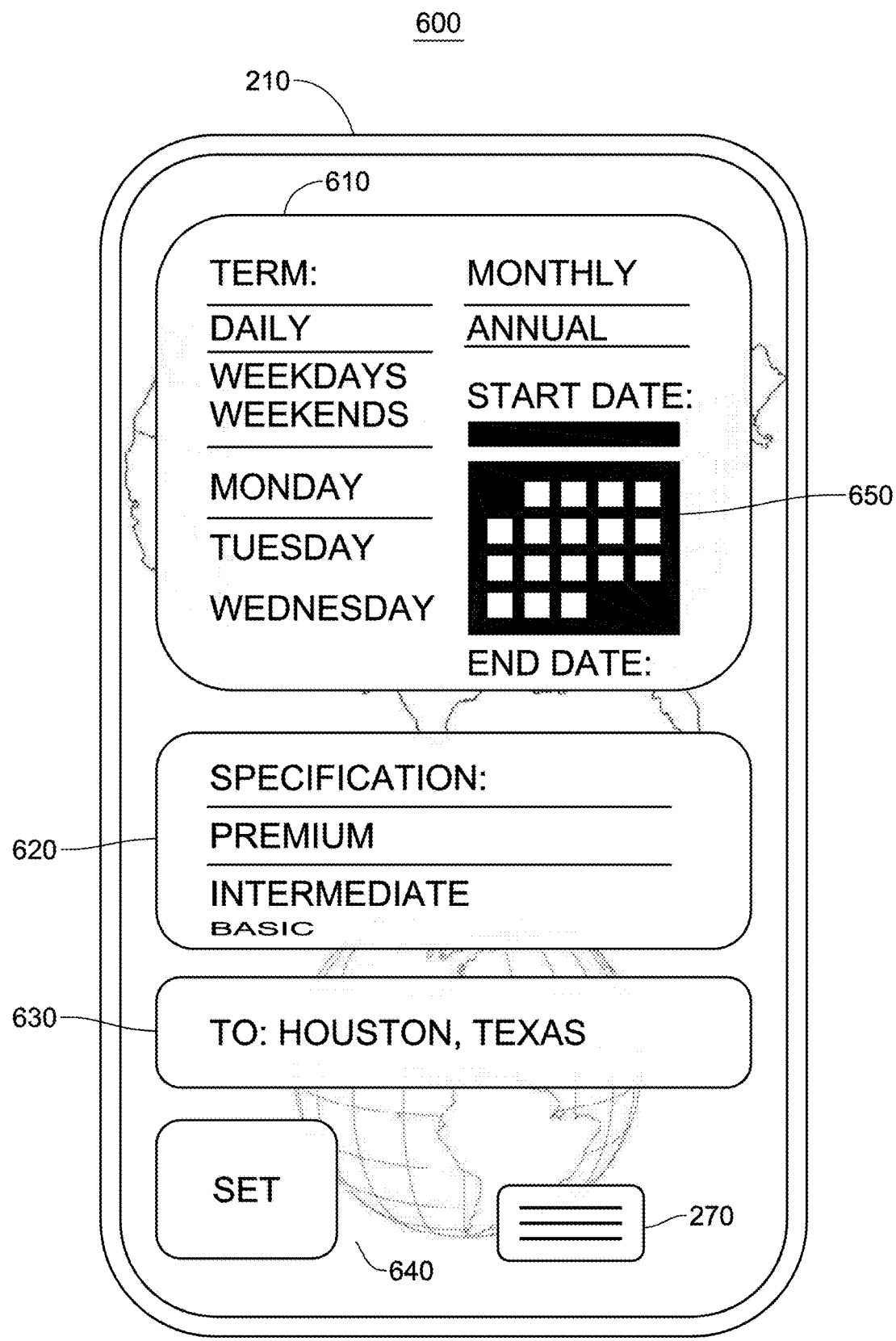
FIG. 6 illustrates an exemplary user interface with various term specifications for agriculture community linked transportation or freight capacity in accordance with some embodiments.

FIG. 6 illustrates an exemplary user interface 210 for selecting the term transformation specification 610 on a portable multifunction device (e.g., a mobile computing device) in accordance with some embodiments. In some embodiments, user interface 210 includes the following elements, or a subset or superset thereof:

Term specification options (a data transformation) 610;

Specification of quality of agriculture community linked transportation or freight capacity (a data transformation) 620;

Destination/To agriculture community linked virtual hub (a data transformation) 630;

Setting button 640 to transmit the term 610 and quality specification grade (a data transformation) 620;

Calendar button 650 to select specification start dates and end dates for a plurality of agriculture community linked virtual transportation or freight hub combinations (a data transformation);

Hamburger button 270 to instruct the GUI 210 to take the user 110 to the menu screen.

In some embodiments, the term specification 610 may be used to participate, transact and/or trade in a specific agriculture community linked virtual hub combination for a specific time period specification. Users 110 may set the term to daily, weekly, monthly, annual, weekdays, weekends, specific days such as Monday, Tuesday, Wednesday, Thursday, Friday, Saturday, Sunday, or any combination of term selections the user 110 sets as relevant for participating, transacting, or trading in the transformed agriculture community linked transportation or freight capacity unit securities market. Not limiting by example, but for use of illustrating a possible subset of term selections, the user 110 may select "weekdays" 610 during a specific calendar time period 650 of a given year. In some embodiments, specific time start dates and end dates may be set by the user with the calendar button 650. In some embodiments a user 110 may select "Mondays" 610 within a specification date window 650 (a data transformation). In some embodiments, the user 110 may select "weekends" 610 during a specification calendar window of dates 650 (a data transformation). In some embodiments, the user 110, may contact the "set" button 640 to transmit the transformed agriculture community linked transportation or freight capacity unit specification data by using the GUI 210 which may instantiate instructions in the memory of the mobile computing device, which then transmits agriculture community linked transportation capacity data through the network 226, 214 or wireless GPS network 215 to call upon instruction routines and instruction sub-routines on the agriculture community linked transportation forward market database server 271, virtual hub database server 223, network member database server 222, map routing servers, no arbitrage condition database server and/or instructions in the memory of the cloud and local CPUs 290, which all interface together to make one system which may deliver agriculture community linked transportation capacity units to users 110 from and to a plurality of agriculture community linked virtual hubs 410, 422 with a plurality of specifications at specific market prices.

Figure 7:
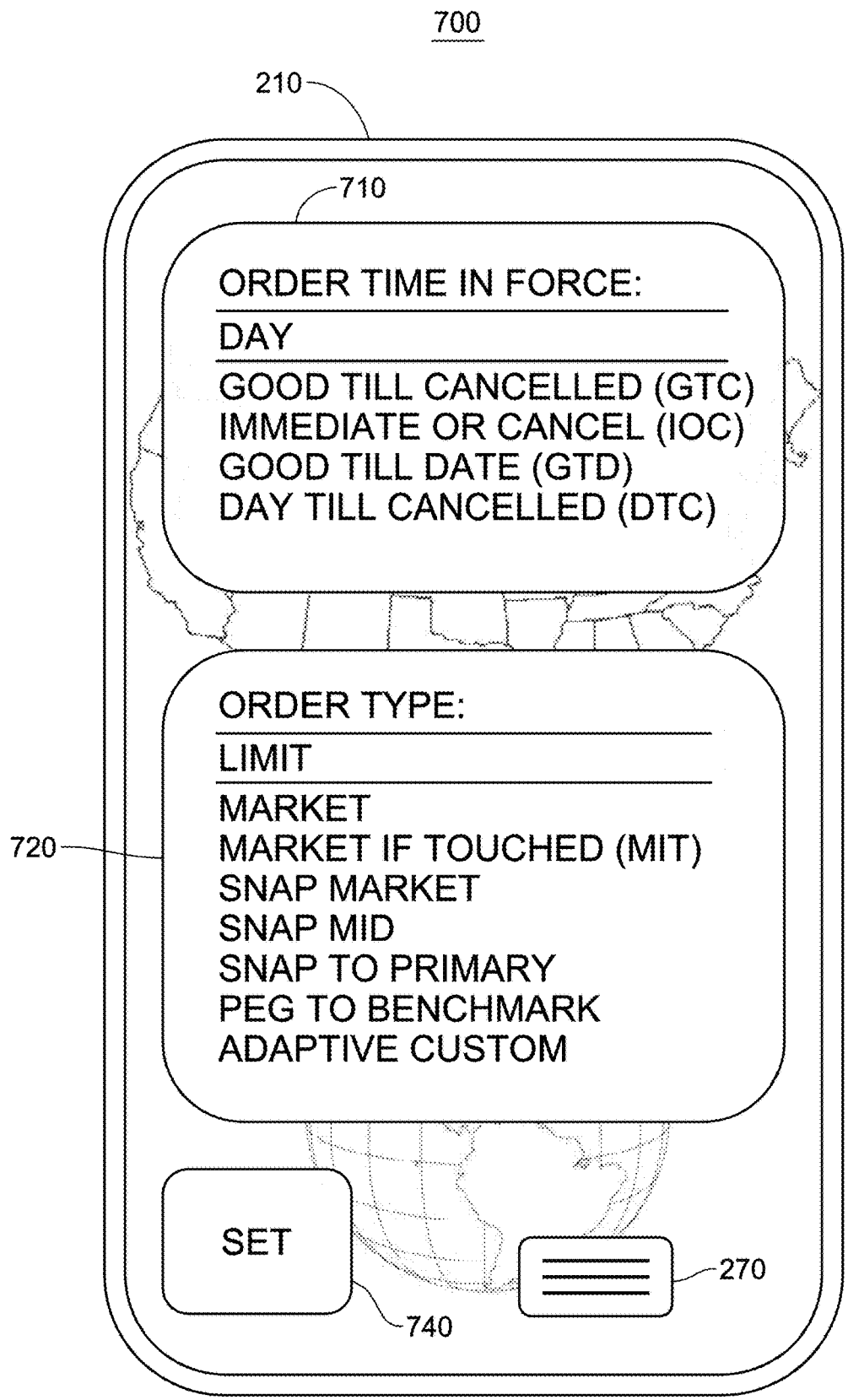
FIG. 7 illustrates an exemplary user interface with various order types and order time in force designations for agriculture community linked transportation or freight capacity in accordance with some embodiments.

FIG. 7 illustrates an exemplary user interface 210 for selecting order time in force order types 710 (a data transformation) as well as order types 720 (a data transformation) on a portable multifunction device (e.g., a mobile computing device) in accordance with some embodiments. In some embodiments, user interface 210 includes the following elements, or a subset or superset thereof:

Order time in force specification options (a data transformation) 710;

Order type specification options (a data transformation) 720;

Setting button 740 to transmit the order time in force specification 710 and Order type specification option 720 (a data transformation);

Hamburger button 270 to instruct the GUI 210 to take the user 110 to the menu screen.

In some embodiments, user interface 210 may be used by the user 110 to select a plurality of order time in force specifications 710. In some embodiments, order time in force selections 710 may include a subset or superset thereof: day (DAY) order; good till cancelled order (GTC); immediate or cancel order (1OC); good till date order (GTD); and/or day till cancelled order (DTC). Order time in force specifications 710 may be used to designate how long a user 110 order may be valid. In some embodiments, the GUI 210 may display the definitions of a plurality of order time in force specification 710 characteristics so that the user 110 may select the appropriate order time in force specification 710 for the agriculture community linked transportation or freight capacity unit that the user 110 may participate, transact and/or trade. In some embodiments, the user interface 210 may be used to select the order type specifications 720. In some embodiments, order type selections 720 may include a subset or superset thereof: Limit, Market, Market if Touched (MIT); Snap to Market; Snap to Mid; Snap to primary; Peg to benchmark; and/or adaptive custom. In some embodiments, the GUI 210 may display the definitions of a plurality of order types specification 720 characteristics so that the user 110 may select the appropriate order type specification 720 for the agriculture community linked transportation or freight capacity unit that the user 110 may participate, transact and/or trade. In some embodiments, the user 110, may contact the "set" button 740 to transmit the agriculture community linked transportation or freight capacity unit specification data by using the GUI 210 which may instantiate instructions in the memory of the mobile computing device, which then transmits agriculture community linked transportation or freight capacity data through the network 226, 214 or wireless GPS network 215 to call upon instruction routines and instruction sub-routines on the transportation forward market database server 271, virtual hub database server 223, network member database server 222, map routing server, no arbitrage condition database server, and/or instructions in the memory of the cloud and local CPUs 290, which all interface together to make one system which may deliver transformed agriculture community linked transportation capacity unit securities to user(s) 110 from and to a plurality of virtual hubs 410, 422 with a plurality of specifications at specific market prices.

Figure 8:
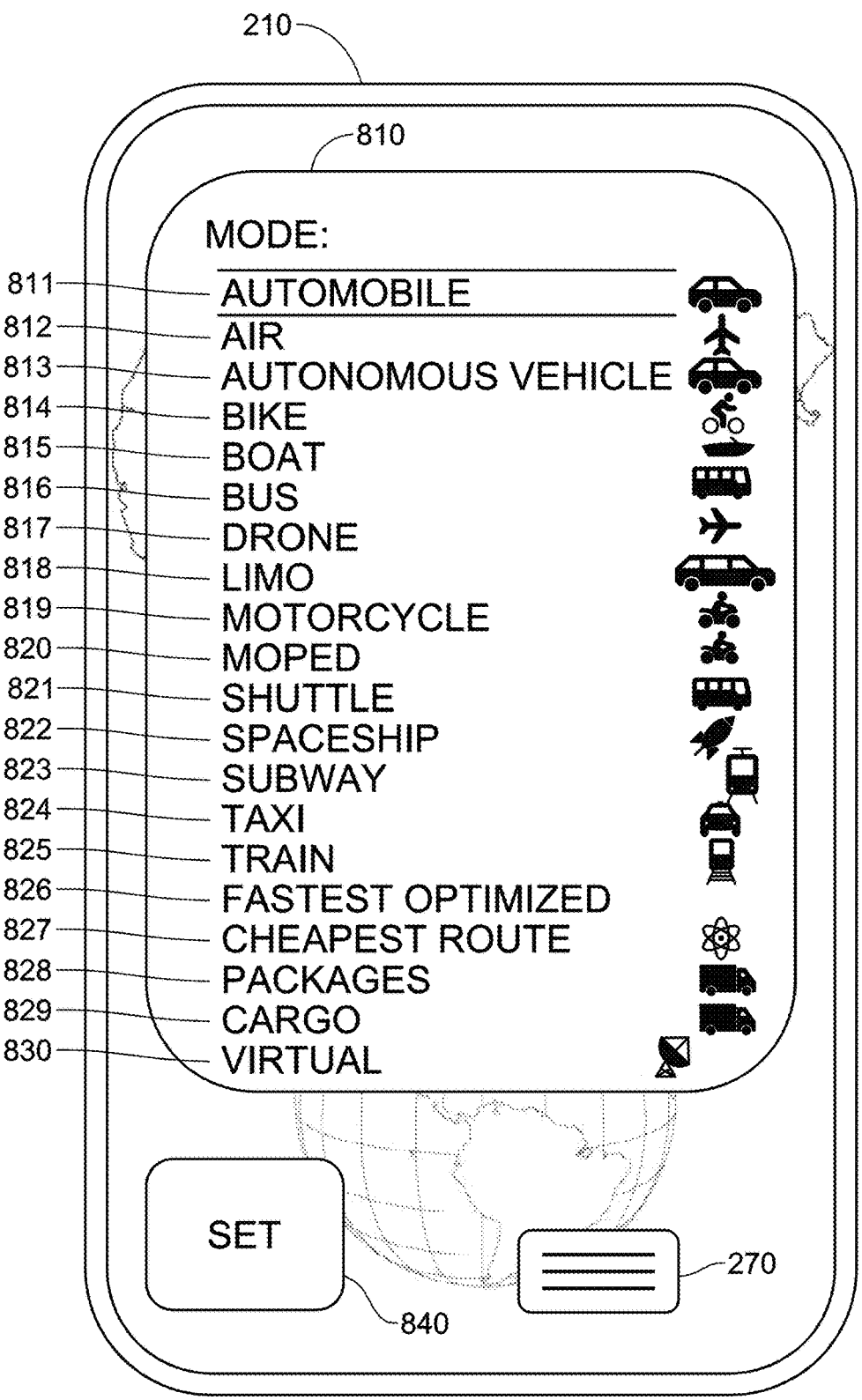
FIG. 8 illustrates an exemplary user interface with various modes of agriculture community linked transportation or freight capacity in accordance with some embodiments.

FIG. 8 illustrates an exemplary user interface 210 for selecting agriculture community linked virtual hub transportation capacity unit modes 810 (a data transformation) on a portable multifunction device (e.g., a mobile computing device) in accordance with some embodiments. In some embodiments, user interface 210 includes the following elements, or a subset or superset thereof:

Virtual hub agriculture community linked transportation capacity unit modes 810 (a data transformation);

Setting button 840 to transmit the agriculture community linked virtual hub transportation capacity unit modes 810;

Hamburger button 270 to instruct the GUI 210 to take the user 110 to the menu screen.

In some embodiments, user interface 210 may be used by the user 110 to select a plurality of agriculture community linked virtual hub transformed transportation capacity unit security modes 810 specifications. In some embodiments, agriculture community linked virtual hub transportation capacity unit mode selections 810 may include a subset or superset thereof: Automobile 811; air 812; autonomous vehicle 813; bike 814; boat 815; bus 816; drone 817; limo 818; motorcycle 819; moped 820; shuttle 821; space 822; subway 823; taxi 824; train 825; fastest optimized 826; cheapest route 827; packages 828; cargo 829; and/or virtual 830. In some embodiments, virtual hub agriculture community linked transportation capacity unit modes are simply that a user 110 would have a virtual transportation or freight capacity unit seat in an automobile or an airplane as examples, but not limiting by example. In some embodiments, the user 110 may bid on cargo 829 or package capacity 828 in any mode or multi-modal of transformed agriculture community linked transportation or freight capacity between a combination of virtual agriculture community linked transportation hub locations. In some embodiments, the user 110 may use one or multiple modes of agriculture community linked transportation between a combination of agriculture community linked virtual transportation hub capacity points. In some embodiments, the user 110, may contact the "set" button 840 to transmit the transformed agriculture community linked transportation or freight capacity unit specification mode data by using the GUI 210 which may instantiate instructions in the memory of the mobile computing device, which then transmits agriculture community linked transportation capacity data through the network 226, 214 or wireless GPS network 215 to call upon instruction routines and instruction sub-routines on the agriculture community linked transportation forward market database server 271, virtual hub database server 223, network member database server 222, no arbitrage condition database server, and/or instructions in the memory of the cloud and local CPUs 290, which all interface together to make one system which may deliver transformed agriculture community linked transportation or freight capacity unit securities to users 110 from and to a plurality of virtual hubs 410, 422 with a plurality of specifications at specific market prices.

Figure 9:
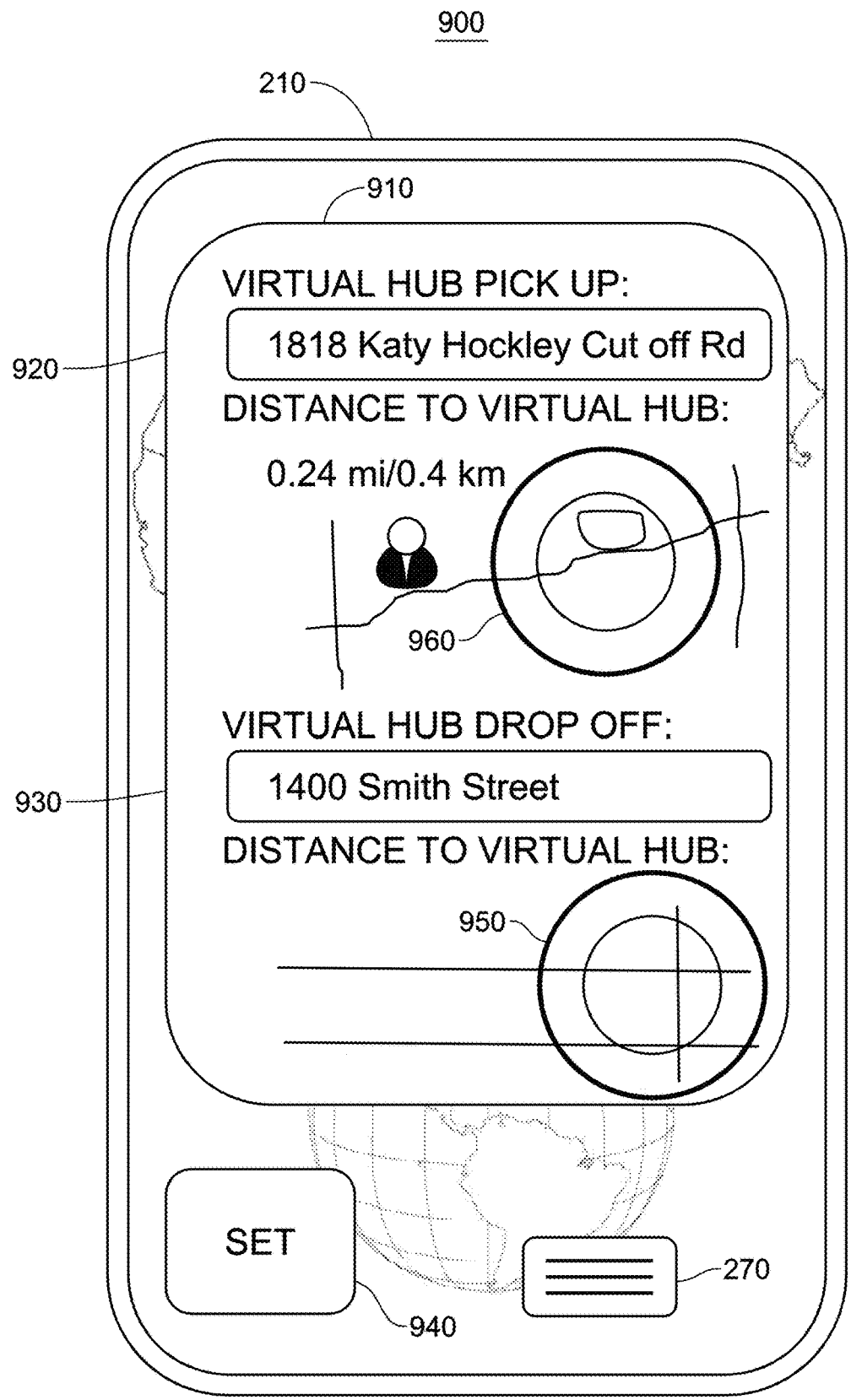
FIG. 9 illustrates an exemplary user interface with the distance between the user and an agriculture community linked virtual hub pick up point for agriculture community linked transportation or freight capacity as well as the distance between a user and a virtual drop off point for agriculture community linked transportation or freight capacity in accordance with some embodiments.

FIG. 9 illustrates an exemplary user interface 210 for identifying the distance the user 110 is from the agriculture community linked virtual hub from a map and distance perspective on a portable multifunction device (e.g., a mobile computing device) in accordance with some embodiments. In some embodiments, user interface 210 includes the following elements, or a subset or superset thereof:

Virtual hub agriculture community linked transportation capacity unit pick up display 910;

Virtual hub agriculture community linked transportation capacity unit pick up address 920;

Virtual hub agriculture community linked transportation capacity unit drop off address 930;

Virtual hub agriculture community linked transportation capacity pick-up target zone 960;

Virtual hub agriculture community linked transportation capacity drop-off target zone 950;

Setting button 940 to transmit the agriculture community linked virtual hub transportation capacity unit addresses 920, 930;

Hamburger button 270 to instruct the GUI 210 to take the user 110 to the menu screen.

In some embodiments, user interface 210 may be used by the user 110 to select a plurality of agriculture community linked virtual hub transportation capacity unit address 910 specifications. In some embodiments, agriculture community linked virtual hub transportation or freight capacity unit address selections 910 may include a subset or superset thereof: agriculture community linked virtual hub pick up address 920; agriculture community linked virtual hub drop off address 930. In some embodiments, agriculture community linked virtual hub transportation capacity unit addresses 920 and 930 may be changed before delivery of an agriculture community linked virtual transportation capacity unit. The user interface map and address tool 910 displays the users 110 distance from the address of the agriculture community linked virtual transportation or freight hub as well as a map to assist the user 110 in finding the location of the agriculture community linked virtual transportation hub. In some embodiments, user interface 210 displays the virtual hub pick up zone 960 on a map in context to the user's 110 location. In some embodiments, user interface 210 displays the virtual hub drop off zone 950 on a map in context to the user's 110 location. In some embodiments, the user 110, may contact the "set" button 940 to transmit the agriculture community linked transportation capacity unit specification address data by using the GUI 210 which may instantiate instructions in the memory of the mobile computing device, which then transmits agriculture community linked transportation or freight capacity data through the network 226, 214 or wireless GPS network 215 to call upon instruction routines and instruction sub-routines on the agriculture community linked transportation forward market database server 271, agriculture community linked virtual hub database server 223, network member database server 222, map routing server, no arbitrage condition database server, and/or instructions in the memory of the cloud and local CPUs 290, which all interface together to make one system which may deliver agriculture community linked transportation or freight capacity units to users 110 from and to a plurality of agriculture community linked virtual hubs 410, 422 with a plurality of specifications at specific market prices.

Figure 10:
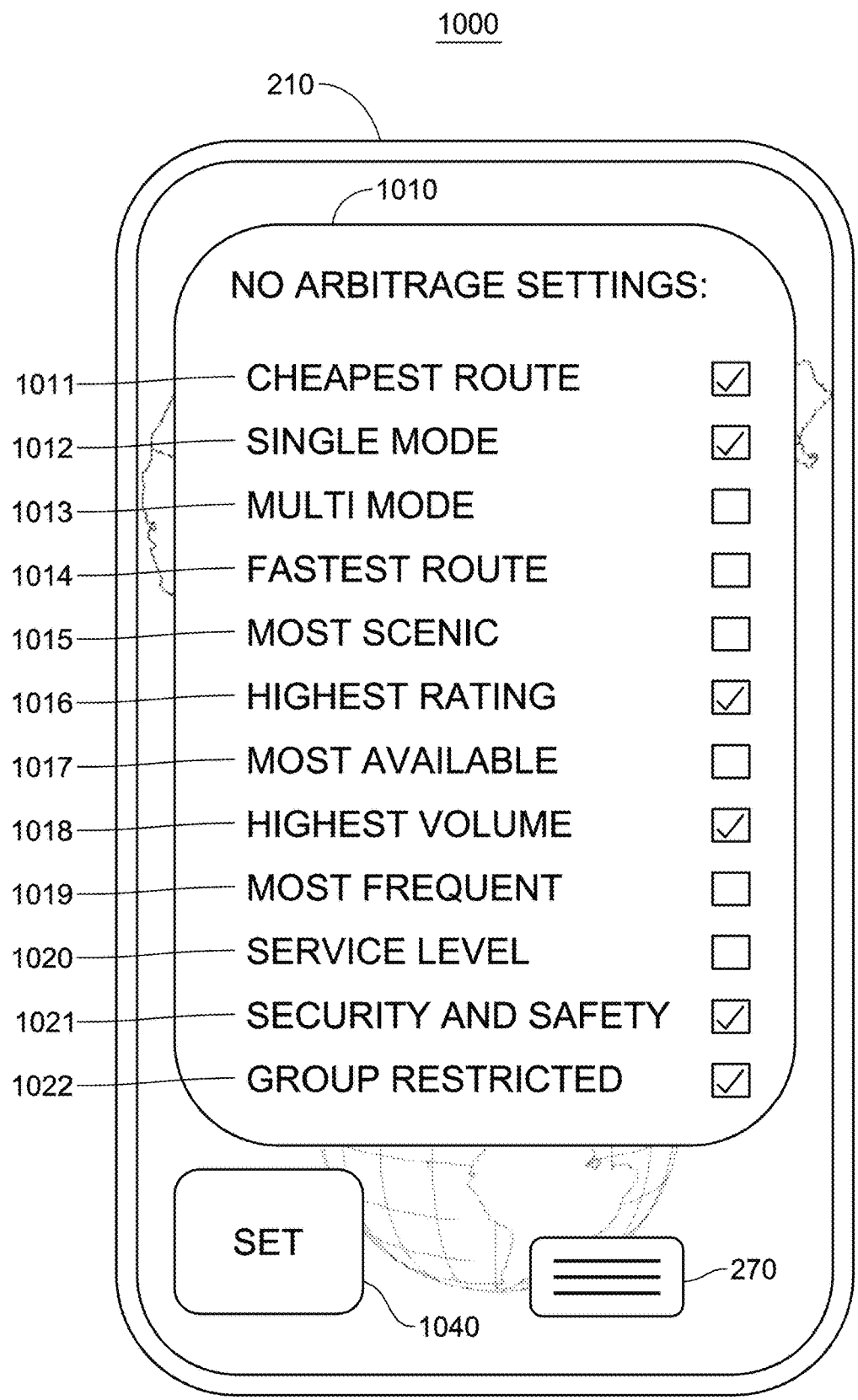
FIG. 10 illustrates an exemplary user interface for settings and constraints of the agriculture community linked transportation or freight capacity trading method and system in accordance with some embodiments.

FIG. 10 illustrates an exemplary user interface 210 for identifying the constraints and no arbitrage settings 1010 the user 110 selects on a portable multifunction device (e.g., a mobile computing device) in accordance with some embodiments (multiple data transformations). In some embodiments, user interface 210 includes the following elements, or a subset or superset thereof:

Constraint and no arbitrage settings 1010 (a data transformation);

Setting button 1040 to transmit the agriculture community linked virtual hub transportation capacity constraints and no arbitrage settings;

Hamburger button 270 to instruct the GUI 210 to take the user 110 to the menu screen.

In some embodiments, user interface 210 may be used by the user 110 to select a plurality of agriculture community linked virtual hub transportation capacity constraint and no arbitrage settings 1010. In some embodiments, agriculture community linked virtual hub transportation capacity unit constraint and no arbitrage selections 1010 may include a subset or superset thereof: cheapest route 1011 (a data transformation); single mode 1012 (a data transformation); multi-mode 1013 (a data transformation); fastest route 1014 (a data transformation); most scenic 1015 (a data transformation); highest rating 1016 (a data transformation); most available 1017 (a data transformation); highest volume 1018 (a data transformation); most frequent 1019 (a data transformation); service level 1020 (a data transformation); and/or security and safety 1021 (a data transformation). In some embodiments, the "cheapest route setting" 1011 instantiates instructions in the memory of the CPU 290 to complete a standard cost minimization linear program to assist the user 110 to complete the agriculture community linked transportation capacity unit between two virtual hubs with the lowest cost. In some embodiments, the "single mode" 1012 instantiates instructions in the memory of the CPU 290 to set a constraint for the user 110 to complete the agriculture community linked transportation capacity unit between two virtual hubs with the only one mode of transportation. In some embodiments, the "multi-mode" 1013 instantiates instructions in the memory of the CPU 290 to set a constraint for the user 110 to complete the agriculture community linked transportation capacity unit between two virtual hubs with more than one mode of transportation. In some embodiments, the "fastest route" 1014 instantiates instructions in the memory of the CPU 290 to complete standard linear programming equation to minimize travel time for the user 110 to complete the agriculture community linked transportation capacity unit between two virtual hubs with the shortest time. In some embodiments, the settings 1010 may set instructions for the agriculture community linked price based navigation routing index and GUI presentation on the user(s) 110 interface. In some embodiments, the "most scenic" 1015 instantiates instructions in the memory of the CPU 290 to complete an algorithm with the highest ratings for scenery to assist the user 110 to complete the transformed agriculture community linked transportation capacity unit between two virtual hubs with highest scenery rating. In some embodiments, the "highest rating" 1016 instantiates instructions in the memory of the CPU 290 to complete a rating algorithm to assist the user 110 to complete the agriculture community linked transportation capacity unit between two virtual hubs with the highest rating. In some embodiments, the "most available" 1017 instantiates instructions in the memory of the CPU 290 to complete an algorithm to search for the route with the most open agriculture community linked transportation capacity units to assist the user 110 to complete the agriculture community linked transportation capacity unit between two agriculture community linked virtual hubs with the most available open seats or open agriculture community linked transportation capacity units. In some embodiments, the "highest volume" 1018 instantiates instructions in the memory of the CPU 290 to complete an algorithm to select the route with the highest volume of participants to assist the user 110 to complete the transformed agriculture community linked transportation capacity unit between two virtual hubs with the largest number of users 110. In some embodiments, the "most frequent" 1019 instantiates instructions in the memory of the CPU 290 to complete most frequent route analysis from a timing constraint perspective to assist the user 110 to complete the agriculture community linked transportation capacity unit between two agriculture community linked virtual hubs with the most frequent departures. In some embodiments, the "service level" 1020 instantiates instructions in the memory of the CPU 290 to align the constraint to select the service level to assist the user 110 to complete the agriculture community linked transportation capacity unit between two virtual hubs with the correct level of service. In some embodiments, the "security and safety" 1021 instantiates instructions in the memory of the CPU 290 to run safety and security algorithms on the user's 110 based on block chain performance of drivers and riders to assist the user 110 to complete the agriculture community linked transportation capacity unit between two virtual hubs with the highest level of safety and security. In some embodiments, the "group restricted" 1022 instantiates instructions in the memory of the CPU 290 to run grouping limitation algorithms on the user's 110 price-time priority queue market auction based on limiting the pool of agriculture community linked drivers and riders or freight providers and shippers to assist the user 110 to complete the agriculture community linked transportation or freight capacity unit between two agriculture community linked virtual hubs with a limit on the pool of available users. In some embodiments, a plurality of settings which transform the data may be sequenced for presenting as a transformed market 400 or as a transformed market as a layer on a navigation system with indexed routes based on price. A user(s) 110 pool for group restricted 1022 (a data transformation) settings may limit the user pool displayed by email, security, sex, rating, or a plurality of other restrictions. In some embodiments, the user 110, may contact the "set" button 1040 to transmit the agriculture community linked transportation or freight capacity unit security specification constraint and arbitrage data by using the GUI 210 which may instantiate instructions in the memory of the mobile computing device, which then transmits agriculture community linked transportation capacity security and safety data through the network 226, 214 or wireless GPS network 215 to call upon instruction routines and instruction sub-routines on the agriculture community linked transportation forward market database server 271, virtual hub database server 223, network member database server 222, map routing server, no arbitrage condition database server, and/or instructions in the memory of the cloud and local CPUs 290, which all interface together to make one system which may deliver agriculture community linked transportation or freight capacity units to users 110 from and to a plurality of virtual hubs 410, 422 with a plurality of specifications at specific market prices in an price-time priority queue auction format.

Figure 11:
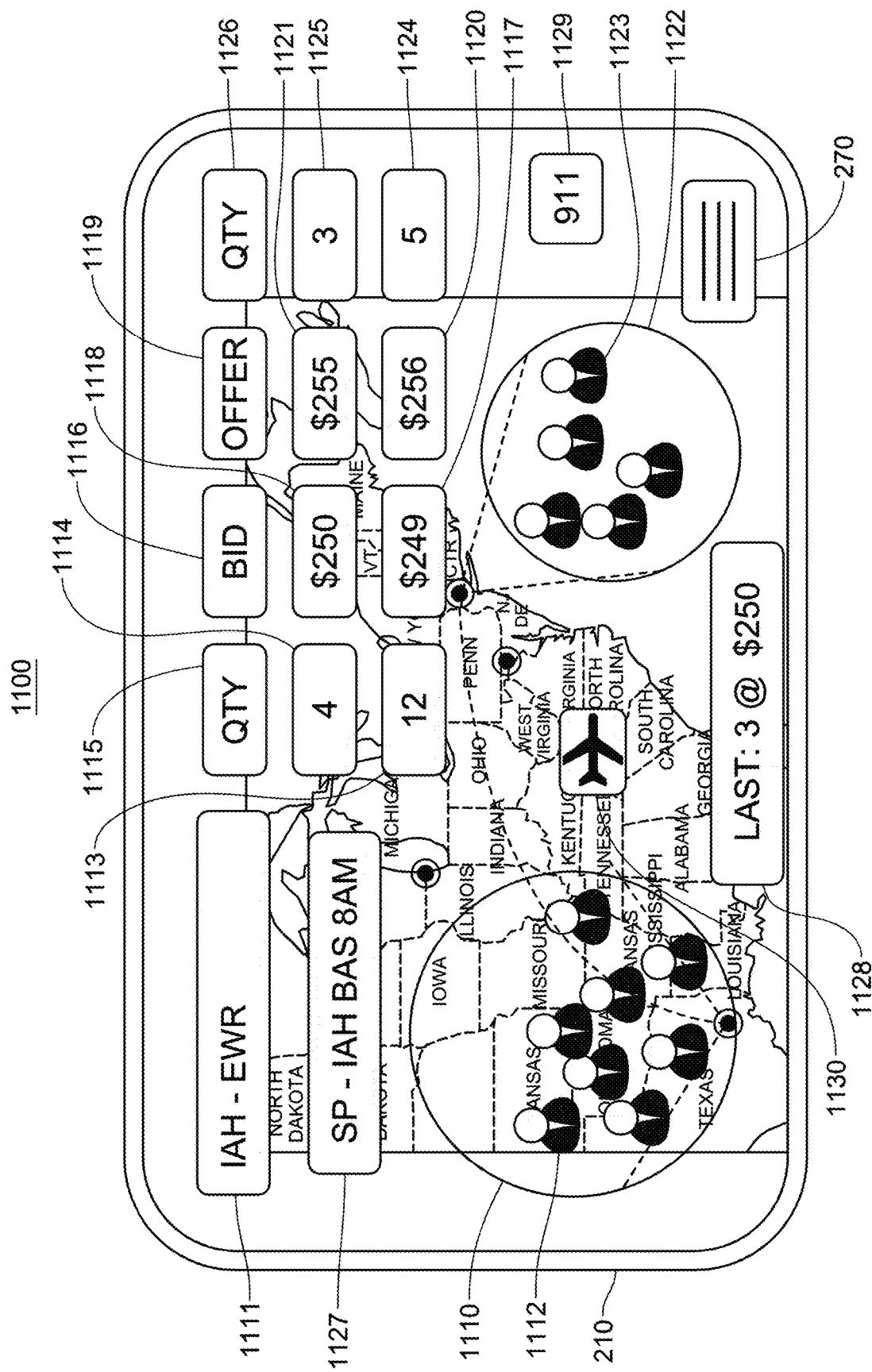
FIG. 11 illustrates an exemplary user interface for transacting and trading agriculture community linked domestic air travel transportation or air freight capacity in accordance with some embodiments.

FIG. 11 illustrates exemplary user interfaces 210 for participating, transacting and/or trading transformed agriculture community linked transportation or freight as a physical forward commodity or security between combinations of agriculture community linked virtual hubs over various transportation modes. In some embodiments, user interface 210 includes the following elements, or a subset or superset thereof:

Exemplary agriculture community linked virtual hub combination 1111;

Exemplary agriculture community linked virtual hub origin/from location 1110 with users 1112 within the agriculture community linked virtual hub location 1110;

Exemplary specification summary of the market, level of service and time of delivery commencement 1127;

Exemplary mode of air transportation or freight capacity type 1130;

Exemplary transaction summary of the last trades quantity and price 1128;

Exemplary agriculture community linked virtual hub destination/to location 1122 and user who is being delivered on the transportation capacity unit 1123;

Exemplary bid/buy quantity title header 1115 for an exemplary agriculture community linked virtual transportation hub market;

Exemplary bid/buy price title header 1116 for an exemplary agriculture community linked virtual transportation or freight hub market;

Exemplary offer/sell price title header 1119 for an exemplary agriculture community linked virtual transportation or freight hub market;

Exemplary offer/sell quantity title header 1126 for an exemplary agriculture community linked virtual transportation or freight hub market;

Exemplary bid/buy quantity 1114 for the best bid quantity from a plurality of users 110 for an exemplary respective agriculture community linked transportation or freight capacity agriculture community linked virtual hub combination that has undergone a plurality of data transformations in the method 1111;

Exemplary bid/buy quantity 1113 for the second-best bid quantity from a plurality of users 110 for an exemplary respective agriculture community linked transportation or freight capacity virtual hub combination that has undergone a plurality of data transformations in the method 1111;

Exemplary bid/buy price 1118 for the best bid price from a plurality of users 110 for an exemplary respective agriculture community linked transportation or freight capacity virtual hub combination that has undergone a plurality of data transformations in the method 1111;

Exemplary bid/buy price 1117 for the second-best bid price from a plurality of users 110 for an exemplary respective agriculture community linked transportation or freight capacity virtual hub combination that has undergone a plurality of data transformations in the method 1111;

Exemplary offer/sell price 1121 for the best offer price from a plurality of users 110 for an exemplary respective agriculture community linked transportation or freight capacity virtual hub combination that has undergone a plurality of data transformations in the method 1111;

Exemplary offer/sell price 1120 for the second-best offer price from a plurality of users 110 for an exemplary respective agriculture community linked transportation or freight capacity virtual hub combination that has undergone a plurality of data transformations in the method 1111;

Exemplary offer/sell quantity 1125 for the best offer quantity from a plurality of users 110 for an exemplary respective agriculture community linked transportation or freight capacity virtual hub combination that has undergone a plurality of data transformations in the method 1111;

Exemplary offer/sell quantity 1124 for the second-best offer quantity from a plurality of users 110 for an exemplary respective agriculture community linked transportation or freight capacity virtual hub combination that has undergone a plurality of data transformations in the method 1111;

Exemplary safety dispatch "911" button 1129 to enact video and audio recording of the user 110 environment and dispatch of that information to authorities.

Exemplary hamburger menu button 270 to move back to menu options and settings away from the participation, transaction, trading auction GUI 210 embodiment.

In some embodiments the user 110 may enter a transaction quantity and price for transformed agriculture community linked transportation or freight capacity unit securities to participate, transact and/or trade by the GUI 210 detecting user 110 contact or audio interface with a bid/buy price 1118 or offer/sell price 1121. The GUI 210 detects user 110 contact with any of the GUI 210 buttons which have been aforementioned. Upon user 110 contact or audio interface with buttons on the GUI 210, instructions are instantiated which allow the user 110 to change the specifications of the respective virtual hub combination 1111. A plurality of prices and markets may be presented based on a plurality of contract specifications. In some embodiments, the best bid/buy price 1118 may be moving up in price or down in price depending on the market conditions at any given time. In some embodiments the last trade or last transacted price for a given specification is listed to help the user 110 understand how the market is moving so that the user 110 may submit a competitive offer/selling price 1121 or bid/buying price 1118. In some embodiments, users 110 may adjust settings of the GUI 210 to show more bid/buying prices 1117 or more offer/selling prices 1120. In some embodiments the matrix of market quantities and prices 1113, 1114, 1115, 1116, 1117, 1118, 1119, 1120, 1121, 1124, 1125, 1126 may be referred to as market depth in the GUI 210 embodiment. In some embodiments the number of users 110 may be displayed as user icons 1112 or 1123 for the amount of people logged in which desire to transact, trade or participate in a given virtual hub 1110 to virtual hub 1122 combination. In some embodiments, users 110 may select the agriculture community linked transportation mode 1130 such that the user allows a market for only one form of agriculture community linked transportation capacity as a commodity or the user 110 may allow the system to show multiple forms of transportation capacity between two agriculture community linked virtual transportation capacity hubs 1110, 1111, 1122. In some embodiments the GUI 210 may detect a user 110 selecting the 911 button 1129 which may activate voice and video recording functions on the mobile or stationary device and transmit the data with a confirmation from the user 110 to the authorities to provide enhanced security while participating, transacting, or trading transformed agriculture community linked forward transportation as a commodity or security. In some embodiments the user may toggle between the GUI 210 market view screen in FIG. 11 and other menu 270 options and settings by the user 110 selecting the hamburger button 270 and the GUI 210 detecting the user 110 input or contact or audio instruction. In some embodiments, the GUI 210 may instantiate instructions in the memory of the mobile computing device, which then transmits agriculture community linked transportation or freight capacity data through the network 226, 214 or wireless GPS network 215 to call upon instruction routines and instruction sub-routines on the agriculture community linked transportation forward market database server 271, virtual hub database server 223, network member database server 222, map routing server, no arbitrage condition database server, and/or instructions in the memory of the cloud and local CPUs 290, which all interface together to make one system which may deliver agriculture community linked transportation capacity units to users 110 from and to a plurality of virtual hubs 1110, 1122 with a plurality of specifications at specific market prices.

Figure 12:
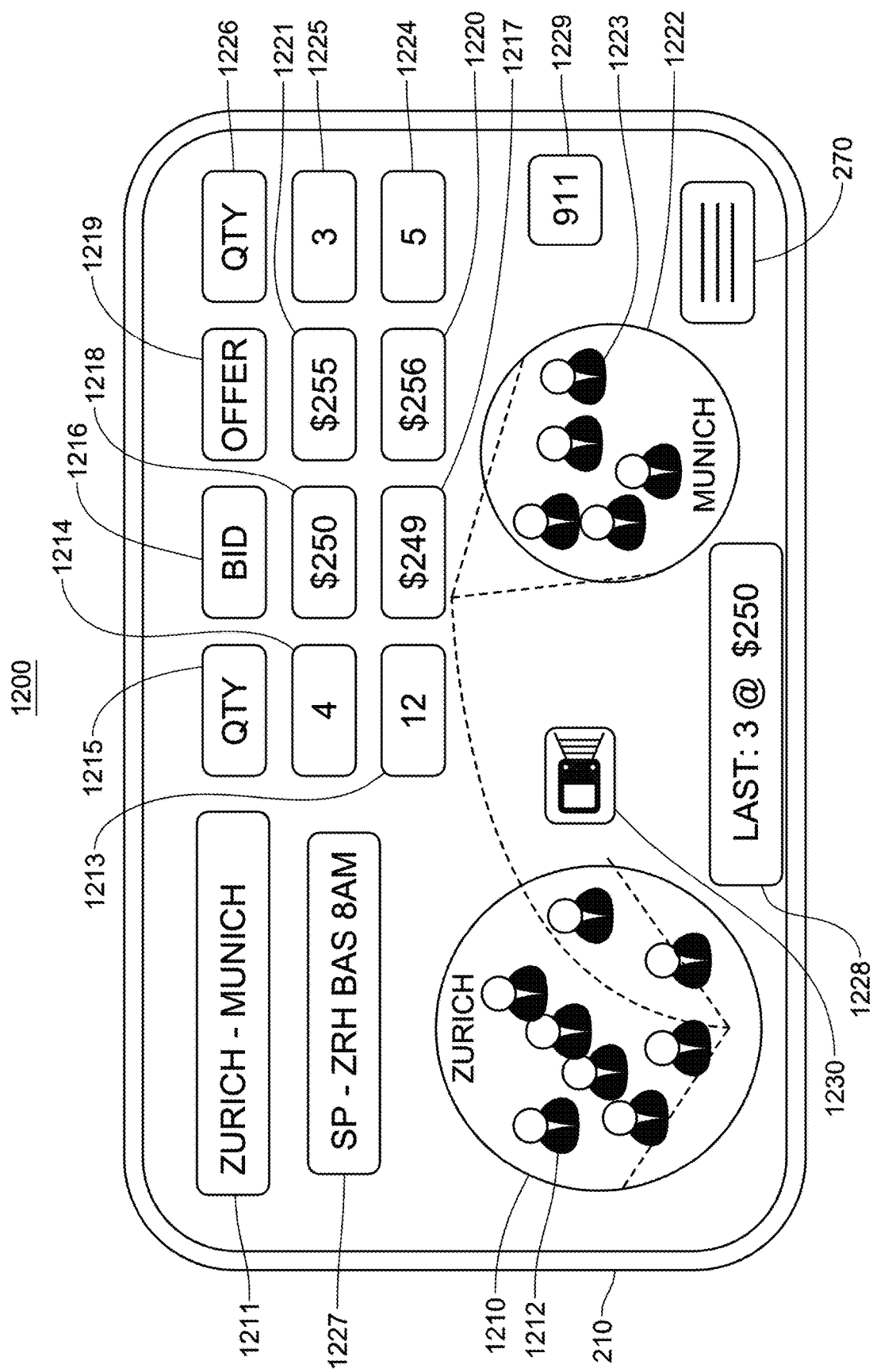
FIG. 12 illustrates an exemplary user interface for transacting and trading agriculture community linked international train transportation or train freight capacity in accordance with some embodiments.

FIG. 12 illustrates exemplary user interfaces 210 for participating, transacting and/or trading transformed agriculture community linked transportation as a physical forward commodity or security between combinations of agriculture community linked virtual hubs over various transportation modes. In some embodiments, user interface 210 includes the following elements, or a subset or superset thereof:

Exemplary agriculture community linked virtual hub combination 1211;

Exemplary agriculture community linked virtual hub origin/from location 1210 with users 1212 within the agriculture community linked virtual hub location 1210;

Exemplary specification summary of the market, level of service and time of delivery commencement 1227;

Exemplary mode of train agriculture community linked transportation capacity type 1230;

Exemplary transaction summary of the last trades quantity and price 1228;

Exemplary agriculture community linked virtual hub destination/to location 1222 and user who is being delivered on the agriculture community linked transportation or freight capacity unit 1223;

Exemplary bid/buy quantity title header 1215 for an exemplary virtual agriculture community linked transportation or freight hub market;

Exemplary bid/buy price title header 1216 for an exemplary agriculture community linked virtual transportation or freight hub market;

Exemplary offer/sell price title header 1219 for an exemplary agriculture community linked virtual transportation or freight hub market;

Exemplary offer/sell quantity title header 1226 for an exemplary agriculture community linked virtual transportation for freight hub market;

Exemplary bid/buy quantity 1214 for the best bid quantity from a plurality of users 110 for an exemplary respective agriculture community linked transportation or freight capacity virtual hub combination that has undergone a plurality of data transformations in the method 1211;

Exemplary bid/buy quantity 1213 for the second-best bid quantity from a plurality of users 110 for an exemplary respective agriculture community linked transportation or freight capacity virtual hub combination that has undergone a plurality of data transformations in the method 1211;

Exemplary bid/buy price 1218 for the best bid price from a plurality of users 110 for an exemplary respective agriculture community linked transportation or freight capacity virtual hub combination that has undergone a plurality of data transformations in the method 1211;

Exemplary bid/buy price 1217 for the second-best bid price from a plurality of users 110 for an exemplary respective agriculture community linked transportation or freight capacity virtual hub combination that has undergone a plurality of data transformations in the method 1211;

Exemplary offer/sell price 1221 for the best offer price from a plurality of users 110 for an exemplary respective agriculture community linked transportation or freight capacity virtual hub combination that has undergone a plurality of data transformations in the method 1211;

Exemplary offer/sell price 1220 for the second-best offer price from a plurality of users 110 for an exemplary respective agriculture community linked transportation or freight capacity virtual hub combination that has undergone a plurality of data transformations in the method 1211;

Exemplary offer/sell quantity 1225 for the best offer quantity from a plurality of users 110 for an exemplary respective agriculture community linked transportation or freight capacity virtual hub combination that has undergone a plurality of data transformations in the method 1211;

Exemplary offer/sell quantity 1224 for the second-best offer quantity from a plurality of users 110 for an exemplary respective agriculture community linked transportation or freight capacity virtual hub combination that has undergone a plurality of data transformations in the method 1211;

Exemplary safety dispatch "911" button 1229 to enact video and audio recording of the user 110 environment and dispatch of that information to authorities.

Exemplary hamburger menu button 270 to move back to menu options and settings away from the participation, transaction, trading GUI 210 embodiment.

In some embodiments the user 110 may enter a transaction quantity and price for agriculture community linked transportation or freight capacity units to participate, transact and/or trade by the GUI 210 detecting user 110 contact with a bid/buy price 1218 or offer/sell price 1221. The GUI 210 detects user 110 contact with any of the GUI 210 buttons which have been aforementioned. Upon user 110 contact with buttons or audio interface on the GUI 210, instructions are instantiated which allows the user 110 to change the specifications of the respective agriculture community linked virtual hub combination 1211. A plurality of transformed prices and transformed markets may be presented based on a plurality of transformed contract specifications. In some embodiments, the best bid/buy price 1218 may be moving up in price or down in price depending on the market conditions at any given time. In some embodiments, the last trade or last transacted price for a given specification is listed to help the user 110 understand how the market is moving so that the user 110 may submit a competitive offer/selling price 1221 or bid/buying price 1214. In some embodiments, users 110 may adjust settings of the GUI 210 to show more bid/buying prices 1217 or more offer/selling prices 1220. In some embodiments the matrix of market quantities and prices 1213, 1214, 1215, 1216, 1217, 1218, 1219, 1220, 1221, 1224, 1225, 1226 may be referred to as market depth in the GUI 210 embodiment. In some embodiments the number of users 110 may be displayed as user icons 1212 or 1223 for the amount of people logged in which desire to transact, trade or participate in a given agriculture community linked virtual hub 1210 to agriculture community linked virtual hub 1222 combination. In some embodiments, users 110 may select the agriculture community linked transportation mode 1230 such that the user allows a market for only one form or mode of agriculture community linked transportation capacity as a commodity or security or the user 110 may allow the system to show multiple forms (multi-modal) of transportation capacity between two virtual agriculture community linked transportation capacity hubs 1210, 1211, 1222. In some embodiments, the GUI 210 may detect a user 110 selecting the 911 button 1229 which may activate voice and video recording functions on the mobile or stationary device and transmit the data with a confirmation from the user 110 to the authorities to provide enhanced security while participating, transacting, or trading transformed forward agriculture community linked transportation or freight units as a commodity or security. In some embodiments, the user may toggle between the GUI 210 market view screen in FIG. 12 and other menu 270 options and settings by the user 110 selecting the hamburger button 270 and the GUI 210 detecting the user 110 input or contact or audio instructions. In some embodiments, the GUI 210 may instantiate instructions in the memory of the mobile computing device, which then transmits agriculture community linked transportation or freight capacity data through the network 226, 214 or wireless GPS network 215 to call upon instruction routines and instruction sub-routines on the agriculture community linked transportation forward market database server 271, virtual hub database server 223, network member database server 222, map routing servers, no arbitrage condition database server, and/or instructions in the memory of the cloud and local CPUs 290, which all interface together to make one system which may deliver agriculture community linked transportation or freight capacity units to users 110 from and to a plurality of virtual hubs 1210, 1222 with a plurality of specifications at specific market prices.

Figure 13:
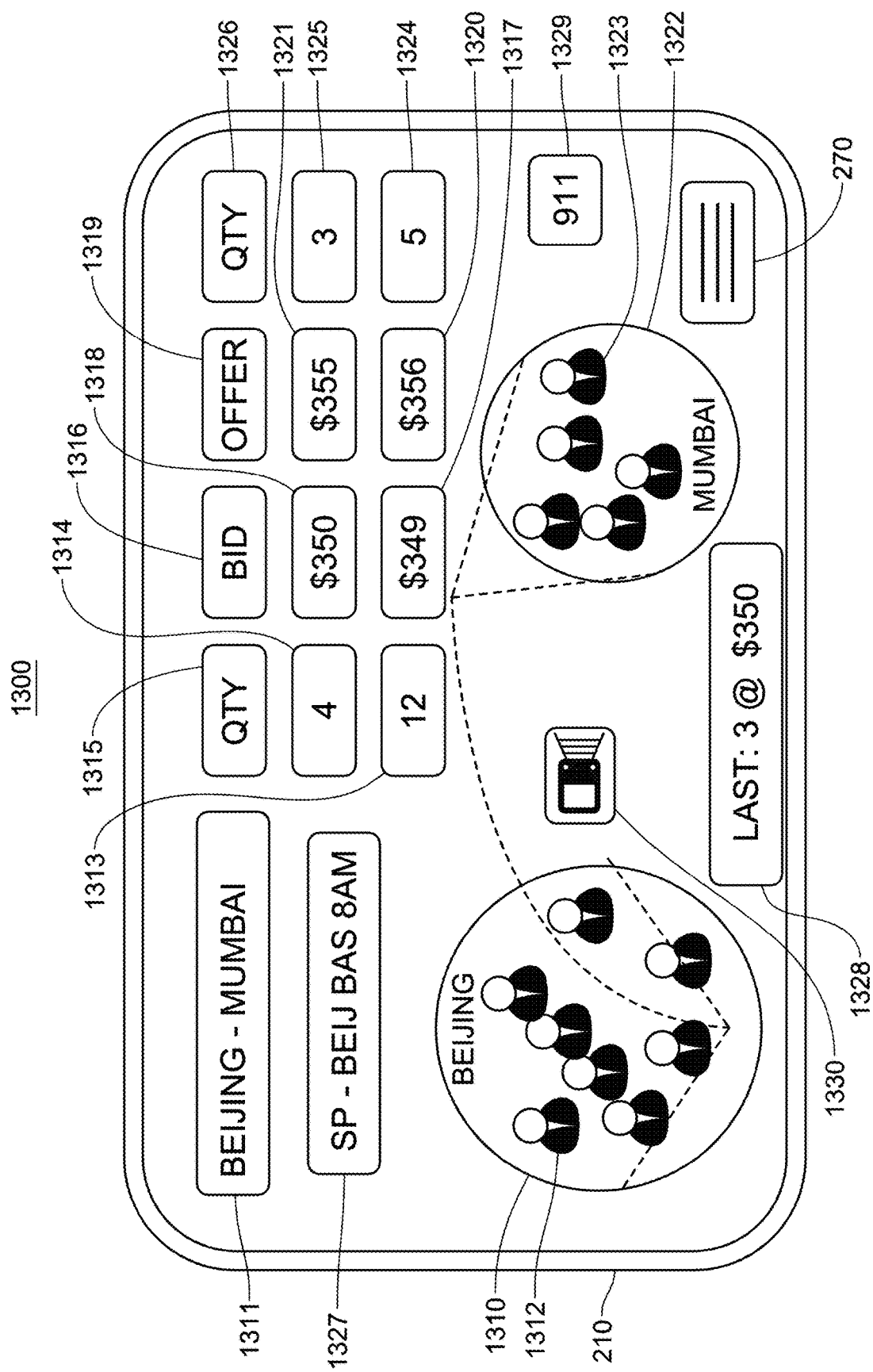
FIG. 13 illustrates an exemplary user interface for transacting and trading agriculture community linked international train transportation or train freight capacity in accordance with some embodiments.

FIG. 13 illustrates exemplary user interfaces 210 for participating, transacting and/or trading transformed agriculture community linked transportation as a physical forward commodities or securities between combinations of agriculture community linked virtual hubs over various transportation modes. In some embodiments, user interface 210 includes the following elements, or a subset or superset thereof:

Exemplary agriculture community linked virtual hub combination 1311;

Exemplary agriculture community linked virtual hub origin/from location 1310 with users 1312 within the agriculture community linked virtual hub location 1310;

Exemplary specification summary of the market, level of service and time of delivery commencement 1327;

Exemplary mode of train agriculture community linked transportation capacity type 1330;

Exemplary transaction summary of the last trades quantity and price 1328;

Exemplary agriculture community linked virtual hub destination/to location 1322 and user who is being delivered on the agriculture community linked transportation or freight capacity unit 1323;

Exemplary bid/buy quantity title header 1315 for an exemplary agriculture community linked virtual transportation or freight hub market;

Exemplary bid/buy price title header 1316 for an exemplary agriculture community linked virtual transportation or freight hub market;

Exemplary offer/sell price title header 1319 for an exemplary agriculture community linked virtual transportation or freight hub market;

Exemplary offer/sell quantity title header 1326 for an exemplary agriculture community linked virtual transportation or freight hub market;

Exemplary bid/buy quantity 1314 for the best bid quantity from a plurality of users 110 for an exemplary respective agriculture community linked transportation or freight capacity virtual hub combination that has undergone a plurality of data transformations in the method 1311;

Exemplary bid/buy quantity 1313 for the second-best bid quantity from a plurality of users 110 for an exemplary respective agriculture community linked transportation or freight capacity virtual hub combination that has undergone a plurality of data transformations in the method 1311;

Exemplary bid/buy price 1318 for the best bid price from a plurality of users 110 for an exemplary respective agriculture community linked transportation or freight capacity virtual hub combination that has undergone a plurality of data transformations in the method 1311;

Exemplary bid/buy price 1317 for the second-best bid price from a plurality of users 110 for an exemplary respective agriculture community linked transportation or freight capacity virtual hub combination that has undergone a plurality of data transformations in the method 1311;

Exemplary offer/sell price 1321 for the best offer price from a plurality of users 110 for an exemplary respective agriculture community linked transportation or freight capacity virtual hub combination that has undergone a plurality of data transformations in the method 1311;

Exemplary offer/sell price 1320 for the second-best offer price from a plurality of users 110 for an exemplary respective agriculture community linked transportation or freight capacity virtual hub combination that has undergone a plurality of data transformations in the method 1311;

Exemplary offer/sell quantity 1325 for the best offer quantity from a plurality of users 110 for an exemplary respective agriculture community linked transportation or freight capacity virtual hub combination that has undergone a plurality of data transformations in the method 1311;

Exemplary offer/sell quantity 1324 for the second-best offer quantity from a plurality of users 110 for an exemplary respective agriculture community linked transportation or freight capacity virtual hub combination that has undergone a plurality of data transformations in the method 1311;

Exemplary safety dispatch "911" button 1329 to enact video and audio recording of the user 110 environment and dispatch of that information to authorities.

Exemplary hamburger menu button 270 to move back to menu options and settings away from the participation, transaction, trading GUI 210 embodiment.

In some embodiments the user 110 may enter a transaction quantity and price for agriculture community linked transportation or freight capacity units to participate, transact and/or trade by the GUI 210 detecting user 110 contact or audio instructions with a bid/buy price 1318 or offer/sell price 1321. The GUI 210 detects user 110 contact with any of the GUI 210 buttons which have been aforementioned. Upon user 110 contact or audio interface with buttons or audio instructions on the GUI 210, instructions are instantiated which allows the user 110 to change the specifications of the respective virtual hub combination 1311. A plurality of prices and markets may be presented based on a plurality of transformed contract specifications. In some embodiments, the best bid/buy price 1318 may be moving up in price or down in price depending on the market conditions at any given time. In some embodiments the last trade or last transacted price for a given transformed specification is listed to help the user 110 understand how the market is moving so that the user 110 may submit a competitive offer/selling price 1321 or bid/buying price 1314. In some embodiments, users 110 may adjust settings of the GUI 210 to show more bid/buying prices 1317 or more offer/selling prices 1320. In some embodiments the matrix of market quantities and prices 1313, 1314, 1315, 1316, 1317, 1318, 1319, 1320, 1321, 1324, 1325, 1326 may be referred to as market depth in the GUI 210 embodiment. In some embodiments the number of users 110 may be displayed as user icons 1312 or 1323 for the amount of people logged in which desire to transact, trade or participate in a given virtual hub 1310 to virtual hub 1322 transformed combination. In some embodiments, users 110 may select the agriculture community linked transportation mode 1330 such that the user allows a market for only one form of agriculture community linked transportation capacity as a commodity or the user 110 may allow the system to show multiple forms of transformed agriculture community linked transportation or freight capacity or securities between two agriculture community linked virtual transportation capacity hubs 1310, 1311, 1322. In some embodiments, by way of example and not to limit by example to avoid doubt, transformed agriculture community linked transportation units or transformed transportation unit securities may even be substitutable between modes if the other specifications meet the grade category of the transformed agriculture community linked transportation unit specification or transformed agriculture community linked transportation unit security. A user(s) 110 may have bought a transformed agriculture community linked transportation unit with a specification and the delivery mechanism was a bus, however the bus user 110 bought back their transformed agriculture community linked transportation unit or transformed agriculture community linked transportation unit security and now the original purchaser may be matched with a car of another user 110 who will deliver the transformed agriculture community linked transportation unit or transformed agriculture community linked transportation unit security. In some embodiments, a bus, a train, an airplane, a car, or a plurality of other modes may be substitutable if the transformed agriculture community linked transportation unit or transformed agriculture community linked transportation unit security meets the delivery transformed specification grade. In some embodiments, the GUI 210 may detect a user 110 selecting the 911 button 1329 which may activate voice and video recording functions on the mobile or stationary device and transmit the data with a confirmation from the user 110 to the authorities to provide enhanced security while participating, transacting, or trading forward agriculture community linked transportation or freight as a commodity. In some embodiments, the user may toggle between the GUI 210 market view screen in FIG. 13 and other menu 270 options and settings by the user 110 selecting the hamburger button 270 and the GUI 210 detecting the user 110 input or contact. In some embodiments, the GUI 210 may instantiate instructions in the memory of the mobile computing device, which then transmits agriculture community linked transportation or freight capacity data through the network 226, 214 or wireless GPS network 215 to call upon instruction routines and instruction sub-routines on the agriculture community linked transportation forward market database server 271, virtual hub database server 223, network member database server 222, map routing servers, no arbitrage condition database server, and/or instructions in the memory of the cloud and local CPUs 290, which all interface together to make one system which may deliver agriculture community linked transportation or freight capacity units to users 110 from and to a plurality of virtual hubs 1310, 1322 with a plurality of specifications at specific market prices.

Figure 14:
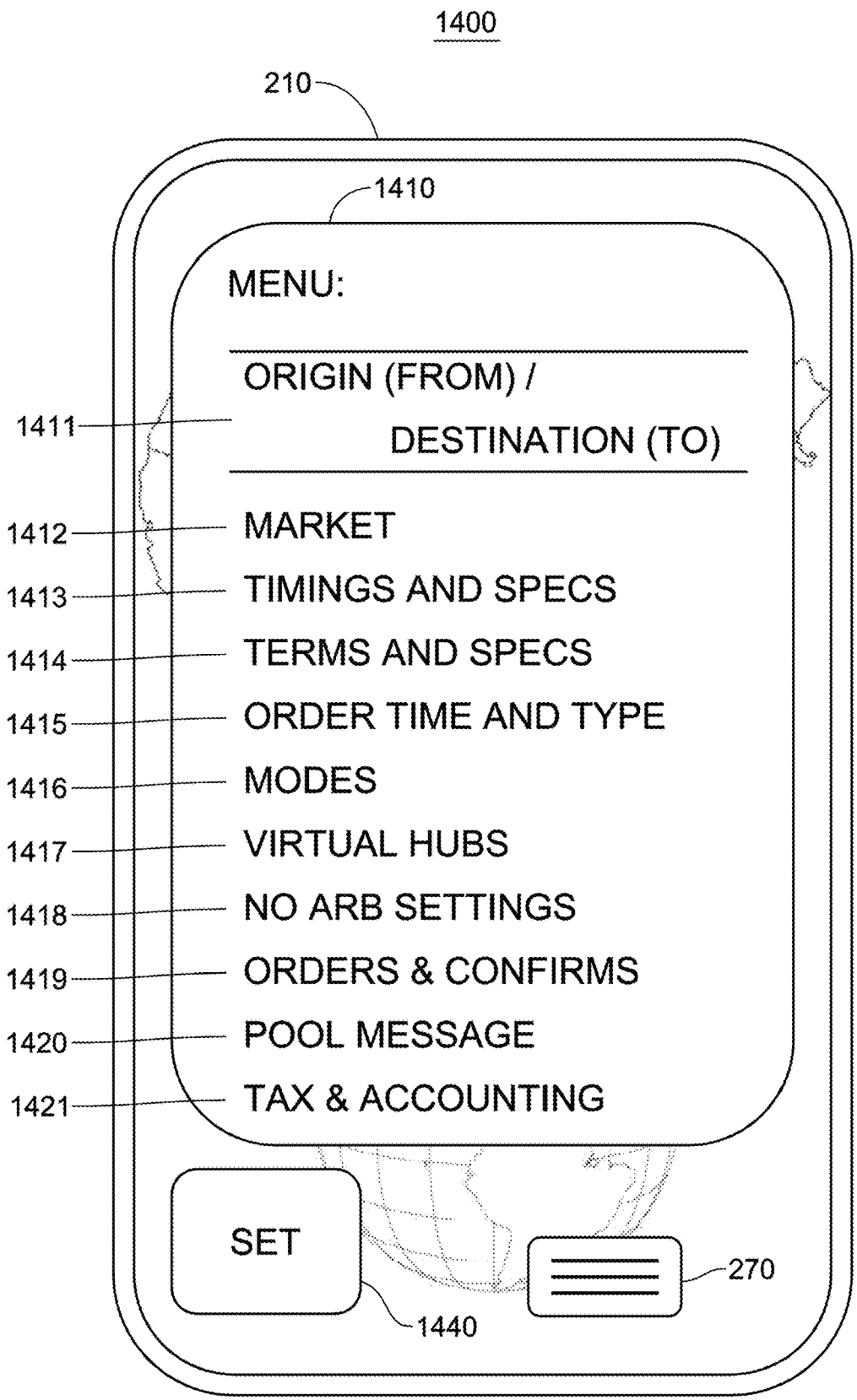
FIG. 14 illustrates an exemplary user interface for agriculture community linked transacting and trading various menu options within the system and method in accordance with some embodiments.

FIG. 14 illustrates an exemplary user interface 210 for selecting menu options 1410 on a portable multifunction device (e.g., a mobile computing device) in accordance with some embodiments. In some embodiments, user interface 210 includes the following elements, or a subset or superset thereof:

Menu options 1410;
Origin (From)/Destination (to) menu option 1411; Market menu option 1412;
Timings and Specs menu option 1413;
Term and Specs menu option 1414;
Order time and type menu option 1415;
Modes menu option 1416;
Virtual Hubs menu option 1417;
No arb settings menu option 1418;
Orders and Confirms menu option 1419;
Pool Message menu option 1420;
Tax and Accounting menu option 1421;
Setting button 1440 to transmit the menu option;
Hamburger button 270 to instruct the GUI 210 to take the user 110 to the menu screen.

In some embodiments, user interface 210 may be used by the user 110 to select a plurality of menu options 1410. In some embodiments, the user 110 may select the origin (from)/destination (to) menu option 1411 which may instruct the GUI 210 to go to an address input rendering 910 and/or FIG. 2. In some embodiments, the user 110, may contact the "market" menu option 1412 which may instruct the GUI 210 to render a market participation, transaction and/or trading screen such as 400, 1100, 1200, or 1300. In some embodiments the user may toggle between the GUI 210 market view screen in FIG. 4 and other menu 270 options and settings by the user 110 selecting the hamburger button 270 and the GUI 210 detecting the user 110 input or contact. In some embodiments, the user 110 may contact the "timings and specs" menu option 1413, which may instruct the GUI 210 to render a timings and specs screen such as 500. In some embodiments, the user 110 may contact the "term and specs" menu option 1414, which may instruct the GUI 210 to render a term and specs screen such as 600. In some embodiments, the user 110 may contact the "order time and type" menu option 1415, which may instruct the GUI 210 to render an order time and type screen such as 700. In some embodiments, the user 110 may contact the "modes" menu option 1416, which may instruct the GUI 210 to render a mode screen such as 800. In some embodiments, the user 110 may contact the "Virtual Hubs" menu option 1417, which may instruct the GUI 210 to render a virtual hubs screen such as 900. In some embodiments, the user 110 may contact the "no arb settings" menu option 1418, which may instruct the GUI 210 to render a no arbitrage constraint screen such as 1000. In some embodiments, the user 110 may contact the "orders and confirms" menu option 1419, which may instruct the GUI 210 to render the market orders and transaction confirmations for the user 110. In some embodiments, the user 110 may contact the "pool message" menu option 1420, which may instruct the GUI 210 to message either the actual agriculture community linked transportation capacity unit or the opposite seller user 110 or buyer user 110, depending on if the user 110 was an opposite buyer or seller of the agriculture community linked transportation capacity unit. In some embodiments, the user 110 may contact the "tax and accounting" menu option 1421, which may instruct the GUI 210 to render tax and accounting information for the respective user 110. In some embodiments, the GUI 210 menu option selection 1410 may instantiate instructions in the memory of the mobile computing device, which then transmits agriculture community linked transportation capacity data through the network 226, 214 or wireless GPS network 215 to call upon instruction routines and instruction sub-routines on the agriculture community linked transportation forward market database server 271, virtual hub database server 223, network member database server 222, map routing server, no arbitrage condition database server, and/or instructions in the memory of the cloud and local CPUs 290, which all interface together to make one system which may deliver agriculture community linked transportation or freight capacity units or securities to users 110 from and to a plurality of virtual hubs 410, 422 with a plurality of specifications at specific market prices.

Figure 15:
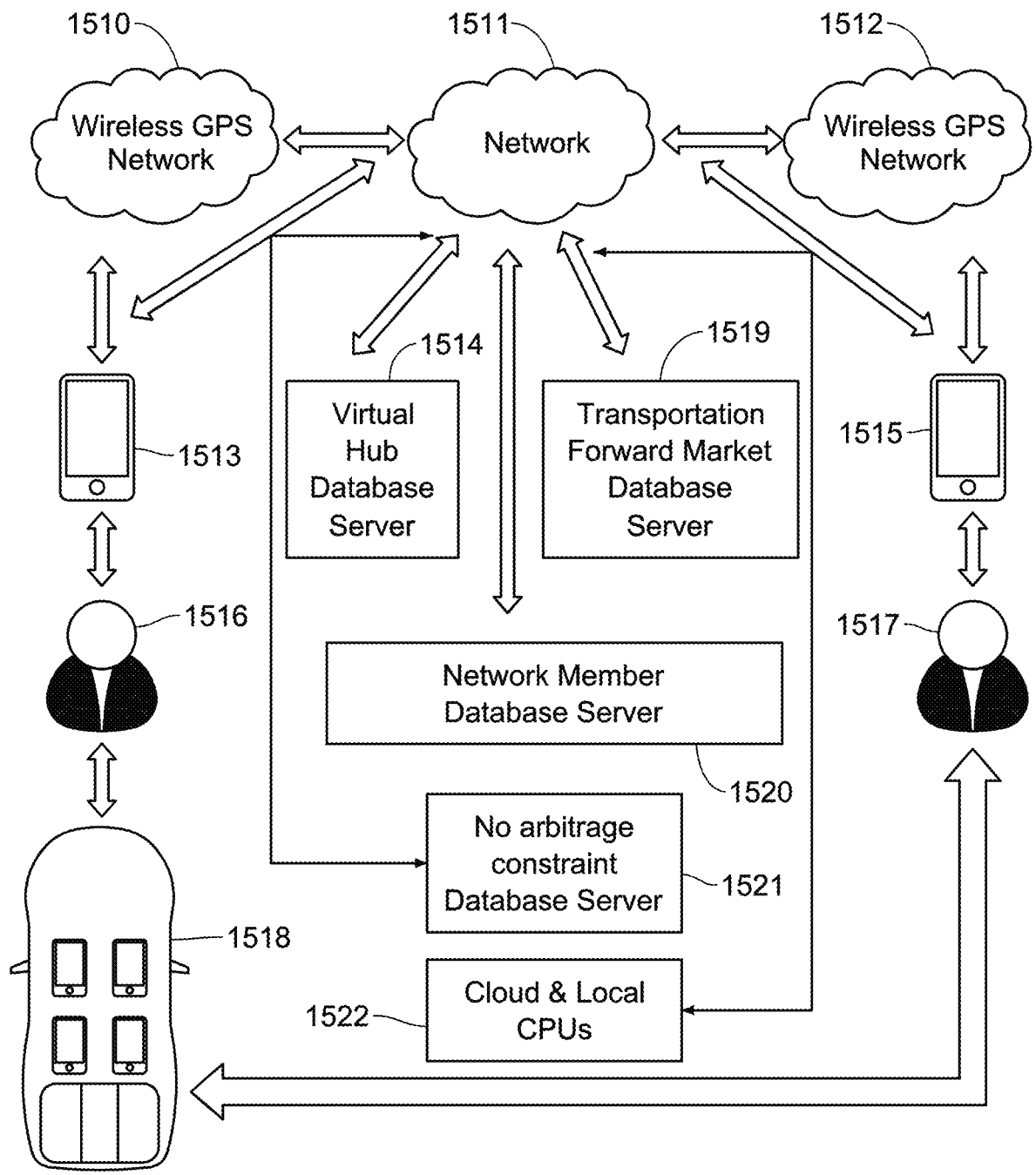
FIG. 15 illustrates a schematic diagram of a network configuration and implementations of methods which support the method and system of trading agriculture community linked transportation capacity in accordance with some embodiments.

FIG. 15 illustrates an exemplary network configuration 1500 in one exemplary implementation of participating, transacting and/or trading transformed agriculture community linked transportation or freight capacity units or securities in accordance with some embodiments. In some embodiments, network configuration 1500 includes the following elements, or a subset or superset thereof:

wireless global positioning system (GPS) network 1510;
network/s 1511;
additional global positioning system (GPS) network 1512;
user member portable multifunction device 1513;
virtual hub database server 1514;
agriculture community linked transportation forward market database server 1519;
additional user member portable multifunction device 1515;
network member database server 1520;
network member user 1516;
additional network member user 1517;
no arbitrage constraint database server 1521;
cloud and Local CPUs 1522;
agriculture community linked transportation or freight capacity unit mode 1518.

In some embodiments, the software and/or instructions stored in memory of the cloud & local CPUs 1522 and portable multifunction devices 1513, 1515 may include additional instructions to instantiate specification requirements, participation, transactions, and/or trading on the agriculture community linked transportation or freight capacity unit network 1511. In some embodiments, instructions may include standard database web services with the database as service provider (i.e. calling from the outside in, which lets the client GUI 210 or 1513 call each of the agriculture community linked virtual hub database server 1514 and/or agriculture community linked transportation forward market database server 1519 and/or network member database server 1520 and/or no arbitrage constraint database server 1521 and/or cloud & local CPUs 1522 through the wireless GPS network 1510 or network 1511. In some embodiments, each of the agriculture community linked virtual hub database server 1514 and/or agriculture community linked transportation forward market database server 1519 and/or network member database server 1520 and/or no arbitrage constraint database server 1521 and/or cloud & local CPUs 1522 may instruct the network to instantiate the database servers 1514, 1519, 1520, 1521, 1522 as service consumers (i.e. calling from the inside out, which lets a SQL query or application module in the database session consume an external web service. In some embodiments, users 1516 and/or 1517 may use portable multifunction devices 1513 and/or 1515 to access the agriculture community linked transportation or freight capacity unit market GUI 210 so that the users 1516 and/or 1517 may participate, transact and/or trade agriculture community linked transportation or freight capacity units. In some embodiments, the virtual hub database server 1514 stores map tile data in addition to user location data which is utilized by the GUI 210 to display or render location of virtual hubs and user 1516 proximity to those virtual hubs 400, 900, 1100, 1200, 1300. In some embodiments, the agriculture community linked transportation forward market database server 1519 stores bid and offer data for respective quantities of users as well as transaction data and a plurality of market data for each agriculture community linked virtual hub combination. In some embodiments, the network member database server 1520 stores user profile, user transaction, user trade, user settings, user specifications, user rating, user criminal history or background check data or facial recognition data or fingerprint recognition data or photo scan recognition data or ride history data, user track record, user bank data, user credit card data, user history data, user tax data and a plurality of other data. In some embodiments, the no arbitrage constraint database server 1521 stores data and algorithms to identify user 110 constraints 1000 and run algorithm calculations for users on specific constraints to check for compliance with constraints. In some embodiments, network servers and CPUs 1514, 1519, 1520, 1521, 1522, 1513, 1515 my interface through the network 1511 and/or wireless GPS networks 1510, 1512 such that agriculture community linked transportation or freight capacity units may be participated in, transacted, and/or traded efficiently in the context of a market for transportation capacity units or securities. Included aforementioned data elements may be a subset or superset of data used for any specific calculation or transformation to participate, transact, or trade agriculture community linked transportation or freight capacity units or securities.

FIG. 16 illustrates a flowchart embodiment of steps a user may perform to participate, transact and/or trade transformed agriculture community linked transportation capacity units or securities between virtual hub combinations. In some embodiments a user at a mobile or portable multifunction device and/or fixed computing device with a touchscreen or a computing device without a touchscreen or augmented, audio interface computing device, mixed reality non-screen display may detect user login to the agriculture community linked transportation capacity unit network 1610. In some embodiments, the GUI of the transportation capacity unit network may detect and receive origin location from user input or current GPS coordinate information and detect destination address from user input and transmission of data 1620. In some embodiments, the GUI and/or CPUs and/or databases may generate and apply one or more optimization techniques to form an agriculture community linked virtual hub with other users that have similar agriculture community linked transportation requests within a geographic boundary 1630. In some embodiments, the GUI and/or CPUs and or databases may generate instructions for a plurality of computing devices, network, virtual hub database server, network member database server and agriculture community linked transportation forward market database server 271 to form a combination of virtual hubs and transformed contract specifications for delivery of agriculture community linked transportation services or transportation or freight capacity between the virtual hubs in a format presented by a graphical user interface which allows users to enter forward physical prices to sell (offer) or bid (buy) transportation capacity units or securities between virtual hub combinations 1640 in an open market auction format. In some embodiments, the GUI and/or CPUs and or databases may generate instructions to interface a plurality of networks, global positioning systems networks, servers, forward commodity market auctions, map routing servers, grouping instruction software for virtual hubs, navigation servers, transparent open access pricing systems, game servers, blockchain audit and safety systems, virtual hub servers and systems, no arbitrage constraint condition systems which form one system to implement a forward commodity transportation or freight capacity unit forward market system and method 1650.

Figure 17:
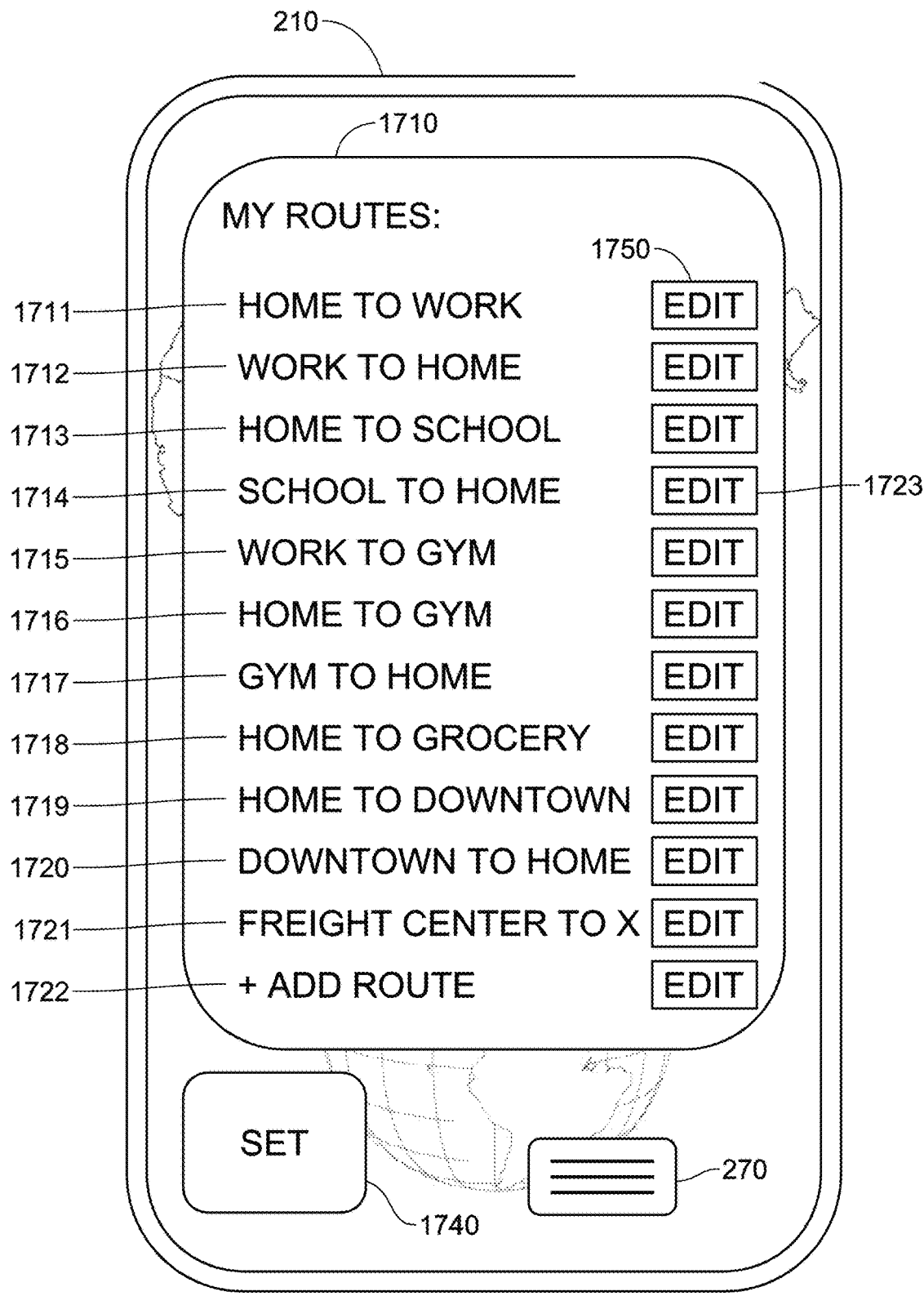
FIG. 17 illustrates an exemplary user interface for displaying most frequent routes in accordance with some embodiments.

FIG. 17 illustrates an exemplary embodiment of a user 110 most frequent transportation or freight unit routes 1710 in one exemplary implementation of participating, transacting and/or trading agriculture community linked transportation or freight capacity units in accordance with some embodiments. In some embodiments, most frequent my routes include the following elements, or a subset or superset thereof:

Home to Work 1711 (may have subsets of transformed data);

Work to Home 1712 (may have subsets of transformed data);

Home to School 1713 (may have subsets of transformed data);

School to Home 1714 (may have subsets of transformed data);

Work to Gym 1715 (may have subsets of transformed data);

Home to Gym 1716 (may have subsets of transformed data);

Gym to Home 1717 (may have subsets of transformed data);

Home to Grocery 1718 (may have subsets of transformed data);

Home to Downtown 1719 (may have subsets of transformed data);

Downtown to Home 1720 (may have subsets of transformed data);

Freight Center to X where X is a delivery route or multi virtual hub combination 1721 (may have subsets of transformed data);

+Add Route 1722 (may have subsets of transformed data);

Edit 1723 or 1750 (may have subsets of transformed data);

Setting button 1740 to transmit the My Routes data;

Hamburger button 270 to instruct the GUI 210 to take the user 110 to the menu screen.

In some embodiments, the GUI 210 may be used to select, store and/or edit user 110 frequent or preferred routes ("MY ROUTES") 1710 for more efficient access to agriculture community linked transportation capacity unit markets over various modes and specifications of transportation capacity. In some embodiments, the user 110 may select, store, and/or edit address and specification data for "Home to Work" 1711, "Work to Home" 1712, "Home to School" 1713, "School to Home" 1714, "Work to Gym" 1715, "Home to Gym" 1716, "Gym to Home" 1717, "Home to Grocery" 1718, "Home to Downtown" 1719, "Downtown to Home" 1720, "Freight Center to X" 1721, and/or "+Add Route" 1722. In some embodiments, the My Routes 1710 module may include any route a user 110 may request on any agriculture community linked transportation or freight capacity unit mode and/or specification. In some embodiments the user may toggle between the GUI 210 market view screen in FIG. 4 and other menu 270 options (e.g., options 1410 of FIG. 14) and settings by the user 110 selecting the hamburger button 270 and the GUI 210 detecting the user 110 input or contact. In some embodiments, the user 110 is notified via SMS text, in application, email or a plurality of other well-known communication methods when market activity occurs on a given route or virtual hub combination. In other words, the "my routes" 1710 feature not only allows for one touch access to a saved route, but also performs notification features between users. Lastly, in some embodiments, the EDIT buttons 1723 or 1750 allow a user 110 to modify a plurality of notification settings such as email, SMS text, in application, voice, messaging or other notification methods.

Figure 18:
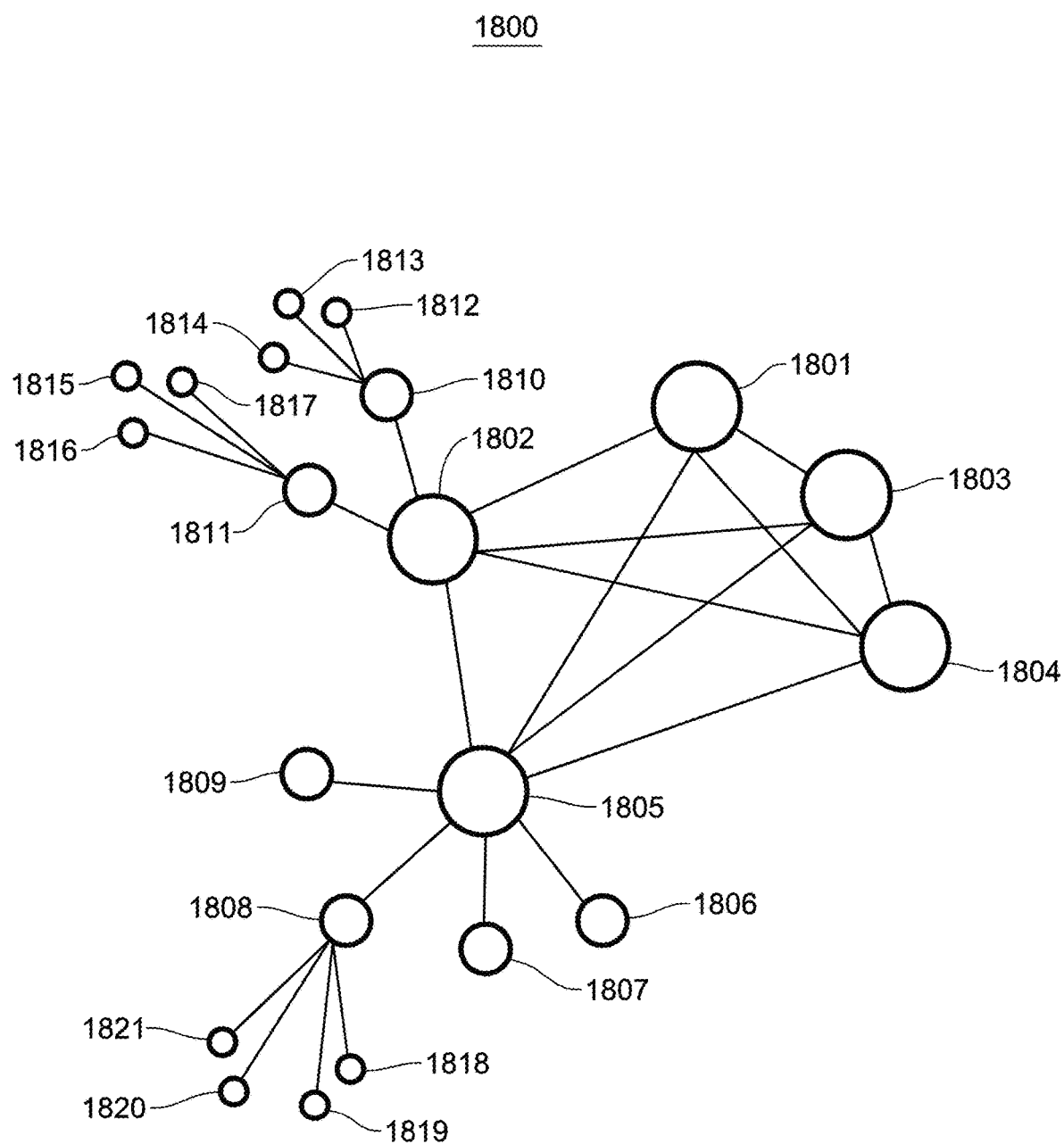
FIG. 18 illustrates an exemplary network topology of an agriculture community linked virtual hub combination or series of multiple agriculture community linked virtual hub combinations for use in the market auction platform for forward agriculture community linked transportation or freight capacity method in accordance with some embodiments.

FIG. 18 illustrates an exemplary network topology configuration 1800 in one exemplary implementation of participating, transacting, and/or trading transformed agriculture community linked transportation or freight capacity units or securities in accordance with some embodiments. In some embodiments, network configuration 1800 includes the following elements, or a subset or superset thereof:

Large agriculture community linked Virtual Hub nodes such as 1801, 1802, 1803, 1804, 1805;

Medium agriculture community linked Virtual Hub nodes such as 1810, 1811, 1809, 1808, 1807, 1806;

Small agriculture community linked Virtual Hub nodes such as 1812, 1813, 1814, 1815, 1816, 1817, 1818, 1819, 1820, 1821;

In some embodiments, the overall network node topology 1800 is comprised of large virtual hub nodes 1801, 1802, 1803, 1804, 1805 and medium virtual hub nodes 1810, 1811, 1809, 1808, 1807, 1806 and small virtual hub nodes 1812, 1813, 1814, 1815, 1816, 1817, 1818, 1819, 1820, 1821, or a subset or superset thereof. In some embodiments a user may input a starting point of 1815 and an ending point of 1818 which represent specific geographic virtual hub locations in a city, multiple cities, a country, or multiple countries. In some embodiments, agriculture community linked forward transportation market price-time priority queue auctions may occur directly between two exemplary points such as 1815 and 1818 or the method and system may combine a series of smaller auctions to comprise a larger price-time priority queue auction between two endpoints on the system. In some embodiments, a series of smaller price-time priority queue auctions may be combined between 1815 and 1811, as well as 1811 and 1802, 1802 and 1805, 1805 and 1808, and/or 1808 and 1818, which would be added together to make a combined agriculture community linked virtual hub price-time priority queue auction. A combined series of smaller auctions may be constrained by instructions which form auctions based on cheapest agriculture community linked transportation or freight route 1011, single mode agriculture community linked transport or freight auctions 1012, multi-mode transport or freight 1013, fastest transport or freight constraints 1014, most scenic auctions 1015, highest rating auctions 1016, most available or liquid auctions 1017, highest volume agriculture community linked auctions 1018, most frequent agriculture community linked auctions 1019, service level agriculture community linked auctions 1020, security and safety level agriculture community linked auctions 1021, group restricted auctions by sex, email, organization, gender or other groups 1022. In some embodiments, the constraints allow for many types of auctions which are unique and novel for agriculture community linked transformed transportation and freight capacity units or securities in a forward transportation and freight market. In some embodiments, the user 110 may specify instructions that set agriculture community linked forward market price-time priority queue auction constraints based on one or a plurality of constraints. In some embodiments, the constrained auctions may have fungible units which allow many participants to transact in the auctions. In some embodiments, the disclosed creation of an agriculture community linked forward market of transportation units between virtual hubs 1801 and 1804 or other combinations along map routes has the attributes of a fungible forward contract which allows for one agriculture community linked transportation unit to be substitutable for another transportation unit because the unit has been transformed and defined as a commodity contract. In other words, if user A bought an agriculture community linked transportation unit from user B between virtual hub 1801 and virtual hub 1804, but then user A was not able to perform the obligation to purchase the agriculture community linked transportation unit between agriculture community linked virtual hub 1801 and agriculture community linked virtual hub 1804 from user B, then user A could resell the agriculture community linked transportation unit contract between agriculture community linked virtual hub 1801 and agriculture community linked virtual hub 1804 to a third party user C on the agriculture community linked forward transportation unit auction market between virtual hub 1804 and agriculture community linked virtual hub 1801 to retrieve the financial payment made for their original purchase from user B. Then user C would replace user A and be matched with user B for the agriculture community linked transportation unit transformation between agriculture community linked virtual hub 1804 and agriculture community linked virtual hub 1801. No other prior art system or method performs the aforementioned data transformation combination. In some embodiments, the agriculture community linked transportation or freight unit auction substitutability dynamic creates a unique and novel invention that does not exist in the world today. In some embodiments, user 110 input instructions use constrained optimization to form one auction between two points or a series of multiple auctions that form one larger auction.

In some embodiments, the forward agriculture community linked transportation and freight unit auctions subject to various constraints may be presented as a linear programming cost minimization problem in the exemplary case where the user 110 selects the cheapest route 1011 constraint. In such an exemplary case, the series of auctions may be combined that utilize the lowest cost path between the start point 1815 and the ending point 1818. In such an exemplary case, the linear programming cost minimization function may select the following path of 1815 to 1811 to 1802 to 1804 to 1805 to 1808 to 1818 if that combination is the lowest cost auction path. In another such exemplary case, the user 110 may select instructions for the auction to minimize both cost and shortest route. In such an exemplary case, the linear programming function may minimize cost subject to a constraint that time is the shortest along the path, and the resulting auction may combine a different and unique series of auctions between the starting point of 1815 and ending point 1818. Accordingly, the path may be optimized to minimize cost subject to the shortest path, which may yield a path of 1815 to 1811 to 1802 to 1805 to 1808 to 1818. The plurality of combinations of linear programming sequences of auctions for agriculture community linked transportation or freight units between two points may consider an infinite set of combinations and permutations.

In some embodiments, the forward transformed agriculture community linked transportation and freight unit or transformed agriculture community linked transportation security unit auctions may be held side by side between two competing routes. By way of example, but not limited by the example, a user may input instructions for the method and system to route between agriculture community linked virtual hub 1801 and agriculture community linked virtual hub 1805. One route may be directly between agriculture community linked virtual hub 1801 and agriculture community linked virtual hub 1805. Another route may be between agriculture community linked virtual hub 1801 and agriculture community linked virtual hub 1805 by way of agriculture community linked virtual hub 1802. The time between the routes may vary due to traffic, construction, road conditions, accidents, or a plurality of other exogenous factors. However, the data transformation of the disclosed method allows for two price-time priority queue auctions to form side by side. Side by side auctions may be displayed on a market based user interface 1300 or as a software layer of instructions over a navigation system. The first agriculture community linked transportation unit price-time priority queue auction may be between agriculture community linked virtual hub 1805 and agriculture community linked virtual hub 1801 directly as one auction. A second auction may be by combining two smaller price-time priority queue auctions between agriculture community linked virtual hub 1805 and agriculture community linked virtual hub 1802 with the auction between agriculture community linked virtual hub 1802 and agriculture community linked virtual hub 1801, which could be expressed independently or as a combined auction. The plurality of route auctions for the transportation unit (e.g., auction one directly between virtual hub 1801 and virtual hub 1805, auction two between agriculture community linked virtual hub 1801 and agriculture community linked virtual hub 1805 by way of agriculture community linked virtual hub 1802) may allow for the user to have transparent price auction information for the value of various proposed routes which have different price values.

Figure 19:
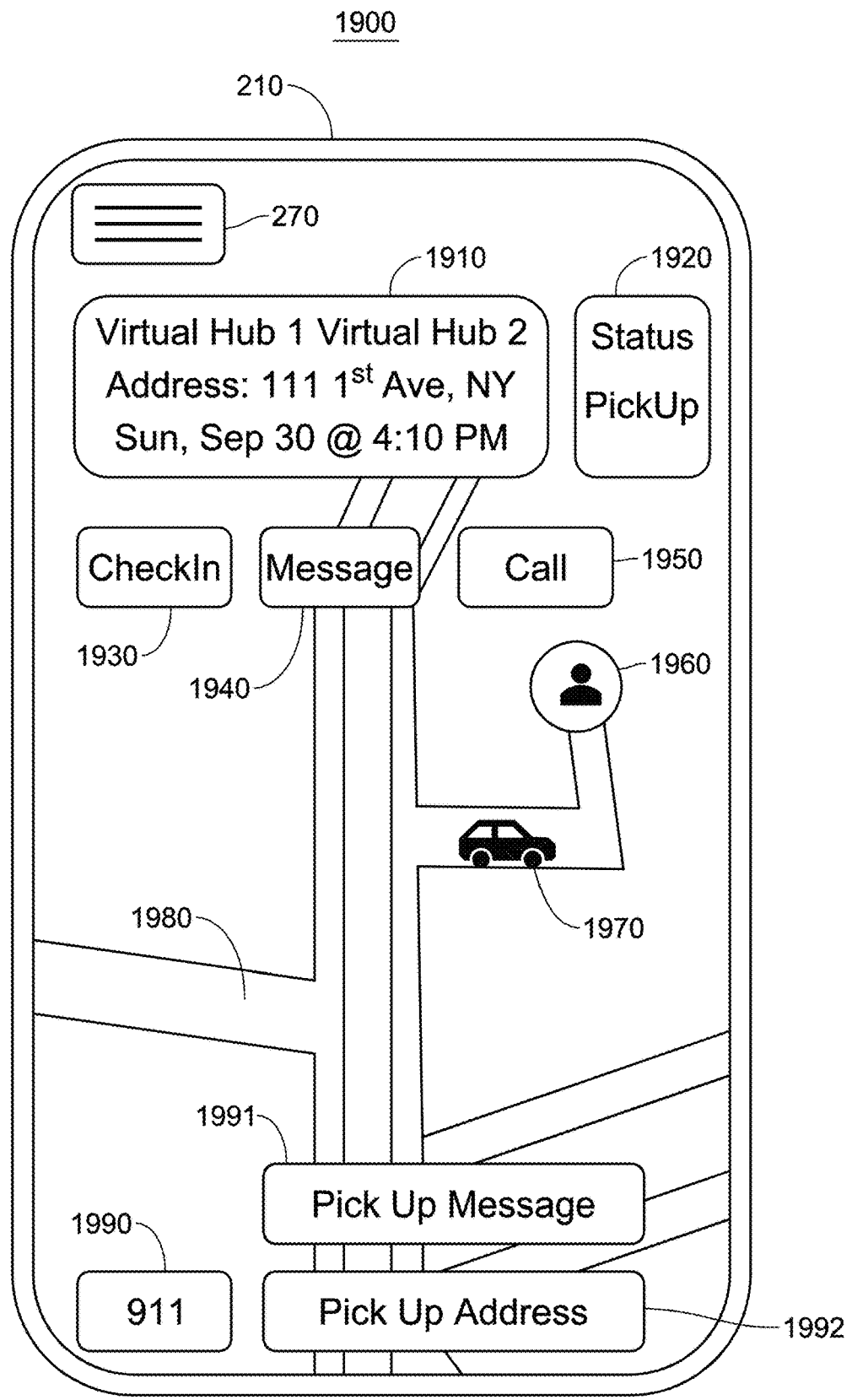
FIG. 19 illustrates an exemplary user interface to display the map of the agriculture community linked virtual hub to virtual hub route of a given transaction for agriculture community linked forward transportation or freight capacity units in accordance with some embodiments.

FIG. 19 illustrates an exemplary delivery and pick up status configuration 1900 in one exemplary implementation of participating, transacting and/or trading transformed agriculture community linked transportation or freight capacity units or securities in accordance with some embodiments. In some embodiments, the delivery and pick up status configuration 1900 includes the following elements, or a subset or superset thereof:

Computing device unit GUI 210 to display a method of multi layered network node topology for forward market of agriculture community linked transportation and freight units.

Hamburger menu toggle 270 to move between different application configurations;

agriculture community linked virtual hub 1 pickup address and agriculture community linked virtual hub 2 destination address at a contract specification with regards to quality, day, date and time 1910;

Trip status of PickUp for agriculture community linked transportation or freight unit 1920;

CheckIn passenger or freight status for agriculture community linked transportation unit 1930;

Messaging texts and instructions between users to make pick up and delivery of agriculture community linked transportation or freight capacity units 1940;

Call between users with number masking for privacy security 1950;

GPS map location of user 1960, who is a rider or, if freight, a cargo location 1960;

GPS map location of user 1970, who is a driver or, if agriculture community linked freight, a cargo carrier agriculture community linked unit location 1970;

GPS map of agriculture community linked transportation or freight unit delivery and pick up 1980;

Texting message window for freight or agriculture community linked transportation unit communication between users 1991;

PickUp address data window during PickUp status 1992;

Security button to report security issues to 911 and system database 1990;

In some embodiments, the GUI 210 transmits delivery instructions to the users 110 to help the user 1960 have a rendering or map of their GPS location relative to the selling user 1970 of freight or agriculture community linked transportation units. In some embodiments, the GUI 210 displays the trip's status, such as PickUp status 1920, the trip status may include subsets or supersets of various status conditions such as PickUp, start, leaving, on-going, in-progress, arriving, arrived or a plurality of other trip status conditions. In some embodiments, the trip view of the GUI 210 may include a CheckIn 1930 button to confirm a passenger or agriculture community linked freight transformed transportation unit has been moved into the transformed agriculture community linked transportation unit object which could be a car, airplane, autonomous vehicle, bike, boat, ship, bus, drone, limo, motorcycle, moped, shuttle, spaceship, subway, taxi, train, cargo, combination of transformed modes or other type of transportation mode. In some embodiments, the user 110 may transmit a message using the message 1940 button which may transmit audio, visual, or text messages between users 1970, 1960. In some embodiments, the users 1960, 1970 may call each other using the call 1950 button to communicate pickup or delivery instructions. In some embodiments, a user 1960, 1970 may message another user 1960, 1970 to communicate using the PickUp Message window 1991, which may utilize visual, audio, or text communication modes, as well as log a message history between users. In some embodiments, the users 1960, 1970 may toggle to other modes of the application using the menu hamburger button 270. In some embodiments, the GPS display of a map with the relative position of an agriculture community linked transportation or freight unit seller 1970 and a transportation or freight unit buyer 1960 are displayed to help users understand each other's relative position and location on a map 1980. In some embodiments, the GPS location of the agriculture community linked transportation and freight unit seller 1970 and transportation or freight unit buyer 1960 are tracked in real time with location updates on the map 1980.

Figure 20:
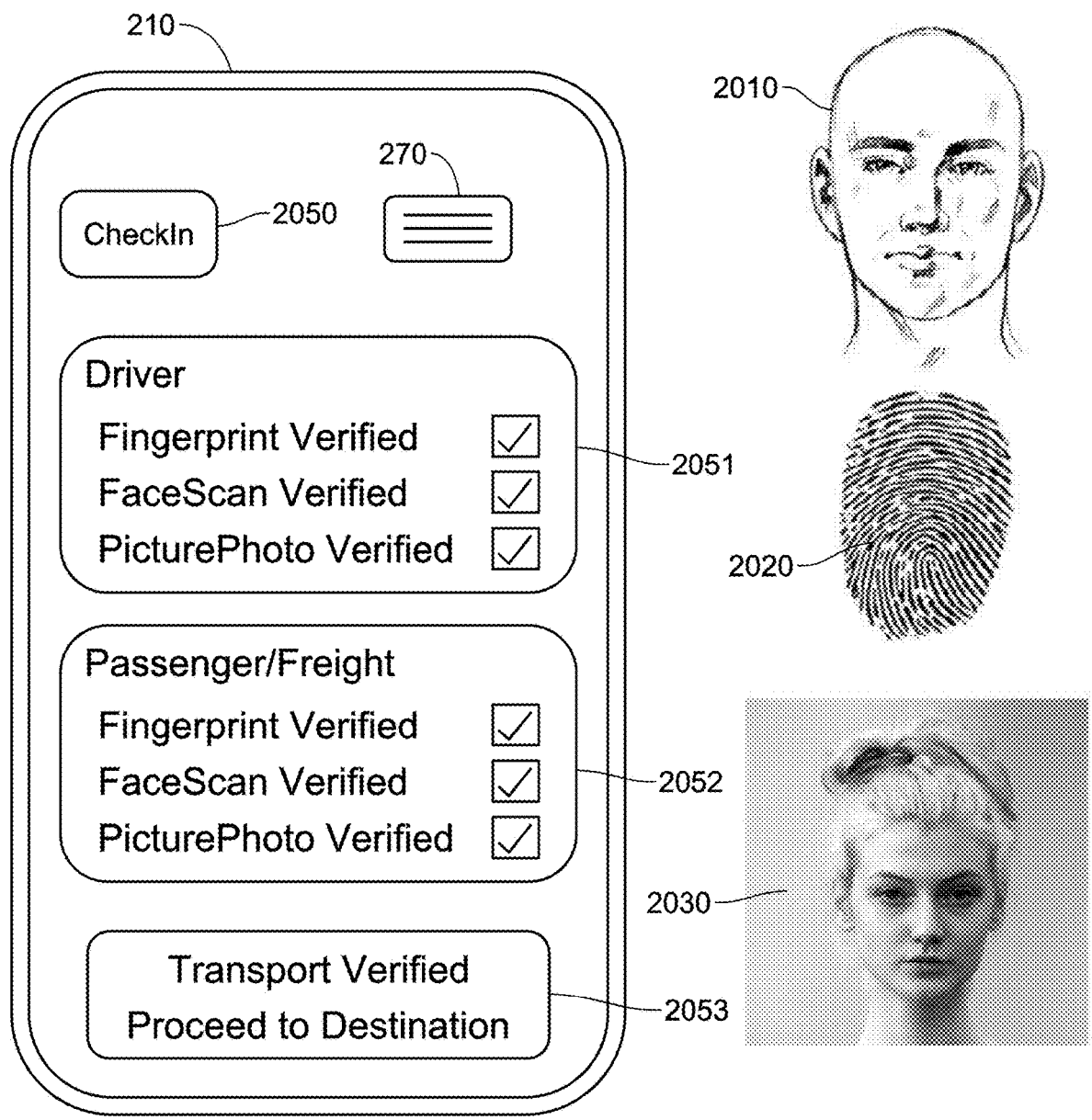
FIG. 20 illustrates an exemplary user interface to display the results of a security check and verification of a user's identity for agriculture community linked forward transportation or freight capacity units in accordance with some embodiments.

FIG. 20 illustrates an exemplary CheckIn configuration 2000 in one exemplary implementation of participating, transacting and/or trading agriculture community linked transportation or freight capacity units in accordance with some embodiments. In some embodiments, the CheckIn 2050 for a buyer or seller of an agriculture community linked transportation or freight unit includes the following elements, or a subset or superset thereof:

computing device unit GUI 210 to display method of multi layered network node topology for forward market of agriculture community linked transportation and freight units with security CheckIn;

hamburger menu toggle 270 to move between different application configurations;

driver or seller of agriculture community linked transportation or freight unit scan check for fingerprint, face scan or picture photo scan to verify identity of user 2051;

passenger or freight and agriculture community linked transportation unit buyer unit scan check for fingerprint, face scan or picture photo scan to verify identity of user 2052;

transport verification confirmation window to confirm identities of users in the system at the application system level 2053;

buyer and seller of agriculture community linked transportation or freight unit facial recognition confirmation 2010;

buyer and seller of agriculture community linked transportation or freight unit fingerprint recognition confirmation 2020;

buyer and seller of agriculture community linked transportation or freight unit photo recognition confirmation 2030;

In some embodiments, the GUI 210 of a computing device transmits and confirms the identity of users against identity records in the Network Member Database Server 222 which also confirms security checks for criminal records or other activity that would suspend a user from the platform environment. In some embodiments, the driver verification window 2051 may fail an identity verification due to a user not being the registered user 2010 on the Network Member Database Server 222. In some embodiments, the passenger or freight verification window 2052 may fail an identity verification due to a user 2010 not being the registered user on the network member database server 222. In some embodiments, the transport verification window 2053 may instruct the user 2010 to proceed to destination if verification is successful. In some embodiments, the transport verification window 2053 may instruct the user not to proceed to the destination if the verification is not successful. The identity verification system is unique and novel and dependent on a novel and unique price-time priority queue auction forward market for transformed agriculture community linked transportation unit or freight unit or securities over multiple nodes or virtual hubs topologies.

Figure 21:
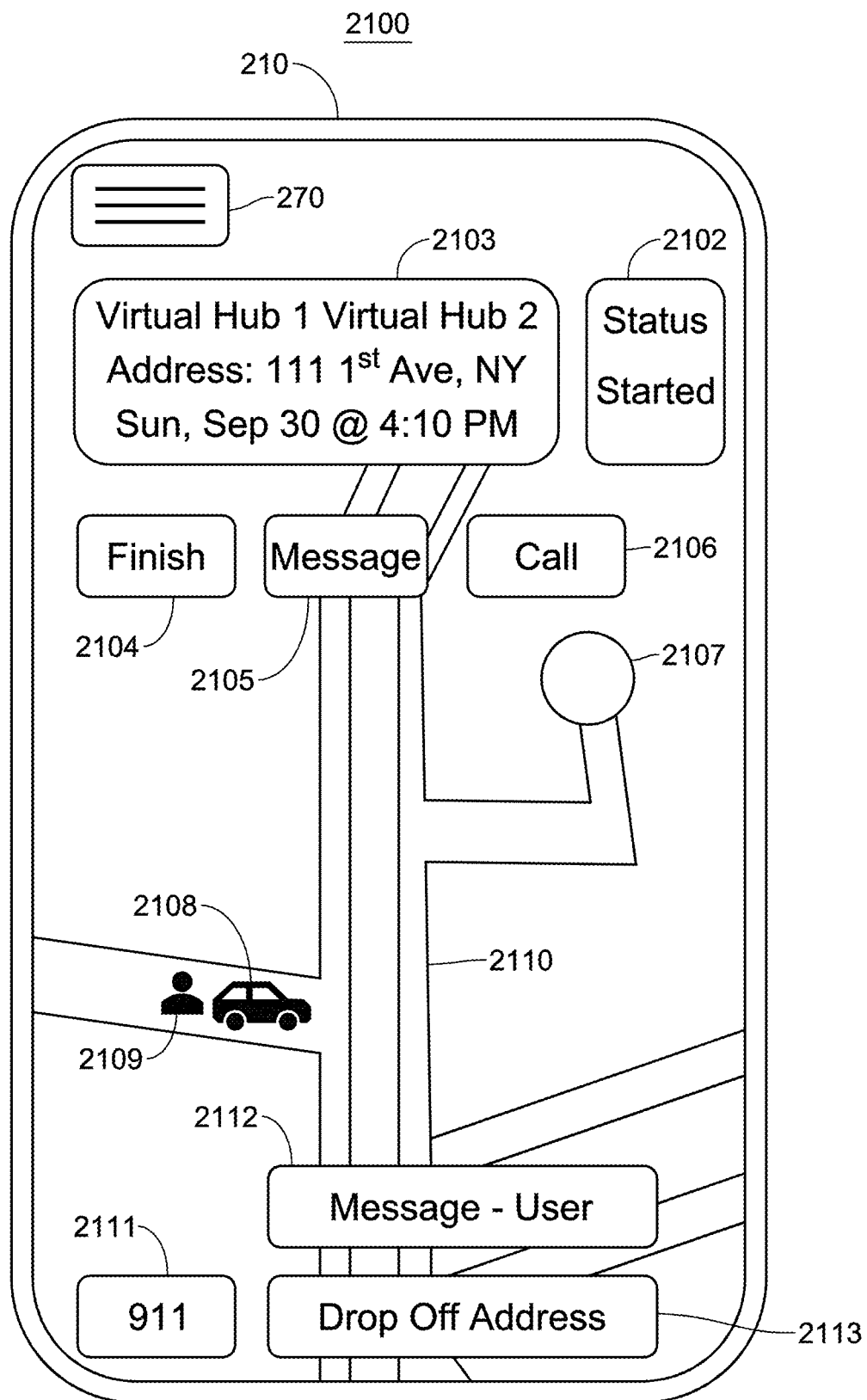
FIG. 21 illustrates an exemplary user interface to display the status of the agriculture community linked virtual hub to virtual hub route of a given transaction for agriculture community linked forward transportation or freight capacity units in accordance with some embodiments.

FIG. 21 illustrates an exemplary delivery and pick up status configuration 2100 once an agriculture community linked transportation or freight unit delivery has started in one exemplary implementation of participating, transacting and/or trading agriculture community linked transportation or freight capacity units in accordance with some embodiments. In some embodiments, the delivery and pick up status configuration 2100 includes the following elements, or a subset or superset thereof:

computing device unit GUI 210 to display method of multi layered network node topology for agriculture community linked forward market of transportation and freight units;

hamburger menu toggle 270 to move between different application configurations;

agriculture community linked virtual Hub 1 pickup address and agriculture community linked Virtual Hub 2 destination address at a transformed contract specification with regards to quality, day, date, and time of delivery 2103 of a transportation or freight unit;

trip status of Started for agriculture community linked transportation or freight unit or security 2102;

finish trip passenger or freight status for agriculture community linked transportation unit 2104 once an agriculture community linked transportation or freight unit has been delivered;

messaging texts and instructions between users to make pick-up, on-going route status and delivery complete of agriculture community linked transportation or freight capacity units 2105;

call between system users with number masking for privacy security 2106;

GPS map location of user 2109, who is a rider or, if agriculture community linked freight, a cargo location 2109;

GPS map location of user 2108, who is a driver or, if agriculture community linked freight, a cargo carrier unit location 2108;

GPS map of transportation or freight unit delivery and pick up 2110;

texting message window for freight or agriculture community linked transportation unit communication between users 2112;

starting point of virtual hub for forward agriculture community linked transportation or freight units 2107;

security button to report security issues to 911 and system database 2111;

drop off address for delivery of passenger or freight for transportation or freight unit 2113.

In some embodiments, the GUI 210 transmits delivery instructions to the users 110 to help the user 2109 have a rendering or map of their GPS location relative to the selling user 2108 of transformed agriculture community linked freight or transportation units or securities. In some embodiments, the GUI 210 displays the trips status such as Started status 2102, where the trip status may include subsets or supersets of various status conditions such as PickUp, Started, leaving, on-going, in-progress, arriving, arrived, or a plurality of other trip status conditions. In some embodiments, the trip view of the GUI 210 may include a Finish 2104 button to confirm a passenger or agriculture community linked freight transportation unit has been delivered or completed by the agriculture community linked transportation unit object, which could be a car, airplane, autonomous vehicle, bike, boat, ship, bus, drone, limo, motorcycle, moped, shuttle, spaceship, subway, taxi, train, cargo, or other types of transportation modes. In some embodiments, the user may transmit a message using the message 2105 button which may transmit audio, visual, or text messages between users 2109, 2108. In some embodiments, the users 2109, 2108 may call each other using the call 2106 button to communicate pickup or delivery instructions or other necessary communication. In some embodiments, a user 2109, 2108 may message another user 2109, 2108 to communicate using the Message—User window 2112, which may utilize visual, audio, or text communication modes, as well as log a message history between users. In some embodiments, the users 2109, 2108 may toggle to other modes of the application using the menu hamburger button 270. In some embodiments, the GPS display of a map with the relative position of a transformed agriculture community linked transportation or freight unit or security seller 2108 and a transformed agriculture community linked transportation or freight unit or security buyer 2109 are displayed to help users understand each other's relative position and location on a map 2110. In some embodiments, the GPS location of the agriculture community linked transportation and freight unit seller 2108 and agriculture community linked transportation or freight unit buyer 2109 are tracked in real time with location updates on the map 2110.

Figure 22:
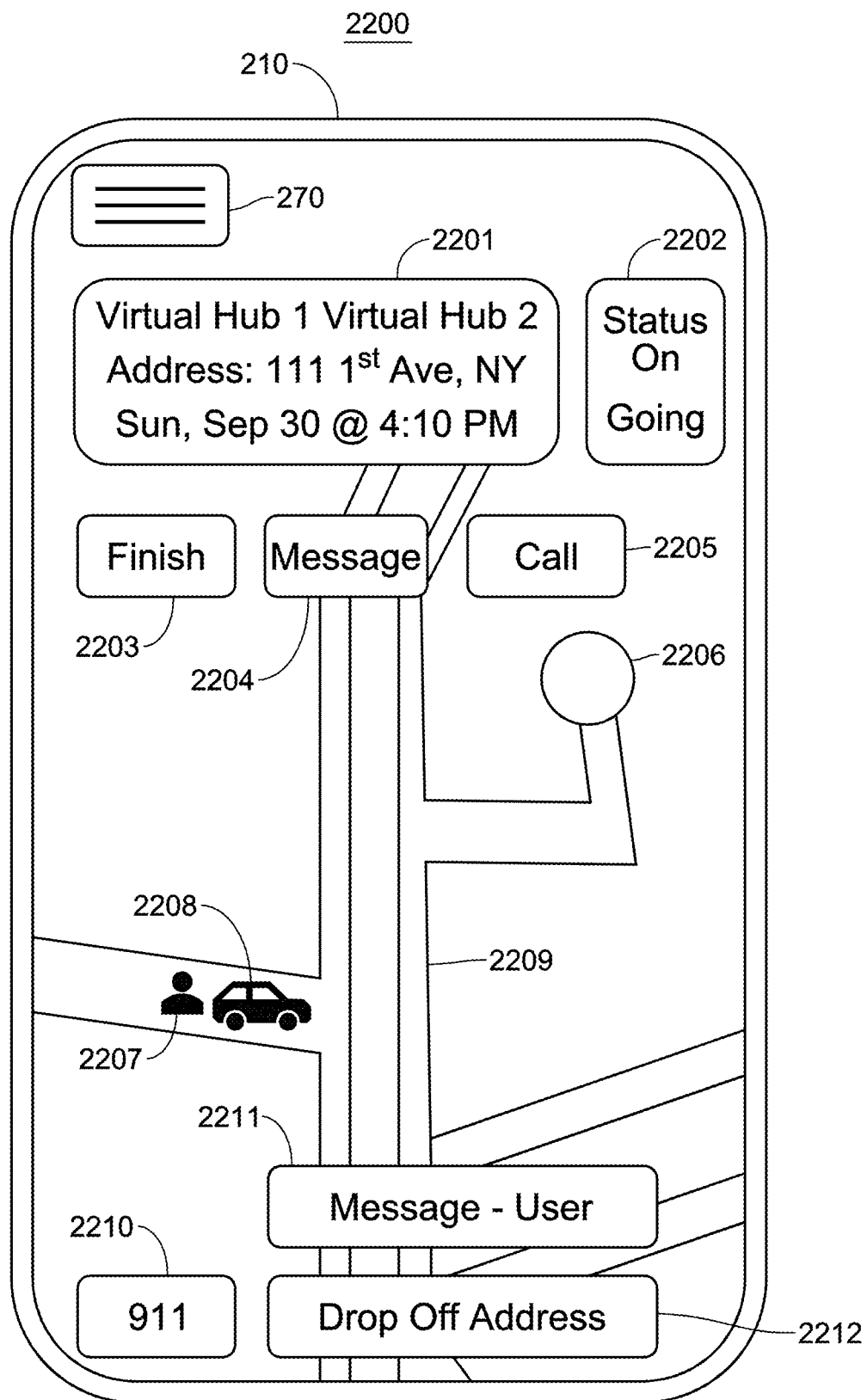
FIG. 22 illustrates an exemplary user interface to display the status of the agriculture community linked virtual hub to virtual hub route of a given transaction for agriculture community linked forward transportation or freight capacity units in accordance with some embodiments.

FIG. 22 illustrates an exemplary delivery and pick up status configuration 2200 once a transportation or freight unit delivery is ongoing in one exemplary implementation of participating, transacting and/or trading transformed agriculture community linked transportation or freight capacity units or securities in accordance with some embodiments. In some embodiments, the delivery and pick up status configuration 2200 includes the following elements, or a subset or superset thereof:

computing device unit GUI 210 to display method of multi layered network node topology for forward market of agriculture community linked transportation and freight units;

hamburger menu toggle 270 to move between different application configurations;

agriculture community linked virtual Hub 1 pickup address and agriculture community linked virtual Hub 2 destination address at a contract specification with regards to quality, day, date, and time of delivery 2201 of an agriculture community linked transportation or freight unit;

trip status of Ongoing for agriculture community linked transportation or freight unit 2202;

finish trip passenger or freight status button for agriculture community linked transportation unit 2203 once an agriculture community linked transportation or freight unit has been delivered;

messaging texts and instructions between users to make pick-up, on-going route status and delivery complete of agriculture community linked transportation or freight capacity units 2204;

call between system users with number masking for privacy security 2205;

GPS map location of user 2207, who is a rider or, if agriculture community linked freight, a cargo location 2207;

GPS map location of user 2208, who is a driver or, if agriculture community linked freight, a cargo carrier unit location 2208;

GPS map of agriculture community linked transportation or freight unit delivery and pick up 2209;

texting message window for agriculture community linked freight or transportation unit communication between users 2211;

starting point of virtual hub for forward agriculture community linked transportation or freight units 2206;

security button to report and record security issues to 911 and system database 2210;

drop off address for delivery of passenger or agriculture community linked freight for transportation or freight unit 2212.

In some embodiments, the GUI 210 transmits delivery instructions to the users to help the user 2207 have a rendering or map of their GPS location relative to the selling user 2208 of agriculture community linked freight or transportation units. In some embodiments, the GUI 210 displays the trips status such as On-Going status 2202, where the trip status may include subsets or supersets of various status conditions, such as PickUp, Started, leaving, on-going, in-progress, arriving, arrived, or a plurality of other trip status conditions. In some embodiments, the trip view of the GUI 210 may include a Finish 2203 button to confirm a passenger or agriculture community linked freight transportation unit or security has been delivered or completed by the transportation unit object, which could be a car, airplane, autonomous vehicle, bike, boat, ship, bus, drone, limo, motorcycle, moped, shuttle, spaceship, subway, taxi, train, cargo, or other types of transportation modes. In some embodiments, the user may transmit a message using the message 2204 button, which may transmit audio, visual, or text messages between users 2207, 2208. In some embodiments, the users 2207, 2208 may call each other using the call 2205 button to communicate pickup or delivery instructions or other necessary communication. In some embodiments, a user 2207, 2208 may message another user 2207, 2208 to communicate using the Message—User window 2211, which may utilize visual, audio, or text communication modes, as well as log a message history between users 2207, 2208. In some embodiments, the users 2207, 2208 may toggle to other modes of the application using the menu hamburger button 270. In some embodiments, the GPS display of a map with the relative position of an agriculture community linked transportation or freight unit seller 2208 and an agriculture community linked transportation or freight unit buyer 2207 are displayed to help the users understand each other's relative position and location on a map 2209. In some embodiments, the GPS location of the agriculture community linked transportation and freight unit seller 2208 and agriculture community linked transportation or freight unit buyer 2207 are tracked in real time with location updates on the map 2209. In some embodiments, the GUI 210 may display the Drop Off Address 2212 of the agriculture community linked transportation or freight unit. In some embodiments a user 2207, 2208 may use a 911 button 2210 to submit a recording to the system servers and to authorities who are connected to the system if anything has occurred that may compromise the security of any user or agriculture community linked transportation unit.

Figure 23:
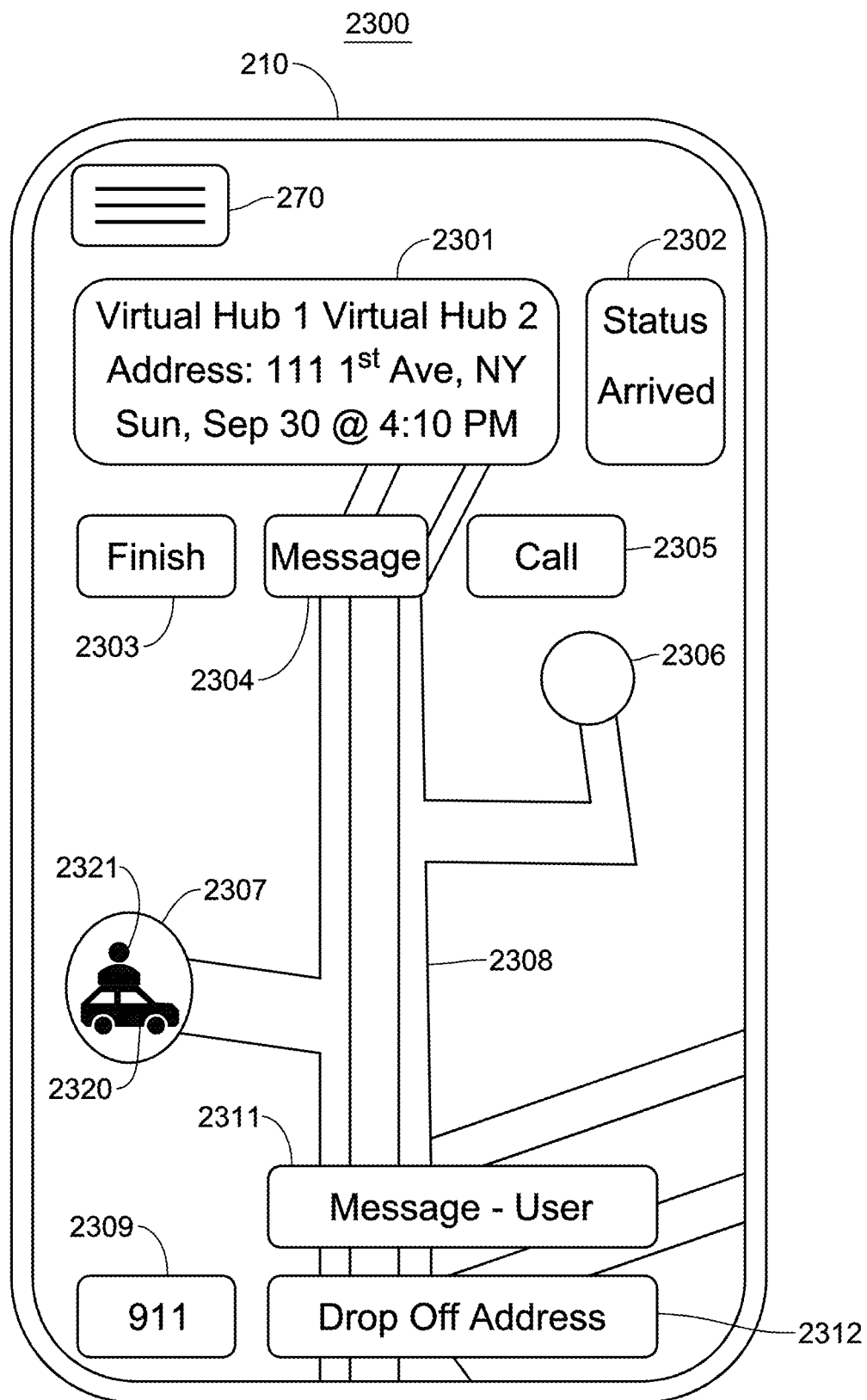
FIG. 23 illustrates an exemplary user interface to display the status of the agriculture community linked virtual hub to virtual hub route of a given transaction for agriculture community linked forward transportation or freight capacity units in accordance with some embodiments.

FIG. 23 illustrates an exemplary delivery and pick up status configuration 2300 once an agriculture community linked transportation or freight unit delivery has arrived in one exemplary implementation of participating, transacting and/or trading agriculture community linked transportation or freight capacity units in accordance with some embodiments. In some embodiments, the delivery and pick up status configuration 2300 includes the following elements, or a subset or superset thereof:

computing device unit GUI 210 to display method of multi layered network node topology for forward market of agriculture community linked transportation and freight units.

hamburger menu toggle 270 to move between different application configurations;

agriculture community linked virtual hub 1 pickup address and agriculture community linked virtual hub 2 destination address at a contract specification with regards to quality, day, date and time of delivery 2301 of an agriculture community linked transportation or freight unit;

trip status of Arrived for agriculture community linked transportation or freight unit 2302;

finish trip passenger or freight status button for agriculture community linked transportation unit 2303 once an agriculture community linked transportation or freight unit has been delivered;

messaging texts and instructions between users to make pick-up, on-going route status and delivery complete of agriculture community linked transportation or freight capacity units 2304;

call between system users with number masking for privacy security 2305;

GPS map location of user 2321, who is a rider or, if freight, a cargo location 2321;

GPS map location of user 2320, who is a driver or, if freight, a cargo carrier unit location 2320;

GPS map of agriculture community linked transportation or freight unit delivery and pick up 2308;

texting message window for agriculture community linked freight or transportation unit communication between users 2311;

starting point of virtual hub for agriculture community linked forward transformed transportation or freight units or securities 2306;

ending point of virtual hub for agriculture community linked forward transformed transportation units or freight units or securities 2307;

security button to report and record security issues to 911 and system database 2309;

drop off address for delivery of agriculture community linked freight for transportation or freight unit 2312;

In some embodiments, the GUI 210 transmits delivery instructions to the users to help the user 2321 have a rendering or map of their GPS location relative to the selling user 2320 of agriculture community linked freight or transportation units. In some embodiments, the GUI 210 displays the trips status, such as "Arrived" status 2302, where the trip status may include subsets or supersets of various status conditions, such as PickUp, Started, leaving, on-going, in-progress, arriving, arrived, or a plurality of other trip status conditions. In some embodiments, the trip view of the GUI 210 may include a Finish 2303 button to confirm an agriculture community linked freight transportation unit has been delivered or completed by the agriculture community linked transportation unit object, which could be a car, airplane, autonomous vehicle, bike, boat, ship, bus, drone, limo, motorcycle, moped, shuttle, spaceship, subway, taxi, train, cargo, or other types of transportation modes. In some embodiments, the user 2320, 2321 may transmit a message using the message 2304 button, which may transmit audio, visual or text messages between users 2320, 2321. In some embodiments, the users 2320, 2321 may call each other using the call 2305 button to communicate pickup or delivery instructions or other necessary communication. In some embodiments, a user 2320, 2321 may message another user 2320, 2321 to communicate using the Message—User window 2311, which may utilize visual, audio or text communication modes, as well as log a message history between users 2320, 2321. In some embodiments, the users 2320, 2321 may toggle to other modes of the application using the menu hamburger button 270. In some embodiments, the GPS display of a map with the relative position of an agriculture community linked transportation or freight unit seller 2320 and an agriculture community linked transportation or freight unit buyer 2321 are displayed to help the users understand each other's relative position and location on a map 2308. In some embodiments, the GPS location of the agriculture community linked transportation and freight unit seller 2320 and transformed agriculture community linked transportation or freight unit or security buyer 2321 are tracked in real time with location updates on the map 2308. In some embodiments, the GUI 210 may display the Drop Off Address 2312 of the transformed agriculture community linked transportation or freight unit or security. In some embodiments, a user 2320, 2321 may use a 911 button 2309 to submit a recording to the system servers and to authorities who are connected to the system if anything has occurred that may compromise the security of any user or agriculture community linked transportation unit.

Figure 24:
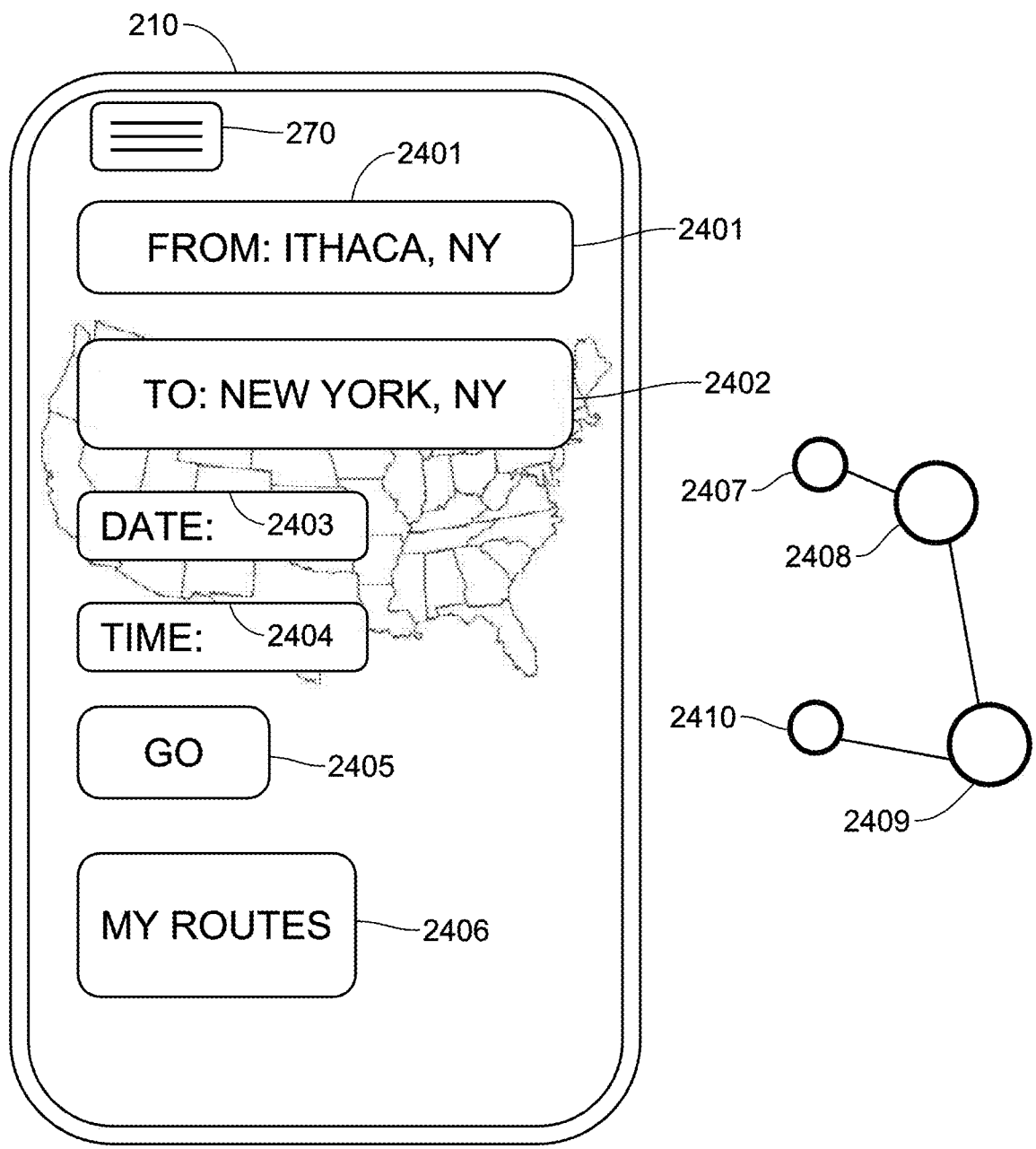
FIG. 24 illustrates an exemplary user interface to display a multi-hub, virtual-hub sequence given a start and end point for a transaction auction for agriculture community linked forward transportation or freight capacity units in accordance with some embodiments.

FIG. 24 illustrates an exemplary delivery and pick up configuration 2400 for an agriculture community linked transportation or freight unit multi layered network node topology in one exemplary implementation of participating, transacting and/or trading agriculture community linked transportation or freight capacity units in accordance with some embodiments. In some embodiments, the multi layered network node topology of participating, transacting and/or trading agriculture community linked transportation or freight capacity configuration 2400 includes the following elements, or a subset or superset thereof:

computing device unit GUI 210 to display method of multi layered network node topology for forward market of agriculture community linked transportation and freight units;

hamburger menu toggle 270 to move between different application configurations;

from node starting point 2401 of a multi layered network node topology for forward market of agriculture community linked transportation and freight units;

to or destination node ending point 2402 of a multi layered network node topology for forward market of agriculture community linked transportation and freight units;

date module 2403 in GUI 210 of an auction for a multi layered network node topology for agriculture community linked forward market of transformed transportation and freight units or securities;

time module 2404 in GUI 210 of pickup and delivery of an auction for a multi layered network node topology for agriculture community linked forward market of transportation and freight units;

go button 2405 to form an auction for a multi layered network node topology for agriculture community linked forward market of transformed transportation and freight units or securities;

My Routes button 2406 to quickly obtain common From 2401 or To 2402 points in an auction for a multi layered network node topology for agriculture community linked forward market of transformed transportation and freight units for a user on the system;

multi-hub network 2407, 2408, 2409, 2410 which may form a single dual node auction 2407 to 2408 or 2407 to 2410 or any possible node combination or a multi-node auction series for a multi layered network node topology for agriculture community linked forward market of transportation and freight units for a user on the system.

In some embodiments, the GUI 210 transmits a From node 2401 and To node 2402 with instructions to the users 110 with a specific date 2403 and time 2404 of a multi layered network node topology for forward market of transformed agriculture community linked transportation and freight units for a user on the system to perform an auction by pressing the Go button 2405. The system may use a plurality of constraints, such as, but not limited by, cheapest route 1011, single mode of agriculture community linked transportation 1012, multi method mode of agriculture community linked transportation 1013, fastest route 1014, most scenic route 1015, highest rated route or highest rated driver 1016, most available route 1017, highest volume route 1018, most frequent route 1019, service level route 1020, security and safety of route 1021, and group restricted email or group criteria 1022 to use any two node points 2407, 2408, 2409, 2410 or any combination of points 2407, 2408, 2409, 2410. In some embodiments, the system may use no constraint, one constraint, or a plurality of constraints to allow the user to participate, transact, or trade in a multi-layered network node topology for agriculture community linked forward market of transportation and freight units in an auction. In some embodiments, the price-time priority queue auction for agriculture community linked forward market transformed transportation or freight units or securities may be comprised of an auction between only two points or a plurality of points subject to a plurality of constraints. In some embodiments, the from or starting point or starting virtual hub may be 2407, but the system selects an auction between 2408 and 2409 rather than starting at 2407, because one or more constraints were selected to frame the price-time priority queue auction for agriculture community linked forward market transportation or freight units. In some embodiments, an auction may be comprised of multiple modes of agriculture community linked transportation comprising a vehicle agriculture community linked transportation or freight unit auction between 2407 and 2408 points, followed by an agriculture community linked airplane transportation or freight unit auction between 2408 and 2409, followed by an agriculture community linked ship auction between 2410 and 2409 for agriculture community linked transportation or freight units. In some embodiments, the various plurality of auctions may be displayed as one price-time priority auction or a series of price-time priority auctions. In some embodiments, auctions for a multi layered network node topology for an agriculture community linked forward market of transportation and freight units may consist of any subset or superset of the aforementioned possibilities including any constraints 1000 or any plurality of modes 810.

Figure 25:
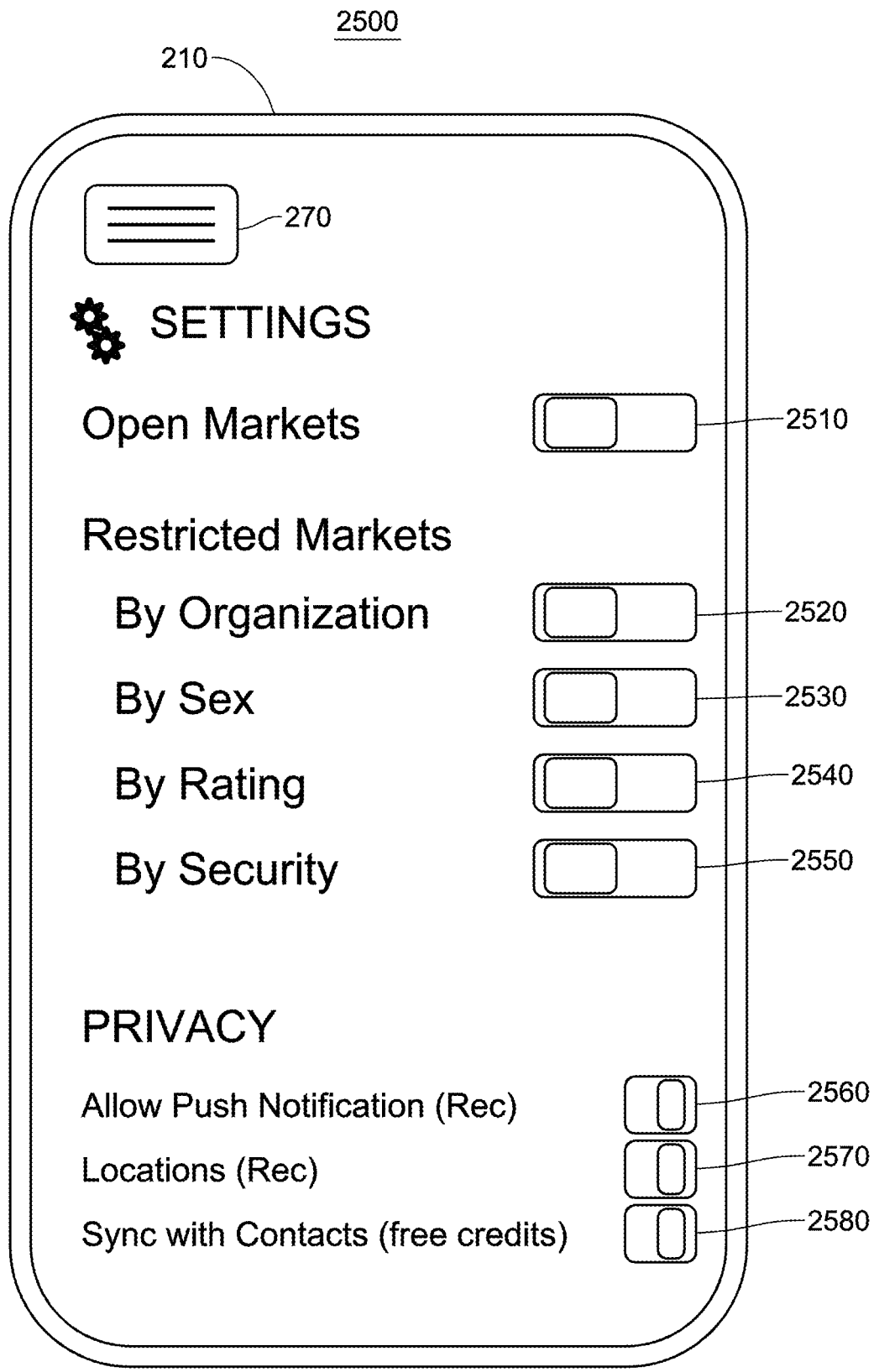
FIG. 25 illustrates an exemplary user interface to display open or restriction settings for auctions of the agriculture community linked transportation or freight forward market system and method in accordance with some embodiments.

FIG. 25 illustrates an exemplary setting configuration 2500 for an agriculture community linked transportation or freight unit multi layered network node topology in one exemplary implementation of participating, transacting and/or trading agriculture community linked transportation or freight capacity units in accordance with some embodiments. In some embodiments, the multi layered network node topology of participating, transacting and/or trading agriculture community linked transportation or freight capacity configuration 2500 includes the following setting elements, or a subset or superset thereof:

computing device unit GUI 210 to display method of multi layered network node topology for forward market of transformed agriculture community linked transportation and freight units or securities.

hamburger menu toggle 270 to move between different application configurations;

open markets setting toggle 2510 which allows a user to see all market participants of a given auction on a multi layered network node topology for a forward market of transformed agriculture community linked transportation and freight units or securities;

restricted markets setting By Organization 2520, By Sex 2530, By Rating 2540, By Security 2550 or by any other restriction the user 110 defines which limit the price-time priority queue auction participants for the user;

privacy settings which restrict push notifications 2560, location information 2570, Sync with contacts 2580, or other privacy settings;

In some embodiments, a user 110 may select open markets 2510 which show every participant in a given auction for a multi layered network node topology for a forward market of agriculture community linked transportation and freight units. In some embodiments, participants or users 110 may select to restrict the market view of the GUI, such as 400, by organization email 2520, sex 2530, rating of driver 2540, rating of user 2540, security 2550, or a plurality of other restrictions, but not limited to those restrictions. In some embodiments, users may change privacy settings, which restrict push notifications 2560, location settings 2570, Sync with Contacts settings 2580, or a plurality of other settings. In some embodiments, the toggle switches 2510, 2520, 2530, 2540, 2550, 2560, 2570, 2580 may be set to off or on depending on if they hold a right or left toggle switch position. The restricted market settings 2520, 2530, 2540, 2550 may be a subset or superset of the aforementioned in the formation of an open market price-time priority auction for a multi layered network node topology for a forward market of agriculture community linked transportation and freight units.

Figure 26:
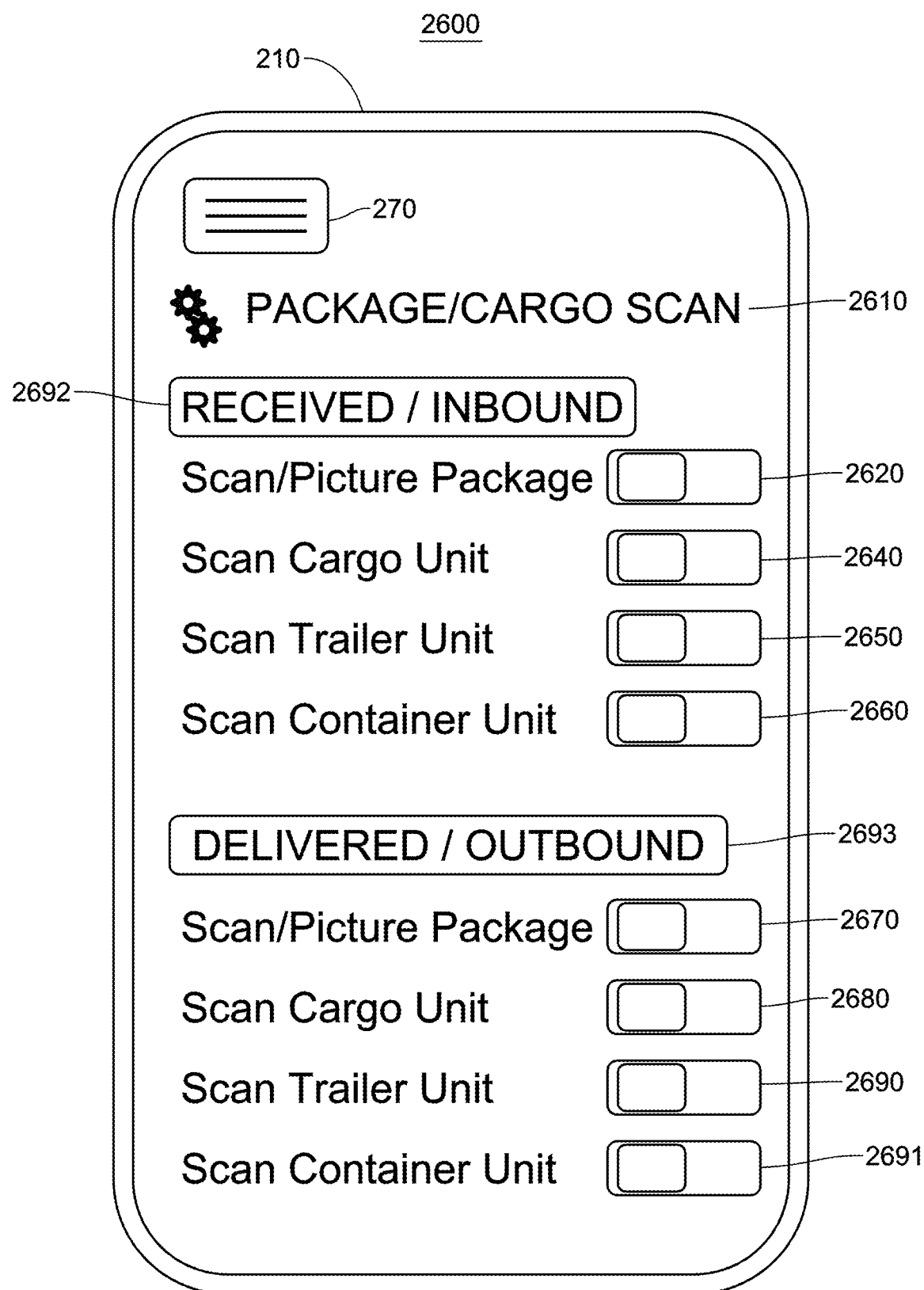
FIG. 26 illustrates an exemplary user interface to display inbound and outbound package, cargo or freight QR scans or UPC scans or pictures to document agriculture community linked freight units in which are delivered against the forward market agriculture community linked auction for two or more virtual hubs in accordance with some embodiments.

FIG. 26 illustrates an exemplary setting for a package or cargo scan configuration 2600 for a transformed agriculture community linked transportation or freight unit multi layered network node topology in one exemplary implementation of participating, transacting and/or trading agriculture community linked transportation or freight capacity units in accordance with some embodiments. In some embodiments, the multi layered network node topology of participating, transacting and/or trading agriculture community linked transportation or freight capacity configuration 2600 includes the following setting for a package or cargo scan elements, or a subset or superset thereof:

computing device unit GUI 210 to display method of multi layered network node topology for forward market of agriculture community linked transformed transportation and freight units.

hamburger menu toggle 270 to move between different application configurations;

package or Cargo Scan module 2610 to document the status and position of transformed forward market freight or agriculture community linked transportation units or security;

package or Cargo Inbound or received module 2692 to scan a picture, universal product code barcode, QR code, or other transformed agriculture community linked transportation or freight unit identifier or security;

package or Cargo Inbound scan toggle switch 2620 to scan a picture, universal product code barcode, QR code, or other transformed agriculture community linked transportation or freight unit identifier or security;

cargo unit Inbound scan toggle switch 2640 to scan a picture, universal product code barcode, QR code, or other transformed agriculture community linked transportation or freight unit identifier or security;

trailer unit Inbound scan toggle switch 2650 to scan a picture, universal product code barcode, QR code, or other transformed agriculture community linked transportation or freight unit identifier or security;

container unit Inbound scan toggle switch 2660 to scan a picture, universal product code barcode, QR code, or other transformed agriculture community linked transportation or freight unit identifier or security;

package or Cargo Outbound or delivered module 2693 to scan a picture, universal product code barcode, QR code, or other transformed agriculture community linked transportation or freight unit or security identifier or security;

package or Cargo Outbound or delivered scan toggle 2670 to scan a picture, universal product code barcode, QR code, or other transformed agriculture community linked transportation or freight unit identifier or security;

cargo outbound or delivered scan toggle 2680 to scan a picture, universal product code barcode, QR code, or other transformed agriculture community linked transportation or freight unit identifier;

trailer Outbound or delivered scan toggle 2690 to scan a picture, universal product code barcode, QR code, or other transformed agriculture community linked transportation or freight unit identifier;

container unit outbound or delivered scan toggle 2691 to scan a picture, universal product code barcode, QR code, or other transformed agriculture community linked transportation or freight unit identifier.

In some embodiments, a user 110 may select the package or cargo unit scan module 2610 to scan or take a picture of a package or cargo identification code such as a QR code, Uniform Product code or other identifying package or cargo characteristic. In some embodiments, the user 110 may select the inbound Scan/Picture Package toggle 2620 which captures the identification characteristic which may include QR Codes, Uniform Product Codes, Serial Numbers, or other cargo identification characteristics of a package or cargo agriculture community linked transportation or freight unit. In some embodiments, inbound cargo may include a larger unit structure than a package, such as a crate or large movable unit, with identification characteristics, which may include QR Codes, Uniform Product Codes, Serial Numbers, or other cargo identification characteristics. For such larger units a user 110 may use the Scan Cargo Unit toggle 2640 to capture the cargo identification characteristic for inbound receipt of the agriculture community linked transportation or freight unit. In some embodiments, an inbound Scan Trailer Unit toggle 2650 option may be used by a user 110 to instruct the system configuration that receipt of a large trailer unit, such as an eighteen wheel trailer unit or smaller trailer, may be scanned to identify the agriculture community linked transportation or freight unit. In some embodiments, an inbound Scan Container Unit 2660 toggle may be utilized to track the receipt or location of a shipping container. In some embodiments, a user 110 may select the outbound package or cargo unit scan module 2693 to scan or take a picture of a package or cargo identification code such as a QR code, Uniform Product code or other identifying package or cargo characteristic to confirm delivery to a delivery address of the agriculture community linked transportation or freight unit. In some embodiments, the user 110 may select the outbound Scan/Picture Package toggle 2670, which captures the identification characteristic of a package or cargo agriculture community linked transportation or freight unit once the unit is delivered to the delivery address. In some embodiments, cargo may include a larger unit structure than a package such as a crate or large movable unit with identification characteristics which may include QR Codes, Uniform Product Codes, Serial Numbers, or other cargo identification characteristics. For such larger units, a user 110 may use the outbound Scan Cargo Unit toggle 2680 to capture the cargo identification characteristic for outbound receipt of the transformed agriculture community linked transportation or freight unit or security. In some embodiments, an outbound Scan Trailer Unit toggle 2690 option may be used by a user 110 to instruct the system configuration that delivery of a large trailer unit, such as an eighteen wheel trailer unit or smaller trailer, may be scanned to identify the agriculture community linked transportation or freight unit and confirm delivery. In some embodiments, an outbound Scan Container Unit 2691 toggle may be utilized to track the delivery or location of a shipping container which has been delivered. In some embodiments, transformed agriculture community linked transportation or freight units or securities may be a subset or superset of the aforementioned in the formation of an open forward market auction for a multi layered network node topology for a forward market of transformed agriculture community linked transportation and freight units or securities.

Figure 27:
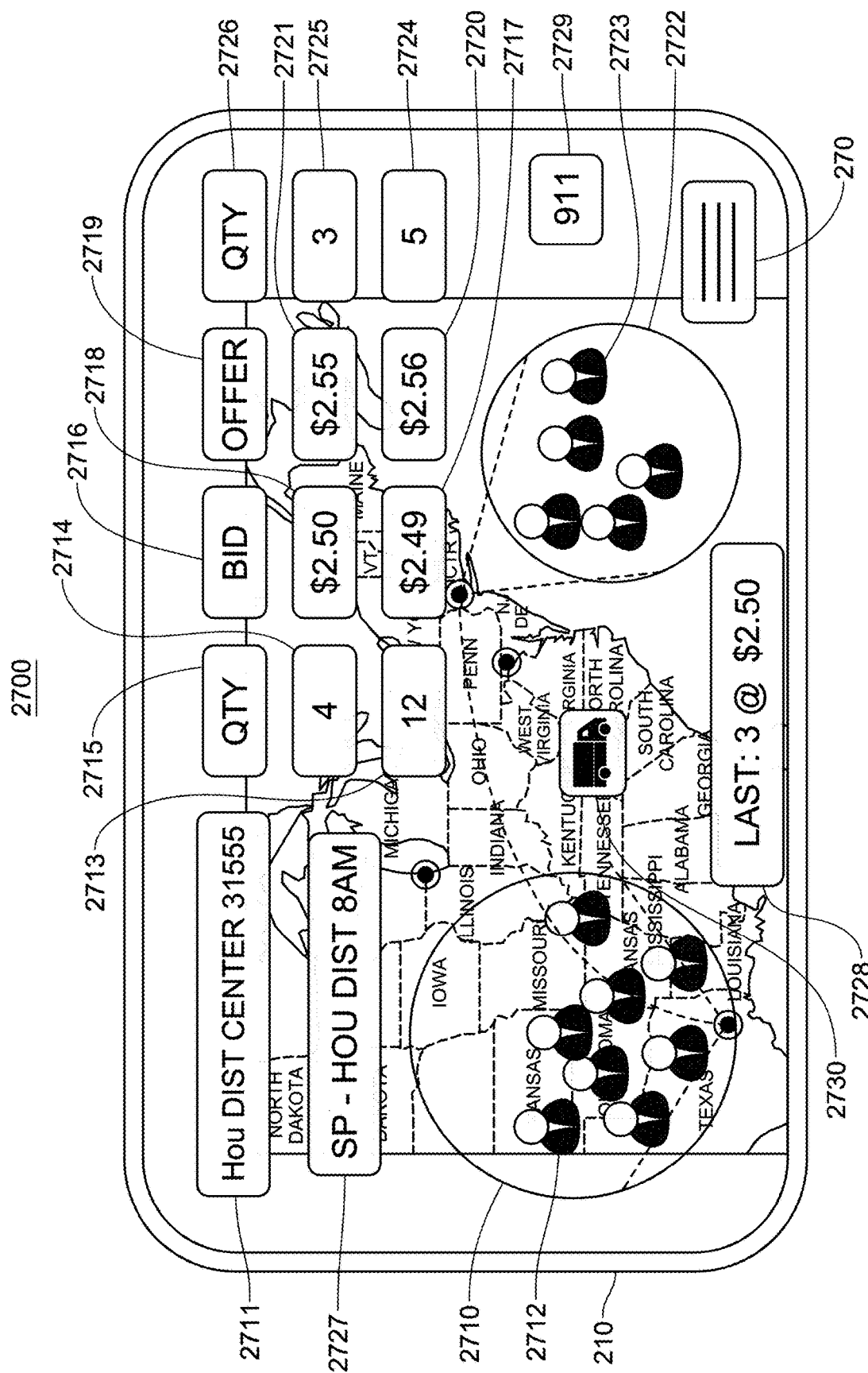
FIG. 27 illustrates an exemplary user interface to display an agriculture community linked forward freight auction for a transportation unit a given hub or multi-hub combination in accordance with some embodiments.

FIG. 27 illustrates an exemplary setting for an agriculture community linked package or cargo market configuration 2700 for a transformed agriculture community linked transportation or freight unit or security multi layered network node topology in one exemplary implementation of participating, transacting and/or trading transformed agriculture community linked transportation or freight capacity units or securities in accordance with some embodiments. In some embodiments, user interface 210 includes the following elements, or a subset or superset thereof:

exemplary agriculture community linked virtual hub combination from a shipping center location (a data transformation) 2711;

exemplary agriculture community linked virtual hub origin/from location 2710 with users or freight originators 2712 within the agriculture community linked virtual hub location 2710 (a data transformation);

exemplary specification summary of the market, level of service and time of delivery commencement 2727 (a data transformation);

exemplary mode of ground transportation or freight capacity type 2730 (a data transformation);

exemplary transaction summary of the last trades quantity and price 2728;

exemplary agriculture community linked virtual hub destination/to location 2722 and user who is being delivered on the agriculture community linked transportation or freight capacity unit 2723 (a data transformation);

exemplary bid/buy quantity title header 2715 for an exemplary agriculture community linked virtual transportation or freight unit hub market (a data transformation);

exemplary bid/buy price title header 2716 for an exemplary virtual agriculture community linked transportation or freight hub market (a data transformation);

exemplary offer/sell price title header 2719 for an exemplary virtual agriculture community linked transportation or freight hub market (a data transformation);

exemplary offer/sell quantity title header 2726 for an exemplary virtual agriculture community linked transportation or freight hub market (a data transformation);

exemplary bid/buy quantity 2414 for the best bid quantity from a plurality of users 110 for an exemplary respective agriculture community linked transportation or freight capacity virtual hub combination 2711 (a data transformation);

exemplary bid/buy quantity 2713 for the second-best bid quantity from a plurality of users 110 for an exemplary respective agriculture community linked transportation or freight capacity virtual hub combination 2711 (a data transformation);

exemplary bid/buy price 2718 for the best bid price from a plurality of users 110 for an exemplary respective agriculture community linked transportation or freight capacity virtual hub combination 2711 (a data transformation);

exemplary bid/buy price 2717 for the second-best bid price from a plurality of users 110 for an exemplary respective agriculture community linked transportation or freight capacity virtual hub combination 2711 (a data transformation);

exemplary offer/sell price 2721 for the best offer price from a plurality of users 110 for an exemplary respective agriculture community linked transportation or freight capacity virtual hub combination 2711 (a data transformation);

exemplary offer/sell price 2720 for the second-best offer price from a plurality of users 110 for an exemplary respective agriculture community linked transportation or freight capacity virtual hub combination (a data transformation) 2711;

exemplary offer/sell quantity 2725 for the best offer quantity from a plurality of users 110 for an exemplary respective agriculture community linked transportation or freight capacity virtual hub combination (a data transformation) 2711;

exemplary offer/sell quantity 2724 for the second-best offer quantity from a plurality of users 110 for an exemplary respective agriculture community linked transportation or freight capacity virtual hub combination (a data transformation) 2711;

exemplary safety dispatch "911" button 2729 to enact video and audio recording of the user 110 environment and dispatch of that information to authorities and system servers.

exemplary hamburger menu button 270 to move back to menu options and settings away from the participation, transaction, trading price-time priority auction GUI 210 embodiment.

In some embodiments, the user 110 may enter a transaction quantity and price for agriculture community linked transportation or freight capacity units to participate, transact and/or trade by the GUI 210 detecting user 110 contact or audio interface with a bid/buy price 2718 or offer/sell price 2721. The GUI 210 detects user 110 contact with any of the GUI 210 buttons which have been aforementioned. Upon user 110 contact or audio interface with buttons on the GUI 210, instructions are instantiated which allow the user 110 to change the specifications of the respective virtual hub combination 2711. A plurality of prices and markets may be presented based on a plurality of transformed agriculture community linked contract specifications. In some embodiments, the best bid/buy price 2718 may be moving up in price or down in price depending on the market conditions at any given time. In some embodiments the last trade or last transacted price for a given specification is listed to help the user 110 understand how the market is moving so that the user 110 may submit a competitive offer/selling price 2721 or bid/buying price 2718. In some embodiments, users 110 may adjust settings of the GUI 210 to show more bid/buying prices 2717 or more offer/selling prices 2720. In some embodiments the matrix of market quantities and prices 2713, 2714, 2715, 2716, 2717, 2718, 2719, 2720, 2721, 2724, 2725, 2726 may be referred to as market depth in the GUI 210 embodiment. In some embodiments, the number of users 110 may be displayed as user icons 2712 or 2723 for the amount of people logged in which desire to transact, trade or participate in a given virtual hub 2710 to virtual hub 2722 combination for agriculture community linked transportation or freight units. In some embodiments, users 110 may select the transportation mode 2730 such that the user 110 allows a market for only one form of transformed agriculture community linked transportation or freight capacity as a commodity or the user 110 may allow the system to show multiple forms of agriculture community linked transportation or freight capacity between two agriculture community linked virtual transportation capacity hubs 2710, 2711, 2722. In some embodiments, the GUI 210 may detect a user 110 selecting the 911 button 2729 which may activate voice and video recording functions on the mobile or stationary device and transmit the data with a confirmation from the user 110 to the authorities and system servers to provide enhanced security while participating, transacting, or trading forward transformed agriculture community linked transportation or freight as a commodity or security. In some embodiments the user may toggle between the GUI 210 market view screen in FIG. 27 and other menu 270 options and settings by the user 110 selecting the hamburger button 270 and the GUI 210 detecting the user 110 input or contact or audio instruction. In some embodiments, the GUI 210 may instantiate instructions in the memory of the mobile computing device, which then transmits transformed agriculture community linked transportation or freight capacity data through the network 226, 214 or wireless GPS network 215 to call upon instruction routines and instruction sub-routines on the agriculture community linked transportation forward market database server 271, virtual hub database server 223, network member database server 222, map routing servers, no arbitrage condition database server, and/or instructions in the memory of the cloud and local CPUs 290, which all interface together to make one system which may deliver agriculture community linked transportation capacity units to users 110 from and to a plurality of agriculture community linked virtual hubs 2710, 2722 with a plurality of specifications at specific market prices.

Figure 28:
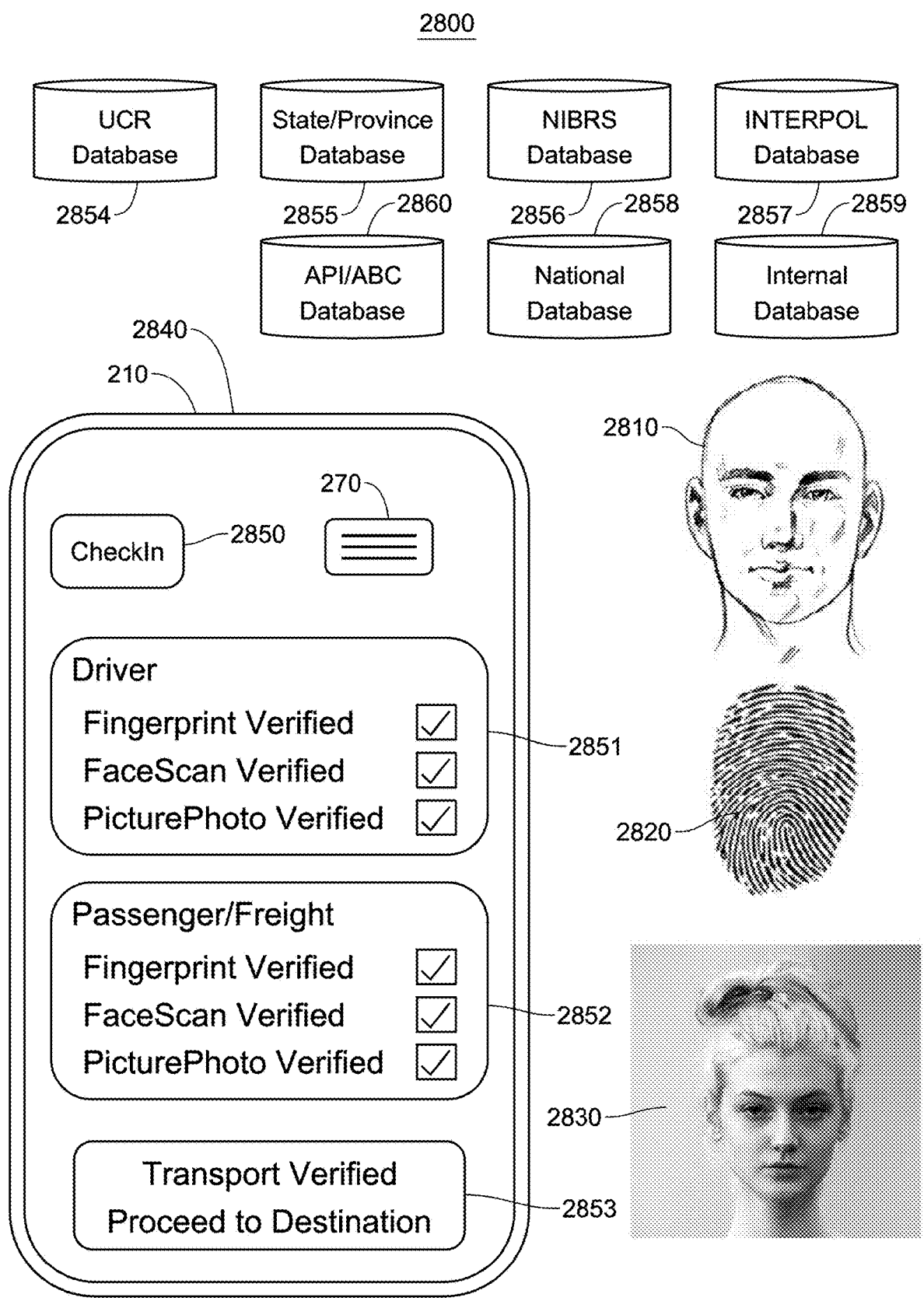
FIG. 28 illustrates an exemplary user interface and database configuration which allow user identity or criminal record or agriculture community linked transaction history to be verified in accordance with some embodiments.

FIG. 28 illustrates an exemplary check in and security database configuration 2800 for an agriculture community linked transportation or freight unit multi layered network node topology in one exemplary implementation of participating, transacting, and/or trading transformed agriculture community linked transportation or freight capacity units or securities in accordance with some embodiments. In some embodiments, the multi layered network node topology of participating, transacting and/or trading agriculture community linked transportation or freight capacity configuration 2800 includes the following security configuration elements, or a subset or superset thereof:

exemplary uniform crime reporting ("UCR") database 2854 from international agencies who report crime;

exemplary International State or Provincial crime reporting database 2855 from international governments who report crime;

exemplary International National Incident Based Reporting System ("NIBRS") crime reporting database 2856 from international governments who report crime;

exemplary Interpol crime reporting database 2857 from international governments who report crime which connects National Central Bureaus ("NCBs");

exemplary International application program interface and ABC ("API/ABC") crime reporting database 2860 from international governments who report crime;

exemplary national crime reporting database 2858 from international governments who report crime;

exemplary internal system crime reporting database 2859 from crimes which occurred on system;

exemplary facial scan to identify user 2810 against a plurality of crime databases;

exemplary fingerprint scan to identify user 2820 against a plurality of crime databases;

exemplary photo or photo scan to identify user 2830 against a plurality of crime databases;

exemplary voice scan to identify user against a plurality of crime databases;

exemplary Computing device unit GUI 210 to display method of multi layered network node topology for forward market of agriculture community linked transportation and freight units.

hamburger menu toggle 270 to move between different application configurations;

exemplary agriculture community linked Driver or Freight transport or freight or transport seller unit user interface 2851 to confirm identity verification against a plurality of crime databases;

exemplary agriculture community linked passenger unit or freight unit user interface 2852 to confirm identity verification against a plurality of crime databases;

exemplary handshake verification user interface 2853 to confirm both buyer and seller of agriculture community linked transportation or freight units were correctly verified against crime databases;

In some embodiments, a plurality of crime databases UCR Database 2854, State and Province Database 2855, NIBRS database 2856, INTERPOL database 2857, API/ABC database 2860, National database 2858, and Internal system database 2859 are used to confirm a user 110 does not have a criminal history in accordance with instructions on the method and system. In some embodiments, agriculture community linked transportation or freight unit security may be a subset or superset of the aforementioned in the formation of an open forward market auction for a multi layered network node topology for a forward market of agriculture community linked transportation and freight units. Such security checks are standard in airports, but they are not automated, and they are not utilized in other modes of transportation which degrades the overall safety of other transportation methods if they are not utilized. In some embodiments, the check in instructions may reject a user from confirmed verified transport if they fail the plurality of safety checks. In some embodiments, confirmed no crime history users 110 do not have activity reported in the plurality of crime databases, which may include the UCR Database 2854, State and Province Database 2855, NIBRS database 2856, INTERPOL database 2857, API/ABC database 2860, National database 2858, and Internal system database 2859, and are confirmed to agriculture community linked transport verified status 2853 in the system.

Figure 29:
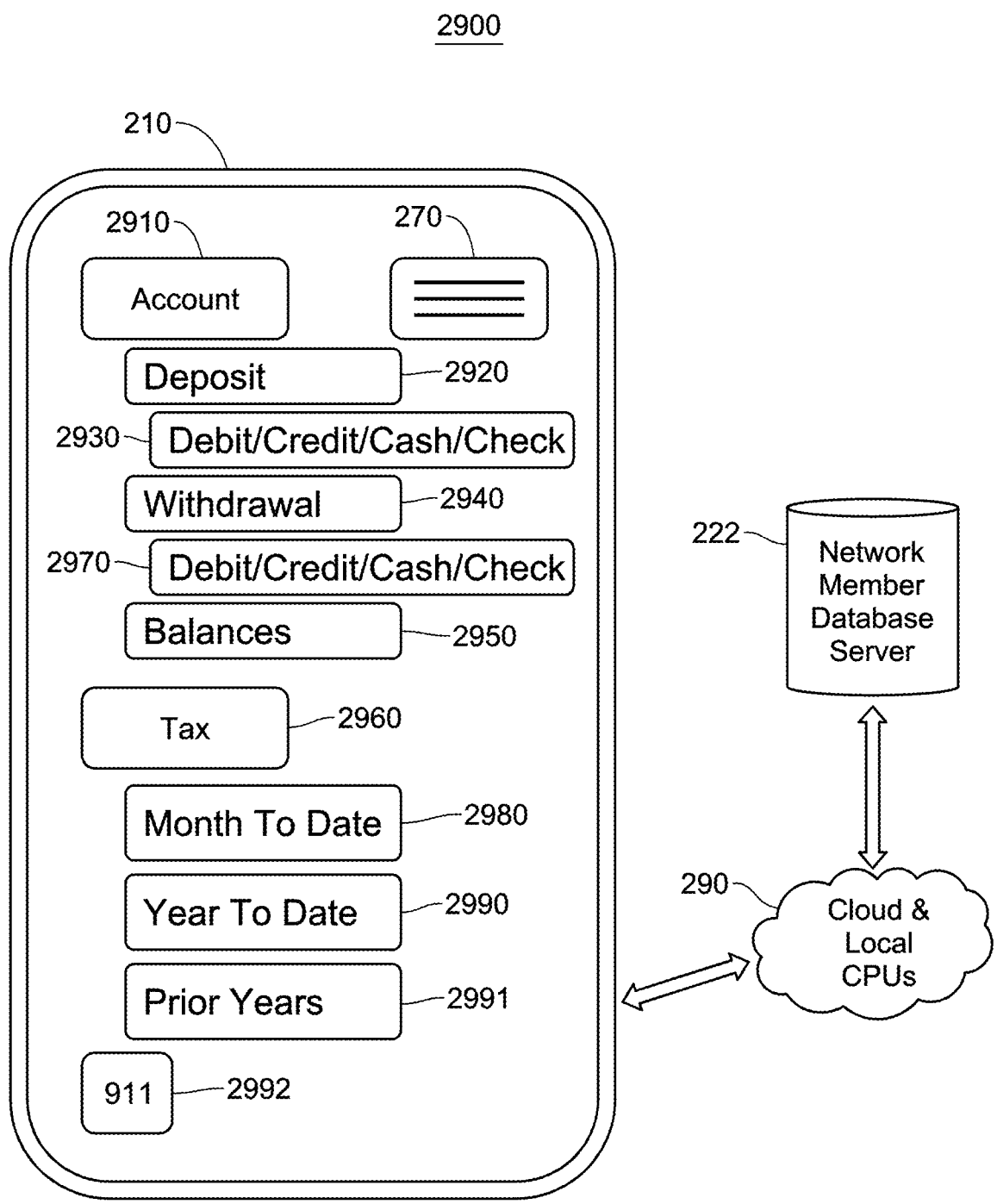
FIG. 29 illustrates an exemplary user interface and database configuration for account balances and payment for the forward market auctions of agriculture community linked transportation and freight capacity between virtual hubs in accordance with some embodiments.

FIG. 29 illustrates an exemplary user accounting configuration 2900 for a transformed agriculture community linked transportation or freight unit or security multi layered network node topology in one exemplary implementation of participating, transacting and/or trading transformed agriculture community linked transportation or freight capacity unit auctions in accordance with some embodiments. In some embodiments, the multi layered network node topology of participating, transacting and/or trading transformed agriculture community linked transportation or freight capacity configuration 2900 includes the following accounting elements, or a subset or superset thereof:

computing device unit GUI 210 to display method of multi layered network node topology for forward market of agriculture community linked transportation and freight units.

exemplary hamburger menu toggle 270 to move between different application configurations;

exemplary account button 2910 to edit or confirm user account data;

exemplary deposit button 2920 to add transaction funds or transaction currency or transaction balances to the user account;

exemplary deposit method button 2930 to add transaction funds or transaction currency or transaction balances to the user account through Debit, Credit, Cash, Check, virtual currency, digital currency, or a plurality of other payment methods;

exemplary withdrawal button 2940 to send transaction funds or transaction currency or transaction balances to the user account in a different institution;

exemplary withdrawal method button 2970 to send transaction funds or transaction currency or transaction balances to the user account at a different institution through Debit, Credit, Cash, Check, virtual currency, digital currency, or a plurality of other payment methods;

exemplary balances button 2950 to confirm user account balances;

exemplary tax button 2960 to track user account activity for taxation reporting;

exemplary month to date tax reporting button 2980;

exemplary year to date tax reporting button 2990;

exemplary prior year tax reporting button 2991;

exemplary "911" security button 2992;

exemplary Network Member Database Server 222;

exemplary cloud and CPU and Network configuration 290 to send and receive Network Member account data.

In some embodiments, user account 2910 data may be displayed with voice or screen or non-screen computing devices with instructions from the GUI 210 in accordance with instructions on the method and system. In some embodiments, user deposit 2920 data may be displayed with voice or screen or non-screen computing devices with instructions from the GUI 210 in accordance with instructions on the method and system. In some embodiments, user deposit method 2930 data such as Debit, Credit, Cash, Check, virtual currency, digital currency, or a plurality of other payment methods may be displayed with voice or screen or non-screen computing devices with instructions from the GUI 210 in accordance with instructions on the method and system. In some embodiments, user withdrawal 2940 data may be displayed with voice or screen or non-screen computing devices with instructions from the GUI 210 in accordance with instructions on the method and system. In some embodiments, user withdrawal method 2970 data such as Debit, Credit, Cash, Check, virtual currency, digital currency, or a plurality of other payment methods may be displayed with voice or screen or non-screen computing devices with instructions from the GUI 210 in accordance with instructions on the method and system to place money in the system account into a different institution specified by the user 110. In some embodiments, user balances 2950 data may be displayed with voice or screen or non-screen computing devices with instructions from the GUI 210 in accordance with instructions on the method and system. In some embodiments, user tax button 2960 data may be displayed with voice or screen or non-screen computing devices with instructions from the GUI 210 in accordance with instructions on the method and system. In some embodiments, user month to date tax data button 2980, year to date tax data button 2990, prior year tax data button 2991 may be displayed with voice or screen or non-screen computing devices with instructions from the GUI 210 in accordance with instructions on the method and system. In some embodiments, the accounting and tax information may be stored in the Network Member Database Server 222 and transmitted through the cloud, network, and CPUs 290 to the GUI computing device. In some embodiments, transportation or freight unit accounting and fund interfaces may be a subset or superset of the aforementioned in the formation of an open forward market price-time priority auction for a multi layered network node topology for a forward market of agriculture community linked transportation and freight units.

Figure 30:
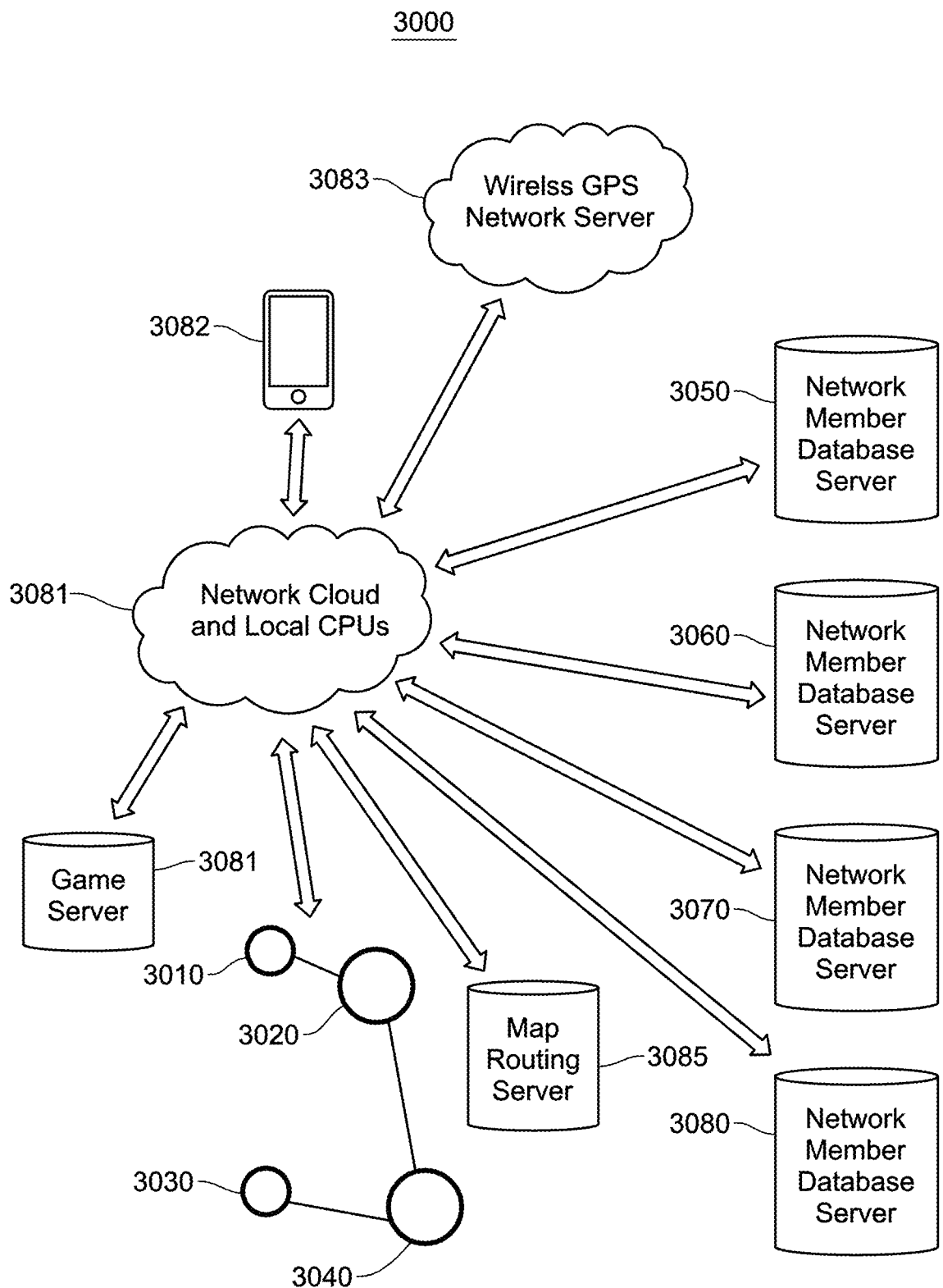
FIG. 30 illustrates an exemplary method and system configuration of multiple agriculture community linked virtual hub topology auctions in accordance with some embodiments.

FIG. 30 illustrates an exemplary network configuration 3000 for an agriculture community linked transportation or freight unit multi layered network node topology in one exemplary implementation of participating, transacting and/or trading transportation or freight capacity unit auctions in accordance with some embodiments. In some embodiments, the multi layered network node topology of participating, transacting and/or trading agriculture community linked transportation or freight capacity configuration 3000 includes the following accounting elements, or a subset or superset thereof:

exemplary wireless GPS Network and Server 3083;
exemplary wireless computing device that is audio, video, screen or non-screen interfaced 3082;
exemplary Network Member Database Server 3050;
exemplary agriculture community linked Transportation Forward Market Database Server 3060;
exemplary agriculture community linked No Arbitrage Condition Database Server 3070;
exemplary agriculture community linked Virtual Hub Database Server 3080;
exemplary Network, Network Cloud, and local CPUs 3081;

Exemplary Network Multi Layered Network Virtual Hub Node Topology for forward market agriculture community linked transportation of freight unit price-time priority auctions 3010, 3020, 3030, 3040.

In some embodiments, the network topology 3010 may utilize a voice or screen or non-screen computing device 3082 to interface with system and method instructions over a Network and Network Cloud and Networked CPUs 3081. The instructions on CPUs may be used to order a constrained or unconstrained virtual hub network topology auction over two or more virtual hub nodes 3010, 3020, 3030, 3040 over one or multiple modes of agriculture community linked transportation or freight with instructions and data from the Virtual Hub Database Server 3080, the No Arbitrage Condition Database Server 3070, the agriculture community linked Transportation Forward Market Database Server 3060, the Network Member Database Server 3050 and the Wireless GPS Network Server 3083. Network Data may be displayed with voice or screen or non-screen computing devices with instructions from the GUI 210 in accordance with instructions on the method and system.

Figure 31:
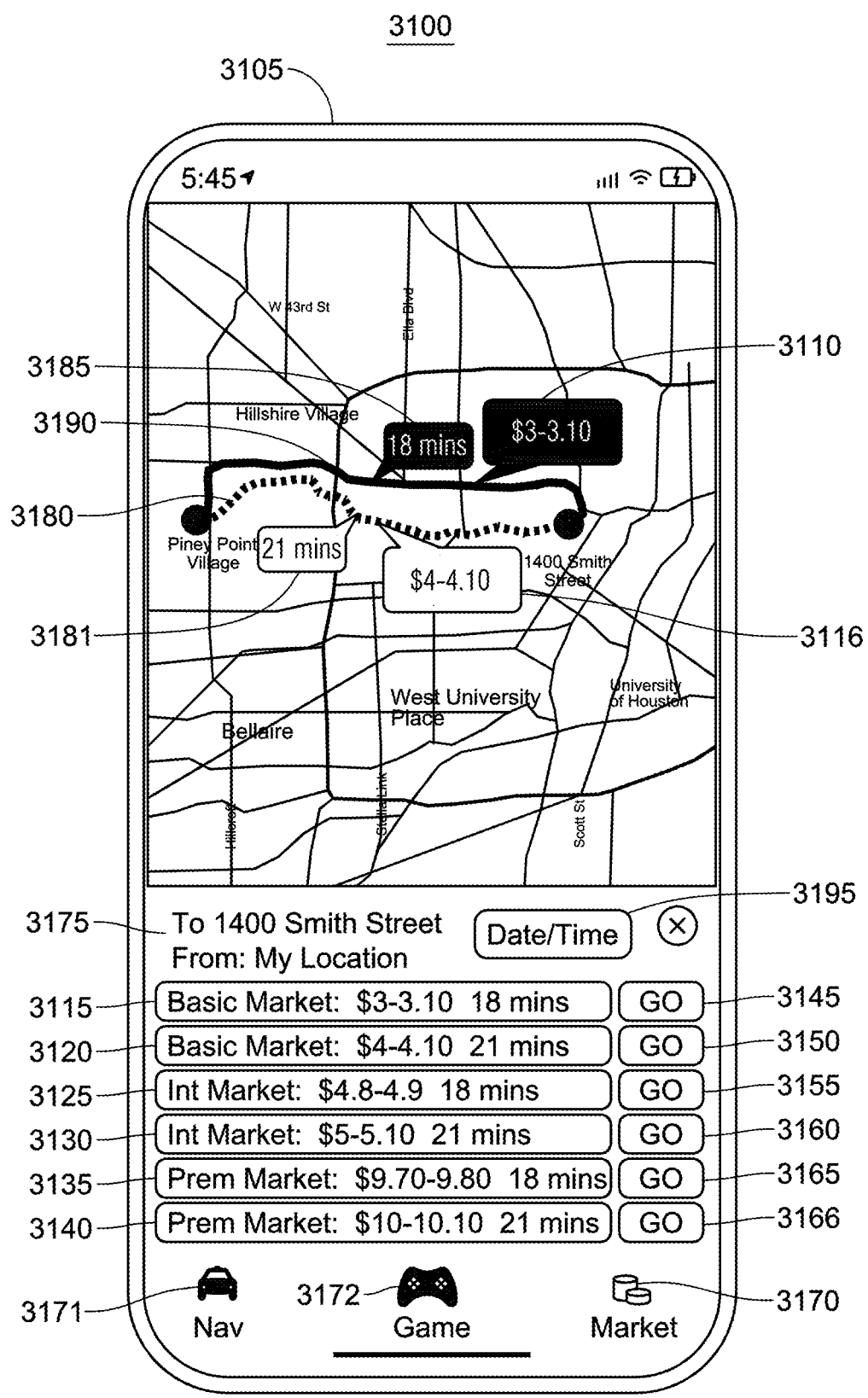
FIG. 31 illustrates an exemplary method and system configuration of the integration interface with GPS map agriculture community linked routing such as TomTom or Apple Maps or other third party map routing software applications.

FIG. 31 illustrates an exemplary network configuration 3100 integrating the disclosed method and system as an agriculture community linked layer on a traditional third party map software. In some embodiments, the multi layered network node topology of participating, transacting and/or trading transformed agriculture community linked transportation or freight capacity configuration 3100 includes the following accounting elements, or a subset or superset thereof:

exemplary computing device 3105;
exemplary route input by user 3175;
exemplary route node structure 3190 to satisfy user agriculture community linked route request 3175;
exemplary alternative route node structure 3180 to satisfy user agriculture community linked route request 3175 with associated time 3181;
exemplary time estimate 3185 for route 3190;
exemplary live auction price value 3110 for route 3190;
exemplary alternative live price-time priority queue auction price value 3116 for agriculture community linked route 3180;
exemplary navigation mode button 3171;
exemplary game mode button 3172;
exemplary date and time modification button 3195 for disclosed route 3175;
exemplary transformed forward agriculture community linked transportation unit price-time priority auction value and modification feed 3115 and selection GO 3145 button to transact the given route with a basic agriculture community linked transportation unit or security feature and characteristic for one route 3190 that satisfies the user route request 3175;
exemplary alternative transformed forward agriculture community linked transportation unit price-time priority auction value and modification feed 3120 and selection GO 3150 button to transact the given route with a basic agriculture community linked transportation unit or security feature and characteristic for one alternative route 3180 that satisfies the user route request 3175;
exemplary transformed forward agriculture community linked transportation unit auction value and modification feed 3125 and selection GO 3155 button to transact the given route with an intermediate agriculture community linked transportation unit or security feature and characteristic for one route 3190 that satisfies the user route request 3175;
exemplary alternative transformed forward agriculture community linked transportation unit auction value and modification feed 3130 and selection GO 3160 button to transact the given route with an intermediate agriculture community linked transportation unit or security feature and characteristic for one alternative route 3180 that satisfies the user route request 3175;
exemplary transformed forward agriculture community linked transportation unit auction value and modification feed 3135 and selection GO 3166 button to transact the given route with a premium agriculture community linked transportation unit or security feature and characteristic for one route 3190 that satisfies the user route request 3175;
exemplary alternative agriculture community linked transformed forward agriculture community linked transportation unit auction value and modification feed 3140 and selection GO 3165 button to transact the given route with a premium agriculture community linked transportation unit or security feature and characteristic for one alternative route 3180 that satisfies the user route request 3175;
exemplary market display feature 3170 as an overlay onto map routing for user requests 3175.

In some embodiments, map routing interfaces 3105 such as Apple Maps or TomTom or another third party, may integrate the disclosed method and system to display the transformed forward agriculture community linked transportation unit or security market auction price along a various route given various virtual hub topologies 1800 over the user 110 defined route request 3175. The computing device 3105 may disclose over visual, audio, or other communication methods the forward transformed agriculture community linked transportation unit auction price 3110 on a given route 3190. In yet other embodiments, the disclosed transportation unit transformation may communicate the forward transformed agriculture community linked transportation unit or security auction price 3116 of an alternative route 3180, such that a user may select either route 3190 or 3180 based on the disclosed method and system price 3110 or 3116, which was generated by instructions from a plurality of users between two virtual hubs on the user defined route 3175. The disclosed forward market agriculture community linked transportation unit auction may be communicated on an on demand basis representing the current time and day or on a forward basis by changing the Date/Time 3195 user interface button feature to represent the then current market pricing for future time intervals on a plurality of given routes 3190 and 3180 along the user requested virtual hub combination 3175. Agriculture community linked virtual hubs may represent the end points of a route defined by the user 3175 or agriculture community linked virtual hubs may represent points along a given route but not including the endpoints or agriculture community linked virtual hubs may represent points not along the agriculture community linked route the user defined 3175. Agriculture community linked virtual hub combinations transform transportation capacity units into a forward market which allow users of the method and system to transact in the physical market by either delivering transformed agriculture community linked transportation units as a driver of a vehicle or capacity holder or by receiving them as a passenger or package if the agriculture community linked unit is a package rather than a person. An agriculture community linked transportation unit or security represents space which may be filled by an agriculture community linked package or unit. Further, the forward transformed agriculture community linked transportation unit market price-time priority queue auction 3170 overlay may be a layer on traditional GPS map routing software or as an alternative to time based routing or mileage based routing. The forward agriculture community linked transportation unit market specification such as "Basic" 3115, 3120, "Intermediate" 3125, 3130, or "Premium" 3135, 3140 may also have a plurality of other characteristics or levels which form the basis of a fungible transformed contract or substitutable contract between users which is exchangeable with the same terms and conditions if one user is unable to fulfil their contract obligations for the transformed agriculture community linked transportation unit. In some embodiments, the navigation mode 3171 may move the user to turn by turn directions along the price based navigation agriculture community linked route 3190. In some embodiments, the game mode 3172 may move the user to a game based overlay on the price based navigation agriculture community linked route 3190. In some embodiments, the market mode 3170 may move the user to a market based overlay on the priced based navigation agriculture community linked route 3190.

The disclosed method and system of a transformed agriculture community linked transportation capacity unit may be fully functional as a layer in map routing software or as a standalone application.

In some embodiments, the disclosed method and system agriculture community linked transportation unit price-time priority queue auction price 3110 and 3116 has two prices or more in other embodiments. Two agriculture community linked route prices 3110 are disclosed at $3 and $3.10. The former price of $3 is the price where a user is willing to buy or pay for an agriculture community linked transportation unit along the given route 3190. The later price of $3.10 is the price at which a user is willing to sell an agriculture community linked transportation unit along the given route 3190. The instructions of the auction may match the highest bidding price of $3 with the lowest selling price in the price queue when the prices match. In other words, in the exemplary embodiment, if a user wanted to sell a transportation unit at the current forward market price-time priority auction queue 3110 on route 3190, the user would enter a price of $3 which is the current highest bidding price in the method and system queue 3110. By way of further example, another user may desire to buy an agriculture community linked transportation unit on the forward transformed agriculture community linked transportation unit auction method and system on route 3190, to match, the user would enter a price of $3.10 which is the lowest selling price of a seller on the forward market agriculture community linked transportation unit auction method and system.

Figure 32:
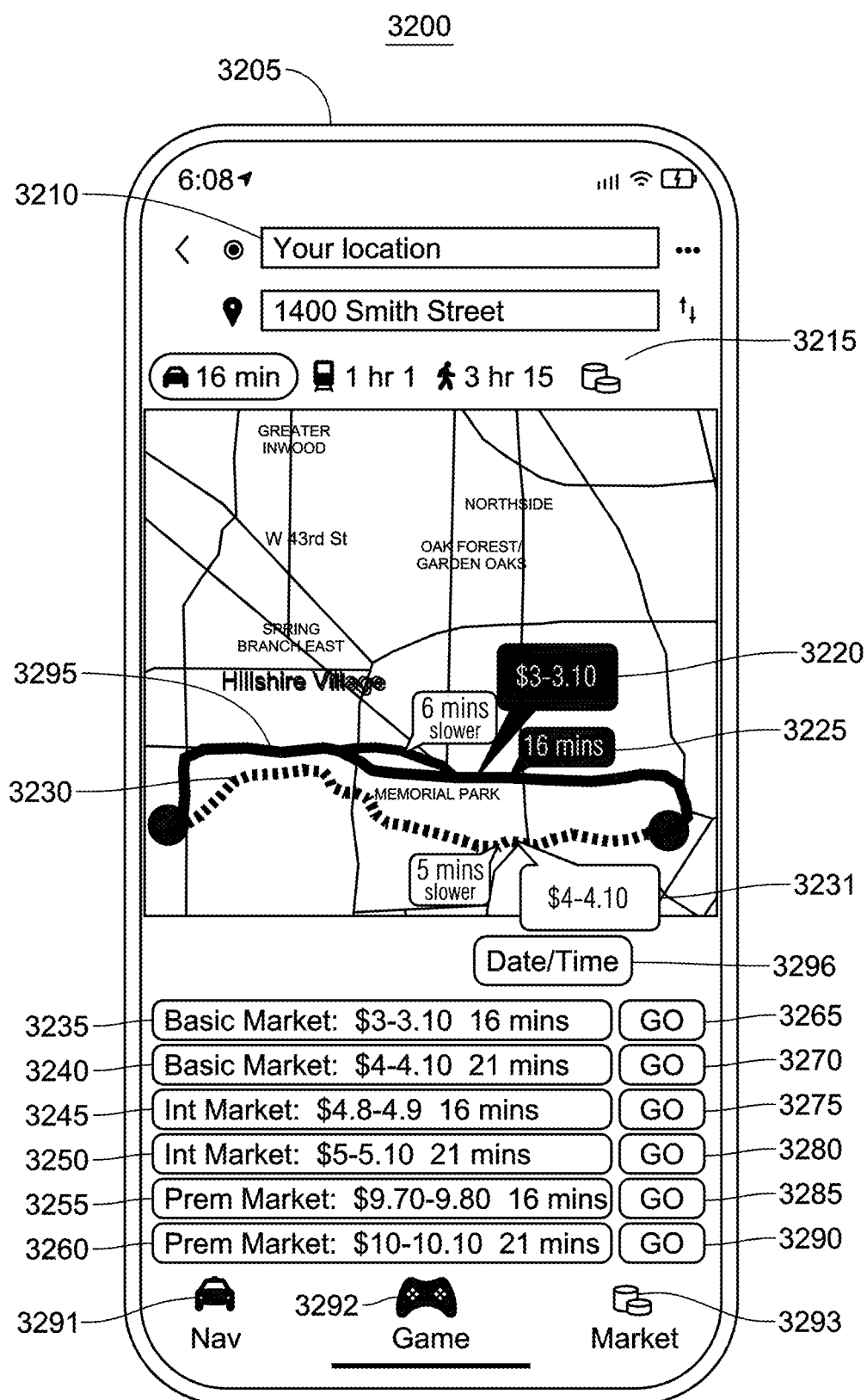
FIG. 32 illustrates an exemplary method and system configuration of the integration interface with GPS map agriculture community linked routing such as Google Maps or other third party map routing software applications.

FIG. 32 illustrates another exemplary network configuration 3200 integrating the disclosed method and system as an agriculture community linked layer on another traditional third party map software. In some embodiments, the multi layered network node topology of participating, transacting and/or trading agriculture community linked transportation or freight capacity configuration 3200 includes the following accounting elements, or a subset or superset thereof:

exemplary computing device 3205;
exemplary route input by user 3210;
exemplary agriculture community linked route node structure 3295 to satisfy user agriculture community linked route request 3210;
exemplary alternative agriculture community linked route node structure 3230 to satisfy user agriculture community linked route request 3210 with associated time;
exemplary time estimate 3225 for route 3295;
exemplary navigation mode button 3291;
exemplary game mode button 3292;
exemplary market mode button 3293;
exemplary live price-time priority queue auction price value 3220 for route 3295;
exemplary alternative live price-time priority auction price value 3231 for agriculture community linked route 3230;
exemplary date and time modification button 3296 for disclosed agriculture community linked route 3210;
exemplary transformed forward agriculture community linked transportation unit or security auction value and modification feed 3235 and selection GO 3265 button to transact the given route with a basic agriculture community linked transportation unit feature and characteristic for one route 3295 that satisfies the user route request 3210;
exemplary alternative transformed forward agriculture community linked transportation unit or security price-time priority auction value and modification feed 3240 and selection GO 3270 button to transact the given route with a basic agriculture community linked transportation unit feature and characteristic for one alternative route 3230 that satisfies the user route request 3210;
exemplary transformed forward agriculture community linked transportation unit or security auction value and modification feed 3245 and selection GO 3275 button to transact the given route with an intermediate agriculture community linked transportation unit feature and characteristic for one route 3295 that satisfies the user agriculture community linked route request 3210;
exemplary alternative transformed forward agriculture community linked transportation unit or security auction value and modification feed 3250 and selection GO 3280 button to transact the given route with an intermediate agriculture community linked transportation unit feature and characteristic for one alternative agriculture community linked route 3230 that satisfies the user agriculture community linked route request 3210;

exemplary transformed forward agriculture community linked transportation unit or security auction value and modification feed 3255 and selection GO 3285 button to transact the given route with a premium agriculture community linked transportation unit feature and characteristic for one agriculture community linked route 3295 that satisfies the user agriculture community linked route request 3210;

exemplary alternative transformed forward agriculture community linked transportation unit or security price-time priority auction value and modification feed 3260 and selection GO 3290 button to transact the given route with a premium transformed agriculture community linked transportation unit feature and characteristic for one alternative agriculture community linked route 3230 that satisfies the user agriculture community linked route request 3210;

exemplary market display feature 3215 as an overlay onto map agriculture community linked routing for user requests 3210.

In some embodiments, map routing interfaces 3205, such as Google Maps, Garmin or another third party navigation methods, may integrate the disclosed method and system to display the transformed forward agriculture community linked transportation unit or security market auction price along a various route given various virtual hub topologies 1800 over the user 110 defined route request 3210. The computing device 3205 may disclose over visual, audio, or other communication methods the forward transformed agriculture community linked transportation unit or security auction price 3220 on a given route 3295. In yet other embodiments, the disclosed agriculture community linked transportation unit transformation may communicate the forward transformed agriculture community linked transportation unit auction price 3231 of an alternative route 3230, such that a user may select either route 3295 or 3230 based on the disclosed method and system price 3231 or 3220, which was generated by instructions from a plurality of users between two agriculture community linked virtual hubs on the user defined agriculture community linked route 3210 and instructions to generate a price-time priority queue for buyers and sellers of agriculture community linked transportation units long given routes. In some embodiments, the user(s) 110 may alter the date 3296 such that the transformed agriculture community linked transportation unit or security may be updated with user 110 submitted prices 3235 for forward looking time periods. The disclosed forward market transformed agriculture community linked transportation unit or security price-time priority queue auction may be communicated on an on demand basis representing the current time and day or on a forward basis by changing the Date/Time 3296 user interface button feature to represent the then current market pricing for future time intervals on a plurality of given routes 3295 and 3230 along the user requested virtual hub combination 3210. Agriculture community linked virtual hubs may represent the end points of a route defined by the user 3210 or virtual hubs may represent points along a given route but not including the endpoints or agriculture community linked virtual hubs may represent points not along the route the user defined 3210. Agriculture community linked virtual hub combinations transform transportation capacity units or securities into a forward market which allow users of the method and system to transact in the physical market by either delivering transformed agriculture community linked transportation units as a driver of a vehicle or capacity holder or by receiving them as a passenger or package if the unit is a package rather than a person. A transformed agriculture community linked transportation unit represents space which may be filled by a person or a package. Further, the forward transformed agriculture community linked transportation unit market auction 3215 overlay may be a layer on traditional GPS map routing software as an alternative to time based routing. The forward agriculture community linked transportation unit market specification, such as "Basic" 3235, 3240, "Intermediate" 3245, 3250, or "Premium" 3255, 3260, may also have a plurality of other characteristics or levels which form the basis of a fungible contract or substitutable contract between users and which is exchangeable with the same terms and conditions if one user is unable to fulfil their contract obligations for the transformed agriculture community linked transportation unit. In some embodiments, the navigation mode 3291 may move the user to turn by turn directions along the price based navigation agriculture community linked route 3295. In some embodiments, the game mode 3292 may move the user to a game based overlay on the price based navigation agriculture community linked route 3295. In some embodiments, the market mode 3293 may move the user to a market based overlay on the priced based navigation agriculture community linked route 3295.

The disclosed method and system of a transformed agriculture community linked transportation capacity unit may be fully functional as a layer in map routing software or as a standalone application.

In some embodiments, the disclosed method and system transformed agriculture community linked transportation unit or security auction price 3220 and 3231 has two prices or more in other embodiments. Two route prices 3220 are disclosed at $3 and $3.10. The former price of $3 is the price where a user is willing to buy or pay for an agriculture community linked transportation unit along the given route 3295. The later price of $3.10 is the price at which a user is willing to sell an agriculture community linked transportation unit along the given route 3295. The instructions of the price-time priority auction may match the highest bidding price of $3 with the lowest selling price in the price queue when the prices match. In other words, in the exemplary embodiment, if a user wanted to sell an agriculture community linked transportation unit at the current forward market price-time auction queue 3220 on route 3295, the user would enter a price of $3 which is the current highest bidding price in the method and system queue 3220. By way of further example, another user may desire to buy a transformed agriculture community linked transportation unit on the forward transformed transportation unit or security auction method and system on route 3295, to match, the user would enter a price of $3.10 which is the lowest selling price of a seller on the forward market transformed agriculture community linked transportation unit price-time priority auction method and system.

Figure 33:
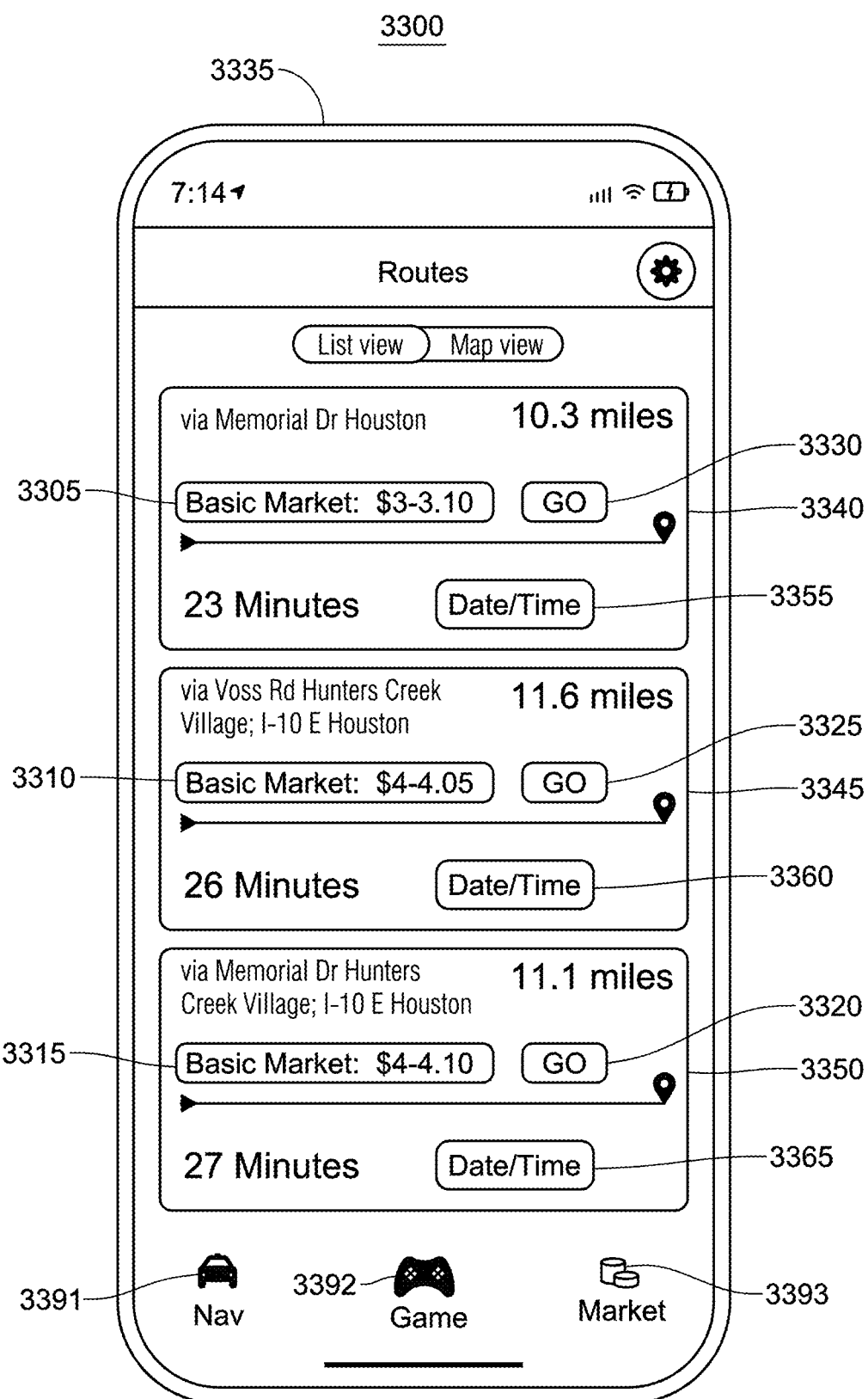
FIG. 33 illustrates an exemplary method and system configuration of the integration interface with GPS map agriculture community linked routing such as Waze Maps or other third party map routing software applications.

FIG. 33 illustrates another exemplary network configuration 3300 integrating the disclosed method and system as a layer on another traditional third party map software. In some embodiments, the multi layered network node topology of participating, transacting and/or trading agriculture community linked transportation or freight capacity configuration 3300 includes the following accounting elements, or a subset or superset thereof:

exemplary computing device 3335;
exemplary agriculture community linked route node structure 3340 to satisfy user route requests with associated time and price;
exemplary alternative agriculture community linked route node structure 3345 to satisfy user route request with associated time and price;
exemplary alternative route node structure 3350 to satisfy user route request with associated time and price;
exemplary live price-time priority auction queue price value 3305 for price based agriculture community linked route 3340;
exemplary navigation mode button 3391;
exemplary game mode button 3392;
exemplary market mode button 3393;
exemplary go 3330 button to transact or modify the price based agriculture community linked routing;
exemplary go 3325 button to transact or modify the price based agriculture community linked routing;
exemplary go 3320 button to transact or modify the price based agriculture community linked routing;
exemplary alternative live price-time priority auction price value 3310 for agriculture community linked route 3345;
exemplary alternative live price-time priority auction price value 3315 for agriculture community linked route 3350;
exemplary date and time modification button 3355 for disclosed agriculture community linked route 3340;
exemplary date and time modification button 3360 for disclosed agriculture community linked route 3345;
exemplary date and time modification button 3365 for disclosed agriculture community linked route 3350;

In some embodiments, map routing interfaces 3335, such as Waze Maps or another third party, may integrate the disclosed method and system to display the transformed forward transportation unit market price-time priority auction price along a various route given various virtual hub topologies 1800 over the user 110 defined route requests. The computing device 3335 may disclose over visual, audio, or other communication methods the forward transformed agriculture community linked transportation unit or security auction price 3305 on a given route 3340. In yet other embodiments, the disclosed transportation unit agriculture community linked transformation may communicate the forward transformed transportation unit auction price 3310 of an alternative route 3345 such that a user may select either route 3340, 3345, or 3350 based on the disclosed method and system price 3305, 3310, or 3315 which was generated by instructions from a plurality of users between two agriculture community linked virtual hubs on the user defined route and instructions to generate a price-time queue for buyers and sellers of agriculture community linked transportation units along given routes. The disclosed forward market transformed agriculture community linked transportation unit or security auction may be communicated on an on demand basis representing the current time and day or on a forward basis by changing the Date/Time 3355, 3360, 3365 user interface button feature to represent the then current market pricing for future time intervals on a plurality of given routes 3340, 3345, or 3350 along the user requested virtual hub combination. In some embodiments, the user(s) 110 may alter the date 3355 such that the transformed agriculture community linked transportation unit or security may be updated with user 110 submitted prices 3305 for forward looking time periods. Agriculture community linked virtual hubs may represent the end points of a route defined by the user or virtual hubs may represent points along a given route but not including the endpoints or agriculture community linked virtual hubs may represent points not along the route the user defined. Virtual hub combinations transform agriculture community linked transportation capacity units into a forward market which allow users of the method and system to transact in the physical market by either delivering agriculture community linked transportation units as a driver of a vehicle or capacity holder or by receiving them as a passenger or package if the unit is a package rather than a person. An agriculture community linked transportation unit represents space which may be filled by a person or a package. Further, the forward transportation unit market auction overlay may be a layer on traditional GPS map routing software or as an alternative to time based routing. The forward agriculture community linked transportation unit market specification, such as "Basic" 3305, may also have a plurality of other transformed characteristics or levels which form the basis of a fungible contract or substitutable contract specifications between users which is exchangeable with the same terms and conditions if one user is unable to fulfil their contract obligations for the transformed agriculture community linked transportation unit or security. In some embodiments, the navigation mode 3391 may move the user to turn by turn directions along the price based navigation agriculture community linked route 3350. In some embodiments, the game mode 3392 may move the user to a game based overlay on the price based navigation agriculture community linked route 3340. In some embodiments, the market mode 3393 may move the user to a market based overlay on the priced based navigation agriculture community linked route 3350.

The disclosed method and system of a transformed agriculture community linked transportation capacity unit may be fully functional as a layer in map routing software or as a standalone application.

In some embodiments, the disclosed method and system transportation unit price-time priority auction prices 3305, 3310, and 3315 each have two prices or more in other embodiments. Two route prices 3305 are disclosed at $3 and $3.10. The former price of $3 is the price where a user is willing to buy or pay for an agriculture community linked transportation unit along the given route 3340. The later price of $3.10 is the price at which a user is willing to sell an agriculture community linked transportation unit along the given route 3340. The instructions of the price-time priority auction may match the highest bidding price of $3 with the lowest selling price in the price queue when the prices match. In other words, in the exemplary embodiment, if a user wanted to sell a transportation unit at the current forward market auction queue 3305 on route 3340, the user would enter a price of $3 which is the current highest bidding price in the method and system queue 3305. By way of further example, another user may desire to buy an agriculture community linked transportation unit on the forward agriculture community linked transportation unit auction method and system on route 3340, to match, the user would enter a price of $3.10 which is the lowest selling price of a seller on the forward market agriculture community linked transportation unit price-time priority auction method and system.

Figure 34:
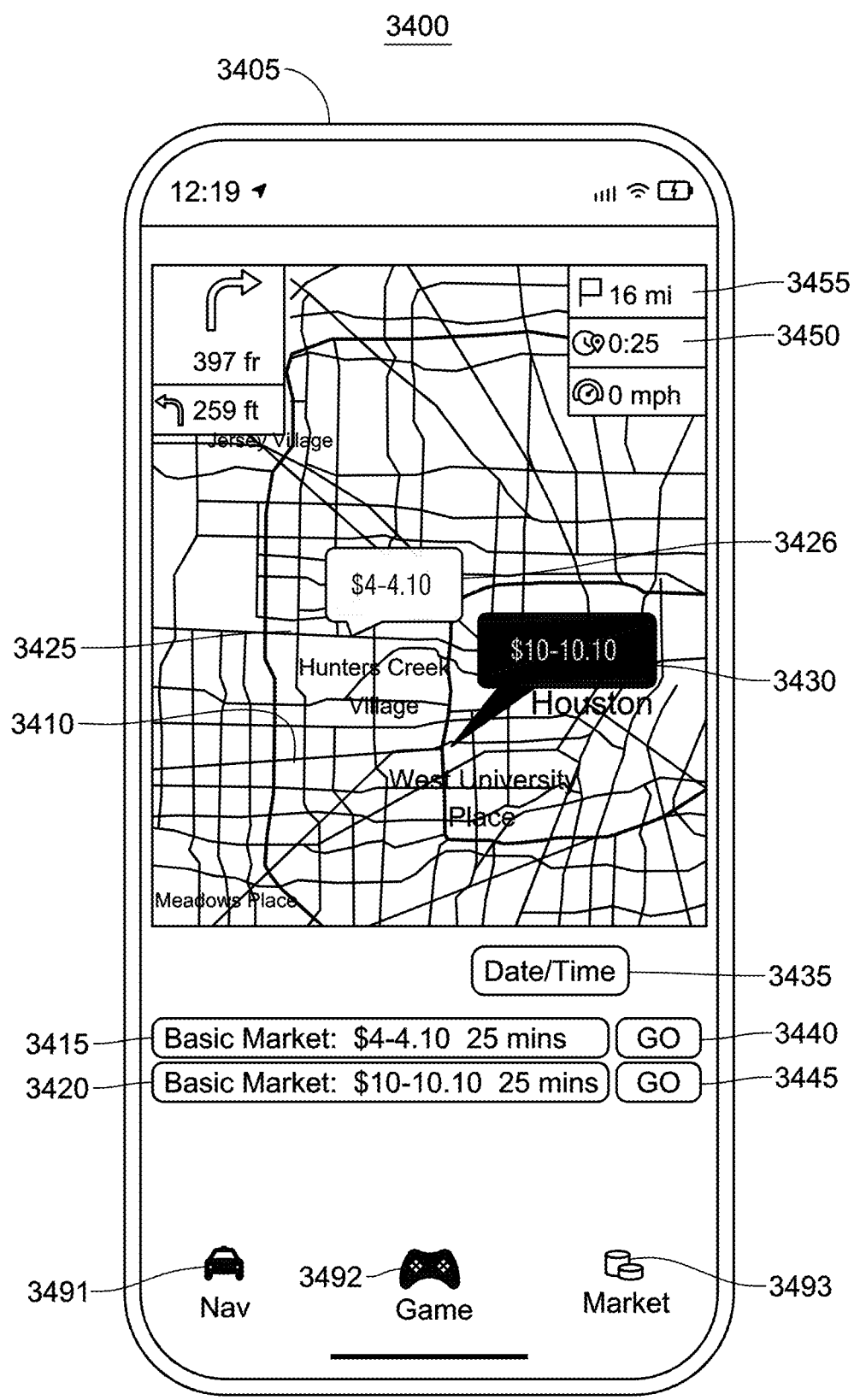
FIG. 34 illustrates an exemplary method and system configuration of the integration interface with GPS map agriculture community linked routing such as Open Street Maps or other third party map routing software applications.

FIG. 34 illustrates another exemplary network configuration 3400 integrating the disclosed method and system as a layer on another traditional third party map software. In some embodiments, the multi layered network node topology of participating, transacting and/or trading transformed agriculture community linked transportation or freight capacity unit or security configuration 3400 includes the following accounting elements, or a subset or superset thereof:

exemplary computing device 3405;
exemplary route 3410;
exemplary live price-time priority auction price value 3430 for agriculture community linked route 3410;
exemplary alternative live price-time priority auction price value 3426 for agriculture community linked route 3425;
exemplary navigation mode button 3491;
exemplary game mode button 3492;
exemplary market mode button 3493;
exemplary date and time modification button 3435 for disclosed agriculture community linked route 3410;
exemplary mileage estimate 3455 for disclosed route 3410;
exemplary route estimate 3450 for disclosed route 3410;
exemplary transformed forward transportation unit auction value and modification feed 3415 and selection GO 3440 button to transact the given route with a basic transportation unit or security feature and characteristic for one route 3425 that satisfies the user route request;
exemplary transformed forward agriculture community linked transportation unit or security auction value and modification feed 3420 and selection GO 3445 button to transact the given route with a premium agriculture community linked transportation unit feature and characteristic for one route 3410 that satisfies the user route request;

In some embodiments, the navigation mode 3491 may move the user to turn by turn directions along the price based navigation agriculture community linked route 3410. In some embodiments, the game mode 3492 may move the user to a game based overlay on the price based navigation route 3410. In some embodiments, the market mode 3493 may move the user to a market based overlay on the priced based navigation route 3410.

Figure 35:
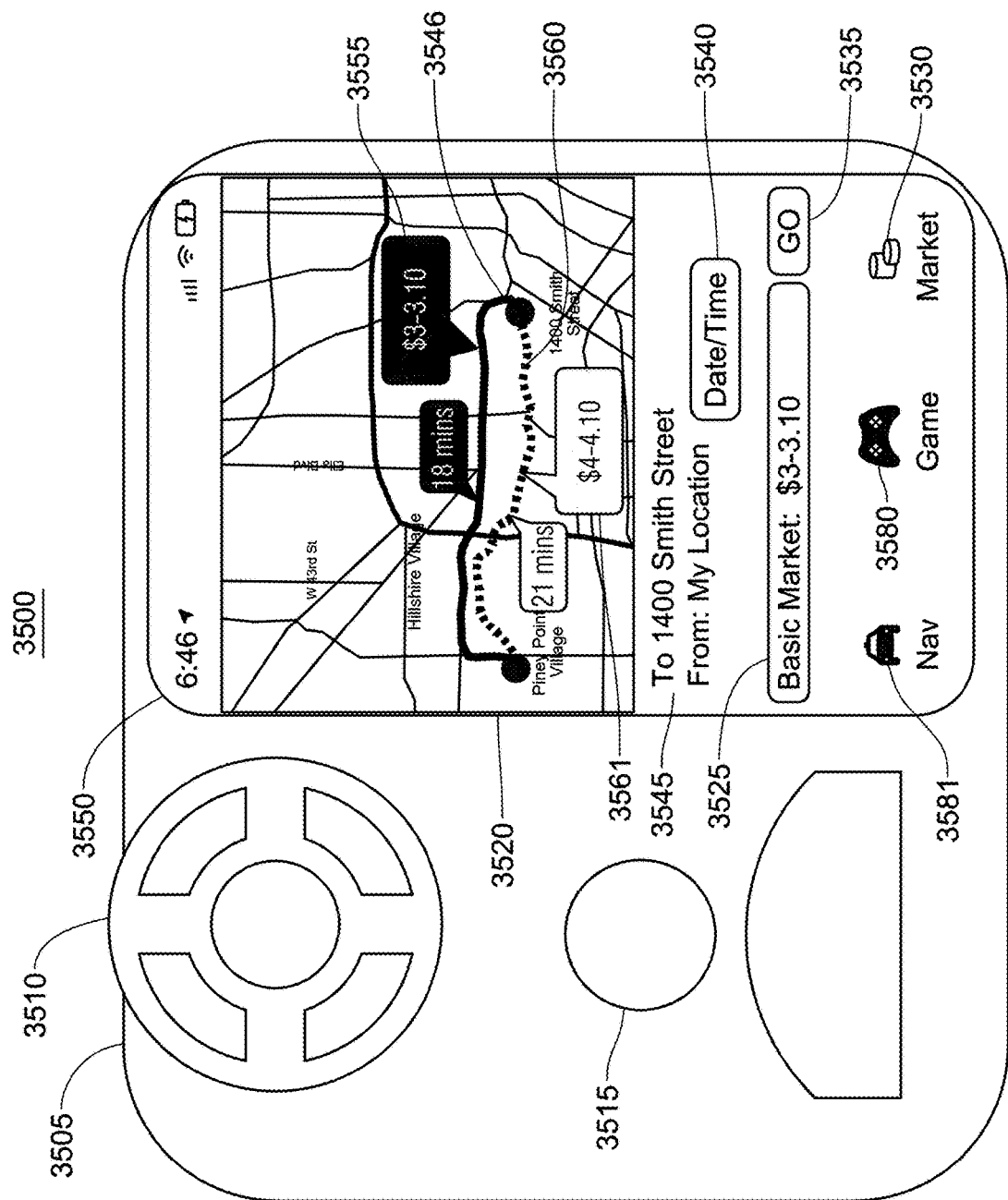
FIG. 35 illustrates an exemplary method and system configuration of the integration interface with GPS map routing in a vehicle such as Tesla, VW, Audi, Daimler, GM, Ford, Honda, Fiat, Nissan, Hyundai, Renault, Suzuki, BMW, Mazda, Dongfeng, Great Wall, Geely, BAIC, Tata, Toyota or any other third party map agriculture community linked routing software applications inside a vehicle.

FIG. 35 illustrates another exemplary network configuration 3500 integrating the disclosed method and system as a layer on another traditional third party map software in the setting of a vehicle GPS navigation system. In some embodiments, the multi layered network node topology of participating, transacting and/or trading agriculture community linked transportation or freight capacity configuration 3500 includes the following accounting elements, or a subset or superset thereof:

exemplary computing device 3550;
exemplary vehicle agriculture community linked transportation unit carrier unit 3505;
exemplary vehicle agriculture community linked transportation unit steering wheel 3510;
exemplary navigation mode button 3581;
exemplary game mode button 3580;
exemplary market mode button 3530;
exemplary user of agriculture community linked transportation unit as seller or driver 3515;
exemplary user route request address information 3545;
exemplary date and time modification button 3540 for disclosed route 3546;
exemplary transformed forward agriculture community linked transportation unit auction value and modification feed 3525 and selection GO 3535 button to transact the given route with a basic transportation unit feature and characteristic for one route 3546 that satisfies the user route request;
exemplary live price-time priority auction price value 3555 for price based agriculture community linked route 3546;
exemplary live price-time priority auction price value 3561 for price based alternative agriculture community linked route 3560;
exemplary market layer routing overlay 3530;

In some embodiments, the disclosed method and system transformed agriculture community linked transportation unit or security auction market layer may be in a vehicle unit GPS navigation system 3550. In some embodiments, the user 3515 may input driving address instructions 3545 that have an origin location and a destination location. In some embodiments, the user 3515 may communicate with the computing device 3550 through a touchscreen 3520 or and audio interface or another interface. In some embodiments the user 3515 may edit the date/time 3540 button to communicate the market price-time priority auction price based agriculture community linked route 3546 from on demand or current time to a forward time or date. Market price-time priority auction based pricing 3555 may vary by date and time due to a plurality of market factors. In some embodiments, the user 3515 may edit the market based auction price for the agriculture community linked transportation units by selecting the market feature button 3525. In some embodiments, the user 3515 may select a give agriculture community linked transportation unit auction price to transact by selecting the go button 3535. In some embodiments, the navigation mode 3581 may move the user to turn by turn directions along the price based navigation agriculture community linked route 3546. In some embodiments, the game mode 3580 may move the user to a game based overlay on the price based navigation route 3546. In some embodiments, the market mode 3530 may move the user to a market based overlay on the priced based navigation agriculture community linked route 3546.

In some embodiments, the disclosed method and system agriculture community linked transportation unit auction prices 3555 and 3561 each have two prices or more in other embodiments. Two route prices 3555 are disclosed at $3 and $3.10. The former price of $3 is the price where a user is willing to buy or pay for a transportation unit along the given route 3546. The later price of $3.10 is the price at which a user is willing to sell an agriculture community linked transportation unit along the given route 3546. The instructions of the auction may match the highest bidding price of $3 with the lowest selling price in the price queue when the prices match. In other words, in the exemplary embodiment, if a user 3515 wanted to sell an agriculture community linked transportation unit at the current forward market auction queue 3555 on route 3546, the user 3515 would enter a price of $3 which is the current highest bidding price in the method and system queue. By way of further example, another user may desire to buy an agriculture community linked transportation unit on the forward transformed agriculture community linked transportation unit or security auction method and system on route 3546, to match, the user would enter a price of $3.10 which is the lowest selling price of a seller on the forward market transformed agriculture community linked transportation unit or security auction method and system. In some embodiments, alternative agriculture community linked routes based on prices in alternative agriculture community linked transportation unit price-time priority auctions 3560 may have different prices based on supply and demand conditions. In some embodiments the market based routing layer 3530 serves as an alternative to time based routing or mileage based routing which are fundamentally different premises. In some embodiments, the overall software system 3505 and associated instructions may ask the user 3515 with visual or audio interface if they would like to monetize their routes upon starting any navigation sequence for transformed agriculture community linked transportation units or securities.

Figure 36:
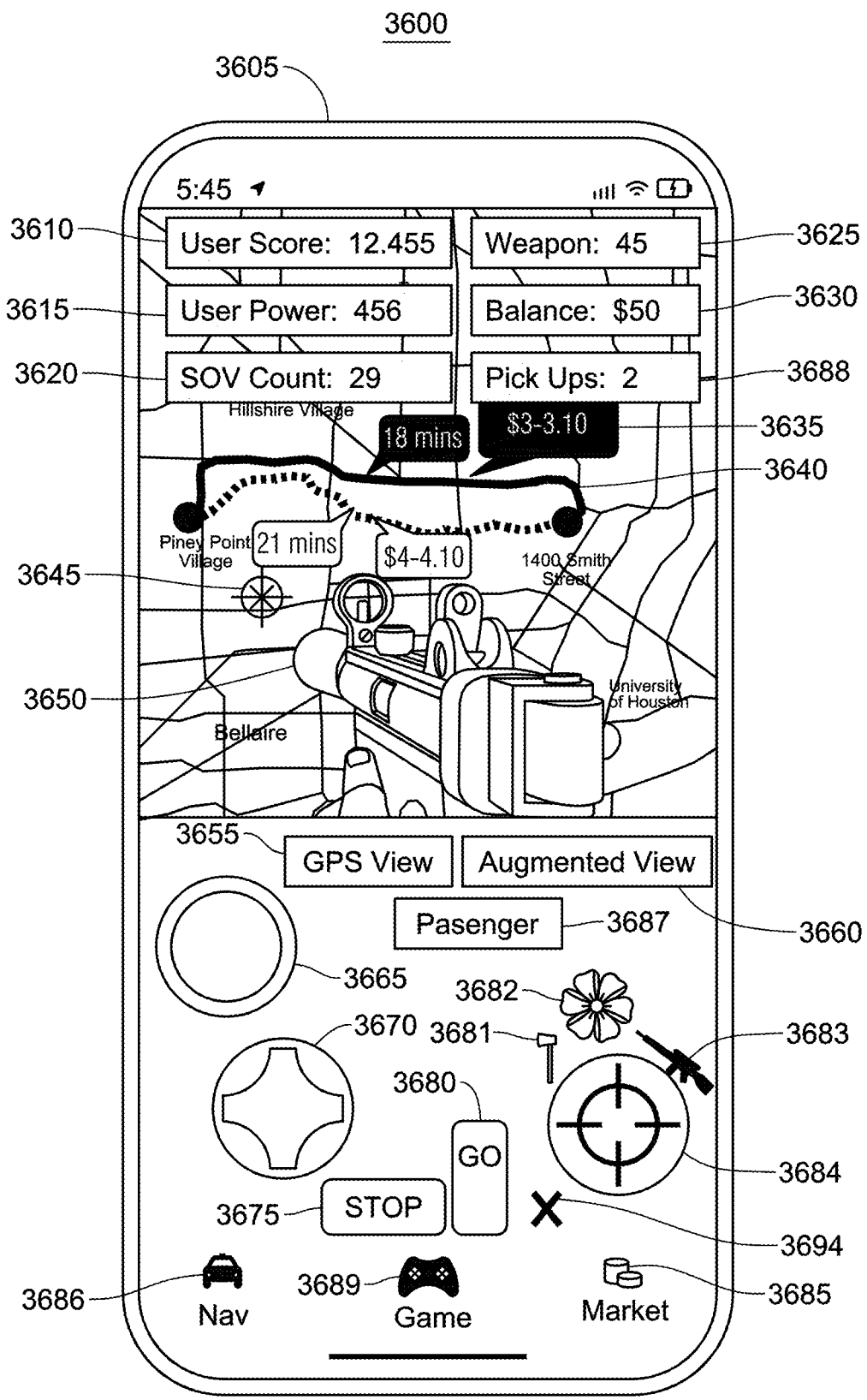
FIG. 36 illustrates an exemplary user interface and database configuration which allow the user to play a strategy based game overlay on the priced based navigation agriculture community linked route.

FIG. 36 illustrates another exemplary network configuration 3600 integrating the disclosed method and system as a game layer on another internal mapping system or traditional third party map system in the setting of a mobile computing device. In some embodiments, the multi layered network node topology of participating, transacting and/or trading transformed agriculture community linked transportation or freight capacity units or securities for price based navigation configuration 3600 includes the following accounting elements, or a subset or superset thereof:

exemplary computing device 3605;
exemplary game overlay user score 3610;
exemplary game overlay user power 3615;
exemplary game overlay SOV (single occupancy vehicle) count 3620;
exemplary game overlay weapon strength 3625;
exemplary game overlay account balance 3630;
exemplary game overlay passenger pick ups 3688;
exemplary game overlay Single Occupancy Vehicle target 3645;
exemplary game overlay Single Occupancy Vehicle weapon 3650;
exemplary game overlay GPS standard map view 3655;
exemplary game overlay augmented or mixed reality view 3660;
exemplary game overlay passenger mode 3687;
exemplary game overlay fire button 3665;
exemplary game overlay multi-purpose direction button 3670;
exemplary game overlay go button 3680;
exemplary game overlay stop button 3675;
exemplary navigation overlay button 3686;
exemplary game overlay button 3689;
exemplary market overlay button 3685;
exemplary market overlay weapon selection button 3683, 3682, 3681, 3694;
exemplary market overlay aim finder toggle 3684.

In some embodiments, the game overlay 3689 awards score and points for destroying the single occupancy vehicle, compute and distribute positive or negative agriculture community linked transportation unit game auction strategy points, power, or rewards 3630 based on any superset combination or subset combination of price 3635, route mileage, number of single occupancy vehicles destroyed or passed 3620, number of passengers 3688, route time estimates, agriculture community linked transportation unit route 3640, agriculture community linked transportation unit specifications, agriculture community linked transportation unit model type based on model type and age, agriculture community linked transportation unit make type, transportation unit age, matched transportation unit specification, matched transportation unit fuel type, matched agriculture community linked transportation unit emission specification, cumulative user agriculture community linked transportation unit specifications, transportation unit rating, transportation unit safety, transportation unit time, transportation unit delay, transportation unit driver rating, agriculture community linked transportation unit rider rating, and agriculture community linked transportation unit timeliness relative to contract specification.

In some embodiments, the game overlay 3689 may use a plurality of weapon or scoring configurations such as a rifle 3683, an axe 3681, a flower gift 3682, or a X logo 3694 to take away points or gain points from other users on the system. In some embodiments, the scoring may be independent of other players on the system, but dependent on the user's actions in the game overlay 3689. In some embodiments a selected weapon 3650 may be used to destroy single occupancy vehicles. In some embodiments the user may accelerate with the go button 3680 to avoid an attack or fire. In some embodiments the user may slow down or stop with the stop button 3675 to avoid enemy fire or attack. In some embodiments, the stop button 3675 may interface with an autonomous driving system of a vehicle to pick up passengers along a price based navigation agriculture community linked route to increase the score 3610 of the player and increase the balances 3630 by earning money on the system. In some embodiments user(s) may be identified by the X logo 3694 or by a person logo for a bidder on the priced based navigation agriculture community linked route 3640 to increase score and balances 3630. In some embodiments user(s) may scan navigation view 3655 or augmented reality view 3660 to look for single occupancy vehicle targets or X logo(s) 3694 or 3645 for users who are bidding on the price based navigation agriculture community linked route 3640.

In some embodiments, the strategy of the priced based navigation game overlay is to pick up as many passengers or bidders as possible along the price based navigation route 3640, destroy as many single occupancy vehicles as possible along the price based navigation route 3640, and to give flowers 3682 and rewards to transportation unit providers who have more than one person in the vehicle along the price based navigation route 3640. In some embodiments, user(s) may work independently or collectively in tribes to maximize user score in strategy.

Figure 37:
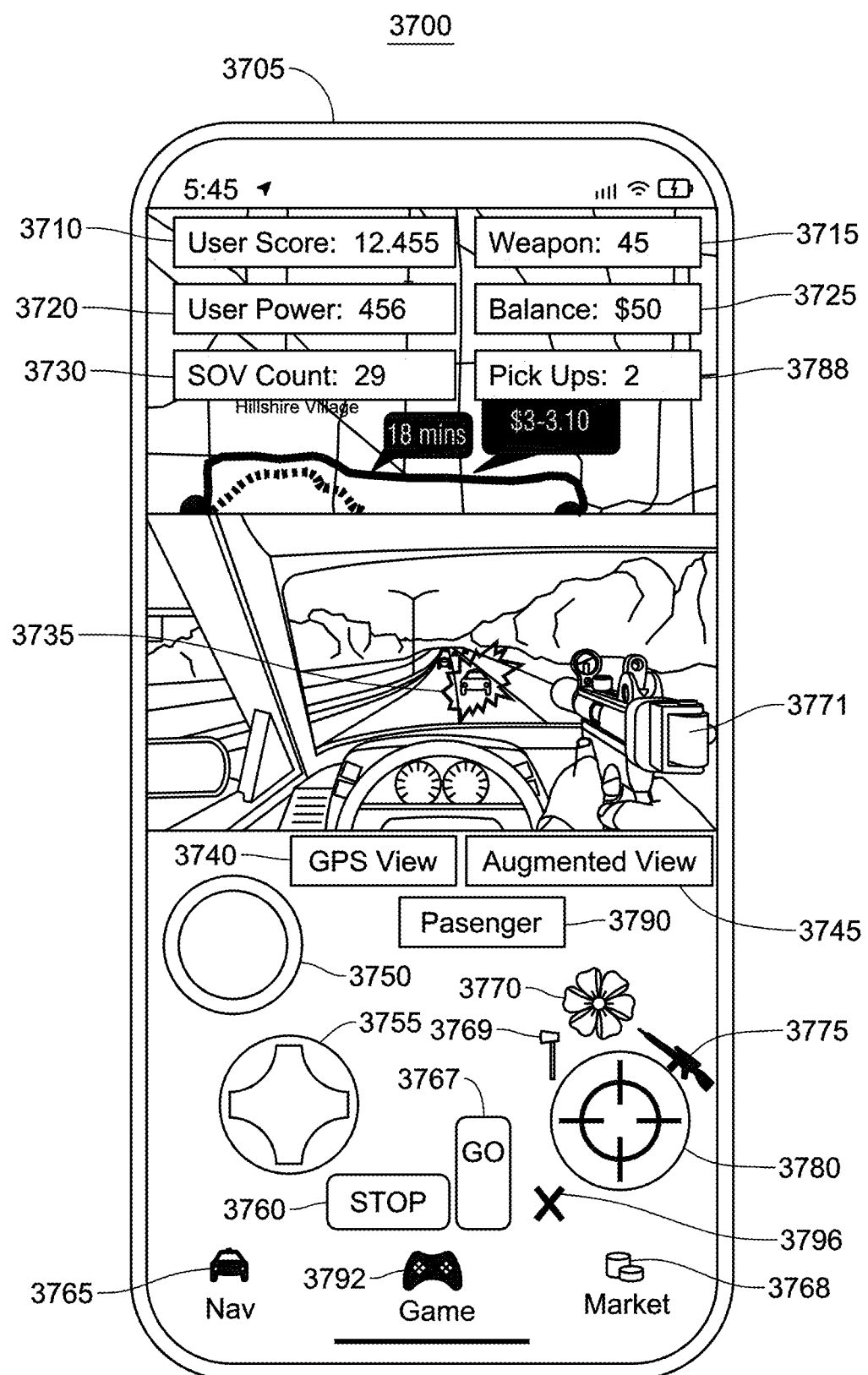
FIG. 37 illustrates an exemplary user interface and database configuration which allow the user to play a strategy based game overlay on the priced based navigation agriculture community linked route with augmented reality.

FIG. 37 illustrates another exemplary network configuration 3700 integrating the disclosed method and system as a game layer on another internal mapping navigation system or traditional third party navigation map system in the setting of a mobile computing device. In some embodiments, the multi layered network node topology of participating, transacting and/or trading agriculture community linked transportation or freight capacity for price based navigation agriculture community linked configuration 3700 includes the following accounting elements, or a subset or superset thereof:

exemplary computing device 3705;
exemplary game overlay user score 3710;
exemplary game overlay user power 3720;
exemplary game overlay SOV (single occupancy vehicle) count 3730;
exemplary game overlay weapon strength 3715;
exemplary game overlay account balance 3725;
exemplary game overlay passenger pick ups 3788;
exemplary game overlay Single Occupancy Vehicle target 3735;
exemplary game overlay Single Occupancy Vehicle weapon 3771;
exemplary game overlay GPS standard map view 3740;
exemplary game overlay augmented or mixed reality view 3745;
exemplary game overlay passenger mode 3790;
exemplary game overlay fire button 3750;
exemplary game overlay multi-purpose direction button 3755;
exemplary game overlay go button 3767;
exemplary game overlay stop button 3760;

exemplary navigation overlay button 3765;
exemplary game overlay button 3792;
exemplary market overlay button 3768;
exemplary market overlay weapon selection button 3775, 3770, 3769, 3796;
exemplary market overlay aim finder toggle 3780.

In some embodiments, the game overlay view of the price based navigation system may alert the user to a single occupancy vehicle 3735 which would then be a target for the user to use a weapon 3775, 3769 to destroy the single occupancy vehicle to increase user score 3710. In some embodiments, the user may identify a vehicle as having more than one passenger in the vehicle and therefore award or gift flowers 3770 to the vehicle or agriculture community linked transportation user in the price based navigation agriculture community linked game strategy. In some embodiments, the user may use a weapon 3775, 3769 against a single occupancy vehicle 3735, at which point the vehicle would explode and the passenger would be left without a vehicle in the augmented reality view 3745 or GPS view 3740. In some embodiments, the user may award flowers 3770 to a vehicle with more than one passenger to increase their score 3710 and add to the score of the user that has more than one passenger in their vehicle.

Figure 38:
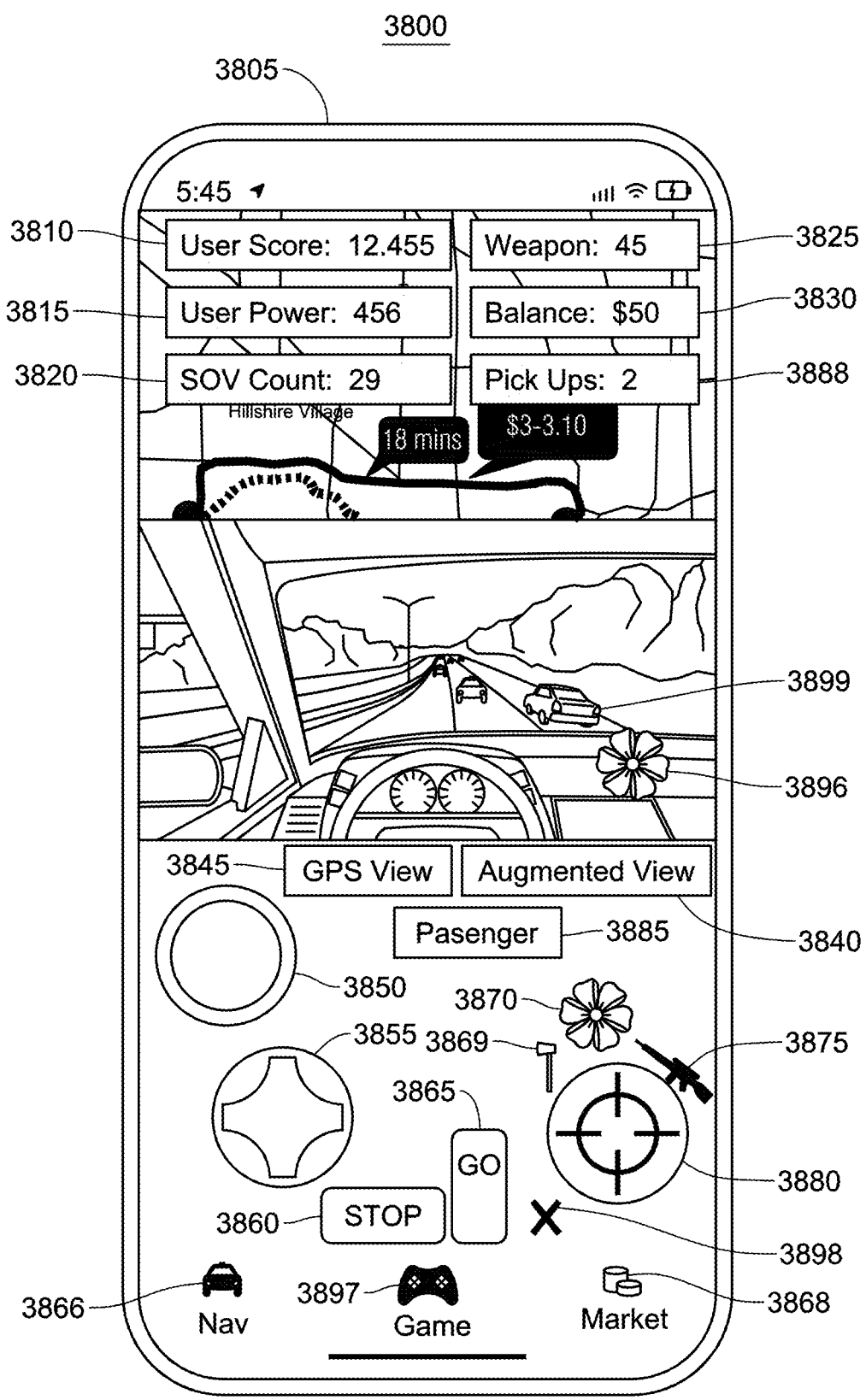
FIG. 38 illustrates an exemplary user interface and database configuration which allow the user to play a strategy based game overlay on the priced based navigation agriculture community linked route with augmented reality.

FIG. 38 illustrates another exemplary network configuration 3800 integrating the disclosed method and system as a game layer on another internal mapping navigation system or traditional third party navigation map system in the setting of a mobile computing device. In some embodiments, the multi layered network node topology of participating, transacting and/or trading agriculture community linked transportation or freight capacity for price based navigation configuration 3800 includes the following accounting elements, or a subset or superset thereof:
exemplary computing device 3805;
exemplary game overlay user score 3810;
exemplary game overlay user power 3815;
exemplary game overlay SOV (single occupancy vehicle) count 3820;
exemplary game overlay weapon strength 3825;
exemplary game overlay account balance 3830;
exemplary game overlay passenger pick ups 3888;
exemplary game overlay flower gift 3896;
exemplary game overlay GPS standard map view 3845;
exemplary game overlay augmented or mixed reality view 3840;
exemplary game overlay passenger mode 3885;
exemplary game overlay fire button 3850;
exemplary game overlay multi-purpose direction button 3855;
exemplary game overlay go button 3865;
exemplary game overlay stop button 3860;
exemplary navigation overlay button 3866;
exemplary game overlay button 3897;
exemplary market overlay button 3868;
exemplary market overlay weapon selection button 3869, 3870, 3875, 3898;
exemplary market overlay aim finder toggle 3880.

In some embodiments, the game overlay view of the price based navigation agriculture community linked system may alert the user to a vehicle with more than one passenger 3899 which would then be a way for the user to gift a flower to the other user 3899.

Figure 39:
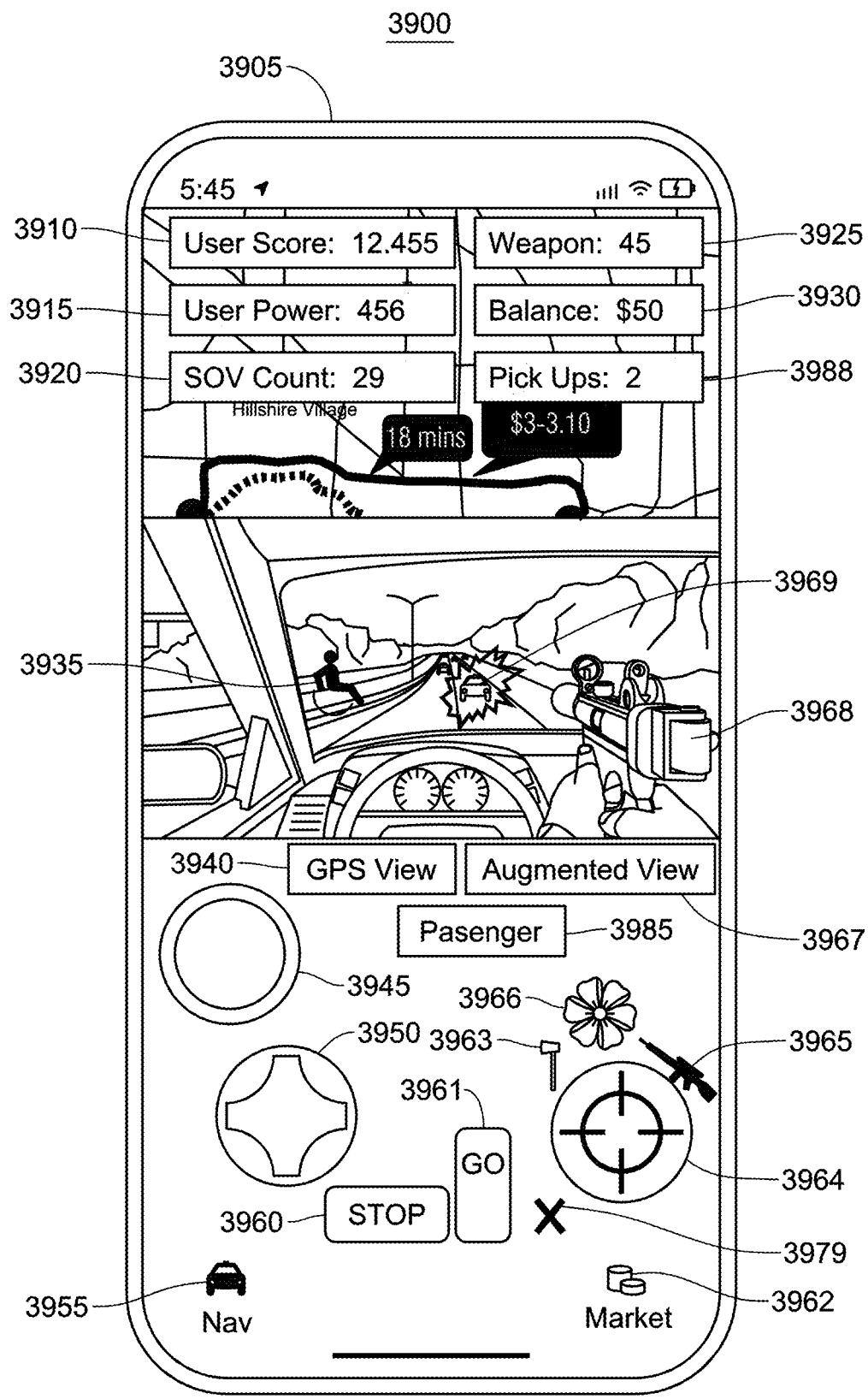
FIG. 39 illustrates an exemplary user interface and database configuration which allow the user to play a strategy based game overlay on the priced based navigation agriculture community linked route with augmented reality.

FIG. 39 illustrates another exemplary network configuration 3900 integrating the disclosed method and system as a game layer on another internal mapping navigation system or traditional third party navigation map system in the setting of a mobile computing device. In some embodiments, the multi layered network node topology of participating, transacting and/or trading agriculture community linked transportation or freight capacity for price based navigation configuration 3900 includes the following accounting elements, or a subset or superset thereof:
exemplary computing device 3905;
exemplary game overlay user score 3910;
exemplary game overlay user power 3915;
exemplary game overlay SOV (single occupancy vehicle) count 3920;
exemplary game overlay weapon strength 3925;
exemplary game overlay account balance 3930;
exemplary game overlay passenger pick ups 3988;
exemplary game overlay weapon 3968;
exemplary game overlay GPS standard map view 3940;
exemplary game overlay augmented or mixed reality view 3967;
exemplary game overlay passenger mode 3985;
exemplary game overlay fire button 3945;
exemplary game overlay multi-purpose direction button 3950;
exemplary game overlay go button 3961;
exemplary game overlay stop button 3960;
exemplary navigation overlay button 3955;
exemplary market overlay button 3962;
exemplary market overlay weapon selection button 3963, 3966, 3965, 3979;
exemplary market overlay aim finder toggle 3964;
exemplary user in augmented reality view who has had their single occupancy vehicle destroyed 3935.

In some embodiments, the game overlay view of the price based navigation agriculture community linked system may show a user who has had their single occupancy vehicle destroyed 3935 which increases the score 3910 of the user. In some embodiments, the user may target additional single occupancy vehicles 3969 to destroy along the priced based navigation route.

FIG. 40 illustrates another exemplary network configuration module 4000 of the disclosed method and system which records the vehicle specifications for a given user on the system in the setting of a mobile computing device 4010. In some embodiments, the multi layered network node topology of participating, transacting and/or trading transformed agriculture community linked transportation or freight capacity units or securities for price based navigation configuration 4000 includes the following elements, or a subset or superset thereof:
exemplary computing device 4010;
exemplary transportation unit model make 4015;
exemplary transportation unit model type 4025;
exemplary transportation unit model year 4035;
exemplary system menu toggle box 4051;
exemplary agriculture community linked transportation unit model fuel type 4045;
exemplary agriculture community linked transportation unit model make selection box toggle 4020;
exemplary agriculture community linked transportation unit model type selection box toggle 4030;
exemplary agriculture community linked transportation unit model year selection box toggle 4040;
exemplary agriculture community linked transportation unit model fuel type selection box toggle 4050;

In some embodiments, the disclosed method and system may allow the user to select the model make such as by example an Acura 4020 as a model make 4015. In some embodiments, the user may select an unlimited variety of vehicle types in the method and system, not limiting the system to those vehicle make 4015 or model 4025 types in FIG. 40. In some embodiments, the user may configure the system for the agriculture community linked transportation unit specification model year 4035, the model fuel type 4045, or a plurality of other vehicle specifications for the purpose of recording specification for the priced based navigation agriculture community linked system. In some embodiments, the data transformation of the transformed agriculture community linked transportation unit or security links the attributes, supersets, or subsets of the model make 4015, model type 4025, model year 4035, model fuel type 4045, or a plurality of other vehicle features to create specification pools as a feature in the data transformations for the transformed transportation units or securities. In some embodiments, the combinations of similar vehicle model make 4015, model type 4025, model year 4035, model fuel type 4045 and plurality of other vehicle attributes are fungible or substitutable in the method of the transformed agriculture community linked transportation unit or security. To avoid confusion, and to provide further example, but not limited by the example, bus, subway, train, air, private automobile, or other transformed agriculture community linked transportation units or securities may be substitutable under broad specifications of the transformed transportation or security pool, provided that the broad transformed specifications are met for delivery within the transformed agriculture community linked transportation unit or security pool.

Figure 41:
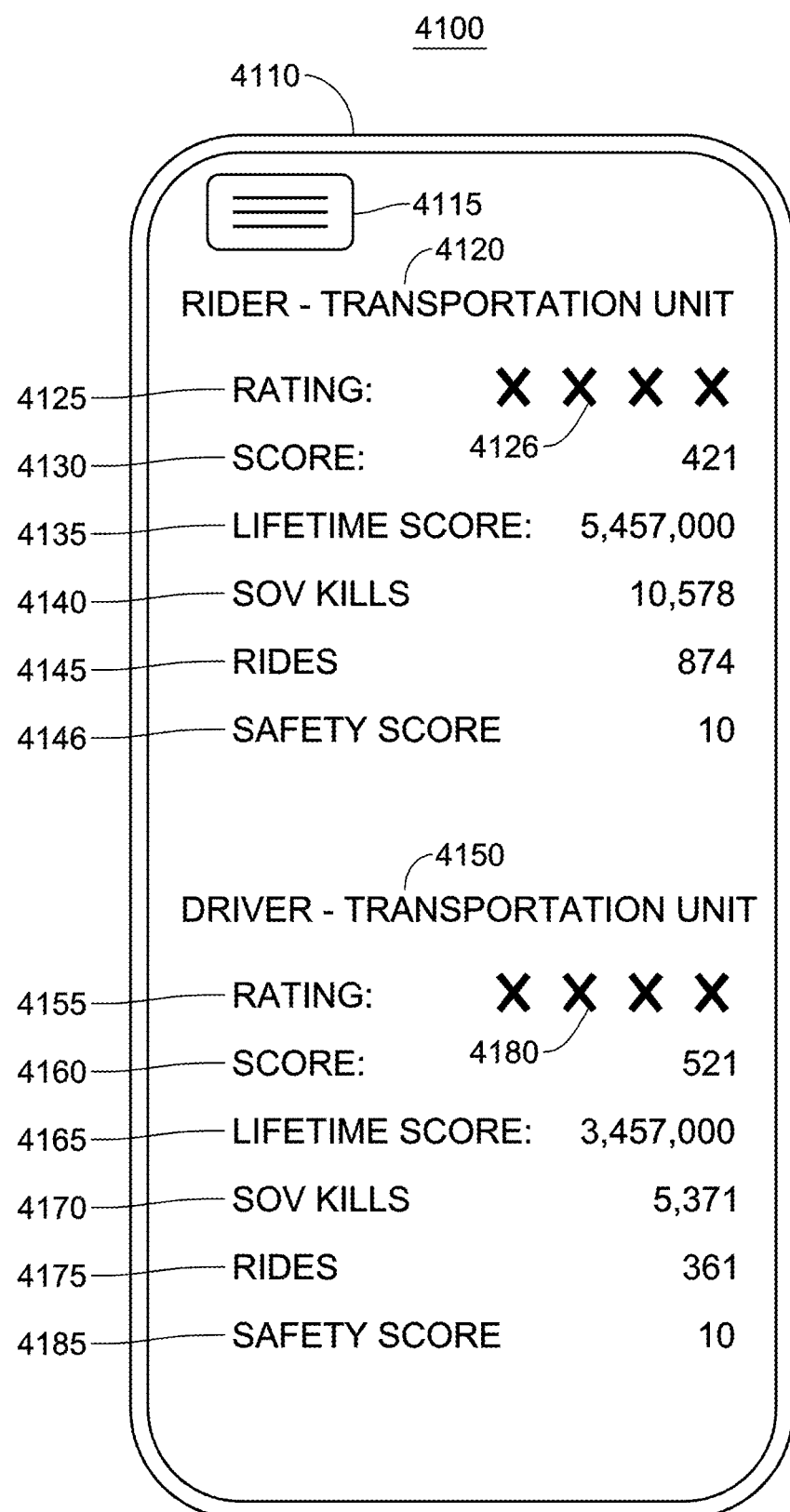
FIG. 41 illustrates an exemplary user interface and database configuration which displays a plurality of metrics for the performance of the user in the game overlay and general system and method of agriculture community linked priced based navigation.

FIG. 41 illustrates another exemplary network configuration module 4100 of the disclosed method and system which records the rider or driver agriculture community linked transportation unit specification ratings for a given user on the system in the setting of a mobile computing device 4110. In some embodiments, the multi layered network node topology of participating, transacting and/or trading agriculture community linked transportation or freight capacity for price based navigation configuration 4100 includes the following elements, or a subset or superset thereof:

exemplary menu toggle box 4115;
exemplary rider agriculture community linked transportation unit rating category summary 4120;
exemplary rider agriculture community linked transportation unit rating summary 4125;
exemplary rider agriculture community linked transportation unit rating X logo amount 4126;
exemplary rider agriculture community linked transportation unit rating score for navigation route 4130;
exemplary rider agriculture community linked transportation unit rating lifetime score 4135;
exemplary rider agriculture community linked transportation unit SOV kills 4140;
exemplary rider agriculture community linked transportation unit ride count 4145;
exemplary rider agriculture community linked transportation unit ride safety score 4146;
exemplary driver agriculture community linked transportation unit rating category summary 4150;
exemplary driver agriculture community linked transportation unit rating summary 4155;
exemplary driver agriculture community linked transportation unit rating X logo amount 4180;
exemplary driver agriculture community linked transportation unit rating score for navigation route 4160;
exemplary driver agriculture community linked transportation unit rating lifetime score 4165;
exemplary driver agriculture community linked transportation unit SOV kills 4170;
exemplary driver agriculture community linked transportation unit ride count 4175;
exemplary driver agriculture community linked transportation unit ride safety score 4185;

In some embodiments the price based navigation agriculture community linked system game overlay layer uses a plurality of the aforementioned combinations to account for user actions in the game overlay of the disclosed method and system.

Figure 42:
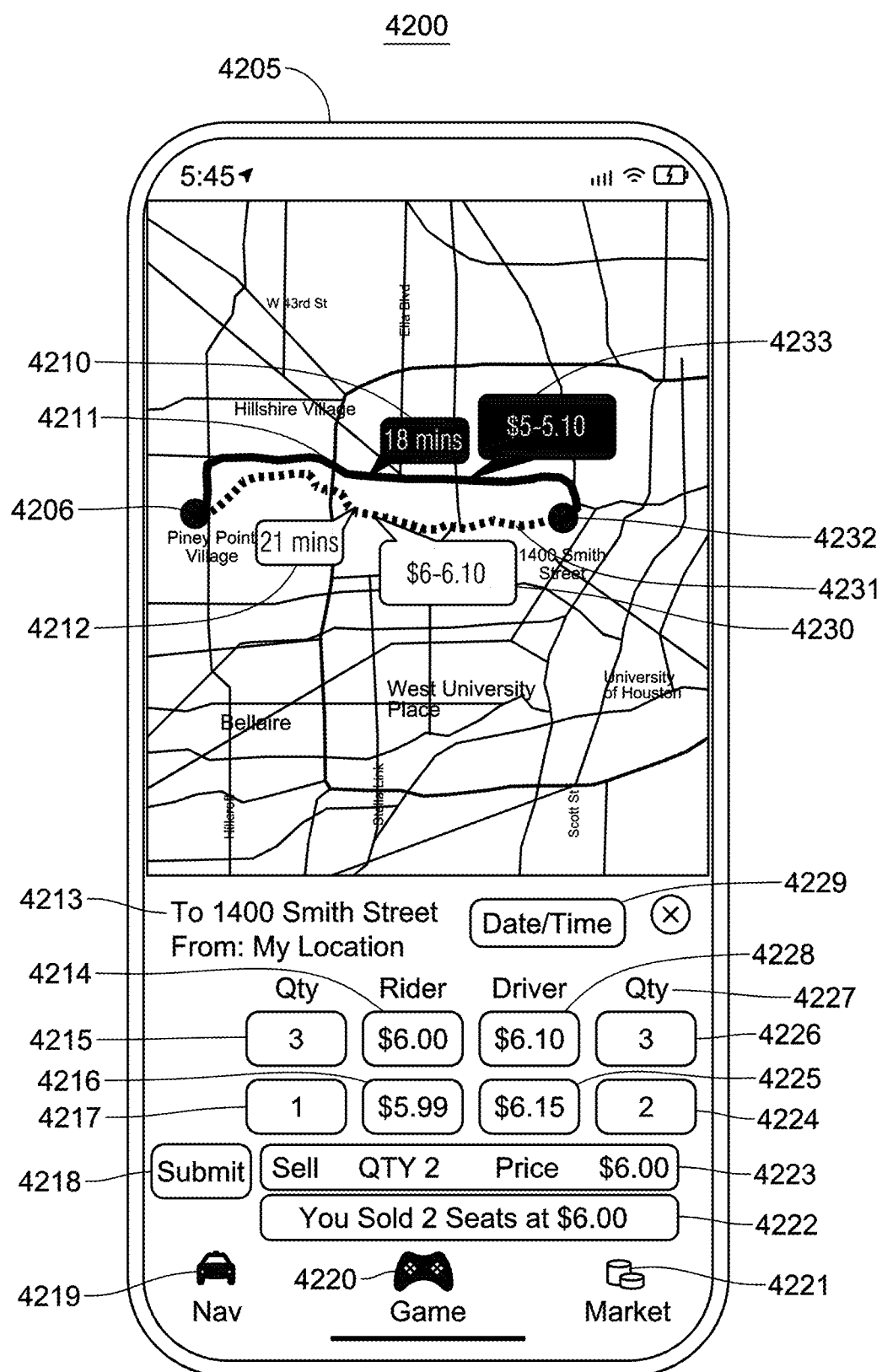
FIG. 42 illustrates an exemplary user interface and database configuration which displays a plurality of agriculture community linked routes between two user requested hubs indexed based on the pricing of agriculture community linked transportation units or agriculture community linked transportation unit securities and the associated open market transaction interface for those transformed agriculture community linked transportation unit securities.

FIG. 42 illustrates another exemplary network configuration module 4200 of the disclosed method and system which records the rider or driver transformed agriculture community linked transportation unit or security specification and market framework for the transformation for a specified plurality of routes. In some embodiments, the multi layered network node topology of participating, transacting and/or trading transformed agriculture community linked transportation or freight capacity units or securities for price based navigation configuration 4200 includes the following elements, or a subset or superset thereof:

exemplary computing device to display the method or system 4205;
exemplary estimated time of a primary indexed price based navigation route of a transformed agriculture community linked transportation unit or security 4120;
exemplary market price of a buyer and seller of primary price based navigation route of a transformed agriculture community linked transportation unit or security 4233;
exemplary price based navigation route of a primary transformed agriculture community linked transportation unit or security 4211;
exemplary estimated time of a secondary indexed price based navigation agriculture community linked route of a transformed agriculture community linked transportation unit or security 4212;
exemplary market price of a buyer and seller of secondary price based navigation route of a transformed transportation unit or security 4230;
exemplary starting point virtual hub of an indexed price based navigation agriculture community linked route of a transformed agriculture community linked transportation unit or security 4206;
exemplary ending point virtual hub of an indexed price based navigation agriculture community linked route of a transformed agriculture community linked transportation unit or security 4232;
exemplary ending point and starting point address of virtual hub(s) of an indexed price based navigation agriculture community linked route of a transformed agriculture community linked transportation unit or security 4213;
exemplary date and time specification of an indexed price based navigation agriculture community linked route of a transformed agriculture community linked transportation unit or security 4229;
exemplary number or quantity of transformed agriculture community linked transportation units or securities that are bidding or buying for purchase by riders of a secondary indexed price based navigation route of a transformed agriculture community linked transportation unit or security which is first in the rider queue indexed by highest price 4215;
exemplary price of transformed agriculture community linked transportation units or securities that are bidding or buying for purchase by riders of a secondary indexed price based navigation route of a transformed agriculture community linked transportation unit or security which is first in the rider queue indexed by highest price 4214;

exemplary price of transformed agriculture community linked transportation units or securities that are bidding or buying for purchase by riders of a secondary indexed price based navigation route of a transformed agriculture community linked transportation unit or security which is second in the rider queue indexed by second highest price 4216;

exemplary number or quantity of transformed agriculture community linked transportation units or securities that are bidding or buying for purchase by riders of a secondary indexed price based navigation route of a transformed agriculture community linked transportation unit or security which is second in the rider queue indexed by second highest price 4217;

exemplary number or quantity of transformed agriculture community linked transportation units or securities that are offering or selling by drivers of a secondary indexed price based navigation route of a transformed agriculture community linked transportation unit or security which is first in the driver queue indexed by lowest price 4226;

exemplary price of transformed agriculture community linked transportation units or securities that are offering or selling by drivers of a secondary indexed price based navigation route of a transformed agriculture community linked transportation unit or security which is first in the driver queue indexed by lowest price 4228;

exemplary number or quantity of transformed agriculture community linked transportation units or securities that are offering or selling by drivers of a secondary indexed price based navigation route of a transformed agriculture community linked transportation unit or security which is second in the driver queue indexed by second lowest price 4224;

exemplary price of transformed agriculture community linked transportation units or securities that are offering or selling by drivers of a secondary indexed price based navigation route of a transformed agriculture community linked transportation unit or security which is second in the driver queue indexed by second lowest price 4225;

exemplary order entry submit button to the method and system for a user order 4218;

exemplary order on the method and system by a driver to sell a specified quantity of transformed agriculture community linked transportation units or securities 4223;

exemplary order confirmation on the method and system by a driver sold two units of transformed agriculture community linked transportation units or securities 4222;

exemplary market view of priced based navigation layer to display indexed prices of a plurality routes which may be one, two, three, or an infinite number of routes between two virtual hubs 4221;

exemplary game view layer of a transformed agriculture community linked transportation unit or security 4220;

exemplary navigation view layer of a transformed agriculture community linked transportation unit or security 4219;

In some embodiments, the disclosed method and system may allow the user to select the model make, such as, by example, an Acura 4020 as a model make 4015, which is placed in a certain transformed agriculture community linked transportation specification pool that may be aggregated with similar transformed transportation unit specification participants or units that then display a user 110 selected navigation route 4211, plurality of routes 4231 and 4211, or an infinite number of routes between the agriculture community linked virtual hub start point 4206 and agriculture community linked virtual hub endpoint 4232. In some embodiments, the prices 4230 on a route 4231 may display the buy price of the highest bidder or rider on a given route 4231, which is listed in more detail in the rider queue display for highest indexed price bid 4214 for a route 4231. In some embodiments, the highest bid price 4214 for a rider on a given route 4231 has an associated quantity 4215 of transformed agriculture community linked transportation units or securities. Similarly, in some embodiments, the lowest offer or sale price 4228 for a driver on a given route 4231 has an associated quantity 4226 of transformed agriculture community linked transportation units or securities. In some embodiments, the rider quantity 4215 listed as three units, which may be one rider, two riders, or three riders who desire to purchase a given transformed agriculture community linked transportation unit(s) or securities so long as the indexed price is queued to the top based on a highest price index and time stamp for a given specification of a transformed agriculture community linked transportation unit or security. In some embodiments, transformed agriculture community linked transportation units or securities may represent a similar pool of transformed agriculture community linked transportation units or securities based on a superset or subset or the plurality of attributes such as vehicle mode make 4015, vehicle mode model type 4025, vehicle model year 4035, cheapest route 1011, single mode 1012, multi modal 1013, fastest route 1014, most scenic 1015, highest rating 1016, most available 1017, highest volume 1018, most frequent 1019, service level 1020, security and safety 1021, group restricted 1022, modes 810, automobile 811, air 812, autonomous vehicle 813, bike 814, boat 815, bus 816, drone 817, limo 818, motorcycle 819, moped 820, shuttle 821, spaceship 822, subway 823, taxi 824, train 825, fastest optimized 826, cheapest route 827, packages 828, cardo 829, virtual 830, order types 710, 720, term specification, timing specification, virtual hub end point and start point, or a plurality of other specifications. In some embodiments, the match of rider price 4214 and driver price 4228 for a transformed agriculture community linked transportation unit(s) or securities occurs if the lowest price in the driver queue 4228 equals the highest price in the rider queue 4214. In some embodiments, if no such match of prices occur between driver and rider queues for a given specification of a transformed agriculture community linked transportation unit or security, then prices remain in the queue until a match or a new order entry re-indexes the order of all the deals because the price is higher than the current highest bid in the rider queue 4214. In other implementations, the queue entries for the transformed agriculture community linked transportation unit or security may become re-indexed to place an order with the appropriate price index ranking in a queue that places the highest rider price 4214 in the top and descends by price 4216 and then time of order entry, where all other things are equal. In some embodiments, the driver price queue 4228, 4225 similarly ranks from lowest driver price 4228 at the top of the queue to highest driver price 4228 at the bottom on the queue, and then indexed by time subordinate to price for a given pool specification of transformed agriculture community linked transportation units or securities. In some embodiments, a plurality of routes 4231 and 4211 may be displayed as price based agriculture community linked navigation options indexed by market pricing. In some embodiments, the user may select one, two or many, many more routes as to how many they desire to be displayed as options between their virtual hubs in order to perform calculations that may maximize the number of agriculture community linked transportation units or securities they sell on a given route specification, the prices which they obtain, or any combination of specifications or objectives the user may have in the price based navigation method and display of transformed agriculture community linked transportation unit or security.

Figure 43:
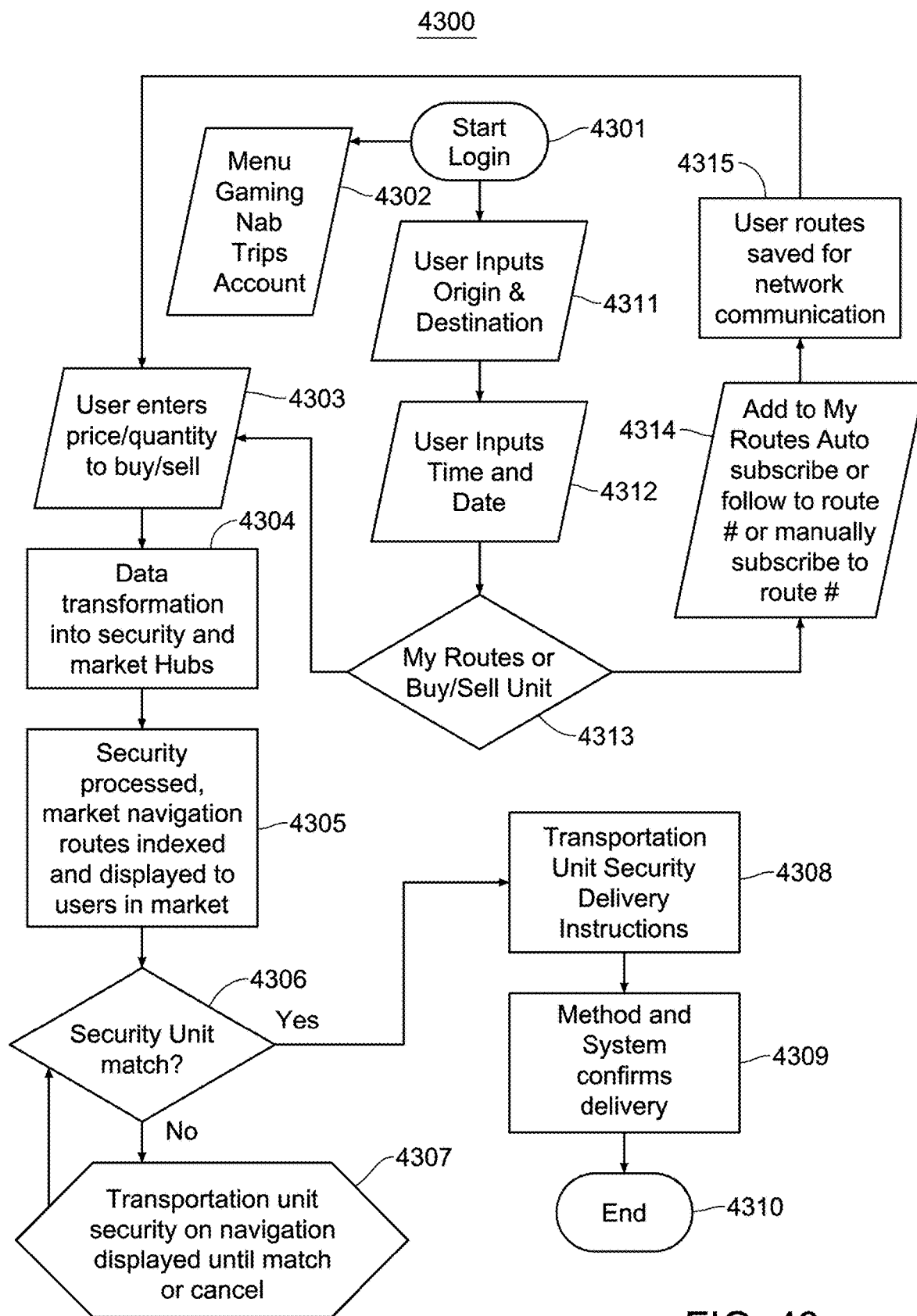
FIG. 43 illustrates an exemplary flow chart of steps in the agriculture community linked transportation unit security data transformation and presentation of the transportation unit security with integration to navigation systems which is another data transformation.

FIG. 43 illustrates an exemplary flow chart 4300 of user 110 experience during a transformed transportation unit or security life cycle. In some embodiments the user 110 may login 4301 to the system which requires the user to go to a plurality of menu options 4302 or user input for origin and destination of agriculture community linked virtual hubs 4311 alongside user inputs of time and date 4312 for a given specification. The specification may contain a subset or superset of attributes, such as vehicle mode make 4015, vehicle mode model type 4025, vehicle mode model year 4035, cheapest route 1011, single mode 1012, multi modal 1013, fastest route 1014, most scenic 1015, highest rating 1016, most available 1017, highest volume 1018, most frequent 1019, service level 1020, security and safety 1021, group restricted 1022, modes 810, automobile 811, air 812, autonomous vehicle 813, bike 814, boat 815, bus 816, drone 817, limo 818, motorcycle 819, moped 820, shuttle 821, spaceship 822, subway 823, taxi 824, train 825, fastest optimized 826, cheapest route 827, packages 828, cardo 829, virtual 830, order types 710, 720, term specification, timing specification, agriculture community linked virtual hub end point and start point, or a plurality of other specifications. In some embodiments, the user may save a route to the "My Routes" 4313 in "Add My Routes" 4314, whereby the user route is saved in the system for one touch retrieval in the future. In some embodiments, the user may enter a price or quantity to buy or sell a transformed agriculture community linked transportation unit or security of a given specification or specification combination 4303, which has many steps involved with the transformation of the agriculture community linked transportation unit or security. In some embodiments, additional data transformations 4305 occur to process, market navigation route options and indexing, virtual hub or virtual hub combination data transformations, agriculture community linked transportation unit transformations, and many other subsets or supersets of transformed transportation unit combinations and combination specifications. In some embodiments, if a transformed agriculture community linked transportation unit or security matches 4306 in price and specification, then the transformed agriculture community linked transportation unit or security moves into delivery 4308 and the deliver process has many steps of electric signal handoff and security checks, 911 system checks, GPS server and user 110 position checks, as well as transportation unit rating checks, and many other possible checks for all the data elements of the transformed agriculture community linked transportation unit or security for verification of delivery. In some embodiments, if prices of the buyer and seller queue do not match 4307, then the steps of processing 4304, 4305, 4306 repeat until a match is made 4306 to 4308 or an order is cancelled before it expires for the transformed agriculture community linked transportation unit or security.

Figure 44:
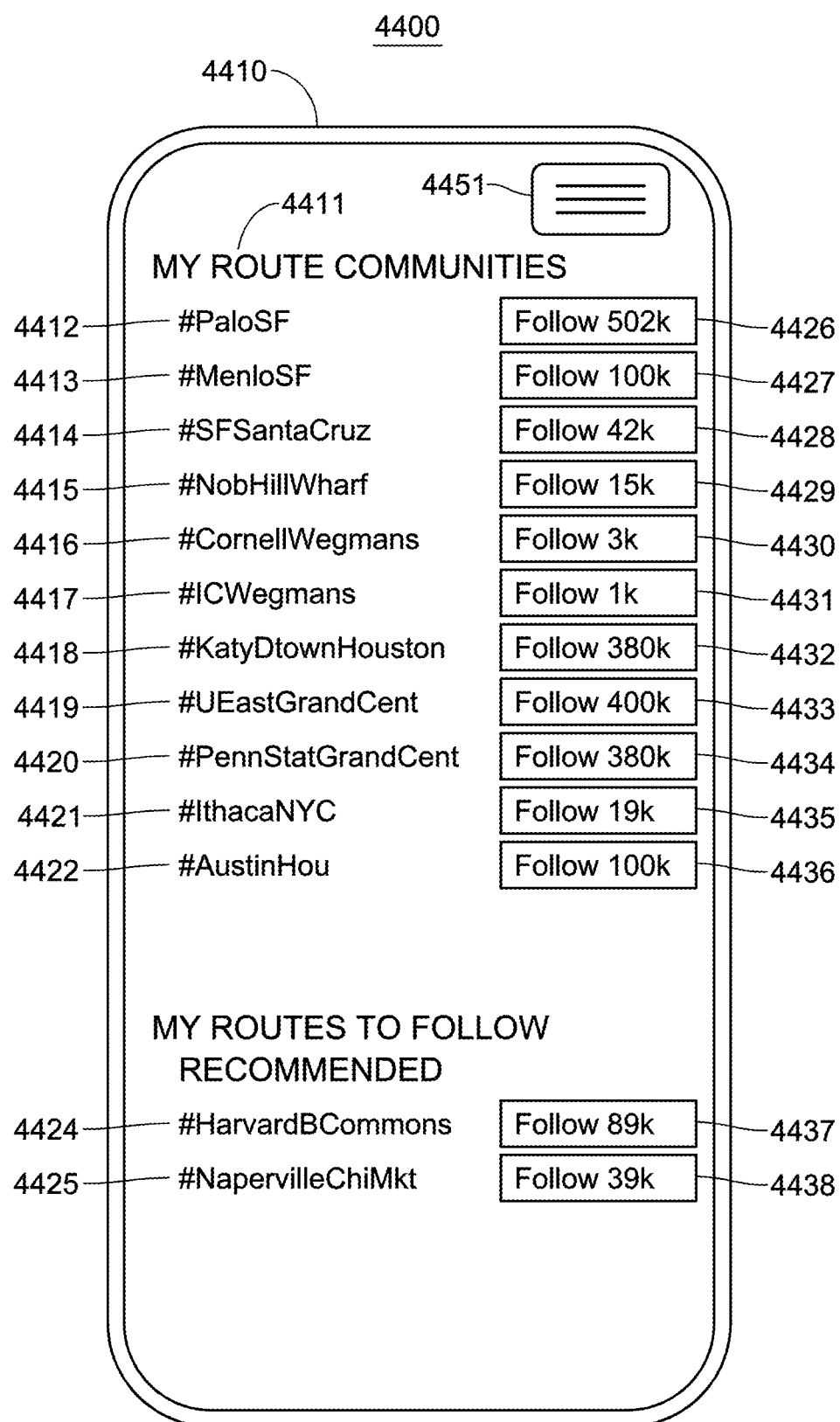
FIG. 44 illustrates an exemplary user interface of agriculture community linked virtual hub sequences as community object(s) to which users may subscribe.

FIG. 44 illustrates an exemplary user interface 4410 for the My Routes Communities functions 4411. In some embodiments, the user interface 4410 may have a menu option 4451 to move to other areas of the method and system. In some embodiments, the virtual agriculture community linked transportation hub sequence as an object may be metadata tag #PaloSF 4412 to represent Palo Alto, California to San Francisco, California. In some embodiments, #PaloSF 4412 may have an option 4426 for the user 110 to follow, join, subscribe, or add the agriculture community linked virtual transportation hub sequence #PaloSF 4412. In one examples, the number of followers or network members who are joined to that community object transformed data structure 4412 is 502,000. In some embodiments, the virtual transportation hub sequence as an object may be metadata tag #MenloSF 4413 to represent Menlo Park, California to San Francisco, California In some embodiments, #MenloSF 4413 may have an option 4427 for the user 110 to follow, join, subscribe, or add the virtual agriculture community linked transportation hub sequence #MenloSF 4413. In one example, the number of followers or network members who are joined to that community object transformed data structure 4413 is 100,000. In some embodiments, the virtual agriculture community linked transportation hub sequence as an object may be metadata tag #SFSantaCruz 4414 to represent San Francisco, California to Santa Cruz, California. In some embodiments, #SFSantaCruz 4414 may have an option 4428 for the user 110 to follow, join, subscribe, or add the virtual agriculture community linked transportation hub sequence #SFSantaCruz 4414. In one example, the number of followers or network members who are joined to that community object transformed data structure 4414 is 42,0008. In some embodiments, the virtual agriculture community linked transportation hub sequence as an object may be metadata tag #NobHillWharf 4415 to represent Nob Hill San Francisco, California to Fisherman's Wharf, San Francisco, California. In some embodiments, #NobHillWharf 4415 may have an option 4429 for the user 110 to follow, join, subscribe, or add the virtual agriculture community linked transportation hub sequence #NobHillWharf 4415. In one example, the number of followers or network members who are joined to that community object transformed data structure 4415 is 15,000. In some embodiments, the virtual agriculture community linked transportation hub sequence as an object may be metadata tag #CornellWegmans 4416 to represent Cornell University, Ithaca, NY to Wegmans, Ithaca, NY. In some embodiments, #CornellWegmans 4416 may have an option 4430 for the user 110 to follow, join, subscribe, or add the virtual agriculture community linked transportation hub sequence #CornellWegmans 4416. In one example, the number of followers or network members who are joined to that community object transformed data structure 4416 is 3,000. In some embodiments, the virtual agriculture community linked transportation hub sequence as an object may be metadata tag #ICWegmans 4417 to represent Ithaca College, Ithaca, NY to Wegmans, Ithaca, NY. In some embodiments, #ICWegmans 4417 may have an option 4431 for the user 110 to follow, join, subscribe, or add the virtual agriculture community linked transportation hub sequence #ICWegmans 4417. In one example, the number of followers or network members who are joined to that community object transformed data structure 4417 is 1,000. In some embodiments, the virtual agriculture community linked transportation hub sequence as an object may be metadata tag #KatyDtownHouston 4418 to represent Katy, Texas to Houston, Texas. In some embodiments, #KatyDtownHouston 4418 may have an option 4432 for the user 110 to follow, join, subscribe, or add the virtual agriculture community linked transportation hub sequence #KatyDtownHouston 4418. In one example, the number of followers or network members who are joined to that community object transformed data structure 4418 is 380,000. In some embodiments, the virtual agriculture community linked transportation hub sequence as an object may be metadata tag #UEastGrandCent 4419 to represent Upper East Side, NYC to Grand Central Station, NYC. In some embodiments, #UEastGrandCent 4419 may have an option 4433 for the user 110 to follow, join, subscribe, or add the virtual agriculture community linked transportation hub sequence #UEastGrandCent 4419. In one example, the number of followers or network members who are joined to that community object transformed data structure 4419 is 400,000. In some embodiments, the virtual transportation hub sequence as an object may be metadata tag #PennStatGrandCent 4420 to represent Penn Station, NYC to Grand Central Station, NYC. In some embodiments, #PennStatGrandCent 4420 may have an option 4434 for the user 110 to follow, join, subscribe, or add the virtual agriculture community linked transportation hub sequence #PennStatGrandCent 4420. In one example, the number of followers or network members who are joined to that community object transformed data structure 4420 is 280,000. In some embodiments, the virtual transportation hub sequence as an object may be metadata tag #IthacaNYC 4421 to represent Ithaca, NY to Grand Central Station, NYC. In some embodiments, #IthacaNYC 4421 may have an option 4435 for the user 110 to follow, join, subscribe, or add the virtual agriculture community linked transportation hub sequence #IthacaNYC 4421. In one example, the number of followers or network members who are joined to that community object transformed data structure 4421 is 19,000. In some embodiments, the virtual agriculture community linked transportation hub sequence as an object may be metadata tag #AustinHou 4422 to represent Austin, Texas to Houston, Texas. In some embodiments, #AustinHou 4422 may have an option 4436 for the user 110 to follow, join, subscribe, or add the virtual agriculture community linked transportation hub sequence #AustinHou 4422. In one example, the number of followers or network members who are joined to that agriculture community linked community object transformed data structure 4422 is 100,000. In some embodiments, the virtual agriculture community linked transportation hub sequences may be recommended 4423 to follow as an object may be metadata tag #HarvardBCommons 4424 to represent Harvard, Cambridge, Mass to Boston Commons. In some embodiments, #HarvardBCommons 4424 may have an option 4437 for the user 110 to follow, join, subscribe, or add the virtual agriculture community linked transportation hub sequence #HarvardBCommons 4424. In one example, the number of followers or network members who are joined to that community object transformed data structure 4424 is 89,000. In some embodiments, the virtual agriculture community linked transportation hub sequences may be recommended 4423 to follow as an object may be metadata tag #NapervilleChiMkt 4425 to represent Naperville, Chicago to Marketplace, Chicago, Ill. In some embodiments, #NapervilleChiMkt 4425 may have an option 4438 for the user 110 to follow, join, subscribe, or add the virtual agriculture community linked transportation hub sequence #NapervilleChiMkt 4425. In one example, the number of followers or network members who are joined to that agriculture community linked community object transformed data structure 4425 is 39,000.

Figure 45:
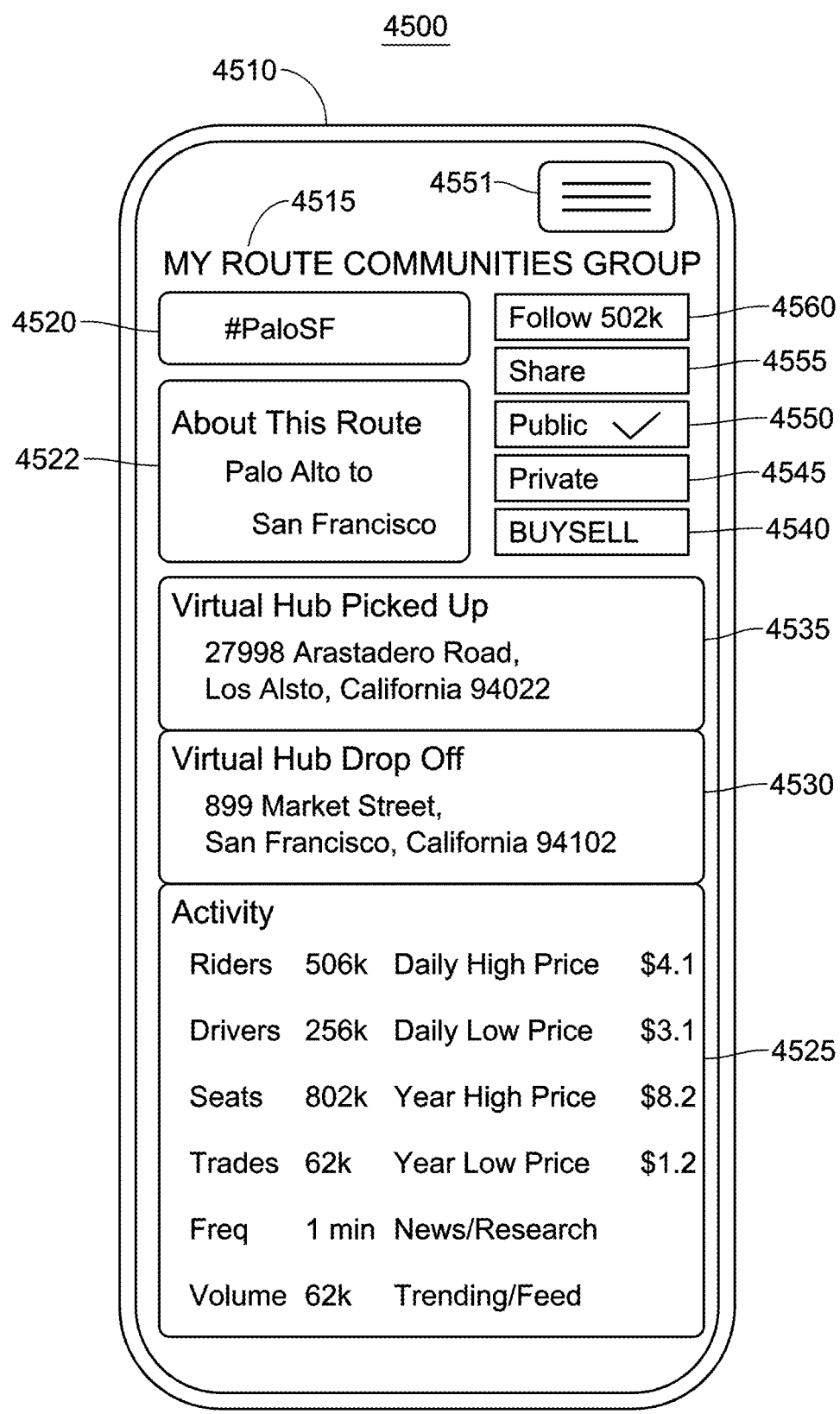
FIG. 45 illustrates an exemplary user interface of an exemplary agriculture community linked virtual hub sequence as a community object and the associated attributes.

FIG. 45 illustrates an exemplary user interface 4510 for the My Routes Communities Group 4515 for a specific transformed data structure of a transformed agriculture community linked community virtual hub sequence 4520. In some embodiments, the meta data virtual hub sequence #PaloSF 4520 may list the long form route details in the about the agriculture community linked route section 4522. In some embodiments, the specific hub sequence #PaloSF 4520 may list the number of followers and an option to follow 4560. In some embodiments, the specific hub sequence #PaloSF 4520 may list the ability to share the agriculture community linked community group with another social network or text or email or other network protocol. In some embodiments, the specific hub sequence #PaloSF 4520 may list group as public 4550 or private 4545. In some embodiments, the specific hub sequence #PaloSF 4520 may list a gateway to buy or sell 4540 transformed transportation units using the LOB for a commute community. In some embodiments, the specific hub sequence #PaloSF 4520 may list specific pick up hub address location 4535 or drop off point address 4530. In some embodiments, the specific hub sequence #PaloSF 4520 may list the activity statistics and data 4525 with respect to the number of riders, number of drivers, number of seats, number of trades, frequency of agriculture community linked transportation units, volume of agriculture community linked transportation units, daily high price for transportation units, daily low price for agriculture community linked transportation units on the community object of #PaloSF 4520, yearly high price, yearly low price, news, research, trending, and/or feeds for the #PaloSF 4520 virtual hub sequence.

Figure 46:
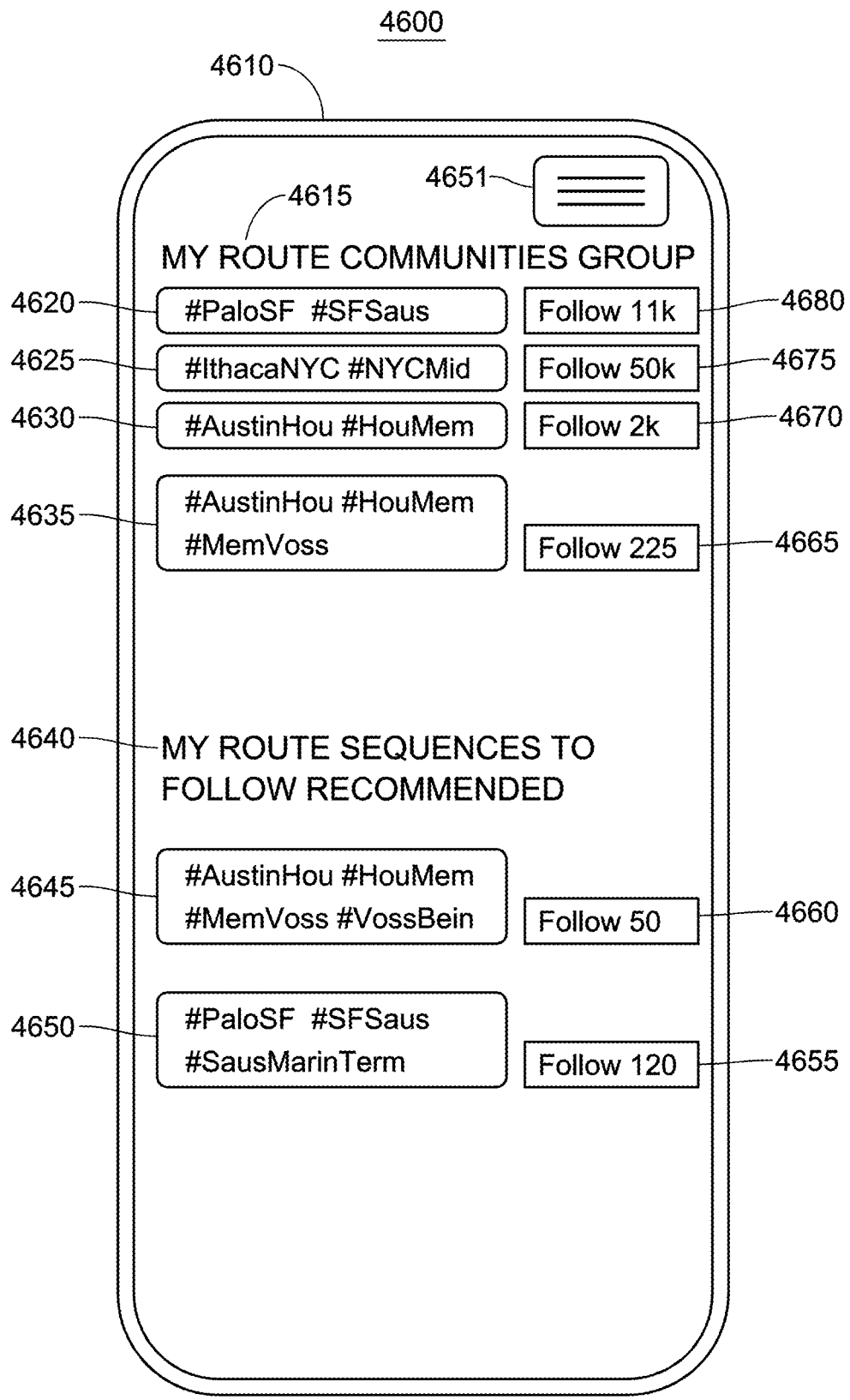
FIG. 46 illustrates an exemplary multi-virtual hub sequence agriculture community linked object combination.

FIG. 46 illustrates an exemplary user interface 4610 with respect to My Route Sequences 4615 which may transform sequences with more than two virtual hubs into sequences as two or three or more series of route sequences 4620. In some embodiments, #PaloSF #SFSaus 4620 may represent an origin virtual hub sequence of Palo Alto, California to San Francisco, California followed by a secondary sequence of San Francisco, California to Sausalito, California 4620. Multi leg virtual hub sequences allow for the power of the data transformation to link the villages, cities, or states from a network agriculture community linked transportation topology structure from multiple providers of agriculture community linked transportation units to provide higher levels of frequency and market opportunity to link public and private systems among many other benefits. In some embodiments, #PaloSF #SFSaus 4620 may allow input from users to join, follow, subscribe, or become a member 4680 of multi leg sequences which help solve potential last mile issues within agriculture community linked transportation systems. In some embodiments, #IthacaNYC #NYCMid 4625, may allow for an agriculture community linked transportation unit seller or buyer to connect two disparate agriculture community linked transportation networks to provide last mile agriculture community linked transportation to a destination at the lowest market cost because each leg or series of agriculture community linked virtual hub sequences has an independent market associated with the leg or agriculture community linked virtual hub sequence #IthacaNYC #NYCMid 4625. In some embodiments, #IthacaNYC #NYCMid 4625 may allow input from users to join, follow, subscribe, or become a member 4675 of multi leg sequences which help solve potential last mile issues within agriculture community linked transportation systems. In some embodiments, three two leg sequences may be attached through data transformations such that #AustinHou then takes a transportation unit to #HouMem which then takes a transportation unit to #MemVoss. The #AustinHou #HouMem #MemVoss 4635 three leg virtual hub sequence combination may further solve last mile issues for travelers where public transport may be an issue or private rides simply are going a different direction. The sequence agriculture community linked community object transformation helps travelers understand options and piece multiple agriculture community linked transportation systems onto a single community based object to aggregate communication and transaction benefits of the system. In some embodiments, prior history navigation searches and locations may be used to build recommended additional sequences 4640 which may be recommended for users to subscribe, join, follow, or become a member. In some embodiments, the virtual hub route sequence may link 4 or more virtual hub sequence pairs or even combinations of already linked community object pairs 4645. In some embodiments, #AustinHou #HouMem #MemVoss #VossBein 4645 may be linked to provide a last mile sequence to a traveler or driver from Austin to the Memorial Area of Houston in a specific address. Traversing a series of linked trips may allow for the cost of non-linked trips to be dramatically lower due to using a series of connected local seats rather than a private for hire vehicle, which may be 10 times the cost and add a reverse dead head trip that further pollutes the environment and leaves the driver without additional income on the dead head return leg. The transformed virtual hub sequence methodology allows for agriculture community linked transportation systems to be integrated in ways that were not formerly possible because the systems were disparate or simply did not allow for linked trips or linked community objects that could optimize topological network structures over existing inefficient structures. In some embodiments, virtual hub sequences which have been linked 4645 may also allow users to subscribe 4660. In some embodiments, #PaloSF #SFSaus #SausMarinTerm 4650 may be linked to provide a last mile sequence to a traveler or driver from Palo Alto, California to Marin Terminal in Sausalito, California in a specific address. In some embodiments, virtual hub sequences which have been linked 4650 may also allow users to subscribe 4655.

Figure 47:
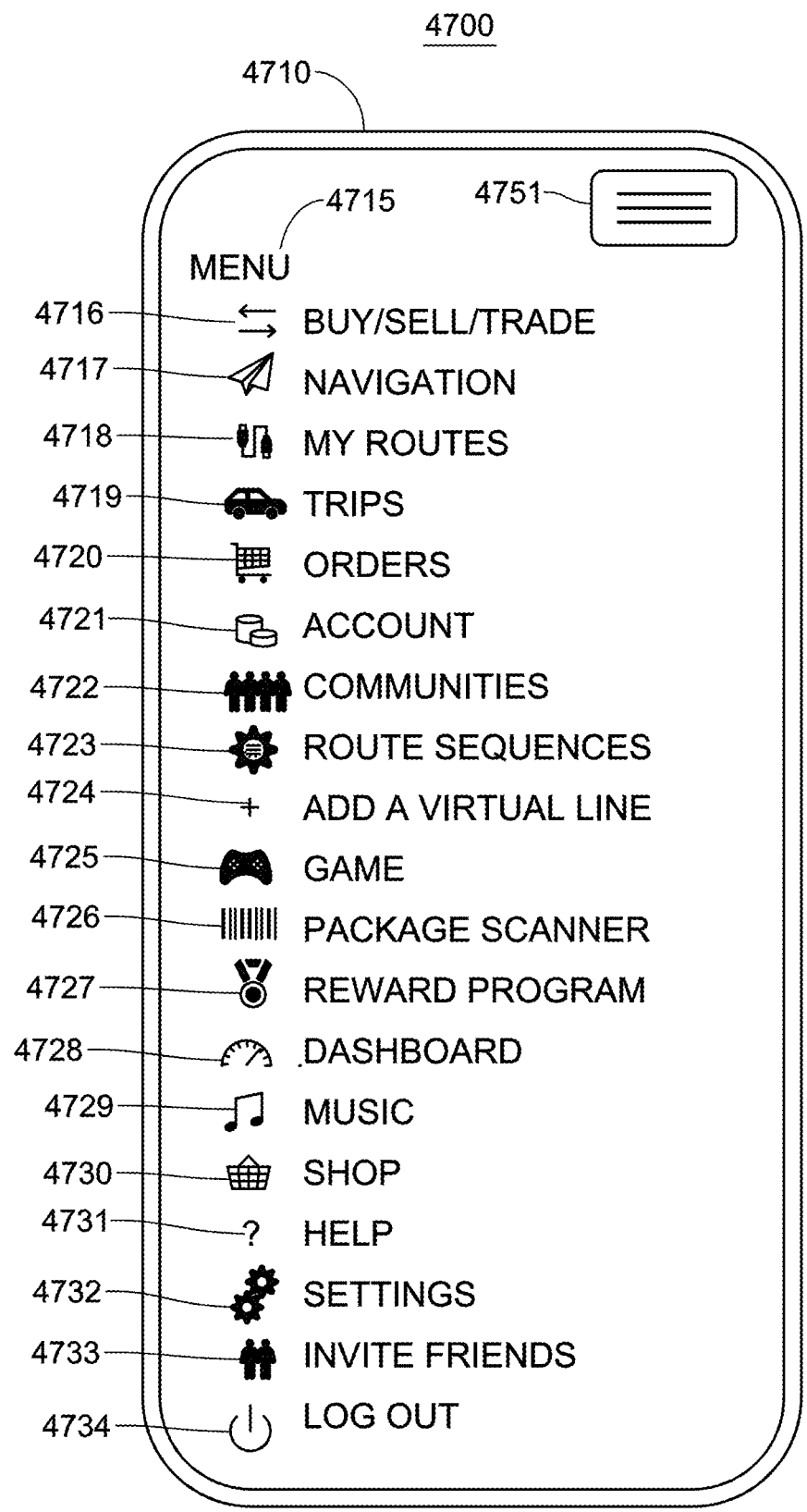
FIG. 47 illustrates an exemplary menu user interface for the method and system of agriculture community linked virtual hub transportation sequence unit market system and method.

FIG. 47 illustrates an exemplary user menu interface 4710. In some embodiments, menu options may include buy/sell/trade 4716 to go to the agriculture community linked transportation unit gateway trading platform for virtual hub combinations and virtual hub sequences. In some embodiments, the user interface may allow a user to go to the navigation module 4717 for price based navigation or route selection based on cost or earnings from a route, as described in U.S. patent application Ser. No. 16/242,967, "Price Based Navigation," filed Jan. 8, 2019, the entirety of which is incorporated by reference herein. Furthermore, such an implementation is also described in U.S. patent application Publication, Ser. No. 15/877,393, "Electronic Forward Market Exchange for Transportation Seats and Capacity in Transportation Spaces and Vehicles," filed Jan. 23, 2018, the entirety of which is incorporated by reference herein. In some embodiments, a user 110 may select my routes 4718 to toggle to routes that are important to their user profile or needs in the network member database 222. In some embodiments, trips 4719 may be selected to toggle to the trip delivery view. In some embodiments, orders 4720 may be selected to toggle to cancel or adjust orders in the system that are unfilled. In some embodiments, users may toggle to the account 4721 page or agriculture community linked communities object page or the route sequences page 4723. In some embodiments, users 110 may add additional hubs 4724 or may toggle to the gaming interface. In some embodiments, agriculture community linked freight transportation units may need to be scanned on the freight scanning module 4726. In some embodiments, users may select the reward program module 4727 or the dashboard module 4728. In some embodiments, the user may select the music 4729 or shopping module 4730. In some embodiments, the user may select help 4731 or settings 4732 to update account information or privacy settings. In some embodiments, users 110 may invite friends 4733 for rewards or bonuses or cash or credits 4733. In some embodiments, users may also logout 4734.

Figure 48:
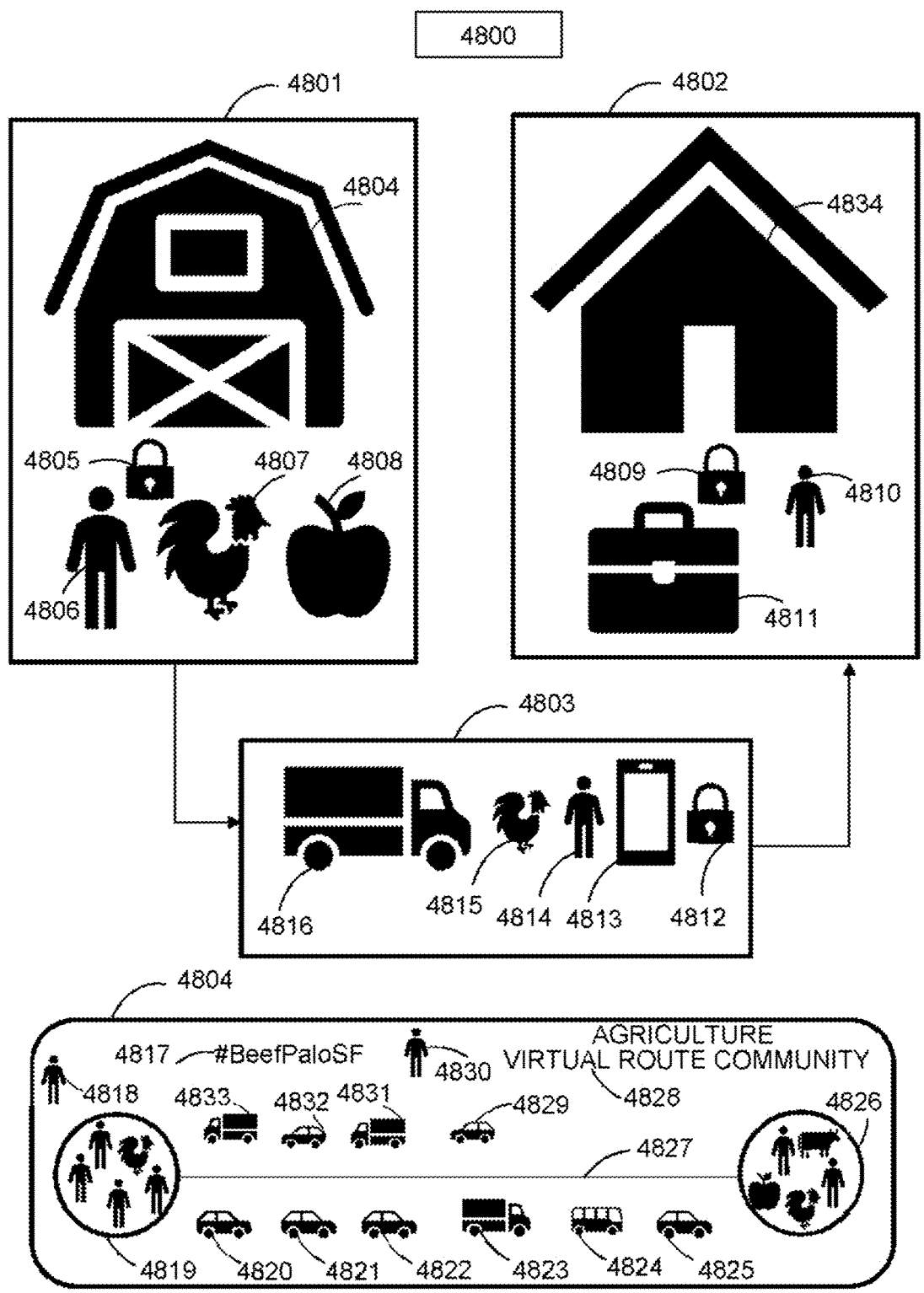
FIG. 48 illustrates an exemplary menu user interface for the method and system of agriculture community linked transportation price-time priority queues with delivery security sequence.

FIG. 48 illustrates another exemplary network configuration 4800 module of the disclosed method and system which records the network architecture of a typical agriculture community linked object with a price-time priority queue and resulting delivery sequence and integration with the agriculture linked virtual community object. In some embodiments, the multi layered network node topology of participating, transacting and/or trading transformed agriculture community linked transportation or freight capacity units or securities for agriculture community linked objects 4800 includes the following elements, or a subset or superset thereof:

- exemplary agricultural community object waypoint origin 4801;
- exemplary agricultural community object waypoint destination 4802;
- exemplary agricultural community object during transit 4803;
- exemplary agricultural community object 4804 to which a user may subscribe, join, friend, follow, etc.;
- exemplary barn or agriculture community unit storage unit at an agriculture community waypoint origin 4804;
- exemplary storage security device which electronically locks or unlocks the agriculture community object for transport 4805 at waypoint origin;
- exemplary agricultural community object user at waypoint origin 4806;
- exemplary agricultural community object unit in the form of an exemplary chicken at the agriculture community waypoint origin 4807;
- exemplary agricultural community object unit in the form of an exemplary apple at the agriculture community waypoint origin 4808;
- exemplary storage security device which electronically locks or unlocks the agriculture community object for transport 4809 at destination waypoint;
- exemplary agricultural community object user at waypoint destination 4810;
- exemplary agricultural community delivery lock box at waypoint destination 4811 for agricultural community unit;
- exemplary agricultural community unit transport vehicle in transit between origin and destination waypoint 4816;
- exemplary agricultural community unit in transit between origin and destination waypoint 4815;
- exemplary agricultural community unit transport driver in transit between origin and destination waypoint 4814;
- exemplary agricultural community unit transport mobile computer device method and system interface in transit between origin and destination waypoint 4813;
- exemplary agricultural community unit transport mobile computer device method and system security interface in transit between origin and destination waypoint 4812;

exemplary agricultural community object tag between origin and destination waypoint(s) for a specified agriculture community object such as beef 4817;

exemplary agricultural community linked transport unit user at origin waypoint 4818;

exemplary agricultural community linked virtual transport route object 4828;

exemplary agricultural community linked object origin waypoint 4819 with users and agriculture units;

exemplary agricultural community linked object destination waypoint 4826 with users and agriculture units;

exemplary agriculture community virtual route user 4830;

exemplary agricultural community linked object unit transport vehicles on an exemplary waypoint combination 4833, 4832, 4831, 4829, 4820, 4821, 4822, 4823, 4824, 4825.

In some embodiments, users 4806, 4810, 4814, 4818, 4830, 4819, 4826 may follow, subscribe, or friend an agriculture community 4828 linked virtual route for a particular agricultural unit, such as beef, for example, but not limited by the example. In some embodiments, the agriculture community linked transport unit 4817 may be comprised of livestock, such as chicken, beef, lamb, goat, fish, horse, pork, or other agriculture livestock varieties. In some embodiments, the agriculture community linked transport unit 4817 may be comprised of apples 4808, oranges, lettuce, spinach, grapes, potatoes, corn, wheat, vegetables, fruit, or other agricultural produce. In some embodiments, the agriculture community linked transport unit user may be a farmer 4806 who produces agricultural livestock 4807 or produce 4808 at a waypoint origin 4819 and desires to participate or transact in the price-time priority queue for a certain agricultural unit 4807 on a waypoint sequence 4819, 4826 or 4801, 4802. In some embodiments, the agriculture community linked transport unit user may be an end consumer, restaurant, hotel, processor, or other end user 4810 who desires to participate in the price-time priority queue for certain agricultural units 4807, 4808. In some embodiments, the end user 4810 or origin producer 4806 of the agricultural community linked object with waypoint 4804 may use a mobile, fixed, visual, or audio interface of a computer unit 4813 to enter price-time priority queue based transactions for agriculture units 4807, 4808, 4815 along an agriculture community linked waypoint combination path 4827. In some embodiments, agriculture virtual route communities may serve as virtual farmers markets with associated price time priority queues and GPS tracking of the agricultural units 4807, 4808, 4815 through the scanning of agriculture units at agriculture unit waypoint origin 4801, waypoint destination 4802, or along the waypoint sequence path 4803. In some embodiments, the user 4806 may transfer agriculture units 4807, 4808 by using the scan feature of the mobile, fixed, visual, or audio interface of the computer unit 4813 to an agriculture community linked transport user 4814 in the agriculture community linked vehicle 4816 as a security authorized transaction participant of the price-time priority queue of the agriculture community linked transport unit. In some embodiments, the agriculture community linked transport unit may be delivered to an end user 4810 at an end user destination waypoint 4834 by using the mobile, fixed, visual, or audio interface of the computer unit 4813 unlock sequence interface to deliver the agriculture community linked transport unit 4815 to a secure delivery storage unit 4811. In some embodiments, scanning procedures of the mobile, fixed, visual, or audio interface of the computer unit 4813 may comprise secure transfer and records or the agricultural community linked transport unit 4815 for both pickup transfer at the agriculture community unit object origin 4801, waypoint combination transfer transport 4803, and waypoint destination delivery 4802.

Figure 49:
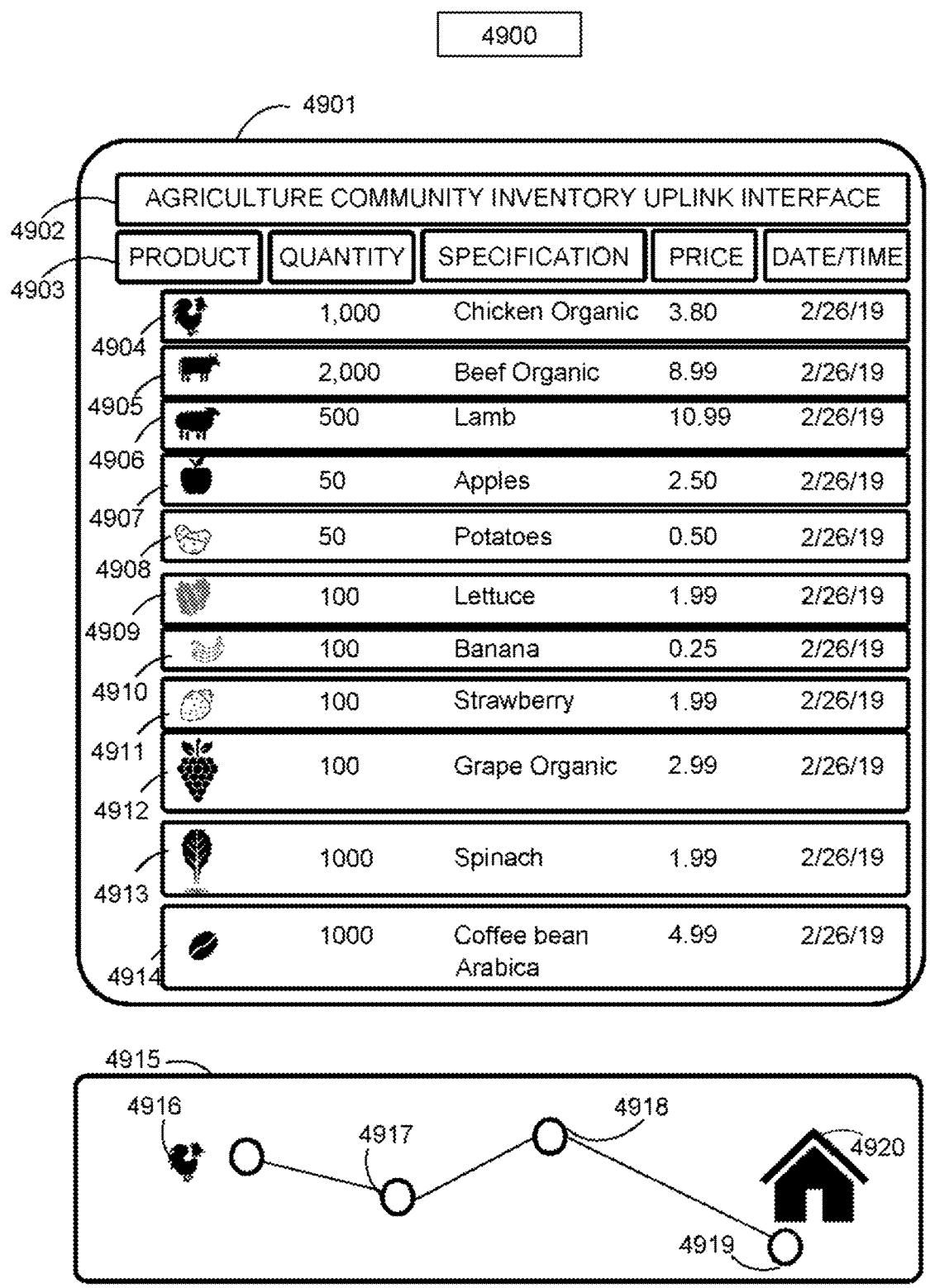
FIG. 49 illustrates an exemplary agriculture unit uplink inventory interface with agriculture community linked virtual hub transportation sequence unit market system and method.

FIG. 49 illustrates an exemplary agriculture community inventory uplink interface 4900 of the disclosed method and system to upload agriculture community linked transport unit inventory to the agriculture linked virtual community object. In some embodiments, the uplink element of the multi layered network node topology of participating, transacting and/or trading transformed agriculture community linked transportation or freight capacity units or securities for agriculture community linked objects includes the following elements, or a subset or superset thereof:

exemplary agricultural community object unit uplink interface 4901 for agriculture unit inventory automation;

exemplary agricultural community object unit product type, quantity, specification, price, date, and time 4903;

exemplary agricultural community unit object of chicken 4904 with a plurality of specifications;

exemplary agricultural community unit object of beef 4905 with a plurality of specifications;

exemplary agricultural community unit object of lamb 4906 with a plurality of specifications;

exemplary agricultural community unit object of apple 4907 with a plurality of specifications;

exemplary agricultural community unit object of potato 4908 with a plurality of specifications;

exemplary agricultural community unit object of lettuce 4909 with a plurality of specifications;

exemplary agricultural community unit object of banana 4910 with a plurality of specifications;

exemplary agricultural community unit object of strawberry 4911 with a plurality of specifications;

exemplary agricultural community unit object of organic grape 4912 with a plurality of specifications;

exemplary agricultural community unit object of spinach 4913 with a plurality of specifications;

exemplary agricultural community unit object of coffee bean arabica 4914 with a plurality of specifications;

exemplary agricultural community unit object delivery sequence 4915;

exemplary agricultural community unit object at origin waypoint 4916;

exemplary agricultural community linked transport unit object transfer or bypass waypoint 4917;

exemplary agricultural community linked transport unit object transfer or bypass waypoint 4918;

exemplary agricultural community linked transport unit object destination waypoint 4919 and storage delivery unit 4920;

In some embodiments, the method and system of agricultural community linked transport units 4916 with agriculture community linked transport price-time priority queues may utilize an uplink module interface 4901 to upload agriculture unit inventory to the agriculture community linked transport unit object which may also be a form of a virtual farmers market interface to farmer users of the method and system. In some embodiments, the agriculture may include a subset or superset of the following agriculture unit examples, but not limiting by the examples: organic chicken 4904, organic beef 4905, lamb 4906, apples 4907, potatoes 4908, lettuce 4909, bananas 4910, strawberries 4911, organic grapes 4912, spinach 4913, *arabica* coffee beans 4914, or a plurality of other agricultural units common to the agriculture market. In some embodiments, the agriculture units may include specifications and nutrition profiles in the specifications to standardize the units in the data transformations of the agriculture units 4916. In some embodiments, the end user interface may include search optimization algorithms that link end user blood and biomarker algorithms to food that has been determined by the algorithms to rank high for the end user, as described in U.S. patent application Ser. No. 15/484,059, "BLOOD AND SALIVA BIOMARKER OPTIMIZED FOOD CONSUMPTION AND DELIVERY WITH ARTIFICIAL INTELLIGENCE," filed Apr. 10, 2017; the entirety of which is incorporated by reference herein.

The aforementioned description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
receiving, by a networked computing system, origin location data and destination location data from a plurality of users, wherein the origin location data corresponds to geographic origins and the destination location data corresponds to geographic destinations;
determining, by one or more processors of the networked computing system, a plurality of virtual hubs based on the origin location data and the destination location data, wherein the plurality of virtual hubs comprises one or more origin virtual hubs determined based on the origin location data and one or more destination virtual hubs determined based on the destination location data, and wherein the plurality of virtual hubs are dynamically updated in response to changes to at least one of the origin location data and the destination location data;
storing, in one or more database servers of the networked computing system, virtual hub location data corresponding to the one or more origin virtual hubs and the one or more destination virtual hubs;
determining, by the one or more processors of the networked computing system, a plurality of virtual hub routes based on the plurality of virtual hubs, wherein a respective virtual hub route corresponds to a geographic route from a location corresponding to a respective origin virtual hub to a location corresponding to a respective destination virtual hub;
receiving, by the networked computing system, agricultural attribute data from the plurality of users, wherein the agricultural attribute data corresponds to one or more attributes of one or more agricultural products available for purchase from the plurality of users using the plurality of virtual hub routes;
generating, by the one or more processors of the networked computing system, an agricultural market platform for one or more agricultural units based on the plurality of virtual hub routes and the agricultural attribute data, wherein:
the one or more agricultural units correspond to the one or more agricultural products available for purchase from the plurality of users using the plurality of virtual hub routes;
the agricultural market platform corresponds to market depth data, the market depth data comprising data indicating at least a bid price or offer price provided by a respective user for a respective agricultural unit; and
the agricultural market platform provides real-time transaction capabilities between the plurality of users for the purchase and sale of the one or more agricultural products available for purchase; and
storing, in the one or more database servers of the networked computing system, the agricultural market platform.

2. The method of claim 1, further comprising:
generating the one or more agricultural units for at least a first subset of the plurality of users based on the one or more agricultural products available for purchase from the plurality of users using the plurality of virtual hub routes, wherein:
the agricultural attribute data comprises data corresponding to product type, product quantity, product specification, product price, product availability, or combinations thereof.

3. The method of claim 1, further comprising:
detecting, at respective user interfaces of the plurality of users, respective user network of the respective user interfaces using facial recognition or fingerprint recognition for authentication, wherein:
the one or more agricultural products comprise one or more products corresponding to agricultural livestock, one or more products corresponding to agricultural produce, or combinations thereof.

4. The method of claim 3, further comprising:
generating one or more graphical layers on respective user interfaces of at least one of first and second users of the plurality of users, wherein:
the one or more graphical layers are configured to be superimposed on a respective navigational map interface of the respective user interfaces; and
the one or more graphical layers comprise at least one or more of: buttons, icons, settings tables, or menus configured for selection or manipulation by at least one of the first and second users;
the one or more products corresponding to the agricultural livestock comprise one or more products corresponding to chicken, beef, lamb, goat, fish, horse, pork, or combinations thereof; and
the one or more products corresponding to the agricultural produce comprise one or more products corresponding to apples, oranges, lettuce, spinach, grapes, potatoes, corn, wheat, or combinations thereof.

5. The method of claim 1, further comprising receiving transaction input data from the plurality of users, wherein the transaction input data comprises data corresponding to acceptance of at least the bid price or the offer price.

6. The method of claim 5, further comprising generating an interface on a computing device, wherein the interface is configured to receive the transaction input data, and wherein the transaction input data comprises fixed input data, visual input data, audio input data, or combinations thereof.

7. The method of claim 1, further comprising generating a priority queue of the one or more agricultural units using the agricultural market platform, wherein the priority queue orders the one or more agricultural units based on product type, product quantity, product specification, product price, product availability, or combinations thereof.

8. The method of claim 1, wherein the respective virtual hub route comprises one or more additional locations along the geographic route, and wherein the one or more additional locations correspond to one or more additional virtual hubs.

9. A computing system, comprising:
one or more processors; and
one or more memory comprising program instructions executable by the one or more processors to:
receive origin location data and destination location data from a plurality of users, wherein the origin location data corresponds to geographic origins and the destination location data corresponds to geographic destinations;
determine a plurality of virtual hubs based on the origin location data and the destination location data, wherein the plurality of virtual hubs comprises one or more origin virtual hubs determined based on the origin location data and one or more destination virtual hubs determined based on the destination location data, and wherein the plurality of virtual hubs are dynamically updated in response to changes to at least one of the origin location data and the destination location data;
store, in one or more database servers of the computing system, virtual hub location data corresponding to the one or more origin virtual hubs and the one or more destination virtual hubs;
determine a plurality of virtual hub routes based on the plurality of virtual hubs, wherein a respective virtual hub route corresponds to a geographic route from a location corresponding to a respective origin virtual hub to a location corresponding to a respective destination virtual hub;
receive agricultural attribute data from the plurality of users, wherein the agricultural attribute data corresponds to one or more attributes of one or more agricultural products available for purchase from the plurality of users using the plurality of virtual hub routes;
generate an agricultural market platform for one or more agricultural units based on the plurality of virtual hub routes and the agricultural attribute data, wherein:
the one or more agricultural units correspond to the one or more agricultural products available for purchase from the plurality of users using the plurality of virtual hub routes;
the agricultural market platform corresponds to market depth data, the market depth data comprising data indicating at least a bid price or offer price provided by a respective user for a respective agricultural unit; and
the agricultural market platform provides real-time transaction capabilities between the plurality of users for the purchase and sale of the one or more agricultural products available for purchase; and
store, in the one or more database servers of the computing system, the agricultural market platform.

10. The computing system of claim 9, wherein the agricultural attribute data comprises data corresponding to product type, product quantity, product specification, product price, product availability, or combinations thereof.

11. The computing system of claim 9, wherein the one or more agricultural products comprise one or more products corresponding to agricultural livestock, one or more products corresponding to agricultural produce, or combinations thereof.

12. The computing system of claim 11, wherein:
the one or more products corresponding to the agricultural livestock comprise one or more products corresponding to chicken, beef, lamb, goat, fish, horse, pork, or combinations thereof; and
the one or more products corresponding to the agricultural produce comprise one or more products corresponding to apples, oranges, lettuce, spinach, grapes, potatoes, corn, wheat, or combinations thereof.

13. The computing system of claim 9, wherein the one or more memory further comprises program instructions executable by the one or more processors to receive transaction input data from the plurality of users, wherein the transaction input data comprises data corresponding to acceptance of at least the bid price or the offer price.

14. The computing system of claim 13, wherein the one or more memory further comprises program instructions executable by the one or more processors to generate an interface on a computing device, wherein the interface is configured to receive the transaction input data, and wherein the transaction input data comprises fixed input data, visual input data, audio input data, or combinations thereof.

15. The computing system of claim 9, wherein the one or more memory further comprises program instructions executable by the one or more processors to generate a priority queue of the one or more agricultural units using the agricultural market platform, wherein the priority queue orders the one or more agricultural units based on product type, product quantity, product specification, product price, product availability, or combinations thereof.

16. The computing system of claim 9, wherein the respective virtual hub route comprises one or more additional locations along the geographic route, and wherein the one or more additional locations correspond to one or more additional virtual hubs.

17. A non-transitory computer-readable medium having stored thereon a plurality of computer-executable instructions which, when executed by a computer, cause the computer to:
receive origin location data and destination location data from a plurality of users, wherein the origin location data corresponds to geographic origins and the destination location data corresponds to geographic destinations;
determine a plurality of virtual hubs based on the origin location data and the destination location data, wherein the plurality of virtual hubs comprises one or more origin virtual hubs determined based on the origin location data and one or more destination virtual hubs determined based on the destination location data, and wherein the plurality of virtual hubs are dynamically updated in response to changes to at least one of the origin location data and the destination location data;
store, in one or more database servers of a computing system, virtual hub location data corresponding to the one or more origin virtual hubs and the one or more destination virtual hubs;
determine a plurality of virtual hub routes based on the plurality of virtual hubs, wherein a respective virtual hub route corresponds to a geographic route from a location corresponding to a respective origin virtual hub to a location corresponding to a respective destination virtual hub;
receive agricultural attribute data from the plurality of users, wherein the agricultural attribute data corresponds to one or more attributes of one or more agricultural products available for purchase from the plurality of users using the plurality of virtual hub routes;

generate an agricultural market platform for one or more agricultural units based on the plurality of virtual hub routes and the agricultural attribute data, wherein:
   the one or more agricultural units correspond to the one or more agricultural products available for purchase from the plurality of users using the plurality of virtual hub routes;
   the agricultural market platform corresponds to market depth data, the market depth data comprising data indicating at least a bid price or offer price provided by a respective user for a respective agricultural unit; and
   the agricultural market platform provides real-time transaction capabilities between the plurality of users for the purchase and sale of the one or more agricultural products available for purchase; and store, in the one or more database servers of the computing system, the agricultural market platform.

18. The non-transitory computer-readable medium of claim 17, wherein the agricultural attribute data comprises data corresponding to product type, product quantity, product specification, product price, product availability, or combinations thereof.

19. The non-transitory computer-readable medium of claim 17, wherein the one or more agricultural products comprise one or more products corresponding to agricultural livestock, one or more products corresponding to agricultural produce, or combinations thereof.

20. The non-transitory computer-readable medium of claim 19, wherein:
   the one or more products corresponding to the agricultural livestock comprise one or more products corresponding to chicken, beef, lamb, goat, fish, horse, pork, or combinations thereof; and
   the one or more products corresponding to the agricultural produce comprise one or more products corresponding to apples, oranges, lettuce, spinach, grapes, potatoes, corn, wheat, or combinations thereof.

* * * * *